US008533141B2

(12) United States Patent  (10) Patent No.: US 8,533,141 B2
Doig et al.  (45) Date of Patent: Sep. 10, 2013

(54) SYSTEMS AND METHODS FOR RULE BASED INCLUSION OF PIXEL RETARGETING IN CAMPAIGN MANAGEMENT

(75) Inventors: Toby Doig, Herts (GB); Craig Gooding, London (GB)

(73) Assignee: Vibrant Media, Inc., New York, NY (US)

(*) Notice: Subject to any disclaimer, the term of this patent is extended or adjusted under 35 U.S.C. 154(b) by 274 days.

(21) Appl. No.: 12/872,625

(22) Filed: Aug. 31, 2010

(65) Prior Publication Data
US 2012/0054143 A1   Mar. 1, 2012

(51) Int. Cl.
*G06N 5/00* (2006.01)
(52) U.S. Cl.
USPC .............................. 706/47; 706/45
(58) Field of Classification Search
USPC .................................... 706/47, 45
See application file for complete search history.

(56) References Cited

U.S. PATENT DOCUMENTS

| | | | |
|---|---|---|---|
| 5,204,947 A | 4/1993 | Bernstein et al. |
| 5,251,294 A | 10/1993 | Abelow |
| 5,694,594 A | 12/1997 | Chang |
| 5,708,825 A | 1/1998 | Sotomayor |
| 5,794,210 A | 8/1998 | Goldhaber et al. |
| 5,794,257 A | 8/1998 | Liu et al. |
| 5,815,830 A | 9/1998 | Anthony |
| 5,822,539 A | 10/1998 | Van Hoff |
| 5,822,720 A | 10/1998 | Bookman et al. |
| 5,848,397 A | 12/1998 | Marsh et al. |
| 5,857,181 A | 1/1999 | Augenbraun et al. |
| 5,903,889 A | 5/1999 | De La Huerga et al. |
| 5,920,859 A | 7/1999 | Li |
| 5,948,061 A | 9/1999 | Merriman et al. |

(Continued)

FOREIGN PATENT DOCUMENTS

| EP | 0 778 534 | 6/1997 |
|---|---|---|
| EP | 8 222 535 A2 | 2/1998 |

(Continued)

OTHER PUBLICATIONS

Fleck, et al., 3D Surveillance—A Distributed Network of Smart Cameras for Real-Time Tracking and its Visualization in 3D, Proceedings of the 2006 Conference on Computer Vision and Pattern Recognition Workshop (CVPRW'06), 2006, pp. 1-9.*

(Continued)

*Primary Examiner* — Wilbert L Starks
(74) *Attorney, Agent, or Firm* — Foley & Lardner LLP; Christopher J. McKenna

(57) ABSTRACT

The present solution provides a configurable, dynamic and flexible mechanism to define and use pixel rules to identity and select campaigns for the user based on the user's pixel history as well as other behavior data. The pixel rules can be configured to identify one or more mandatory pixels that have to be present or tracked for the user in order to include or exclude a campaign in a campaign selection process. The pixel rules can be configured to identify weighted pixels that have to be present or tracked for the user in order to include or exclude a campaign in a campaign selection process. The pixel rules may identify any combination of mandatory and weighted pixel rules. These pixel rules may be configured via a user interface of a development tool and during run-time campaign management applied to the user pixel history to select and deliver campaigns.

20 Claims, 51 Drawing Sheets

(56) References Cited

U.S. PATENT DOCUMENTS

| | | | |
|---|---|---|---|
| 5,963,205 | A | 10/1999 | Sotomayor |
| 5,991,809 | A | 11/1999 | Kriegsman |
| 5,999,912 | A | 12/1999 | Wodarz et al. |
| 6,052,730 | A | 4/2000 | Felciano et al. |
| 6,092,074 | A | 7/2000 | Rodkin et al. |
| 6,098,081 | A | 8/2000 | Heidorn et al. |
| 6,108,703 | A | 8/2000 | Leighton et al. |
| 6,119,098 | A | 9/2000 | Guyot et al. |
| 6,185,598 | B1 | 2/2001 | Farber et al. |
| 6,253,189 | B1 | 6/2001 | Feezell et al. |
| 6,256,631 | B1 | 7/2001 | Malcolm |
| 6,269,361 | B1 | 7/2001 | Davis et al. |
| 6,285,987 | B1 | 9/2001 | Roth et al. |
| 6,324,519 | B1 | 11/2001 | Eldering |
| 6,341,306 | B1 | 1/2002 | Rosenschein et al. |
| 6,393,443 | B1 | 5/2002 | Rubin et al. |
| 6,434,567 | B1 | 8/2002 | De La Huerga |
| 6,449,657 | B2 | 9/2002 | Stanbach et al. |
| 6,516,321 | B1 | 2/2003 | De La Huerga |
| 6,519,631 | B1 | 2/2003 | Rosenschein et al. |
| 6,574,644 | B2 | 6/2003 | Hsu et al. |
| 6,581,065 | B1 | 6/2003 | Rodkin et al. |
| 6,728,712 | B1 | 4/2004 | Kelley et al. |
| 6,748,385 | B1 | 6/2004 | Rodkin et al. |
| 6,804,659 | B1 | 10/2004 | Graham et al. |
| 6,928,452 | B2 | 8/2005 | De La Huerga |
| 7,089,194 | B1 | 8/2006 | Berstis et al. |
| 7,130,861 | B2 | 10/2006 | Bookman et al. |
| 7,240,022 | B1 | 7/2007 | Bistriceanu et al. |
| 7,284,008 | B2 | 10/2007 | Henkin et al. |
| 7,437,725 | B1 | 10/2008 | Chang et al. |
| 7,617,121 | B1 | 11/2009 | DeMayo et al. |
| 7,822,743 | B2 | 10/2010 | Henkin et al. |
| 7,933,893 | B2 | 4/2011 | Walker et al. |
| 7,949,791 | B2 | 5/2011 | Serena |
| 8,041,711 | B2 | 10/2011 | Walker et al. |
| 2002/0010757 | A1 | 1/2002 | Granik et al. |
| 2002/0026472 | A1 | 2/2002 | Wolfman et al. |
| 2003/0110210 | A1 | 6/2003 | Nolan et al. |
| 2009/0031311 | A1 | 1/2009 | Chang et al. |
| 2009/0171750 | A1 | 7/2009 | Zhou et al. |
| 2009/0171751 | A1 | 7/2009 | Zhou et al. |

FOREIGN PATENT DOCUMENTS

| | | |
|---|---|---|
| WO | WO-99/39281 A2 | 8/1999 |
| WO | WO-00/38074 A1 | 6/2000 |
| WO | WO-01/40992 A2 | 6/2001 |
| WO | WO-01/44992 A1 | 6/2001 |
| WO | WO-02/19175 A2 | 3/2002 |

OTHER PUBLICATIONS

"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.

"The Best Way To Buy and Sell Web Advertising Space" Aaddzz Brokers Web Ad Space Sales Between Advertisers & Publishers, Copyright 1997, Information Access Technologies, Inc., 6 pages.

AccuWeather Press Release, GuruNet Adds Weather Updates and Forecasts to its Instant Information Service, GuruNet.com, Jan. 18, 2000 (2 pages).

AD:TECH San Francisco 2003 Exhibitor Profiles. Business Wire, Jun. 16, 2003. Retrieved from http://www.thefreelibrary.com/_/print/PrintArticle.aspx?id=103396098 (10 pages).

AD:TECH San Francisco 2005 Exhibitor Profiles. Business Wire, Apr. 21, 2005. Retrieved from http://www.thefreelibrary.com/_/print/PrintArticle.aspx?id=131793102 (12 pages).

AdAgent—Flycast Online Product Demo, retrieved on Feb. 6, 2012 from http://web.archive.org/web/19990218045529/http://www.flycast.com/demo/adagent/setup.html (5 pages).

AdForce User Guide, A Complete Guide to AdForce version 2.6, Copyright 1998, Adforce Inc (285 pages).

Agosti, M. et al., "Automatic Authoring and Construction of Hypermedia for Information Retrieval," Multimedia Systems, Feb. 1995, pp. 1-9, vol. 3, No. 1, Springer Berlin.

Aiello, Dave, GuruNet Can't Make It with Consumers, Changing Name to Atomica, CTDATA.com, Nov. 7, 2000. Retrieved from http://www.ctdata.com/interbiz/2000/11/07/0858224.html (3 pages).

Allan, J., "Automatic Hypertext Construction," Dissertation, Cornell University, Jan. 1995, 128 pg.

Barrett, Rob & Maglio, Paul. Web Intermediaries (WBI) poster, IBM Almaden Research Center http://www.almaden.ibm.com/cs/wbi.

Bohner, Kate, Searching With Gurus, JagNotes.com, Oct. 10, 1999. Retrieved from http://web.archive.org/web/20000229105054/http://www.gurunet.com/press/991010_jagnotes/jagnotes.html (2 pages).

Botluk, Diana, A Review of Flyswat, ResearchWire, Dec. 1, 1999. Retrieved from http://www.llrx.com/node/106/print (4 pages).

Bowman, Lisa M., Company brings hyperlinks to new level, ZDNet News, Sep. 6, 1999. Retrieved from http://web.archive.org/web/20000520142218/http://gurunet.com/press/990906_zdnet/zdnet.html (1 page).

Broersma, Matthew, FlyCast no fish outta water, ZDNet, Nov. 14, 1997. Retrieved on Feb. 23, 2012 from http://www.zdnet.comlnews/flycast-no-fish-outta-water/97467 (2 pages).

Bruner, Rick E., Small networks chase per-click ad business: Aaddzz, ValueClick compete, Advertising Age, Sep. 8, 1997.

Can networks harness P2P for profit? Retrieved from http://www.zdnet.com/news/can-networks-harness-p2p-for-profit/117908?tag=search-results-rivers;item7 (5 pages).

Carnes, Harley, GuruNet—today on Internet Minute., Internet Minute, Nov. 12 1999. Retrieved from http://web.archive.org/web/20000816052442/http://www.gurunet.com/press/991112_internet_minute/internet_minute.html (1 page).

Carr, L., et al., "The Evolution of Hypertext Link Services," ACM Computing Surveys, Dec. 1999, vol. 31, No. 4, [Online] [Retrieved on Mar. 31, 2009] Retrieved from the internet<URL:http://www.cs.brown.edu/memex/ACM_HypertextTestbed/papers/19.html>.

Chan, Tricia, GuruNet.com Launched First Instant Expert, Internet Wire, Sep. 14, 1999 (2 pages).

Chin, Gregory, A full-fledged reference library at the click of a mouse button, Epinions.com, Nov. 3, 1999. Retrieved from http://web.archive.org/web/20000229173847/http://www.gurunet.com/press/991103_epinions/epinions.htm (2 pages).

CMGI acquires uBid, The Ticker, NY Daily News, NYDailyNews.com, Feb. 11, 2000 http://articles.nydailynews.com/2000-02-11/news/18126370_1_cmgi-ubid-tcby-enterprises.

Collaborative Dictionaries in Wordbot, retrieved from internet on Mar. 13, 2012 at http://webarchive.org/web/19990508223232/http://www.wordbot.com/dictionaries.html (2 pages).

Crestani, F. et al., "A Case Study of Automatic Authoring: from a Textbook to a Hyper-Textbook," Submitted to Elsevier Preprint, Oct. 13, 1997, pp. 1-34.

DART Targeting Methodologies, DART for Publishers 11.0, Jun. 1, 2000, DoubleClick Inc (42 pages).

DART User Manual, www.doubleclick.net (75 pages).

DART White Paper, Jun. 1999 (21 pages).

Dash, Anil, Gurunet and Pervasive Hyperlinking, ANIL DASH A blog about making culture, Sep. 10, 1999. Retrieved from http://dashes.com/anil/1999/09/gurunet-and-per.html (2 pages).

Don't Eat the Yellow Links. Slashdot.org, Retrieved from http://slashdot.org/story/01/07/31/2015216/dont-eat-the-yellow-links (1 page).

DoubleClick.net web site, which was archived by web.archive.org on or before Feb. 5, 1998 (65 pages).

Einstein, David, GuruNet—Not!, Forbes.com, Nov. 7, 2000 (2 pages).

Elliot, Matt, GuruNet, ZDNet Reviews, Oct. 28, 1999. Retrieved from http://web.archive.org/web/20000301003402/http://www.gurunet.com/press/991028_zdnet_review/zd net_review2.html (2 pages).

Evangelista, Benny, Mystery links/New Web advertising tool gets results, draws criticism, San Francisco Chronicle, Jul. 30, 2001.

Retrieved from http://articles.sfgate.com/2001-07-30/business/17609727_1_contextual-advertising-onlineadvertising-bmg-entertainment.

eZula and FortuneCity Partner to Give Users Access to the Hottest Development in Online Shopping, Business Wire, May 11, 2000. Retrieved from http://www.thefreelibrary.com/_/print/PrintArticle.aspx?id=62028183 (2 pages).

eZula Shifts the Internet Shopping Model. PR Newswire, May 3, 2000. Retrieved from http://www.thefreelibrary.com/_/print/PrintArticle.aspx?id=61875017 (2 pages).

eZula website archive, Oct. 31, 2004. Retrieved from http://web.archive.org/web/20001018022713/http://www.ezula.com/ on Oct. 24, 2011 (52 pages).

eZula, Inc. Announces Immediate Availability of TopText iLookup 2.0, PR Newswire, Oct. 15, 2001. Retrieved from http://www.thefreelibrary.com/_/print/PrintArticle.aspx?id=79121240 (2 pages).

eZula.com, General, ISPs and Loyalty Program Provider pages, Retrieved from http://www.ezula.com/solutions/Default.asp, 2000(8 pages).

Farmer, Melanie Austria, Engage Technologies to buy Cmgi's Adsmart, Flycast, CNET News, Jan. 20, 2000. Retrieved on Feb. 23, 2012 from http://news.cnet.com/Engage-Technologies-to-buy-CMGIs-Adsmart,-Flycast/21 00-101_3... (3 pages).

Festa, Paul, GuruNet ditches its name and consumer focus, CNET News, Nov. 7, 2000. Retrieved from http://news.cnet.com/GuruNet-ditches-its-name-and-consumer-focus/2100-1023_3- 248227.html (3 pages).

Festa, Paul, Search tools leave Web out of sight, CNET News, Jan. 22, 2000. Retrieved from http://news.cnet.com/2100-1023-235526.html (2 pages).

Flycast Website Archive—Nov. 28, 1999. Retrieved on Feb. 23 2012 from http://web.archive.org/web/19991128141745/http://www.flycast.com/advertisers/index.cfm (15 pages).

FlyCast Webste Archive—May 31, 1997. Retrieved on Feb. 23, 2012 from http://web.archive.org/web/19970531224709/http://www.flycast.com/ (29 pages).

FlyCast.com Press Release: FlyCast Communications Revolutionizes Online Media Buying, Feb. 24, 1997. Retrieved on Feb. 6, 2012 from http://web.archive.org/web/19980115214122/http://www.flycast.com/PRO22497.htm (3 pages).

FlyCast.com Press Release: Flycast Introduces Next-Generation, Turnkey Web Advertising Solution for Buyers and Sellers, Nov. 17, 1997. Retrieved on Feb. 6, 2012 from http://web.archive.org/web/19980115212143/http://www.flycast.com/PR101797.htm (3 pages).

FlyCast.com Press Release: Flycast Partners With Accipiter, Art Technology Group, Bellcore, Clickover, Focalink, Intelligent Interactions, Netgravity, and Starpoint to Extend and Maximize Web Advertising Opportunity, Jun. 23, 1997. Retrieved on Feb. 6, 2012 from http://web.archive.org/web/19980115214043/http://www.flycast.com/PRO62097.htm (5 pages).

Flyswat And ConsumerREVIEW.com Partner to Connect Online Shoppers to Product Enthusiast Reviews & Communities, Business Wire, Mar. 1, 2000. Retrieved from http://www.thefreelibrary.com/Flyswat And ConsumerREVIEW.com Partner to Connect Online Shoppers to...-a059672879 (3 pages).

Flyswat and Red Herring Partner to Provide OnlineInvestors With the Best Business Technology Information From Any WebPage, Business Wire, Nov. 30, 1999. Retrieved on Oct. 20, 2011, from http://www.allbusiness.com/media-telecommunications/internet-www/6770359-1.html%23.TqCvdWwTRJw.printfriendly (2 pages).

Flyswat Appoints Former Surf Monkey Executive as Marketing Chief, Advertising Age, Oct. 28, 1999. Retrieved Nov. 21, 2011 from http://adage.com/print/8016 (1 page).

Flyswat, Neoplanet Announce Distribution Agreement; Flyswat Featured As Exclusive Enhanced Navigation Service In NeoPlanet 5.1, Busniess Wire, Feb. 8, 2000. Retrieved from http://findarticles.com/p/articles/mi_m0EIN/is_2000_Feb_8/ai_59234519/ (2 pages).

Flyswat.com web site, which was archived by web.archive.org on or before Nov. 27, 1999 (48 pages).

Gilmore, Dan, GuruNet's intriguing Net journey, San Jose Mercury News, Sep. 4, 1999 (3 pages).

Golden, Keith. Welcome to Wordbot, retrieved from internet on Mar. 13, 2012 at http://web.archive.org/web/19991013082439/http://wordbot.com/wordbot-js.html (3 pages).

Golden, Keith. Wordbot Home Page, retrieved from internet on Mar. 13, 2012 at http://web.archive.org/web/19990430033130/http://www.wordbot.com/ (2 pages).

Goldszmidt,G. et al., "Load Distribution for Scalable Web Servers: Summer Olympics 1996—A Case Study," 10 pages.

Good, Robin, Gurunet—Contextual search tool, masternewmedia.org, Jul. 27, 2000. Retrieved from http://www.masternewmedia.org/2000/07/27/gurunet_contextual_search_tool.htm (3 pages).

GuruNet Press Release, GuruNet Instant Expert Among Prestigious Group Selected to Present at Upside Magazine's LAUNCH!, Gurunet.com, Ocotber 13, 1999 (2 pages).

GuruNet Press Release, GuruNet Introduces Version 1.0, Adding New International Capabilities, gurunet.com, Mar. 13, 2000 (2 pages).

GuruNet Press Release, GuruNet Publisher to Support Custom Content, Gurunet.com, Feb. 7, 2000 (2 pages).

GuruNet Press Release, GuruNet Selected to Appear at the DEMO 2000 Conference, Gurunet.com, Jan. 31, 2000 92 pages).

GuruNet Press Release, GuruNet.com Launches First Instant Expert, Gurunet.com, Sep. 7, 1999 (2 pages).

GuruNet Press Release, Oingo Records a Monthly Increase of Over 300% in Search Traffic and Licenses Search Technology to GuruNet, gurunet.com, Feb. 3, 2000 (2 pages).

GuruNet Press Release, RealNames AND GuruNet ease information access on the web with Internet Keywords, GuruNet.com, Oct. 26, 1999 (2 pages).

GuruNet website archive, Apr. 8, 2000. Retrieved on Jan. 4, 2012 from http://web.archive.org/web/20000408161239/http://www.gurunet.com/ (79 pages).

HighBeam Research, Flyswat 1.0, Jan. 1, 2000. Retrieved from http://www.highbeam.com/DocPrintaspx?DocId=1G1:58469424 (1 page).

Himowitz, Mike, Let GuruNet answer your questions, SunSpot, Sep. 27, 1999 (2 pages).

Holm, R., "A Trip Down Hypermedia Lane," Linux Gazette, May 2002, Issue 78, [Online] [Retrieved on Mar. 31, 2009] Retrieved from the Internet<URL:http://linuxgazette.net/issue78/holm.html>.

Hotchkiss, Gord, Gator and TopText Push the Legal Limits of Online Marketing, NetProfit, Sep. 28, 2001. Retrieved from http://www.searchengineposition.com/info/netprofit/gatortoptext.asp(3 pages).

IBM Research. The (unofficial) WBI Story, retrieved from internet on Mar. 21, 2012 at http://web.archive.org/web/20000829142605/http://www.almaden.ibm.com/cs/wbi/doc/SystemAdmin.html (62 pages).

Langheinrich, Marc, Unintrusive customization techniques for Web Advertising, Elsevier Science B.V., 1999, pp. 181-194.

Lewis, Peter H., Searches Where Less, Not More, Is Better, The New York Times, Sep. 30, 1999 (3 pages).

Li, Z. et al., "Hypermedia Links and Information Retrieval," Conference, Lancaster University, 1992, pp. 1-11.

Lifschitz, Ronny, High Tech Features: Atten-Shun!, Globes Arena, Sep. 8, 1999 (3 pages).

Luening, Erich. IBM harnesses Web data flow, CNET News, published Jun. 11, 1999 (3 pages) http://news.cnet.com/2100-1001-226995.html.

Macarlo, Inc. Internet Services, New Flyswat Tested on Windows 2000 Professional, Apr. 28, 2000. Retrieved from http://macarlo.com/flyswatneww2k2904.htm (7 pages).

Magid, Larry, GuruNet Thinks Different, Upside Today, Sep. 24, 1999 (1 page).

Magid, Lawrence J., Quick Reference Is GuruNet's Defining Moment, L.A. Times, Sep. 27, 1999 (2 pages).

Maglio, Paul P. & Farrell, Stephen. LiveInfo: Adapting Web Experience by Customization and Annotation, A H 2000, LNCS 1892, pp. 144-154, 2000. Springer-Verlag Berlin Heidelberg 2000.

Mayfield, J. et al., "Snitch: Augmenting Hypertext Documents with a Semantic Net," International Journal of Intelligent and Cooperative Information Systems, 1993, pp. 1-17.

Moskowitz, Lisa, Zapper Aids With Searching Questions, PCWorld, Jun. 12, 2000. Retrieved from http://www.pcworld.com/article/17114/zapper_aids_with_searching_questions.html (3 pages).

Mossberg, Walter S., Cool Software Brings Meaning to Words on Computer Screen, Wall Street Journal, Sep. 9, 1999. Retrieved from http://web.archive.org/web/20000229031010/http://www.gurunet.com/press/990909_mossberg/moss berg.html (2 pages).

mySimon—Flyswat Browser Companion, 1999. Retrieved on May 16, 2004from http://web.archive.org/web/20000301151946/www.mysimon.com/consumer_resources/flyswat... (5 pages).

NBC Internet Inc., Annual Report (10-K) Results of Operations (excerpt), EDGAROnline, Mar. 29, 2001. Retrieved from http://sec.edgar-online.com/nbc-internet-inc/10-k-annual-report/2001/03/29/section11.aspx (8 pages).

NBCi buys Flyswat, ZDNet, Apr. 3, 2000. Retrieved on Dec. 19, 2011 from http://www.zdnet.com/news/nbci-buys-flyswat/106630 (3 pages).

NBCi.com "Quickclick" links, Retrieved from http://www.quicklink.com, 2000 (7 pages).

Needle, David, GuruNet Seeks to Define Simple, Easy Web Searching, TechWeek, Dec. 12, 1999 (3 pages).

Needleman, Rafe, More Like This, Redherring, Sep. 14, 1999 (1 page).

Neoplanet Features, Flyswat, Mar. 2, 2000. Retrieved on Dec. 19, 2011 from http://web.archive.org/web/20000302145214/http://www.neoplanet.com/intro/features/flyswat/index.html (1 pages).

PCMAG.com, Flyswat, Oct. 17, 2000. Retrieved on Oct. 20, 2011 from http://www.pcmag.com/article/print/6780 (1 page).

Pitkow, James E., & Jones, R. Kipp, Supporting the Web: A Distributed Hyperlink Database System, Fifth International World Wide Web Conference, Paris, France, May 6-11, 1996.

Plotnikoff, David, Navigation tools help the Web traveler, San Jose Mercury News, Feb. 5, 2000. Retrieved from http://I27.0.0.1 : 1584 J/v1?catid=14287363& md5=ea36bI512Ocd0c077218360f3dd6d7d6 (3 pages).

PR Newswire, NBCi to Acquire Flyswat, Inc. to Bring Content and E-Commerce Direct to User Desktops, Apr. 3, 2000. Retrieved from http://www.prnewswire.com/news-releases/nbci-to-acquire-flyswat-inc-to-bring-content-and-e-commerce-direct-to-user-desktops-72374337.html (3 pages).

QuickClick.com website archive, Apr. 2, 2001. Retrieved on Dec. 6, 2011 from http://web.archive.org/web/20010402070831/http://www.quickclick.com/ (29 pages).

Schloss, Robert J., Novel Business Uses of Independently Created Hyperlinks in the World Wide Web: Basic Mechanism and Examples, Proceedings of the 29th Annual Hawaii International Conference on System Sciences—1996.

Seidman, Robert, Call on the Guru?, Online Insider, Sep. 12, 1999. Retrieved from http://web.archive.org/web/20000531084458/http://gurunet.com/press/990912_online_insider/online_insider.html (1 page).

Serena, F. David, Advertising Replacement BUsiness Plan Synopsis Meta-Boycott, Jan. 3, 2000, (3 pages).

Skalbeck, Roger, An impressive "instant information service" software tool, Law Library Resource Echange, Ocotber 15, 1999. Retrieved from http://web.archive.org/web/20000229122937/http://www.gurunet.com/press/991015_llrx/llrx.html (2 pages).

Spooner, John, New Online Ad Network, Aaddzz, to Launch, ADWEEK, Jul. 7, 1997 http://www.adweek.com (3 pages).

Spring, Tom, Latest Online Ad Gimmick: Hyperlinks, PCWorld, Aug. 3, 2001. Retrieved from http://www.pcworld.com/article/57064/latest_online_ad_gimmick_hyperlinks.html (2 pages).

Spring, Tom, Updated Flyswat Search Has Better Aim, PCWorld, Feb. 15, 2000. Retrieved from http://www.pcworld.com/article/15294/updated_flyswat_search_has_better_aim.html (1 page).

Technical Overview of Content Spider (4 pages).

Thistlewaite, P., "Automatic Construction and Management of Large Open Webs," Information Processing & Management, 1997, pp. 161-173, vol. 33, No. 2.

TopText Screenshot of Active Reference Links, Retrieved from http://web.archive.org/web/20050714005628/http://www.ezula.com/TopText/Features.asp (1 page).

TUDogs Review, GuruNet—5 Dogs from TUDogs, Feb. 29, 2000. Retrieved from http://web.archive.org/web/20000229184436/http://www.gurunet.com/press/991001_tudogs_review/t udogs.html (1 page).

Wagner, Fred C., The Aaddzz Service is Closed, Letter to Aaddzz customers posted at http://www.aaddzz.com/letter.html(2 pages).

WBI Development Kit for Java: another alphaWorks technology, retrieved from internet on Mar. 21, 2012 at http://web.archive.org/web/20000817033338/http://www.alphaworks.ibm.com/tech/wbidk/ (3 pages).

Wildstrom, Stephen, Guru.net: a Dictionary Hot-Wired to the Net, Business Week Daily Briefing, Nov. 29, 1999. Retrieved from http://web.archive.org/web/20000304000848/http://www.businessweek.com/bwdaily/dnflash/nov1999/nf91129d.htm (1 page).

Williamson, Debra Aho, Online buying moves toward a virtual market, Advertising Age, Feb. 24, 1997 (5 pages).

www.aaddzz.com, Aaddzz Website Archive 1997, retrieved from http://web.archive.org (42 pages).

Zapper.com Press Release, New Technology Links Users, With One Click, to Exact Web Content & Services They Seek, Jun. 6, 2000. Retreieved from http://web.archive.org/web/200012081302/http://zapper.com/about/about_fr.html (3 pages).

Zapper.com Press Release, Software Developer Zapper TEchnologies Launches Product, Venture Wire, May 12, 2000. Retrieved from http://web.archive.org/web/200012081302/http://zapper.com/about/about_fr.html (1 page).

Zapper.com Press Release, Zapper Technologies, Inc. Develops Advanced New Interactive Engine Technology, May 11, 2000. Retrieved from http://web.archive.org/web/200012081302/http://zapper.com/about/about_fr.html (2 pages).

Zapper.com website archive, Jun. 19, 2000. Retrieved on Dec. 14, 2011 from http://web.archive.org/web/20000619125036/http://zapper.com/index.shtml (84 pages).

Zeff, Robbin & Aronson, Brad, "Advertising on the Internet", John Wiley & Sons, Inc., 2nd Ed., Aug. 2, 1999 (excerpt).

* cited by examiner

Pixel Retargeting Manager 920

Pixel Rule Dialog 910

Pixel Manager / Pixel Manager Interface 905

Edit Pixel Dialog 907

Get Pixel HTML Dialog

Edit Piggyback Dialog

Show Pixel Subscribers Dialog

CLR Algorithm 937

For each entry in contenders
   A. Retrieve pixel rules for the set
   B. For each mandatory pixel
      i. If pixel restriction is that it must exist then
         1. if bucket.contains(pixel.PixelID), then - do nothing – rule satisfied
         2. otherwise
            a. remove contender – rule not satisfied
            b. exit
      ii. otherwise the pixel restriction is that it must not exist so
         1. if bucket.contains(pixel.PixelID), then
            a. remove contender – rule not satisfied
            b. exit
         2. otherwise, do nothing – rule satisfied
      iii. if cap >= 0 then
         1. if CapType is 0 then
            a. if bucket.pixel.impressionCount >= pixel.cap
               i. do nothing – rule satisfied
            b. otherwise
               i. remove contender – rule not satisfied
               ii. exit
         2. otherwise (CapType is 1)
            a. if bucket.pixel.impressionCount <= pixel.cap
               i. do nothing – rule satisfied
            b. otherwise
               i. remove contender – rule not satisfied
               ii. exit
   C. If weighted pixels exist then
      i. Weight = 0
      ii. For each weighted pixel
         1. if cap >= 0 then
            a. if CapType is 0 then
               i. if bucket.pixel.impressionCount >= pixel.cap
                  1. move to next step – rule satisfied
               ii. otherwise, move onto next weighted pixel – rule not satisfied
            b. otherwise (CapType is 1)
               i. if bucket.pixel.impressionCount <= pixel.cap
                  1. move to next step – rule satisfied
               ii. otherwise, move onto next weighted pixel – rule not satisfied
         2. If pixel restriction is that it must exist then
            a. if bucket.contains(pixel.PixelID)
               i. weight += pixel.weight
         3. otherwise the pixel restriction is that it must not exist so
            a. if not bucket.contains(pixel.PixelID)
               i. weight += pixel.weight
      iii. if weight < pixelRuleSets.targetWeight
         1. remove contender – rules not satisfied
         2. exit

Fig. 9I

SYSTEMS AND METHODS FOR RULE BASED INCLUSION OF PIXEL RETARGETING IN CAMPAIGN MANAGEMENT

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE INVENTION

The disclosure generally relates to the field of campaign delivery, in particular, to developing and delivering campaigns to users based on user's behavioral information.

BACKGROUND

An enterprise serving web pages to a user may wish to provide the user with an easier and quicker access to information the user is looking for. The services of the enterprise may aim to increase the user's satisfaction by decreasing the amount of time the user spends finding the relevant information. As the user searches the world wide web for the relevant information, the user may often open many new web pages which do not include the relevant content. The user may become even more dissatisfied when the old web pages from which the user began searching are closed or lost during the search process. The enterprise may wish to provide the user with an option to find the relevant information without having to exit the current web page in order to access a next one, which may or may not include the information the user is looking for.

Hypertext is a computer based text used in a web page to provide information to a user and organize the web page content into interconnected associations. These associations may enable the user to easily access information the user chooses or clicks. An instance of such an association is called a hyperlink or hypertext link. A hyperlink, when selected, leads the viewer to another web page (or file or resource, collectively called the destination page).

In order to access the supplemental information provided through hyperlinks, viewers are required to leave their current web pages. This requirement interrupts the viewers' web browsing experience. As a result, most viewers are reluctant to visit the destination page provided by hyperlinks.

In addition, traditionally the hyperlinks are generated by human editors, a process that is both tedious and subject to human errors. Further, by the time a viewer tries to visit a destination page of a hyperlink, the destination page may cease to exist or have evolved to no longer provide the related information.

In some cases, the viewer leaves the web page to visit a destination page that does not have information desired by the viewer. The user then may have to search for other destination pages to try to obtain the desired information. This may lead the viewer to perform multiple searches and visit several pages to find the desired information. The viewer may become dissatisfied with the amount of activity to find the desired information and with leaving the current destination page to do so.

SUMMARY OF THE INVENTION

Systems and methods of the present solution enable an enterprise, such as a publisher agency or an advertiser, to develop and run campaigns for display on remote clients that is more suitable for the user based on the knowledge about the user's behavior. Retargeting is a way of targeting campaigns to users based on the behavioral information the system may have about those users. The present solution may user the pixels a user has been marked with and keywords exposed to the user to selected and run campaigns of advertisement or content to the user.

Pixelling a user, also known as beaconing, entails the dropping one or more cookies on a user's browser following a particular event such as visiting a page, viewing or clicking a particular advert. The pixel call itself may be implemented as a 1×1 image or a script block, but in either case it causes the user's browser to make requests to a webserver at which point the user is "pixelled". In pixelling the user, multiple pixels may be used such that the pixels can come from the enterprise or solution providers network as well as other networks. This allows us to retarget on the network ("on-network") of the campaign solution provider as well as on other networks ("off-network").

The present solution provides a configurable, dynamic and flexible mechanism to define and use pixel rules to identity and select campaigns for the user based on the user's pixel history as well as other behavior data. The pixel rules can be configured to identify one or more mandatory pixels that have to be present or tracked for the user in order to include or exclude a campaign in a campaign selection process. The pixel rules can be configured to identify weighted pixels that have to be present or tracked for the user in order to include or exclude a campaign in a campaign selection process. The pixel rules may identify any combination of mandatory and weighted pixel rules. These pixel rules may be configured via a user interface of a development tool and during run-time campaign management applied to the user pixel history to select and deliver campaigns.

In some aspects, the present solution is related to a method for applying one or more pixel rules to selecting for a user a campaign from a plurality of campaigns. A server may identify or obtain one or more pixels tracked for a user, such as via a cookie or user profile. The server may identify one or more pixel rules for a campaign of a plurality of campaigns, each of the one or more pixel rules identifying whether or not a pixel is required for the first campaign. Responsive to applying the one or more pixel rules to the one or more pixels tracked for the user, the server determines whether or not to include the first campaign in selecting, for the user, a campaign from the plurality of campaigns.

In some embodiments, the server from a client receives from the client one or more cookies of the user, which may identify the one or more pixels tracked for the user. The server may receive one or more cookies having a set of piggbacked pixels. The server may store the one or more pixels to a profile of the user. The server may identify the one or more pixels tracked for the user from a profile of the user.

In some embodiments, a pixel rule of the one or more pixel rules may identify a number of times the user must be marked with a specified pixel. A pixel rule of the one or more pixel rules may identify that a user should not have a specified pixel.

In some embodiments, the server may determine whether each of the one or more pixels tracked for the user correspond to a pixel specified by each of the one or more pixel rules. The server may determine the one or more pixels tracked for the user match each pixel required by the one or more pixel rules and include the campaign in the campaign selection process.

The server may determine the one or more pixels tracked for the user do not match each of the each pixel required by the one or more pixel rules and exclude the campaign from the campaign selection process.

In another aspect, the present solution is related to a method for applying a weighted pixel rule to selecting for a user a campaign from a plurality of campaigns. A server may identify one or more pixels tracked for a user. The server may identify a pixel rule for a campaign of a plurality of campaigns. The pixel rule may specify or identify one or more pixels, a weight corresponding to each of the one or more pixels and a weight threshold. Responsive to applying the pixel rule to the one or more pixels tracked for the user, the server determines whether or not to include the campaign in selecting, for the user, a campaign from the plurality of campaigns.

In some embodiments, the server receives from a client one or more cookies of the user. The one or more cookies may identify the one or more pixels tracked for the user. The server may receive one or more cookies including a set of piggbacked pixels. The server may store the one or more pixels to a user profile. The server may obtain the one or more pixels tracked for the user from the user profile.

In some embodiments, the pixel rule identifies one or more mandatory pixels. In some embodiments, the pixel rule identifies a negative weight corresponding to a pixel of the one or more pixels. The server may sum the corresponding weights of each of the one or more pixels tracked for the user that correspond to a pixel specified by the pixel rule. The server may determine to include the first campaign in the campaign selection if the summation is greater than the weight threshold. The server may determine to not include the first campaign in the campaign selection if the summation is less than the weight threshold.

BRIEF DESCRIPTION OF DRAWINGS

The foregoing and other objects, aspects, features, and advantages of the present invention will become more apparent and better understood by referring to the following description taken in conjunction with the accompanying drawings, in which:

FIG. 9A is a block diagram of an embodiment of a system for;

FIG. 9I is a block diagram of an embodiment of a user interface for identifying a campaign based on the pixel rules.

In the drawings, like reference numbers generally indicate identical, functionally similar, and/or structurally similar elements.

DETAILED DESCRIPTION

Figure 1A:
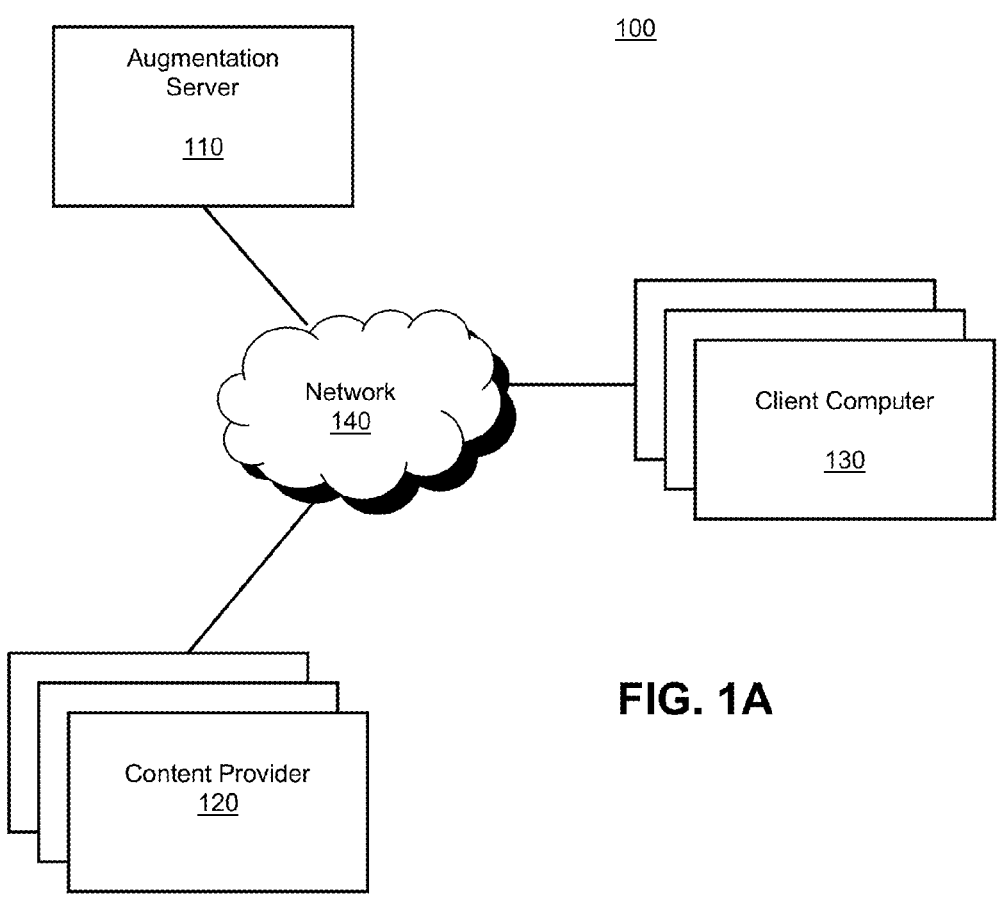
FIG. 1A is a block diagram that depicts an embodiment of an environment for providing systems and methods described herein.

For purposes of reading the description of the various embodiments below, the following descriptions of the sections of the specification and their respective contents may be helpful:

Section A describes a network and computing environment which may be useful for practicing embodiments described herein;

Section B describes embodiments of systems and methods for delivering a augmented content;

Section C describes embodiments of systems and methods of an ad server platform for delivering a plurality of advertisement and augmented content services;

Section D describes embodiments of systems and methods for delivering related video content to augment keywords on a web page;

Section E describes embodiments of systems and methods for design and development of unit types via a development tool; and Section F describes embodiments of systems and methods for pixel rule based campaign selection.

A. System and Network Environment

Some of the disclosed embodiments describe examples of a method (and corresponding system and computer program product) for augmenting files with related resources through layered augmentation. Viewers of the augmented files can access the related resources through a multi-layered dialog box. The process of providing additional resources through multilayered dialog box and the multi-layered dialog box are collectively called layered augmentation.

An embodiment of the method identifies data in a file, associates the identified data with reference data in a reference database, and stores the associations in a corresponding augmented file. A viewer of the augmented file can access resources related to a piece of augmented data through layered augmentation. When the viewer moves a pointer over the piece of augmented data (also called mouse-over), the related resources are provided in a multi-layered dialog box. The dialog box is overlaid on the augmented file approximate to the position where the mouse-over occurred. The viewer can navigate through the related resources in the dialog box without leaving the augmented file.

As described herein, a file includes any types of documents such as web pages. Augmented data, the data with integrated association in an augmented file, include any types of content such as text and image. Resources provided through layered augmentations include textual content, visual content such as images and videos, interactive controls such as dialog boxes, and services such as Internet search service and advertisement. A pointer can be any pointer device such as a mouse, a trackball, a roller, and a touchpad. For purposes of illustration, the method (and corresponding system and computer program product) is described in terms of augmenting keywords (or key phrases) in web pages and delivering related advertisements through multi-layered dialog boxes based on user interactions with the augmented keywords, even though the disclosed embodiments apply to all other types of content, files, and resources as defined above.

FIG. 1A illustrates an embodiment of a computing environment 100 for augmenting web pages and providing viewers of the augmented web pages with related advertisements through layered augmentation based on user interaction. As illustrated, the computing environment 100 includes an augmentation server 110, multiple content providers (or websites) 120, and one or more client computers (or user systems) 130, all of which are communicatively coupled through a network 140.

The augmentation server 110 is configured to augment keywords (or other types of content) in web pages (or other types of documents) with advertisements (or other types of resources), and deliver the advertisements based on user interaction with the augmented keywords. The augmentation server 110 retrieves web pages from the content providers 120 and augments the web pages. The augmentation server 110 augments a web page by identifying keywords in the web page, associating (or tagging) the keywords with one or more related references in a reference database, generating an augmented web page, and storing the associations in a database. When a user views an augmented web page in a client computer 130 and moves a pointer over one of the augmented keywords (hereinafter "the activated keyword"), the augmentation server 110 displays (or avails) related advertisements in the client computer 130 through a multi-layered dialog box. An example architecture of the augmentation server 110 is described in detail below with respect to FIG. 2.

The content providers 120 are entities that provide (or generate), host, publish, control, or otherwise have rights over a collection of web pages (or other types of documents). In one embodiment, the content providers 120 are web servers hosting web pages for viewers to access. The content providers 120 may provide web pages to the augmentation server 110 for layered augmentation. In some embodiments, the content providers 120 may either instruct or give permission to the augmentation server 110 to retrieve all or parts of their web pages for layered augmentation.

A client 130 may comprise any personal computer (e.g., based on a microprocessor from the x86 family, the Pentium family, the 680x0 family, PowerPC, PA-RISC, MIPS families, the ARM family, the Cell family), network computer, wireless device (e.g. mobile computer, PDA, smartphone), information appliance, workstation, minicomputer, mainframe computer, telecommunications or media device that is capable of communication and that has sufficient processor power and memory capacity to perform the operations described herein. For example, the client 130 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED, NINTENDO REVOLUTION, or NINTENDO WII device manufactured by Nintendo Co., Ltd., of Kyoto, Japan, or an XBOX or XBOX 360 device manufactured by the Microsoft Corporation of Redmond, Wash. In some embodiments, the client may include any of the Kindle family of devices sold or provided by Amazon.com.

Operating systems supported by the client 130 can include any member of the WINDOWS family of operating systems from Microsoft Corporation of Redmond, Wash., MacOS, JavaOS, various varieties of Unix (e.g., Solaris, SunOS, Linux, HP-UX, A/IX, and BSD-based distributions), any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MaC OSX, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The client computers 130 may be any type and form of client devices for users to browse web pages (or other types of documents). In one embodiment, a client computer 130 includes a pointer device (e.g., a mouse, a trackball, a roller, a touchpad, or the like), a conventional web browser (e.g., Microsoft Internet Explorer™, Mozilla Firefox™, or Apple Safari™), and can retrieve and display web pages from the content providers 120 in a conventional manner (e.g., using the HyperText Transfer Protocol). In one embodiment, the client computer 130 displays augmented keywords in an augmented web page differently than the non-augmented content. For example, the augmented keywords can be displayed in a double underline style and/or in a color distinctive from texts that are not augmented. When a user moves a pointer (e.g., mouse pointer) over (e.g., mouse-over) an augmented keyword in the augmented web page, the client computer 130 (or the utilized web browser) generates a request and transmits the request to the augmentation server 110. The augmentation server 110 receives the request and determines relevant advertisements to transmit to the client computer 130. The client computer 130 (or the utilized web browser) displays the advertisements retrieved from the augmentation server 110 in a multi-layered dialog box overlaying the augmented web page and proximate to the location where the mouse-over occurred. The multi-layered dialog box displays an advertisement and multiple clickable tabs representing the other retrieved advertisements. The viewer can select (e.g., click) a tab to request the dialog box to display the corresponding advertisement. The viewer may navigate among the multiple advertisements and interact with the advertisements without leaving the augmented web page.

The network 140 is configured to communicatively connect the augmentation server 110, the content providers 120, and the client computers 130. The network 140 may be a wired or wireless network. Examples of the network 140 include the Internet, an intranet, a WiFi network, a WiMAX network, a mobile telephone network, or a combination thereof. The network 140 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 140 may comprise a wireless link, such as an infrared channel or satellite band. The topology of the network 140 may be a bus, star, or ring network topology. The network 140 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the augmentation server 110, the content providers 120, and/or the client computers 130 are structured to include a processor, memory, storage, network interfaces, and applicable operating system and other functional software (e.g., network drivers, communication protocols). The client 120, server 110, and content providers 120 may be deployed as and/or executed on any type and form of computing device, such as a computer, network device or appliance capable of communicating on any type and form of network and performing the operations described herein.

Figure 1B:
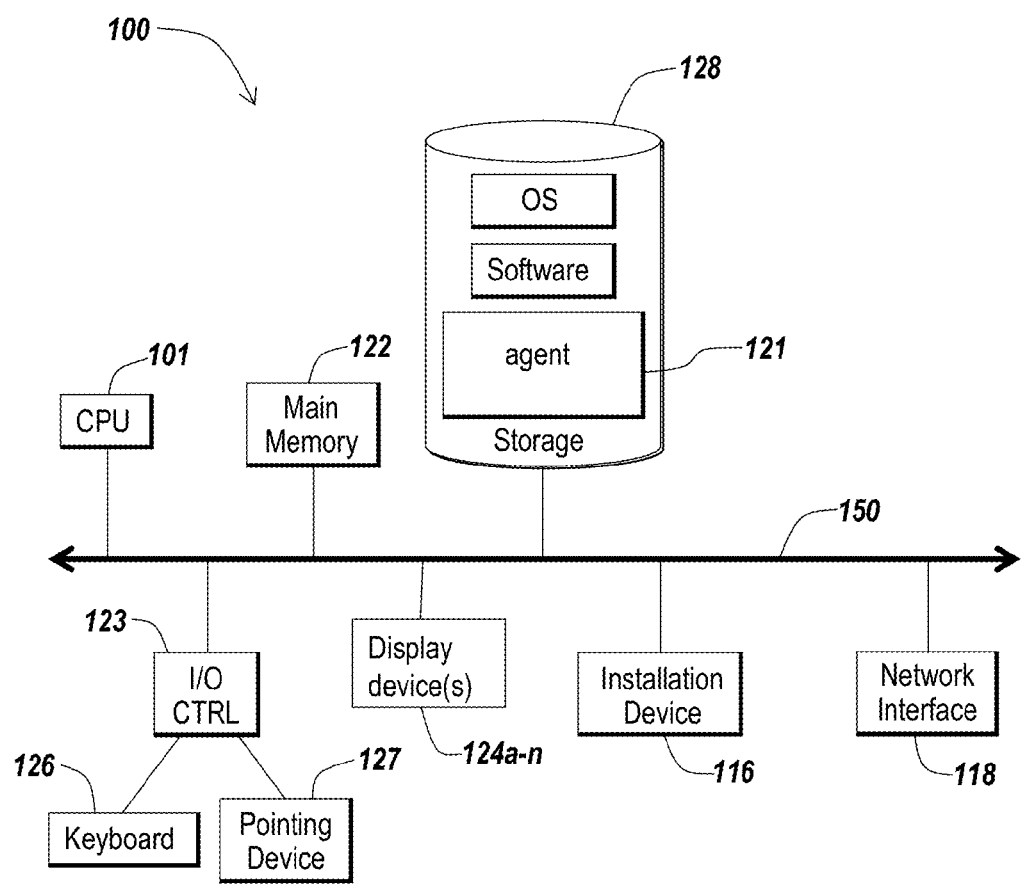
FIGS. 1B and 1C are block diagrams of computing devices that may be used in any of the embodiments of the systems and methods described herein.
Figure 1C:
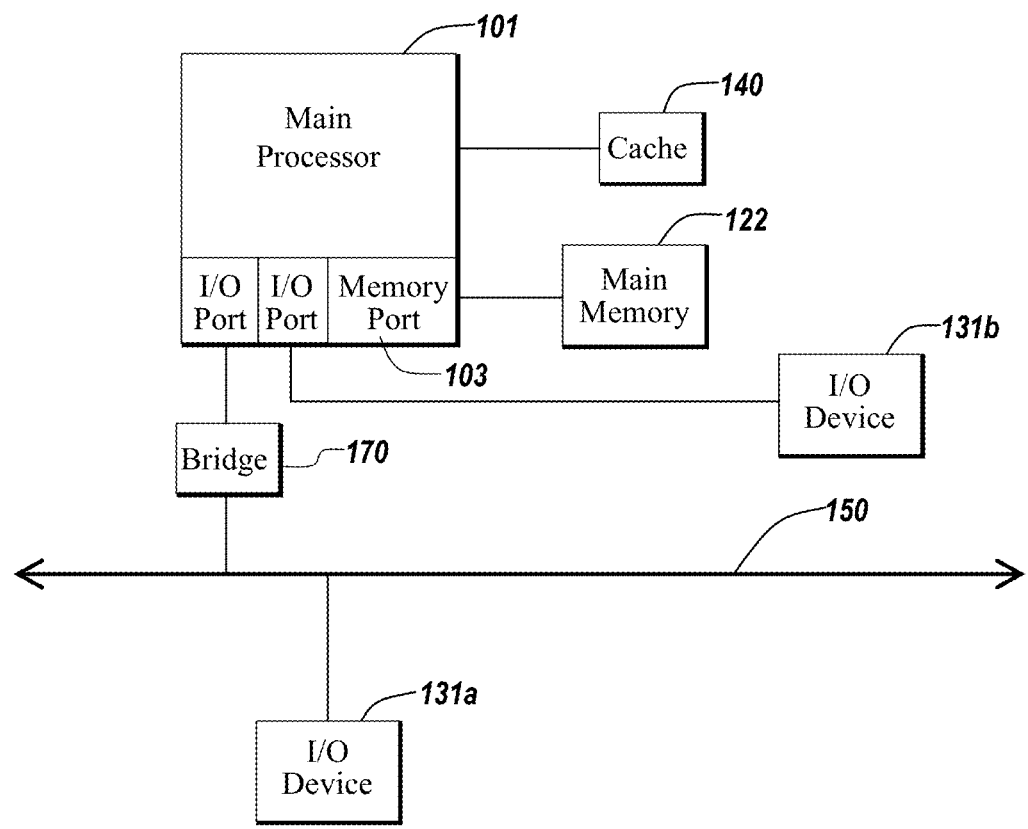

FIGS. 1B and 1C depict block diagrams of a computing device 100 useful for practicing an embodiment of the client 130, server 110 or content provider 120. As shown in FIGS. 1B and 1C, each computing device 100 includes a central processing unit 101, and a main memory unit 122. As shown in FIG. 1B, a computing device 100 may include a visual display device 124, a keyboard 126 and/or a pointing device 127, such as a mouse. Each computing device 100 may also include additional optional elements, such as one or more input/output devices 131a-131b (generally referred to using reference numeral 131), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1B the main memory 122 may be DRAM.

FIG. 1C depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 131 via a local system bus 150. Various busses may be used to connect the central processing unit 101 to any of the I/O devices 131, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1C depicts an embodiment of a computer 100 in which the main processor 101 communicates directly with I/O device 131b via HyperTransport, Rapid I/O, or InfiniBand. FIG. 1C also depicts an embodiment in which local busses and direct communication are mixed: the processor 101 communicates with I/O device 131b using a local interconnect bus while communicating with I/O device 131a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 121 related to providing an agent, such as a safe agent, as described herein. The computing device 100 may further comprise a storage device 128, such as one or more hard disk drives or redundant arrays of independent disks, for storing an operating system and other related software, and for storing application software programs such as any program related to an agent 121 as described herein. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 131a-131n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 131 may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 131a-131n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 131 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. AugeB and 1C typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. In some embodiments, the computing device may include any type and form of wireless reading device, such as any Kindle device manufactured by Amazon.com Inc. of Seattle, Wash. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Systems and Methods For Providing Augmented Content

Figure 2:
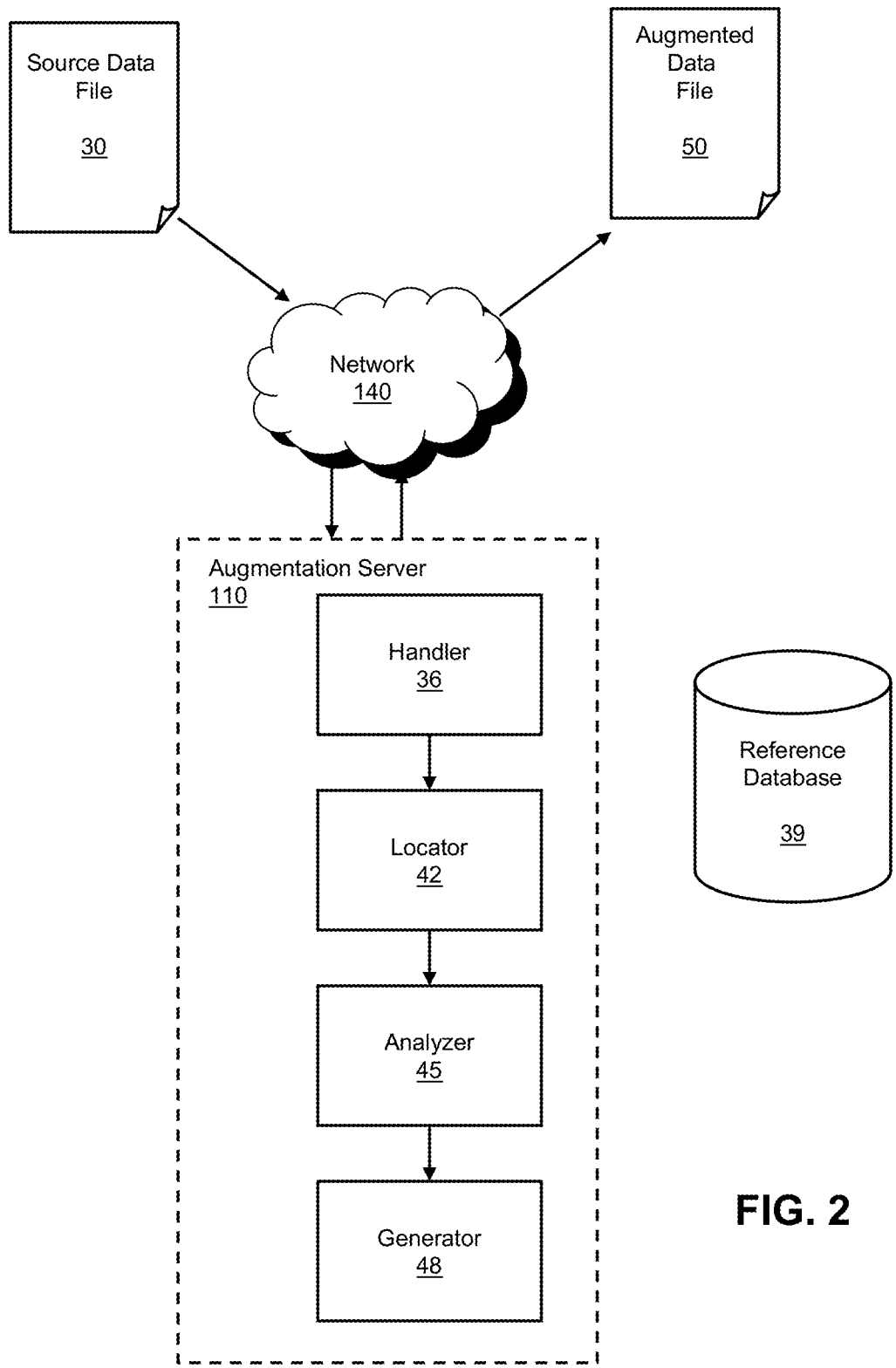
FIG. 2 is a block diagram that depicts an embodiment of an augmentation server in FIG. 1.

FIG. 2 is a block diagram illustrating one example architecture of the augmentation server 110 as described above with respect to FIG. 1. As illustrated, the augmentation server 110 includes a handler 36, a locator 42, an analyzer 45, a generator 48, and a reference database 39. The components 36 through 45 may include a software or firmware instruction that can be stored within a tangible computer readable medium (e.g., magnetic disk drive, optical disk or solid state memory such as flash memory, or random-access memory) and executed by a processor or equivalent electrical circuits, state machines, microcode, or the like.

A source data file 30 (e.g., a web page) resides on a server (e.g., a content provider 120) on a network 140 (e.g., the Internet). The handler 36 retrieves the source data file 30 for augmentation by the augmentation server 110. The locator 42 examines the retrieved source data file 30 for comparison to data in the reference database 39. In one embodiment, the locator 42 analyzes content of the source data file 30 for keywords, searches corresponding reference data in the reference database 39, and provides the keywords and the corresponding reference data to the analyzer 45. In some embodiments, rather than analyzing the source data file 30 for keywords, the locator 42 retrieves a list of keywords from the reference database 39 and enumerates through the textual content of the source data file 30 for matches.

The analyzer 45 creates associations between the keywords and the corresponding reference data found by the locator 42. The generator 48 generates an augmented data file 50 by embedding the associations created by the analyzer 45 in the source data file 30. The generator 48 embeds associations by generating intelligent tags for the keywords, and augmenting the keywords with the intelligent tags. In one embodiment, an intelligent tag is an alphabetic and/or numeric string that identifies its associated keywords, and/or reference data, and optionally includes an unique identification number (hereinafter called the association ID). The generator 48 inserts the generated intelligent tags into the source data file 30 to generate the augmented data file 50. Web pages with the integrated intelligent tags are called augmented web pages. Keywords with the integrated intelligent tags are called augmented keywords. The generator 48 also stores the identified keywords and/or the associations in a database for later references.

The resulting augmented data file 50 is returned to the handler 36 to reside at a Universal Resource Locator (URL) address on the network 140 (e.g., at the content provider 120 from which the source data file 30 is retrieved). In one embodiment, the handler 36 also receives requests (or signals) from client computers 130 indicating user interactions with the augmented data file, and transmits to the client computers 130 related advertisements for display through layered augmentation. Layered augmentation is described in detail below with respect to FIGS. 3A through 3C. The handler 36 retrieves the activated keywords (e.g., from the requests), and determines one or more relevant advertisements from an advertising database (not shown) that matches the keywords and/or the associated reference data. In one embodiment, rather than transmitting the related advertisements, the handler 36 transmits addresses (e.g., URLs) of the relevant advertisements to the requesting client computer 130. The client computer 130 resolves the addresses to retrieve the advertisements.

The reference database 39 stores reference data such as types of advertisements (e.g., television advertisements), categories of advertisements (e.g., storage rental, home equity loan), and/or information about specific advertisements (e.g., associated keywords, format information, price the advertiser is willing to pay, and URL of the advertisement). The reference database 39 may be a relational database or any other type of database that stores the data, such as a flat file. In one embodiment, the reference database 39 is a web enabled reference database supporting remote calls through the Internet to the reference database 39.

The components of the augmentation server 110 can reside on a single computer system or several computer systems located close by or remotely from each other. For example, the analyzer 45 and the generator 48 may reside on separate web servers, and the reference database 39 may be located in a dedicated database server. In addition, any of the components or sub-components may be executed in one or multiple computer systems.

Web pages (or web browsers) can provide additional information to viewers. For example, when a user places a mouse over a link label of a hyperlink, a web browser displays the associated destination URL (e.g., on a status bar of the web browser). As another example, when a user places a pointer over a keyword, the web browser may generate a pop-up dialog box, and display relevant information (e.g., an explanation of the keyword). The process of providing additional information to web page viewers is called augmentation.

A keyword (or phrase) often has multiple aspects of related information, each having multiple aspects of related information. For example, the key phrase "digital camera" is related to its history, underlying technology, and available products and services. A specific product related to digital camera has related information such as product description, customer review, and competing products. Usually only one aspect of the related information is provided through augmentation due to limited display space.

Multiple aspects of related information can be arranged and provided to viewers through layered augmentation. Each aspect of related information can be assigned to one specific layer of the layered augmentation. Viewers can navigate among the multiple aspects of related information by accessing the different layers of the layered augmentation without leaving the web page. For example, the augmented information can be displayed in a multi-layered dialog box. A viewer can navigate among different layers by selecting associated tabs displayed in the dialog box in which each tab is associated with a layer. In some embodiments, the multiple layers may be stacked in a manner similar to windows in Microsoft Windows™ Operating System. The stacked layers may be arranged in a horizontal, vertical, or cascade style, showing a small exposed portion of each layer, such as a title area or a corner area. Navigation between each layer in the stack can be through selection of that small exposed portion of the layer within the stack. The process of providing additional information (or resources) through multi-layered dialog box and the multi-layered dialog box are collectively called layered augmentation.

Figure 3A:
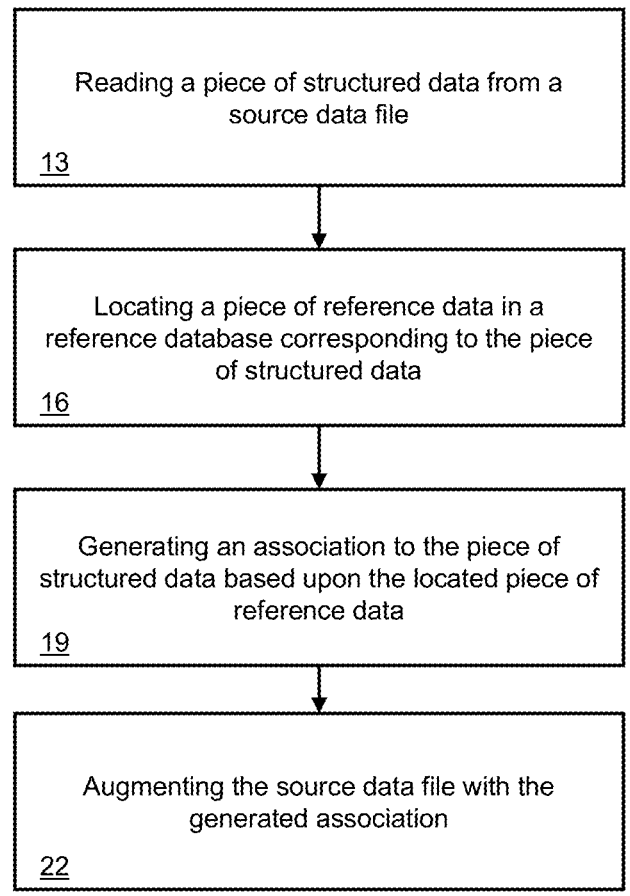
FIG. 3A is a flow diagram of an embodiment of a method of producing augmented content.
Figure 3B:
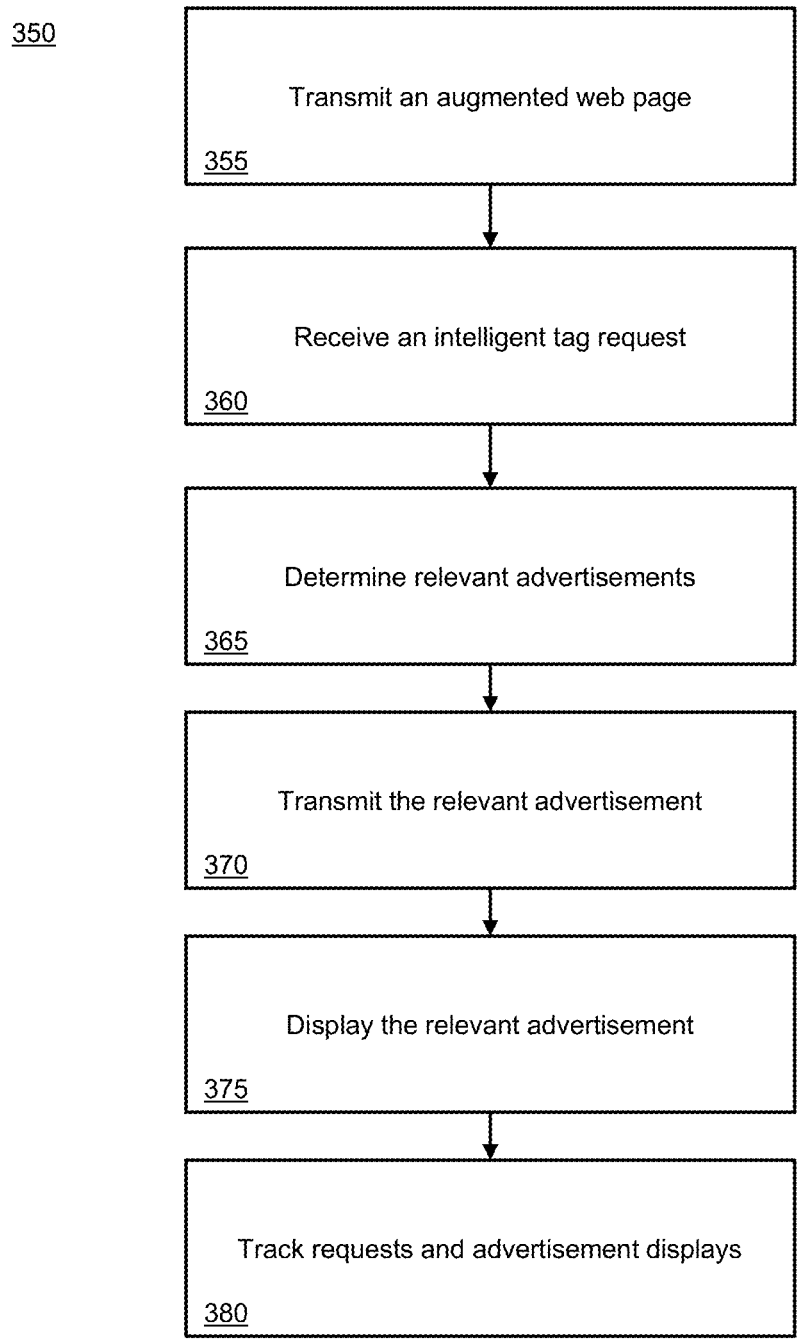
FIG. 3B is a flow diagram of an embodiment of a method of providing augmented content to users.
Figure 3C:
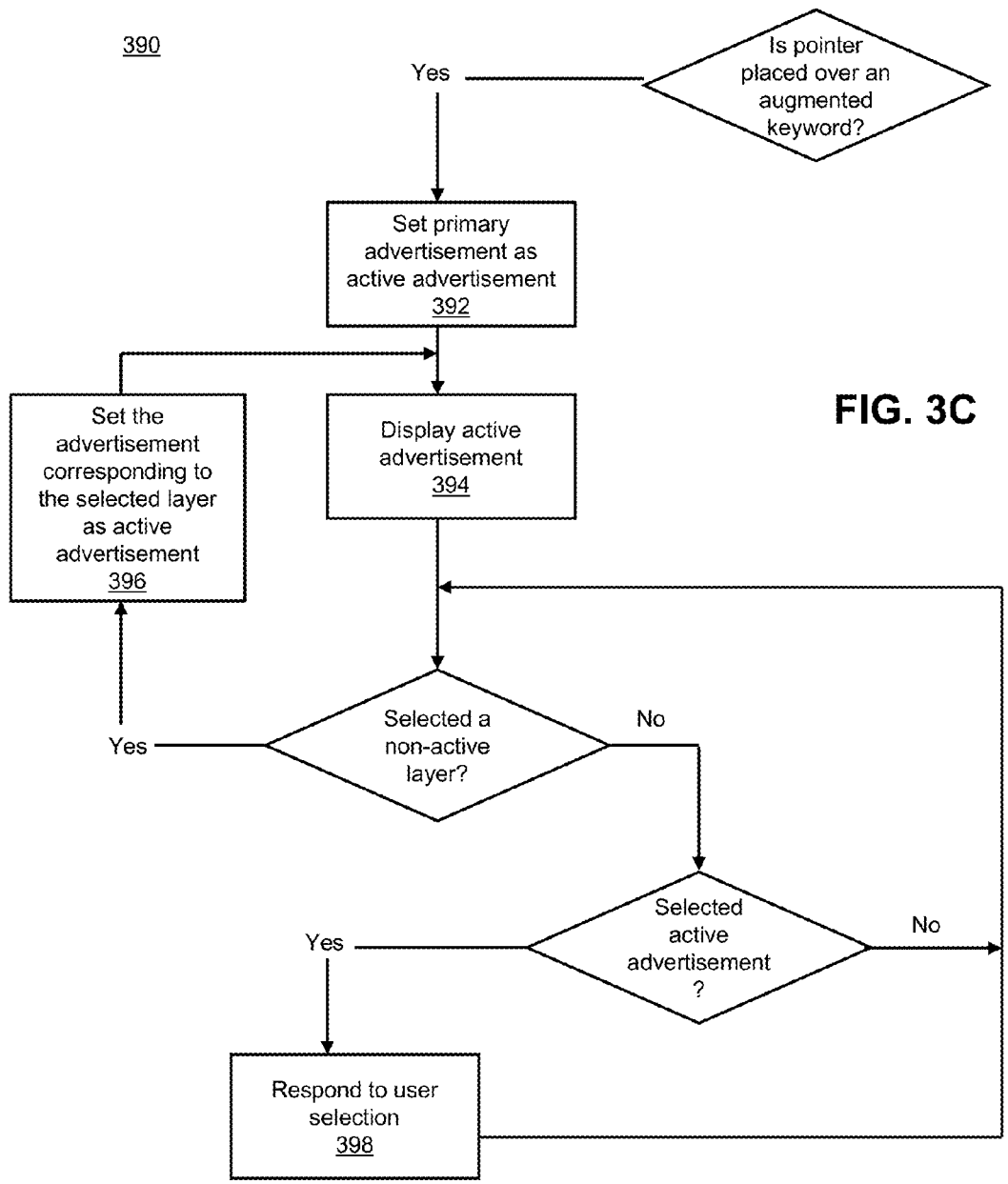
FIG. 3C is a flow diagram of an embodiment of a process of operation of advertisement and client code.

FIGS. 3A through 3C are flowcharts collectively illustrating an example process (or method) for augmenting web pages and providing viewers of augmented web pages with related advertisements through layered augmentation. In one embodiment, the illustrated method (or either of its sub-methods 300, 350, and 390) is implemented in a computing environment such as the computing environment 100. One or more portions of the method may be implemented in embodiments of hardware and/or software or combinations thereof.

By way of example, the illustrated method may be embodied through instructions for performing the actions described herein and such instrumentations can be stored within a tangible computer readable medium and are executable by a processor. In some embodiments (or additionally), the illustrated method may be implemented in modules like those in the augmentation server 110 described above with respect to FIG. 2 and/or other entities such as the content providers 120 and/or the client computers 130. Furthermore, those of skill in the art will recognize that other embodiments can perform the steps of the illustrated method in different order. Moreover, other embodiments can include different and/or additional steps than the ones described here.

FIG. 3A illustrates an example process (or method) 300 for augmenting web pages. As illustrated in FIG. 3A with reference to components of the augmentation server 110 in FIG. 2, at an appropriate starting terminus 10, the method 300 begins by reading a piece of structured data from a source data file 30 at a block 13 (e.g., through the handler 36). The source data file 30 may be one designated by an input uniform resource locator (URL) address or by any suitable means to designate a resource. Upon opening the source data file 30, the method 300 may optionally identify the type of content on the page with a content identifier such as a MIME header (e.g., through the locator 42). In one embodiment of the invention, the method 300 merely searches for the presence of a piece of reference data (e.g., through the locator 42), either informed by the content identifier or by simply searching an occurrence of a piece of well structured data (e.g., a keyword) within the source data file. In addition, once the source data file 30 is open, the method 300 has its content available for comparison to reference data in the reference database 39. Other methods and examples to read a piece of structured data from the source data file are described in U.S. application Ser. No. 12/033,539, filed on Feb. 19, 2008, the content of which is incorporated by reference in its entirety.

At a block 16, the method 300 locates one or multiple pieces of reference data in the reference database 39 corresponding to the piece of structured data read in the source data file 30 (e.g., through the locator 42). In one embodiment, the locator 42 searches for reference data in the reference database 39 that match the piece of structured data by making function calls to the reference database 39. In one embodiment, the structured data are keywords, and the reference data also contain keywords.

Keywords are a facile and efficient means of generating layered augmentation. In addition to or instead of using keywords, one embodiment uses a "fuzzy expert" or a neural network analysis of the source data file 30, such as by a natural language search of the source data file 30 to generate a distinct identifier for the content in the source data file 30. One advantage of a natural language search is the ability to better place content in context making links more contextually appropriate, for instance, security might relate to security of a physical plant such as security of a residence in one source data file 30 in one context and security of a website in another. In one embodiment, the method 300 determines a context of the keywords and/or the source data file 30 based on statistical modeling (e.g., through the locator 42). For example, a context can be assigned a pre-defined set of terms which acts as a fingerprint for the context (hereinafter called context fingerprint). The locator 42 can compare the context fingerprints associated with a collection of contexts with the terms within the source data file 30 to determine a percentage match for each context in the collection. Where a high percentage match is achieved (e.g., exceeding a pre-defined percentage match threshold), the locator 42 determines that the associated context is the context for the source data file 30. In some embodiments, the locator 42 may determine the context associated with the highest percentage match as the context for the source data file 30. The context can be used to locate corresponding reference data and/or related resources.

At a block 19, the method 300 generates an association to the piece of structured data based upon the located matching reference data (e.g., through the analyzer 45). In one embodiment, a piece of reference data includes an identifier such as a keyword, a context, a unique identification number, and/or associated URL address(es) of intended destination resource(s) based upon the occurrence of the corresponding keywords in the source data file 30. Generating an association means to associate the piece of structured data located in the source data file 30 with the located reference data in the reference database 39. The generated association might optionally include additional identification codes such as an association ID. The method 300 then augments the original source data file 30 with the generated association at a block 22 to generate an augmented data file 50 (e.g., through the generator 48).

In one embodiment, the method 300 expresses the association as intelligent tags (e.g., through the generator 48). The method 300 generates intelligent tags for the located keywords and tags the keywords with the generated intelligent tags. The intelligent tags contain information about the associated keywords such as the keyword and related context, and information about the associated reference data such as IDs that uniquely identify the reference data in the reference database 39. For example, the intelligent tags may contain requirement (or preference) information about advertisements (or other types of resources) to be associated with the keyword, such as types of advertisements and a minimum advertisement fee. In one embodiment, the intelligent tags also format the augmented keywords differently than the other textual content in the augmented web pages. Having generated the augmented data file 50, the method 300 then terminates at a block 25.

In one embodiment, the augmentation server 110 (or the content providers 120) also augments the web pages by including computer code (hereinafter called client code) to monitor and report viewers' interactions with the augmented keywords. The computer code can be in any computer language, such as JavaScript. Additional functions of the client code are described in detail below with respect to FIGS. 3B and 3C.

The augmented data file 50 can be delivered (or transmitted) to client computers 130 for display through a web browser to viewers to provide related resources through layered augmentation. The delivery of the augmented data file 50 and the process to provide layered augmentation is described in detail below with respect to FIGS. 3B and 3C. For purpose of illustration, the method is described in terms of web pages augmented with advertisements, even though the disclosed embodiments apply to other types of augmented data file and resources.

Referring now to FIG. 3B, a flowchart illustrating an example process (or method) 350 for providing layered augmentation to viewers of augmented web pages. As illustrated, the method 350 transmits 355 an augmented web page to a client computer. For example, a user of the client computer 130 may enter the URL of an augmented web page (or the corresponding original web page) in the address bar of a conventional web browser (e.g., Microsoft Internet Explorer™, Mozilla Firefox™, or Apple Safari™). The web browser of the client computer 130 (hereinafter called the client web browser) resolves the URL and transmits a request for the web page to a corresponding content provider. Responding to the request, the content provider transmits 355 the augmented web page to the client web browser for display. In one embodiment, the client web browser displays augmented keywords in a double underline style and/or in a color distinctive from text that is not augmented in the augmented web page.

The method 350 receives 360 an intelligent tag request from the client computer 130. As described above with respect to FIG. 3A, the augmented web page contains client code that monitors user interactions with augmented keywords. In one embodiment, if the user moves a pointer (e.g., a pointer controlled by a mouse, navigation button, or touchpad) over (a mouse-over) an augmented keyword (the activated keyword), the client code (which may be integrated with the web browser, for example, as a plug-in applet) generates an intelligent tag request and transmits the request to the augmentation server 110. The request indicates the mouse-over user activity to the augmentation server 110. The request may contain information that uniquely identifies the activated keyword (e.g., an association ID), and/or other information such as the activated keyword itself.

The method 350 determines 365 advertisements relevant to the activated keyword for the received request based on the keyword and/or the associated reference data. In one embodiment, the augmentation server 110 extracts the keyword and/or related context from the request, retrieves the associated reference data from the reference database 39, and determines 365 the relevant advertisements by searching in an advertisement database using the keyword and/or requirements set forth in the associated reference data (e.g., advertisement category, context, fee requirements, etc.).

In one embodiment, the method 350 determines 365 the advertisements that match the best (e.g., matching the activated keyword and/or satisfies the most number of reference requirements) as the relevant advertisements. In another embodiment, the method 350 determines 365 relevant advertisements based on a context of the augmented web page and/or the activated keyword. For example, for a key phrase "digital camera" in an article about digital camera, the method 350 may determines the following resources as relevant: a product review of a digital camera in CNET.com, a collection of user reviews at Buy.com, and a selection of similar digital cameras. The context can be determined when the activated keyword is identified in method 300.

In one embodiment, the method 350 determines a sequence for the related advertisements. The top advertisement in the sequence (also called the default advertisement or the primary advertisement) is the advertisement being displayed on the top layer of the layered augmentation. The lower ranked advertisements (also called secondary advertisements) are made available on lower layers of the layered augmentation.

In one embodiment, the method 350 uses a bidding system to determine related advertisements sequence. For example, for a key phrase "digital camera," there may be multiple related advertisements (e.g., advertisements for different brands or models of digital cameras), each having a bid (or budget or cost) for the key phrase. The method 350 may determine a sequence of the advertisements based on their bids, the one with the highest bid ranked the highest and so on.

In another embodiment, the method 350 may determine the sequence of multiple advertisements based on factors other than bidding prices. For example, the method may consider factors such as relationships among the multiple advertisements (e.g., prioritizing video advertisements over text ones), prior user interactions with the advertisements (e.g., prioritizing advertisements with higher interacting rate), and contexts of the augmented keyword (e.g., prioritizing advertisements from retailers or service providers having branches near a geographical context of the keyword and/or the augmented web page, or geographic locations of a substantial portion of viewers of the web page).

Further, specific sequences may be set for specific keywords and/or parties (e.g., content providers, advertisers, users). For example, if the keyword(s) is a music artist (or band, album) name, the method 350 may make available his songs (e.g., playback through an embedded music player) on the top layer and other resources on lower layers. As another example, if the keyword(s) is a location name (e.g., Yellowstone National Park), the method 350 may make available the relevant map (e.g., MapQuest™ Map) on the top layer. As noted above, the resources made available through the layered augmentation need not to be advertisements and can be related contents such as related articles, videos, images, music, to name only a few. For example, a content provider may specify that the layered augmentations in its web pages make available a set of links to its other relevant web pages (e.g., within the same website) where the keyword(s) being augmented is cross-indexed.

In one embodiment, viewers can set their preferences to determine a preferred sequence for the layered augmentation. For example, a viewer may prefer video advertisements while another may disfavor them (e.g., due to bandwidth constrains at receiving device). As a result, the method 350 may place video advertisements higher on a sequence for the first viewer, while not consider video advertisements for augmentation for the second viewer. Viewer preferences can be stored in a database such as the reference database 39 along with other viewer related data (e.g., profile data).

The method 350 transmits 370 the relevant advertisements to the client computer 130 for display. In one embodiment, the method 350 retrieves the advertisements from an advertisement database, and transmits 370 them to the client web browser (or the client computer) for display. In some embodiments, the method 350 may transmit references of the advertisements (e.g., their URLs) to the client web browser for retrieval.

In one embodiment, the method 350 generates computer code (hereinafter called the advertisement code) to facilitate user interaction with the advertisements. Similar to the client code, the advertisement code can be in any computer language, such as JavaScript. The advertisement code may display the relevant advertisements in a multi-layered dialog box (or popup box) when the viewer moves a pointer over the activated keyword. The method 350 transmits the generated advertisement code along with the related advertisements to the client web browser. In one embodiment, the advertisement code is a part of the client code, and is integrated in the augmented web page when the page is generated The client web browser displays 375 the relevant advertisements in a layered dialog box proximate to the activated keywords (or the position where the mouse-over is occurring) as an in-page overlay. In one embodiment, the client web browser utilizes the advertisement code to display the advertisements in a multi-layered dialog box. The advertisements are displayed according to their sequence. In one embodiment, only the top advertisement is displayed and the lower ranked advertisements are represented by selectable tabs. An example process of the operation of the advertisement code and the client code is described in detail below with respect to FIG. 3C.

Referring now to FIG. 3C, a flowchart illustrating an example process (or method) 390 of the client code and/or the advertisement code. As illustrated, the method 390 determines whether a pointer is positioned over an augmented keyword (the activated keyword), and if so, sets 392 the primary advertisement as the active advertisement, and displays 394 the active advertisement in a multi-layered dialog box overlaying the augmented web page in a position proximate to the activated keyword or the mouse-over. The multi-layered dialog box also displays multiple selectable (e.g., clickable) tabs representing the lower layers. The viewer can select a tab to request the multi-layered dialog box to display the corresponding layer. If the user selected a tab, the method 390 sets 396 the advertisement corresponding to the selected layer as the active advertisement and displays 394 it in place of the previously displayed advertisement.

The viewer can also interact with the currently displayed advertisement by selecting the advertisement. If the viewer selects the advertisement, the method 390 responds 398 to the user selection based on the nature of the user selection and the configuration of the advertisement. For example, if the user clicks on the active advertisement, the method 390 redirects the web browser to a web page related to the active advertisement. In some embodiments, if the user drags a scrollbar displayed on the dialog box, the method displays different portions of the active advertisement as the user drags along the scrollbar. In one embodiment, if the viewer moves the pointer away from the activated keyword and/or the multi-layered dialog box for an extended period of time, the method 390 hides the dialog box.

Referring back to FIG. 3B, in one embodiment, rather than displaying multiple advertisements, the method 350 displays multiple aspects (or portions) of the same advertisement in the multi-layered dialog box. For example, the multi-layered dialog box may display an image and brief description of a product, and present two tabs, one for user reviews and the other for playback of a television advertisement of the product. The viewer may interact with the advertisement through the multi-layered dialog box without having to navigate away from and otherwise leave the current web page the viewer is interacting with in the web browser. For example, if the advertisement contains video, the multi-layered dialog box may overlay the video with video controls (e.g., forward, rewind, play/pause, volume, etc.). The multi-layered dialog box may also provide functional resources such as web searches, enabling viewers to conduct web searches and/or review search results without leaving the augmented web page.

The method 350 tracks 380 the received requests, the advertisements displays, and/or the user's interactions with the advertisements. These activities may be logged in a database (e.g., the reference database 39) or reported to another device or person (e.g., via electronic mail).

Figure 4A:
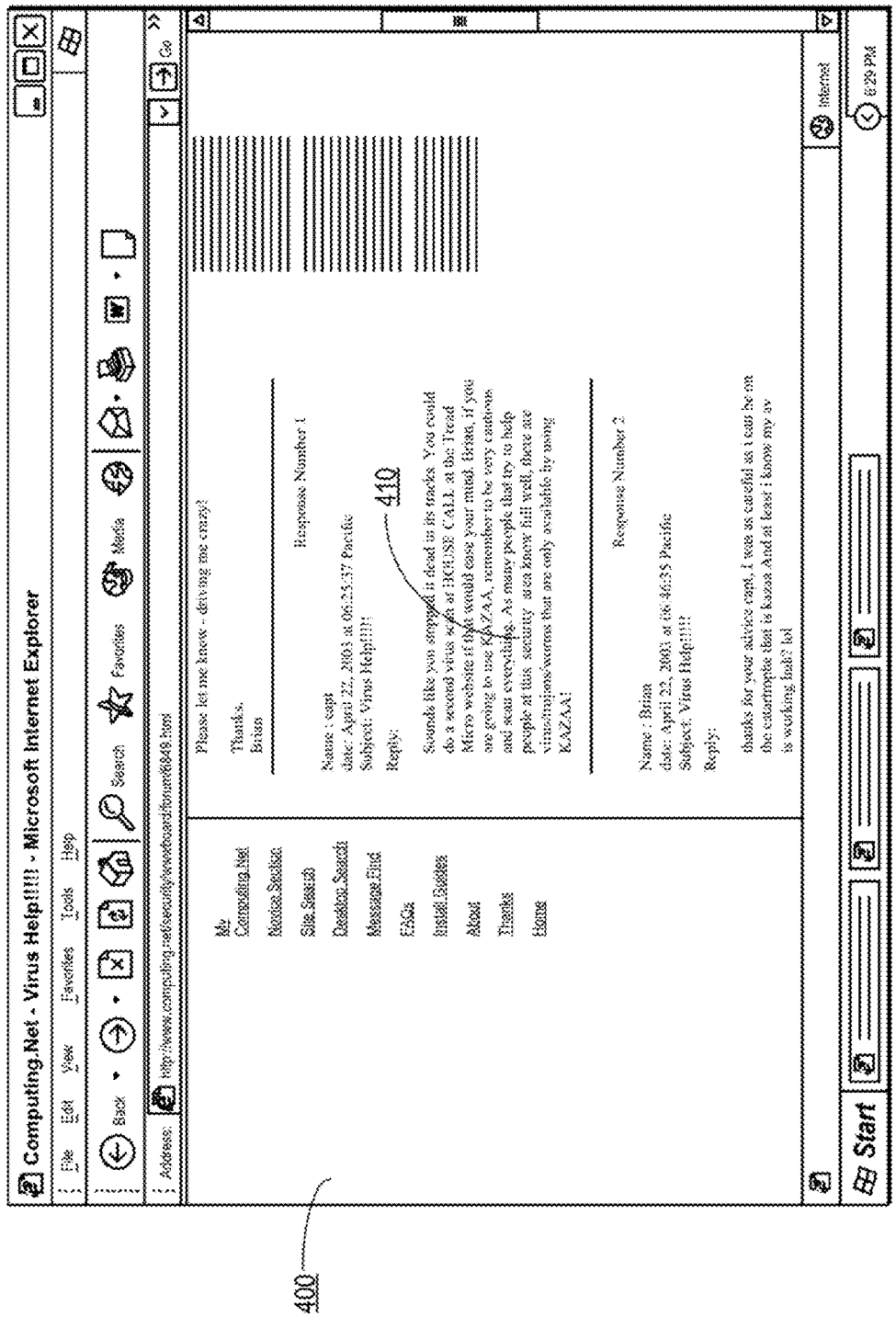
FIGS. 4A through 4E are screenshots illustrating a web page, its corresponding augmented web page, and a viewer's user experience interacting with the augmented web page according to embodiments of the present disclosure.

The methods described above with respect to FIGS. 3A through 3C are illustrated below in an example together with accompanying screenshots in FIGS. 4A through 4E. Initially, the augmentation server 110 retrieves a web page 400 for augmentation. The web page 400 may contain textual content of any subject. FIG. 4A shows an example of the web page 400 as displayed in Microsoft Internet Explorer™. As shown in FIG. 4A, the web page 400 is retrieved from website www.computing.net and contains a paragraph about computer virus.

The augmentation server 110 reads 13 the web page 400 for keywords. The augmentation server 110 identifies the keyword "security" 410 for layered augmentation. The augmentation server 110 locates 16 a piece of reference data matching the keyword "security" 410 and determines a context of computer security for the keyword 410. The piece of reference data includes an advertisement category for computer security services. The augmentation server 110 generates 19 an association of the keyword "security" 410 and the located piece of reference data.

The augmentation server 110 augments 22 the web page 400 by generating an intelligent tag encoding the generated association, and integrating the intelligent tag in an augmented web page 450. The augmentation server 110 also includes in the augmented web page 450 JavaScript code (client code) that captures user interactions with the augmented keyword 410.

Figure 4B:
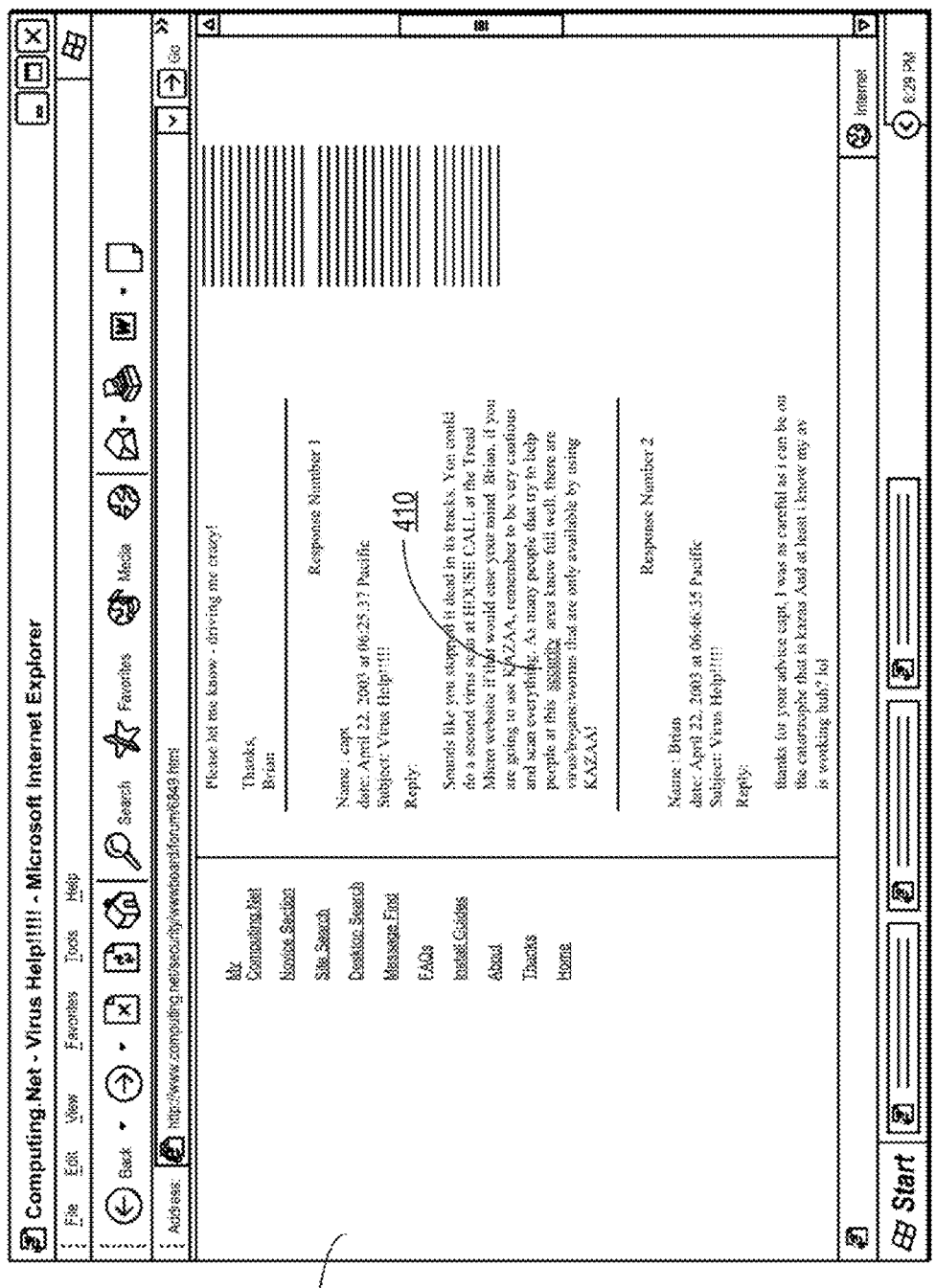

A web browser running on a client computer 130 retrieves the augmented web page 450 and displays it to a user (e.g., responding to the user entering an URL of the web page 400 or 450 in the address bar of the web browser). FIG. 4B illustrates a screenshot of the augmented web page 450 as displayed on an Internet Explorer™ web browser after it is retrieved by the browser. It is noted that in FIG. 4B the augmented keyword 410 is displayed in a double underline style to distinguish from conventional hyperlinks that are single underlined.

Subsequently, the user may move a pointer (e.g., controlled by a mouse, stylus, or touchpad) over the double underlined augmented keyword 410 (the activated augmented keyword). This user action is also referred to as a mouse-over. Detecting the mouse-over, the embedded JavaScript code (the client code) in the augmented web page 450 (or the web browser) generates an intelligent tag request that uniquely identifies the activated augmented keyword 410 and/or the related context, and transmits the request to the augmentation server 110. The augmentation server 110 receives 360 the request, retrieves stored association of the keyword 410, and determines 365 relevant advertisements by searching for advertisements corresponding to the keyword 410 and/or the related context in an advertising database. In the present example, the augmentation server 110 determines 365 that an advertisement for Cisco security center is the relevant advertisement associated with the augmented keyword 410.

The augmentation server 110 determines a sequence of various parts of the Cisco advertisement and/or other relevant advertisements. In the present example, the augmentation server 110 determines that a description of the Cisco security center ranks top in the sequence, followed by its customer reviews, and a list of competing services.

The augmentation server 110 transmits 370 the related advertisement(s) back to the web browser for display. The augmentation server 110 also transmits JavaScript code (advertisement code) that enables layered representation of the transmitted advertisements.

Figure 4C:
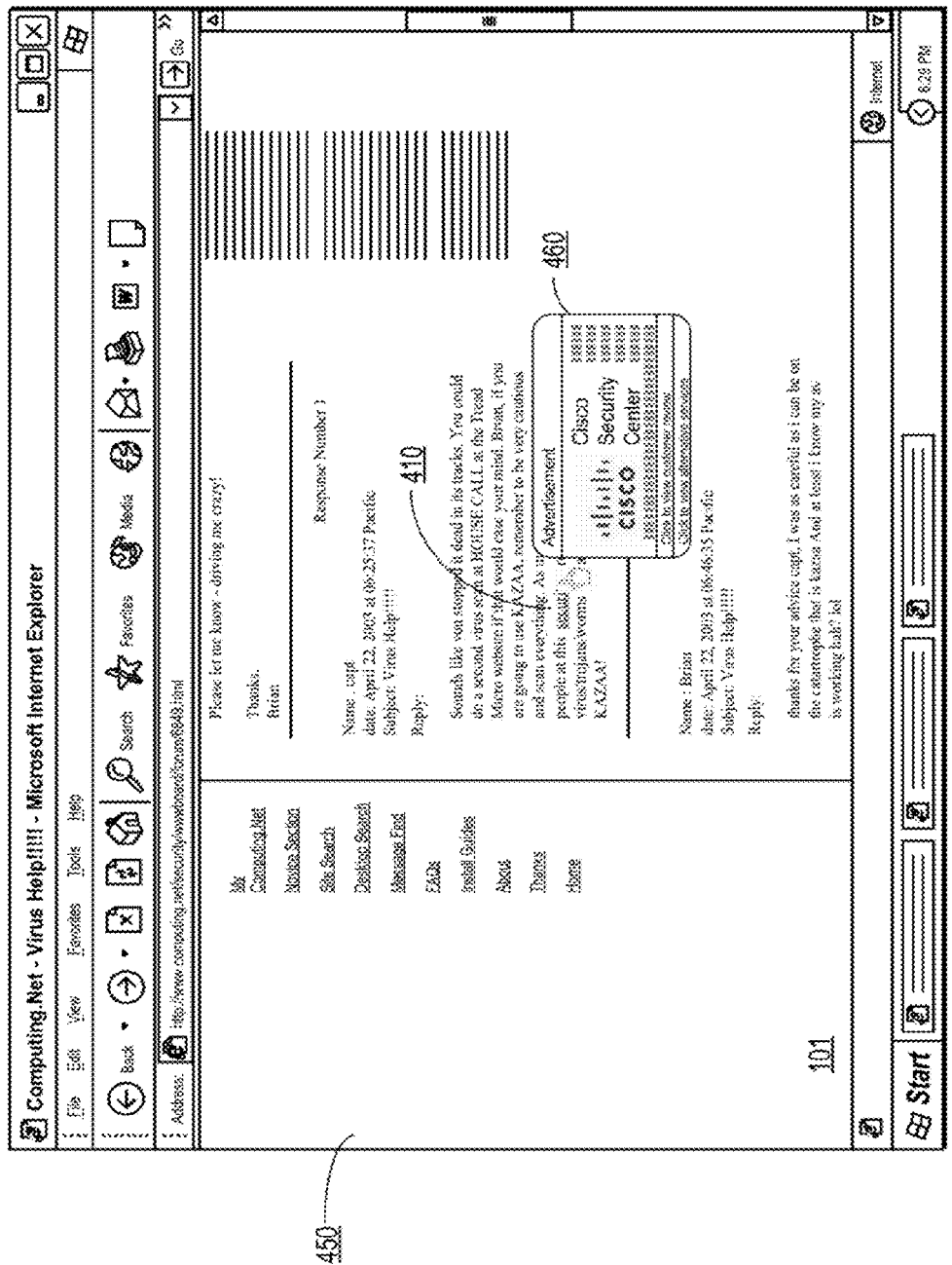

The web browser (or the advertisement code) displays 375 the received advertisement(s) as an overlay in a multi-layered dialog box in proximity to the keyword 410 or the location where the mouse-over occurred. As illustrated in FIG. 4C, the user has moved a mouse pointer over the keyword 410. As a result, the web browser receives advertisements related to the keyword "security" 410 and displays them in a multi-layered dialog box 460 proximate to the pointer.

As illustrated, the multi-layered dialog box 460 displays an advertisement about CISCO security center. On the bottom of the multi-layered dialog box 460 are two tabs labeled "Click to view customer review" and "Click to view alternative services," respectively. Note that this is consistent with the sequence of the advertisements (and/or advertisement portions) determined by the augmentation server 110. The user can navigate the advertisements within the multi-layered dialog box 460 by clicking the labeled tabs. The user can also visit the corresponding advertiser's web page by clicking the advertisement. While the user navigates within the multi-layered dialog box 460, the augmented web page 450 remains as the current web page displayed in the client web browser. The user can quickly resume browsing the rest of the augmented web page 450.

Figure 4D:
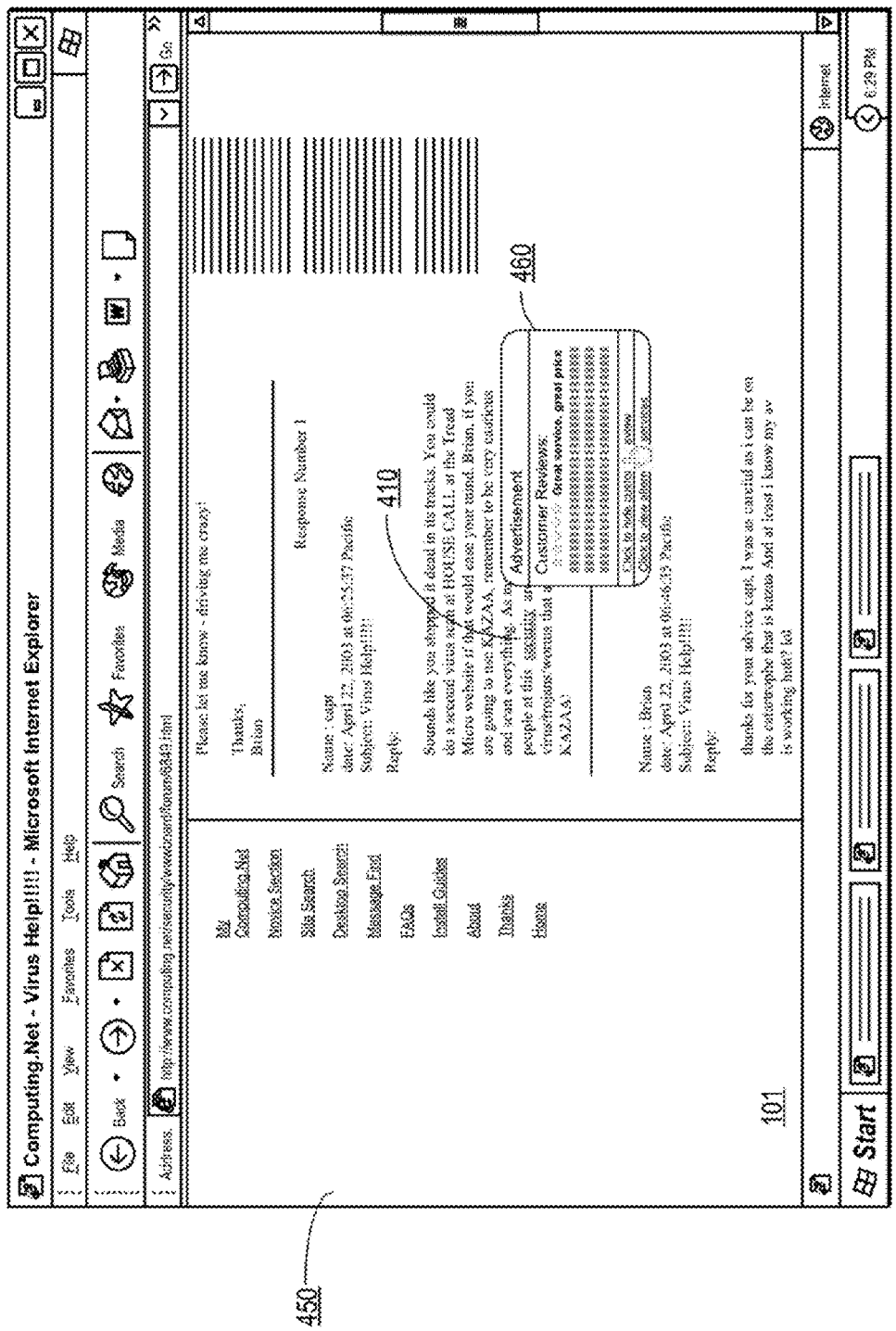

As illustrated in FIG. 4D, when the user clicks (or mouse-over) the tab labeled "Click to view customer review," the multi-layered dialog box 460 displays customer reviews for Cisco security center. It is noted that the label on the tab representing customer review changes to "Click to hide customer review." The user can click the tab to resume viewing the previous advertisement for Cisco security center.

Figure 4E:
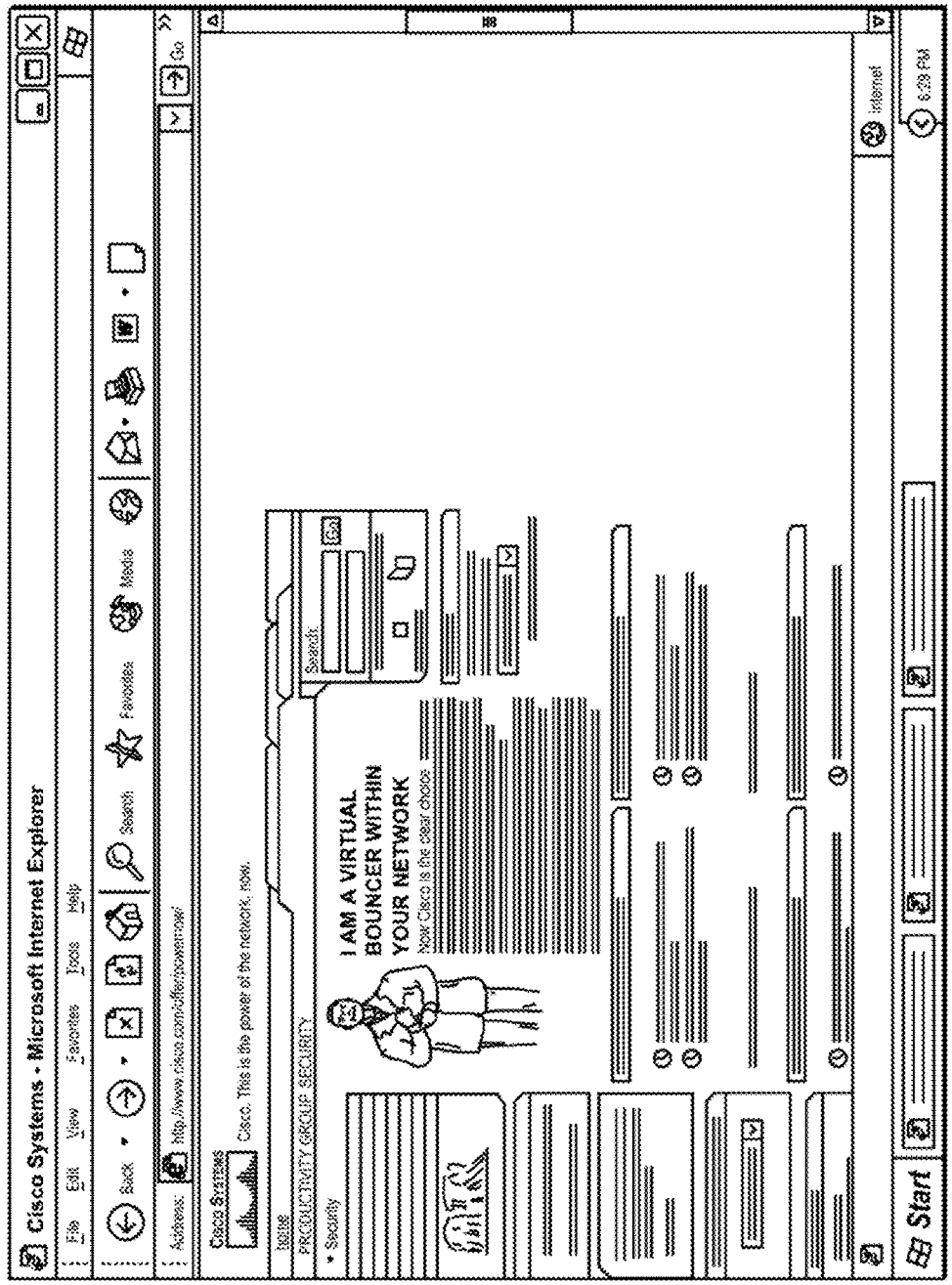

As illustrated in FIG. 4E, when the user clicks the Cisco security center advertisement, the advertisement code redirects the client web browser to the advertiser's web page, in this case a web page related to Cisco security center.

C. Systems and Methods of an Ad Server Platform

Figure 5A:
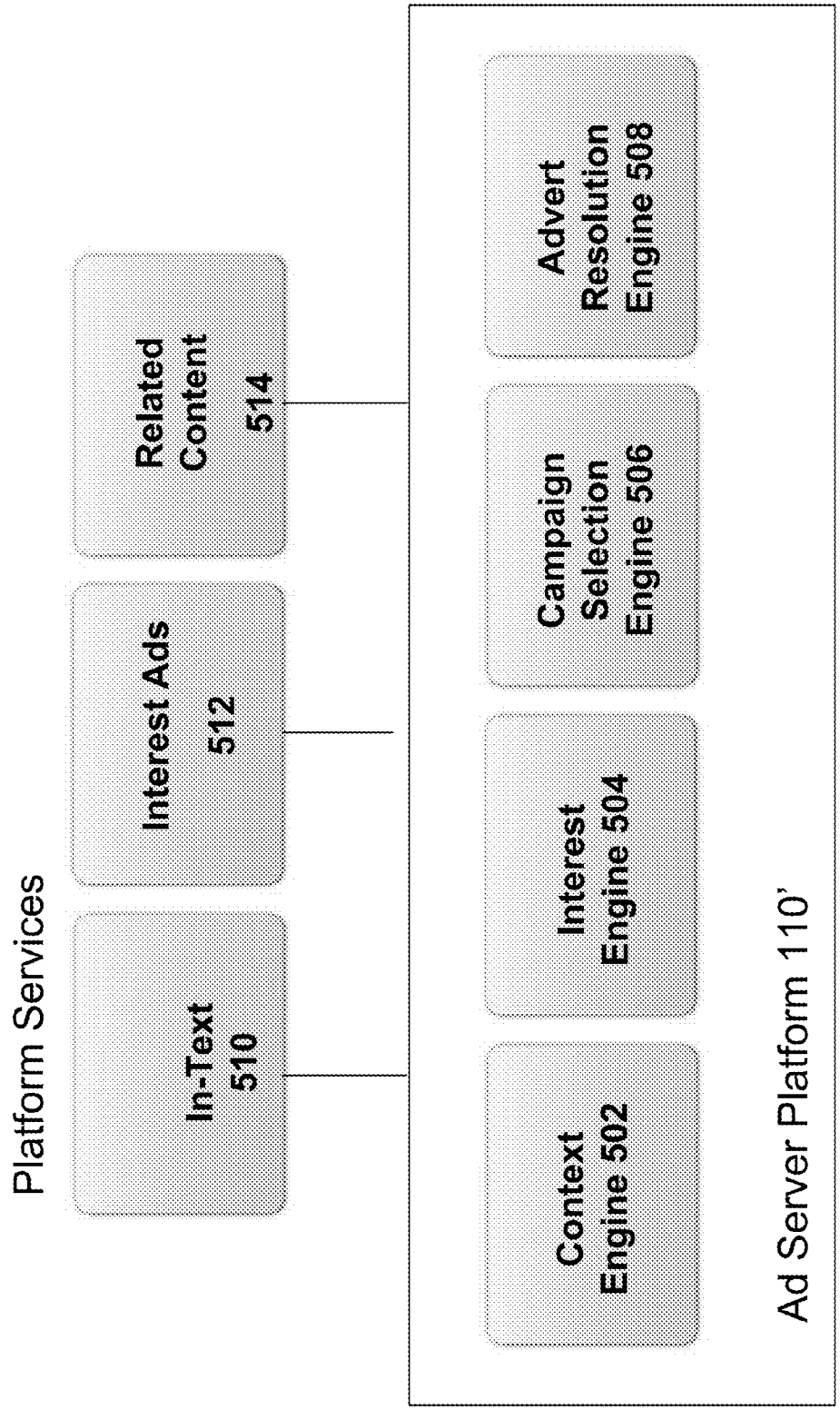
FIG. 5A is block diagram of an embodiment of an ad server platform and platform services.

Referring now to FIG. 5A, an embodiment of an environment and systems for providing a plurality of augmented content and related services. In brief overview, an ad server platform 110' delivers a plurality of services, such an in-text services 510, interest ads 512 and related content 514 services. The ad server platform 110' may include a context engine 502, an interested engine 504, a campaign selection engine 506 and/or an advert resolution engine. The ad server may include or further include any embodiments of the augmentation server 110 described herein.

The ad server platform 110' may comprise any combination of modules, applications, programs, libraries, scripts or any other form of executable instructions executing on one or more servers. The ad server platform 110' may provide services directed to advertisers to reach a plurality of users across a plurality of publisher websites, such as content providers 120. The services of the ad server platform 110' may combine the precise word targeting with delivery of rich media and video content. The ad server platform 110' may provide services directed to publishers to received additional advertising revenue and real-estate with adding more clutter on their web-sites. The ad server platform provides a user controlled environment, allowed the user to view augmented content, such as advertising, only when these choose to via mouse interaction over a relevant word of interest—a keyword. As such, an ad impression may be pre-qualified in that a user must choose to view the ad by moving their mouse over or clicking on a word or phrase of interest. This may be referred to as user-initiation impressions.

The ad server platform may provide in-text advertising services 510. In-text services reads web pages and hooks words and word-phrases dynamically and in real time. The hooked words may be linked or hyperlinked to augmented content in any manner. In one embodiments, the words are double underlined but any type of indicator may be used such as a single underline or an icon. In some embodiments, the code for in-text services is installed by publishers into their sites and does not require any additional code, adware or spyware to be downloaded or uploaded by a user. When a user mouses over or clicks on hooked (e.g., double underlined) word or phrase, the code display a user interface overlay, sometimes referred to as a tooltip, on the web page and near the hooked word or phrase.

The ad server platform may provide interest ad services 512. The interest ad services identifies words of interest within a web page to deliver advertisements that are related to these words of interest. The interest ad service may identify the words on the page to analyze those words to determine which words are core or central to that page. These set of core word are keywords to identify one or more ad campaigns relevant to those keywords and the user's interests. This may minimize wasted impressions and deliver and advertising experience that relates more directly to the user's interest.

The ad server platform may provide related content services 514. The related content services may provide, create or generate an automated linking system that conveniently delivers relevant additional content from the same or different publishes in the form of videos, articles and information. The related content services may read web pages and hook words and word-phrases dynamically and in real time. The hooked words may point or navigate the user through content related to the hooked words available through a website, network or portal. For example, the related content service may link a word on the page to re-circulate the user through additional content, such as other web pages, of the publisher. In some embodiments, the related content service may automatically mirror the hyperlink style of a publisher's editorial links or already provided hyperlinks. The related content services may generate or add an icon, such as search icon, that indicates that augmented content is returned or available.

In further details, the ad server platform may comprise one or more context engines 502. The context engine may comprise any type and form of executable instructions executing on a device, such as a server. The context engine may comprise any functions, logic or operations for analyzing content of a web page. The context engine may use any type and form of semantics based algorithm to determine the meaning of the keyword relevant to the content of the page, the user, the web-site, the publisher and/or the campaign. The context engine may determine the intended structure and meaning of words, phrases, sentences or text in the content of the page. The context engine may analyze the text in the content to determine any characters, text, strings, words, terms and/or phrases, or any combinations thereof, that match or correspond to any characters, text, strings, words, terms and/or phrases, or any combinations thereof of any one or more campaigns. The context engine may analyze the content of the page for keywords from campaigns targeted at the web-site, publisher or content provider of the page. The context engine may determine any type of metrics on the content of the web page and of keywords of targeted campaigns of the web page. The context engine may use any type and form of algorithm to determine a keyword relevancy weight such as by location of the keyword, the frequency of the keywords and the length of the keyword. For example, for location weighting, those keywords that appear earlier in the content may be considered more relevant than those that appear later. For frequency relevancy, the more a keyword is repeated within the content, the more relevant the keyword may be considered. For length relevancy, the more words in a keywords the less generic the keyword may be and the more relevant the keyword may be considered.

The ad server platform may comprise one or more interest engines 504. The interest engine may comprise any type and form of executable instructions executing on a device, such as a server. The interest engine may comprise any functions, logic or operations for tracking and storing user information and/or behavior to a behavioral profile. The interest engine may track and store the user's location, operating system and/or browser. The interest engine may track a predetermined number of keywords a user has seen over a certain time period. The interest engine may track a predetermined number of relevant terms a user has viewed over a certain time period. The interest engine may track the a predetermined number of searches for which a user clicked a search result and landed on the content providers web-site or web. The interest engine may store the recent search terms and/or recently viewed terms into a behavioral profile for the user. The ad server platform, context engine and/or interest engine may change the weighting of keywords in content of a page responsive to any information stored in any behavioral profiles. For example, The ad server platform, context engine and/or interest engine may use a multiplier to upweight or downweight one or more keywords.

The ad server platform may comprise one or more campaign selection engines 506. The campaign selection engine may comprise any type and form of executable instructions executing on a device, such as a server. The campaign selection engine may comprise any functions, logic or operations for selecting or matching a campaign to a set of one or more keywords identified and/or weights for content of a page. The campaign selection engine may identify and select a campaign from a plurality of campaigns. The campaign selection engine may identify and select a first set of campaigns from a plurality of campaigns that meet a first threshold or criteria. From the first set of campaigns, the campaign selection engine may order or rank these campaigns using any type and form of algorithms. In some embodiments, the campaign selection engine may provide a campaign-level relevance of the keywords. The campaign selection engine may determine a relevance number or weighting for each campaign relative to the weighted keywords. In some embodiments, each campaign may provide a priority to keywords, web-pages or publishers. In some embodiments, each campaign may provide a relevance weighting to keywords, web-pages or publishers. The campaign selection engine may also comprise any set of one or more rules or restrictions for either changing the ranking, keeping a campaign or removing the campaign. Based on applying these rules and/or restrictions, the campaign selection engine selects from the first set of one or more companies a second set of one or more campaigns to use for augmenting the identified keywords on the web-page.

The ad server platform may comprise one or more advert resolution engines 508. The advert resolution engine may comprise any type and form of executable instructions executing on a device, such as a server. The advert resolution engine may comprise any functions, logic or operations for resolving the advertisement to use for a hook. For each advertisement, the advert resolution engine may determine whether the advertisement is a backfill or to be obtained from a backfill network. If the advertisement is backfill, the advert resolution engine calls or communicates with the backfill provider's servers. For example, the advert resolution engine may include one or more handlers designed and constructed to communicate with a particular backfill provider. When an advertisement is received from the backfill provider or when the advertisement if not coming from a backfill, the advert resolution engine may perform any type and form of filtering on the advertisement, such as for making sure the ad meets any rules or restrictions for content. The advert resolution engine includes a placer for selecting an instance of a keyword to hook with the advertisement. When the advert resolution engine has checked for backfill, filters the advertisement and selected an instance to hook for all the intended advertisements, the advert resolution engine may hook the keywords. The advert resolution engine may perform these operations for content other than advertisements, such as other types of augmented content.

Figure 5B:
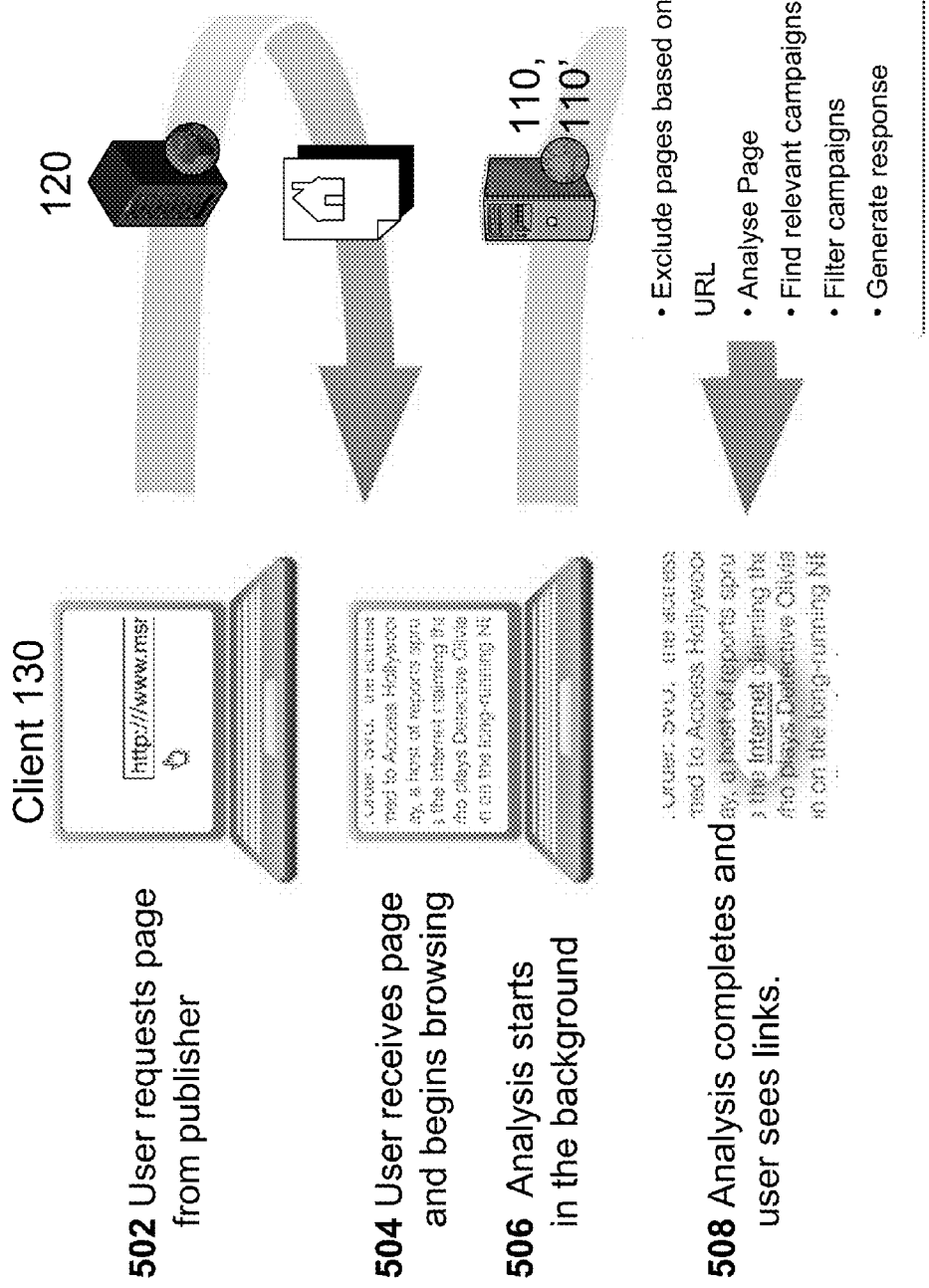
FIG. 5B is a diagram of an embodiment of stages of a request from a client for platform services.
Figure 5C:
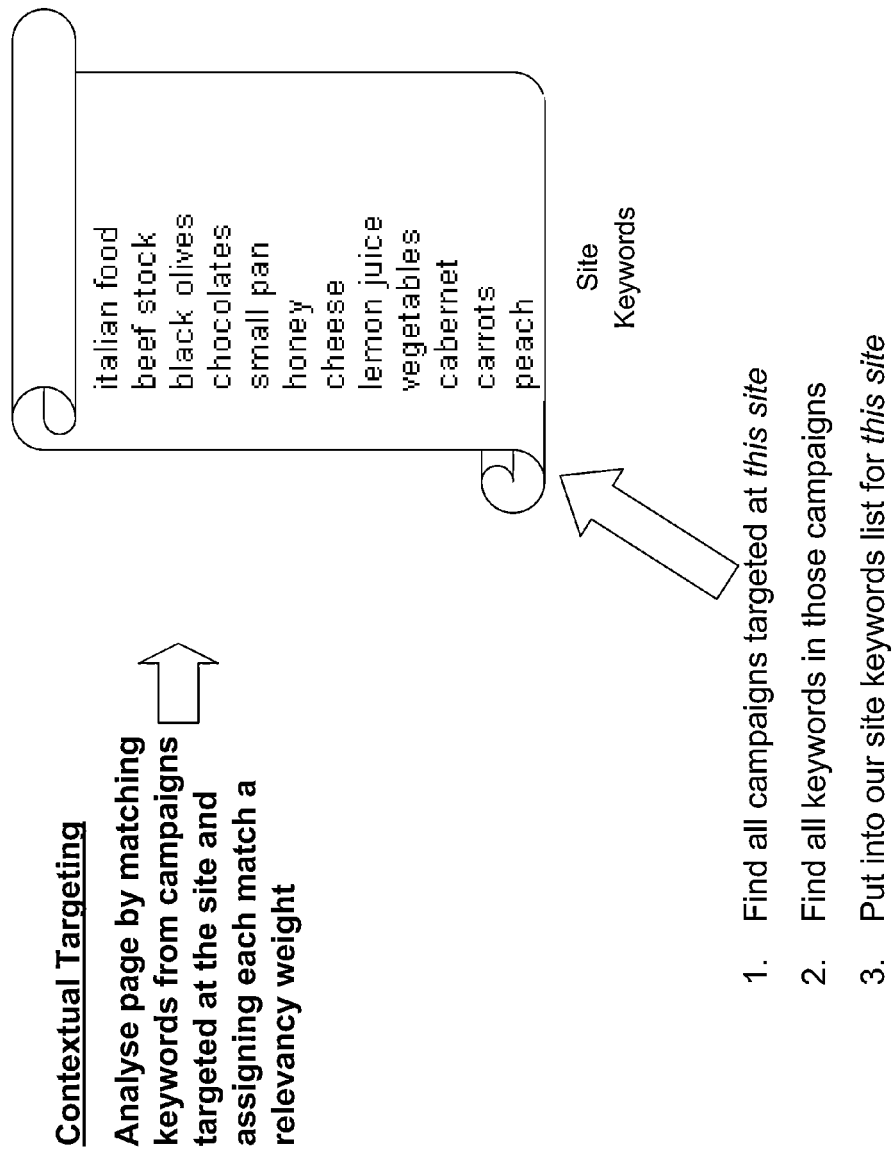
FIG. 5C is a diagram of an embodiment of contextual targeting.
Figure 5D:
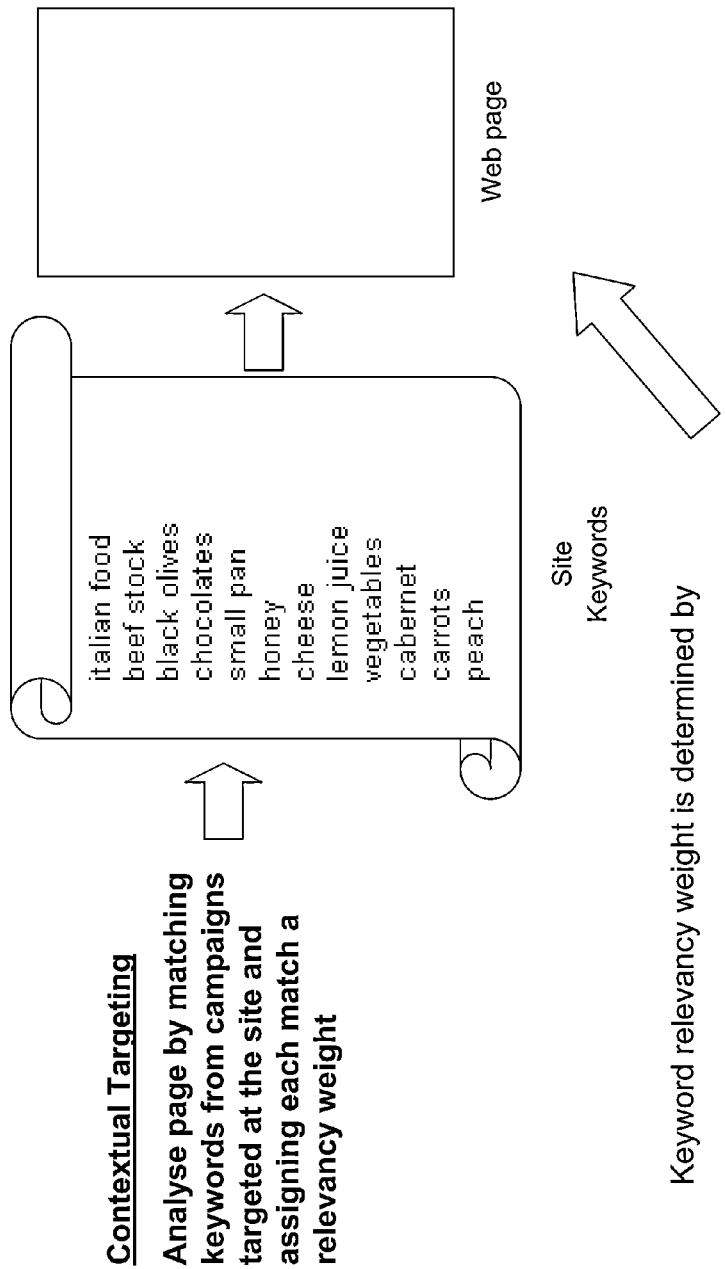
FIG. 5D is a diagram of another embodiment of contextual targeting.
Figure 5E:
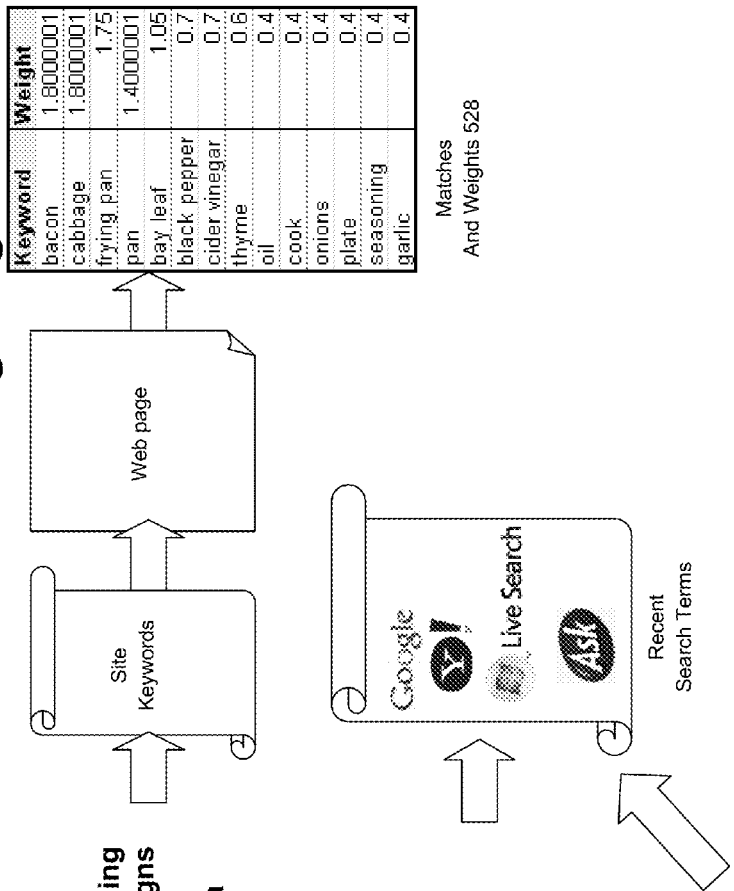
FIG. 5E is a diagram of an embodiment of contextual and behavioral targeting.
Figure 5F:
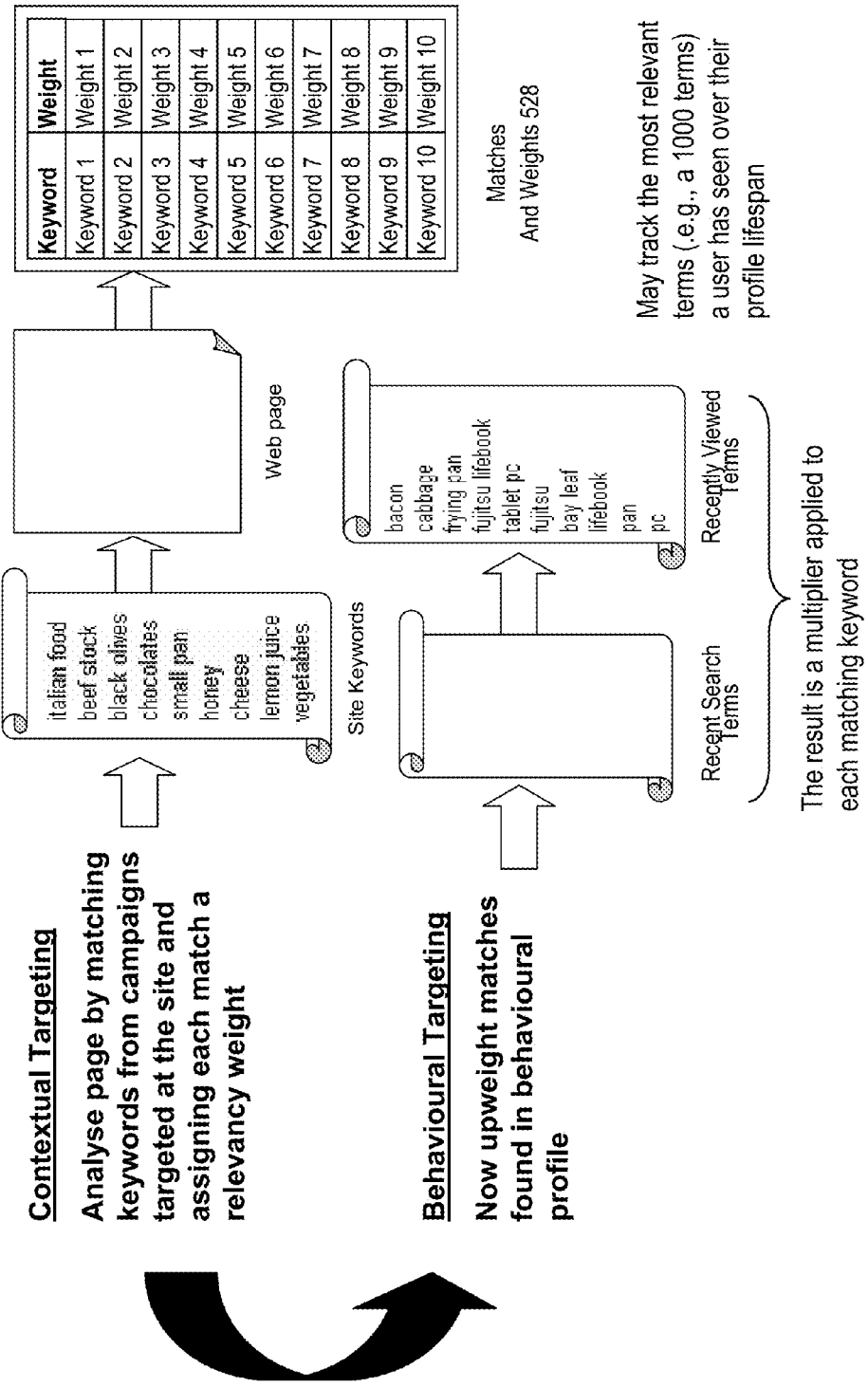
FIG. 5F is a diagram of another embodiment of contextual and behavioral targeting.
Figure 5G:
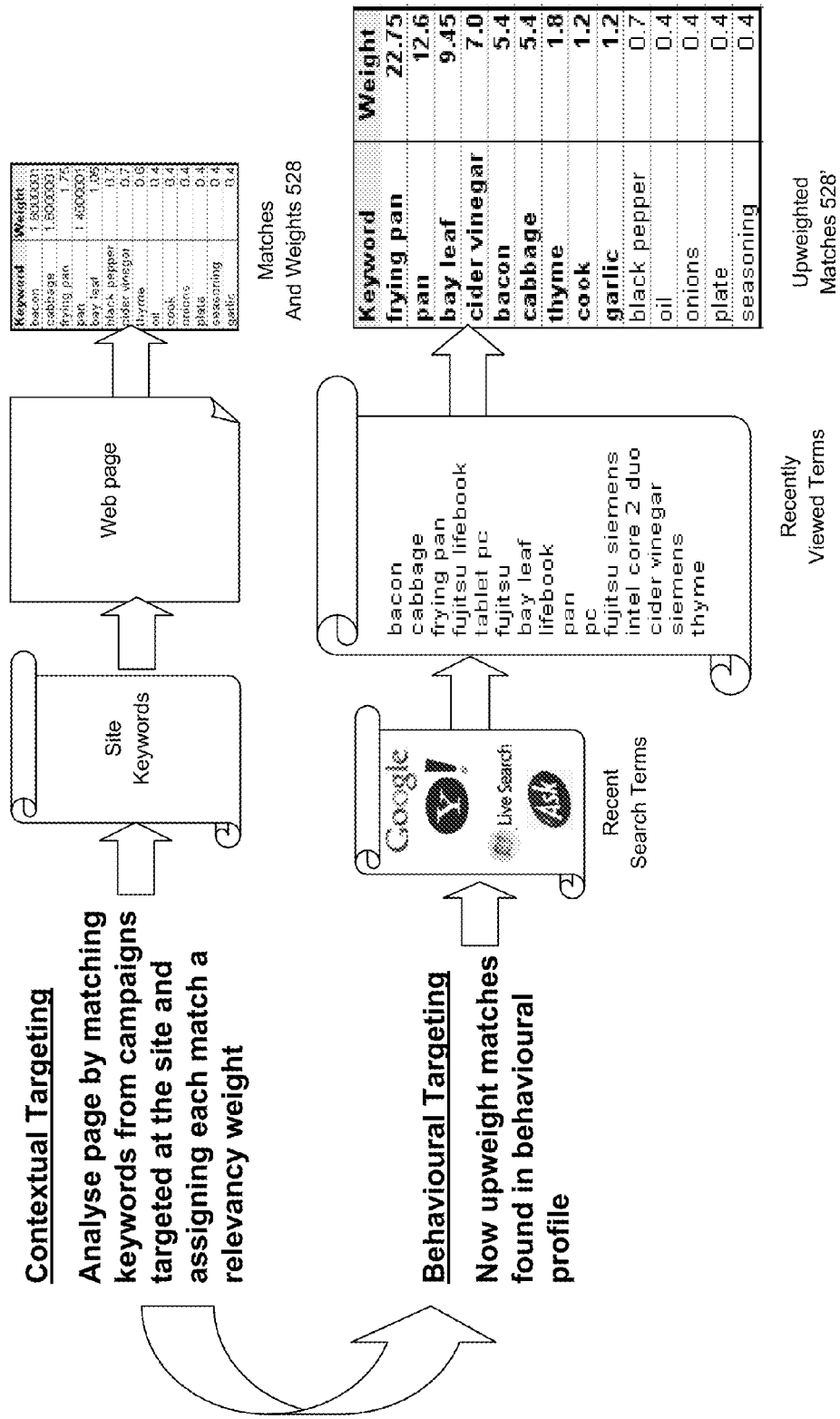
FIG. 5G is a diagram of another embodiment of contextual and behavioral targeting.
Figure 5H:
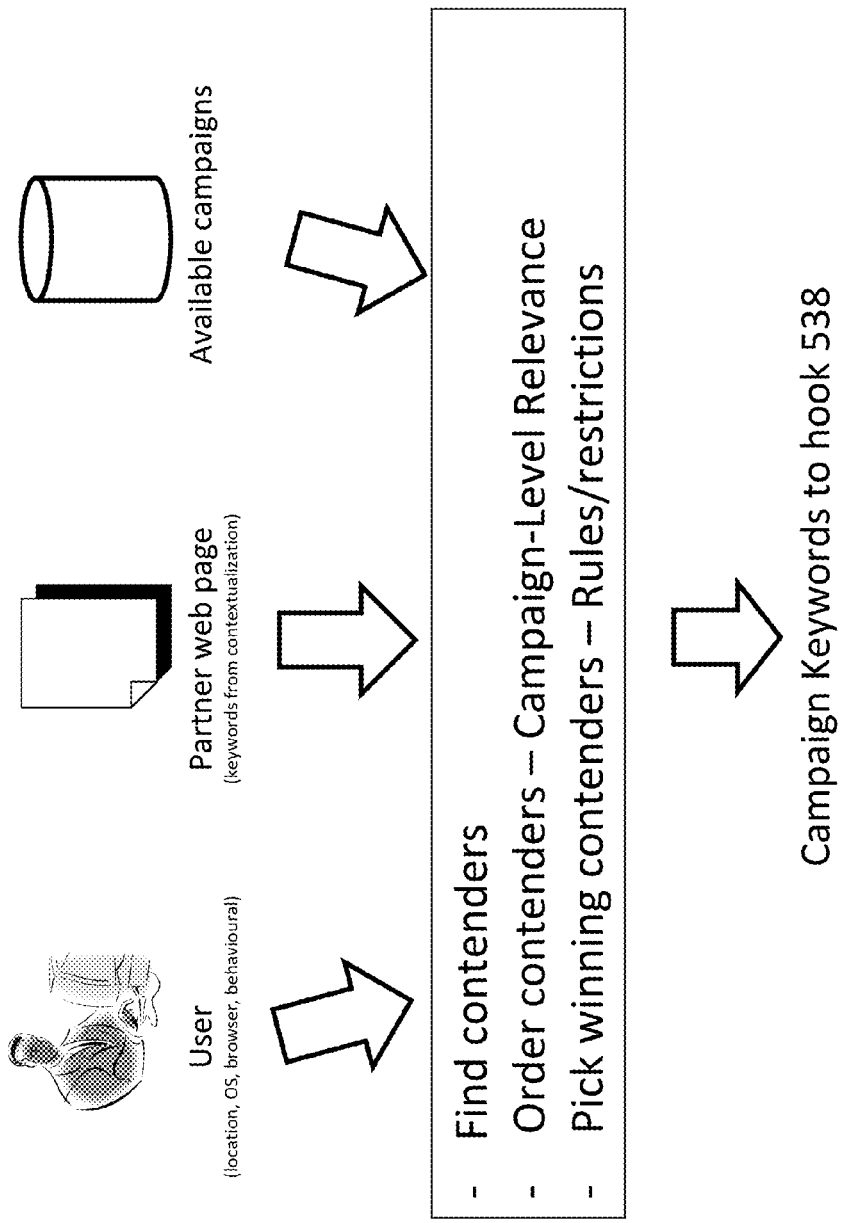
FIG. 5H is a diagram of an embodiment of a campaign selection engine.

Referring now to FIGS. 5B through 5H, diagrams of embodiments of the functionality and operations of the ad server platform are depicted. FIG. 5b depicts an embodiment of high level overview of the process from the client perspective. FIG. 5C depicts an embodiment of contextual targeting. FIG. 5D depicts an embodiment of keyword relevancy weighting. FIG. 5E depicts an embodiment of behavioral targeting. FIG. 5F depicts a further embodiment of behavioral targeting. FIG. 5G depicts an embodiment of further weighting based on behavioral targeting. FIG. 5H depicts and embodiment of campaign selection.

Referring to FIG. 5A, at step 502, a user on a client 120 requests a page from a publisher, such as a web page of a content provider 120. At step 504, the client receives the page and the browser loads the page. The user may start browsing the web page. At step 506, an agent on the page, such as a script starts an analysis in the background. The agent may be triggered upon loading of the web page or start the analysis upon receipt and/or loading of the web page. The agent may communicate with the ad server platform to perform any of the services of in-text advertising, related content or interest ads. For example, the agent may send content from the page for the ad server platform to analyze. In the background of the user viewing or browsing the web page, the ad server platform may analyze the page, find relevant campaigns filter campaigns and generate a response to the agent for hooking the keywords and identifying or delivering the augmented content. The ad server platform may not analyze pages based on filtering certain URLs. The ad server platform may analyze the content received from the agent, perform any of the services described herein and send the keywords to hook and the corresponding augmented content, such as advertisements from a campaign. At step 508, the analysis is completed and the user sees links to keywords, such as double underlined keywords. As described herein, the user may mouse over or click the hooked keyword and have the augmented content displayed.

Referring now to FIG. 5C, an embodiment of contextual targeting is depicted. This contextual targeted may be performed by the ad server platform and performed in the background while the page is being loaded and browsed/viewed by the user. The ad server platform receives page content from the client, such as via an agent. The ad server platform analyzes the page to match keywords to campaigns targeted to the web-site, page or URL. In some embodiments, the ad server platform finds all campaigns targeted to this site, finds all keywords in those campaigns and forms or generates a site keyword list for this site. The ad server platform may match the keywords from the site keyword list to keywords in the content from the page. The ad server platform may assign each matching keyword a relevancy weight.

Referring now to FIG. 5D, an embodiment of assigning a relevancy weight to each keyword to provide contextual targeting is depicted. The ad server platform may provide a relevancy weight to each keyword of the site keyword list matching content of the web page. The ad server platform may use any type and form of metrics or combinations of metrics to determine a relevancy weight. In some embodiments, the ad server platform uses a location, frequency and/or length metric to assign a relevancy weight to the matching keyword. The location relevancy weight may comprise an indicator or multiplier to those keywords that appear near the beginning or top of the web page relevant to those keywords that appear near the end of bottom of the web page. The frequency relevancy weight may comprise an indicator or multiplier to those keywords that appear more times on the same page or content than other keywords. The length relevancy weight may comprise an indicator or multiplier to those keywords that have more words in the keywords than single keyword or keywords with less words.

Each type of metric relevancy weight may be weighted the same or differently. Each metric relevancy weight may have it owns multiplier or factor that scales the weight for the keyword up or down according to the relevancy. The keyword may be up weighted and/or down weighted one or more times by each of the metric relevancy weights. A keyword relevancy weight may be up weighted by one metric relevancy weight while downloaded by another relevancy weight. For example, a keyword may be repeated several times and be upweighted or have a high multiplier based on the frequency relevancy weight while only found and repeated near the end of the page for a down weighting or low multiplier from the location relevancy weight. In some embodiments, a keyword may get a low relevancy weighting from each of the metric relevancy weightings. In some embodiments, a keyword may get a high relevancy weighting from each of the metric relevancy weightings. In some embodiments, a keyword may get a combination of low and high relevancy weightings from different relevancy weightings.

Referring now to FIG. 5E, an embodiment of applying behavioral targeting is depicted. The ad server platform may identify, track and store formation about a user's behavior in a behavioral profile. The behavioral profile may comprise a profile for one user or a plurality of users. Each of the user's profile data may be identified, tracked and managed via unique user identifiers. In some embodiments, the ad server platform may track a predetermined number of search terms, such as 5, that the user last searched. In some embodiments, the ad server platform may track a predetermined number of search terms for each search engine, such as the Google search engine, Microsoft Bing search engine, Yahoo search or Ask search engine. In some embodiments, the ad server platform may track a predetermined number of search terms for each search engine across a combination of search engines. In some embodiments, the ad server platform tracks and stores those search terms for which the user clicked a search result. In some embodiments, the ad server platform tracks and stores those search terms for which the user clicked a search result. In some embodiments, the ad server platform tracks and stores those search terms for which the user clicked a search result and landed on a web page of a predetermined content provider or publisher.

Referring to FIG. 5F, a further embodiment of behavioral targeting is depicted. The ad server platform may track and store in the behavioral profile of a user a history of terms the user has seen over a predetermined time period. In some embodiments, the ad server platform tracks terms has a user has viewed on a web page. In some embodiments, the ad server platform tracks terms the user has selected from a search or interacted with during the user's viewing history. In some embodiments, the ad server platform tracks terms of one or more search results from which the user has clicked through. In some embodiments, the ad server platform tracks viewed terms over a predetermined time period. In some embodiments, the ad server platform tracks viewed terms over a start of a behavioral profile of the user to current time.

The ad server platform may use any of the search terms and/or viewed terms from the behavioral profile to make a change to the relevancy weightings of the matching keywords. Those matching keywords that the use has searched or viewed previously will have their relevancy weightings increased or upweighted via a behavioral targeting multiplier. In some embodiments, the ad server platform may use a combination of recently searched and viewed terms to apply a multiplier to each matching keyword. The ad server platform may use any temporal threshold to determine which search terms and/or viewed terms to use for determining a multiplier to the relevancy weightings of the matching keywords. The ad platform may apply higher behavioral targeting multipliers to those keywords that were recently viewed and/or recently search within a predetermined time history. The ad platform may apply no or lower behavioral targeting multipliers to those keywords that were not recently viewed and/or not recently search within the predetermined time history.

As a result of using behavioral profile data and behavioral targeting multipliers, as depicted in FIG. 5G, the ad server platform modifies the relevancy of the matching keywords from the site keyword list. The matching keywords are assigned a first relevancy weighting from the contextual targeting and are modified or changed to a second relevancy weighting from the behavioral targeting. In some embodiments, the ad server platform maintains both the contextual targeting relevancy weightings and the behavioral targeting relevancy weighting for each matching keyword. In some embodiments, the ad server platform maintains a single relevancy weighting keyword comprising the behavioral targeting multipliers (up weighting or down weighting) to the relevancy weighting applied by the contextual targeting.

Referring to FIG. 5H, an embodiment of campaign selection is depicted. In some embodiments, the results of contextual and/or behavioral targeting are used as input to the campaign selection engine. The ad server platform may use the relevancy weightings of the matching keywords from the site keyword list to determine which campaigns may be applicable to these matching keywords. Those campaigns not having keywords corresponding to any of the matching keywords may be dropped from consideration. In some embodiments, those campaigns not having a number of keywords corresponding to the matching keywords within a predetermined threshold may be dropped from consideration. In some embodiments, those campaigns having one or more keywords corresponding to a predetermined number of the top relevancy weighted keywords may be identified for consideration.

The ad server platform may order the list of campaigns under consideration using any type and form of algorithm. For example, the ad server platform may rank the campaigns based on having matching keywords with the highest combined relevancy weightings. the ad server platform may rank the campaigns based on having the highest number of matching keywords. The ad server platform may rank the campaigns based on a combination of the highest combined relevancy weightings and the highest number of matching keywords. The ad server platform may also order campaigns based on any type of priorities assigned to the campaigns. Some campaigns may have a high order of priority to deliver or serve than other campaigns.

The ad server platform may selected the campaigns to deliver from the ordered or ranked list of campaigns. The ad server platform may further restrict the selection based on any rules or policies of the ad server platform, the publisher or the campaign. For example, the campaign or publisher may have rules restricting the serving of a campaign directed to certain users, times of days, locations, browsers, or content. Once the selection of the one or more campaigns is made, the ad server platform generates a list of campaign keywords to hook and transmits these keywords to the agent of the client. The ad server platform may provide to the agent information on the publisher, campaign, tooltip/user interface overlay and/or augmented content with or corresponding to the keyword.

Figure 5I:
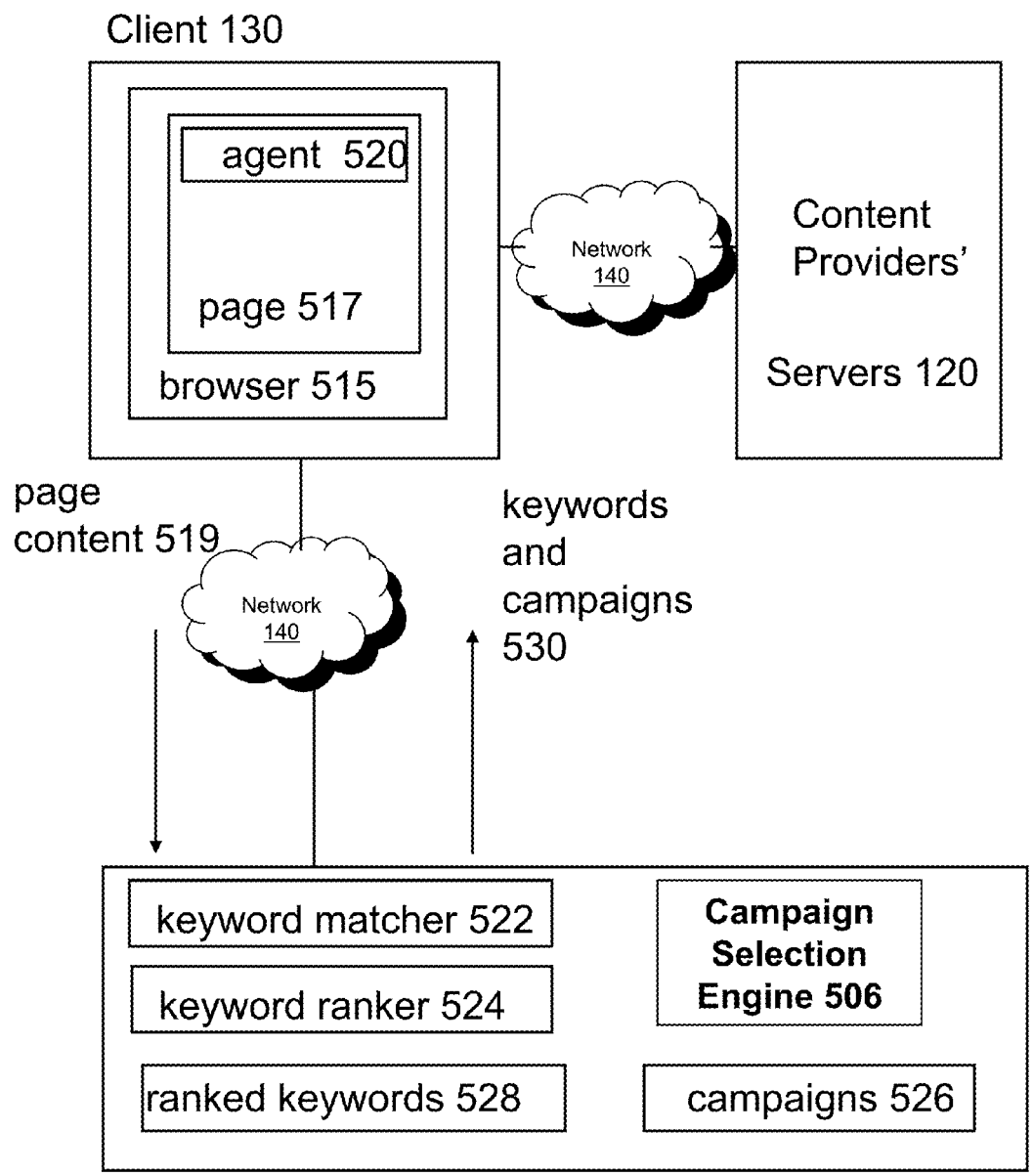
FIG. 5I is block diagram of an embodiment of a system to provide augmented content for a keyword on a web page.
Figure 5J:
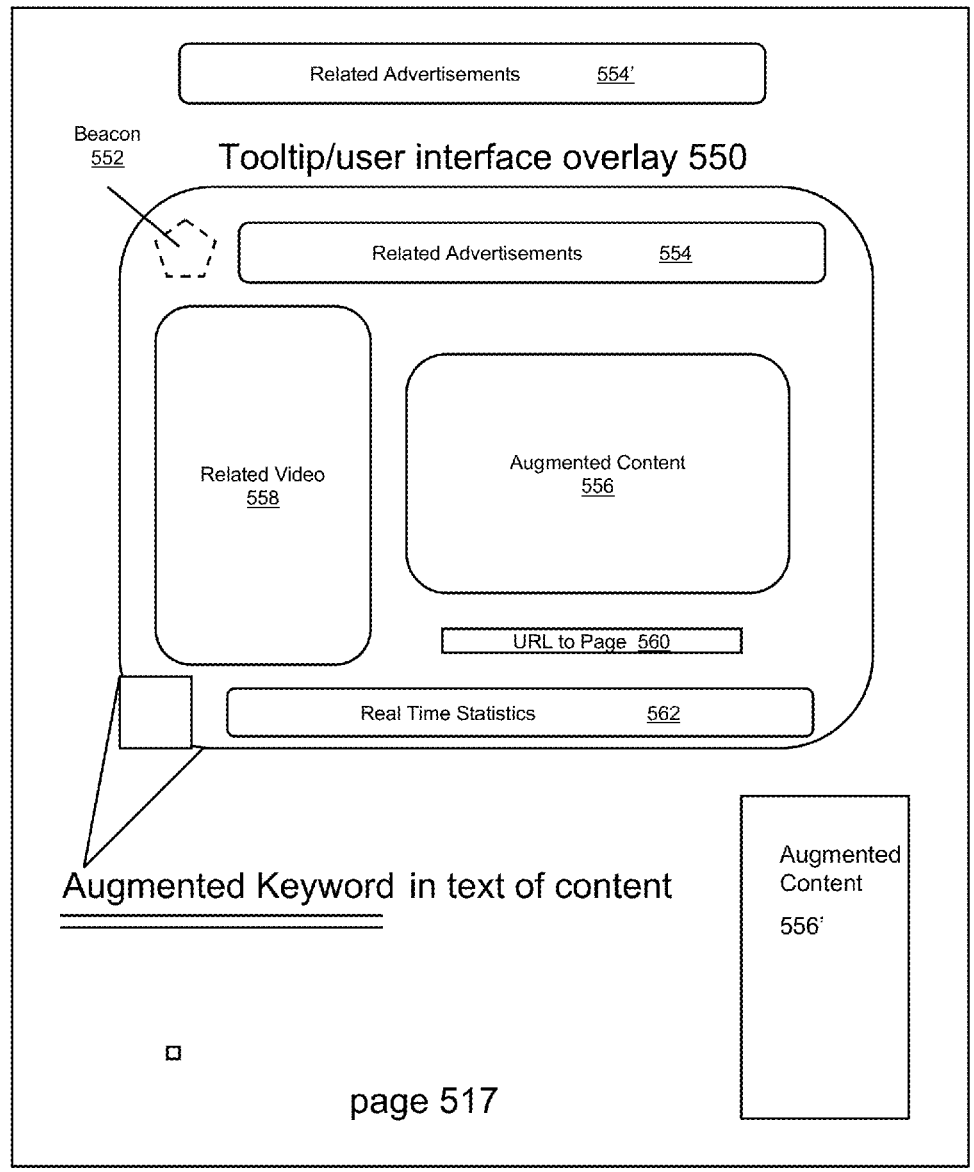
FIG. 5J is a diagrammatic view of an embodiment of augmented content.
Figure 5K:
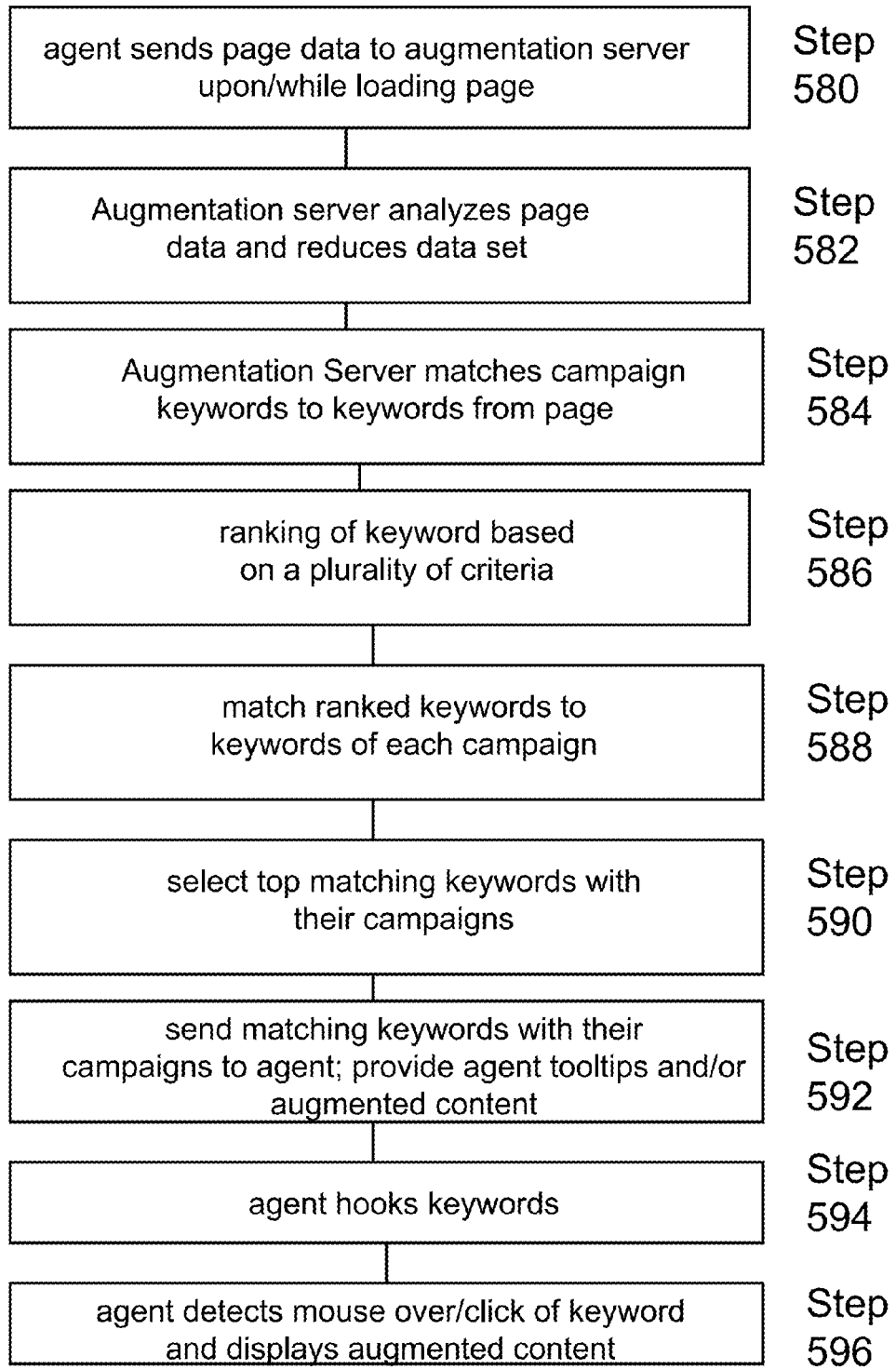
FIG. 5K is a flow diagram of an embodiment of a method for delivering augmented content for a keyword on a web page.

Referring now to FIGS. 5I, 5J and 5K, embodiments of systems and methods for delivering augmented content are depicted. FIG. 5I depicts an embodiment of a system for analyzing content of a page to determine keywords to augment for one or more campaigns. FIG. 5J depicts an embodiment of augmented content delivered to a web page of a client. FIG. 5k depicts embodiments of a method for analyzing and hooking keywords on a web page of a client.

In brief overview of FIG. 5I, an embodiment of a system for augmented keywords on a web page is depicted. A client 130 communicates with one or more content providers 120, such as publishers, via network(s) 140. The client 120 may include a browser that receives, loads and display content in the form of web page or pages 517 from the one or more contents providers. The client 130 also communicates with the augmentation server or ad server 110'. The page 517 being loaded or loaded by the browser comprises an agent 520. The agent 520 may communication page content 519 to the server 110, 110' for analysis and received from the server 110, 110' keywords, corresponding campaigns and/or augmented content. The keyword matcher 522 of server 110, 110' may perform keyword matching, such as using site keyword list, on the page content 519 received from the agent 520. The keyword ranker 524 ranks the keywords to provide ranked keywords 528. The campaign selection engine 506 selects campaigns 526 based on the ranked keywords 528.

In further detail, the browser 515 may comprise any type and form of executable instructions for accessing information resources via a network 140 such as the Internet. The browser may include any user agent or software for retrieving, presenting, accessing and/or traversing information resources or documents on the world wide web or a network 140. The browser may include any functionality for loading, running, processing and/or displaying on a computer screen information written in HTML, XML, javascript, java, flash or any other language or a script used for web pages. Browser may include any functionality for displaying any type and form of content or features presented by web page or transmitted content provider 120. Browser may include any functionality for enabling a user to interact or interface with a web page. Browser may provide functionality for displaying advertisement information within a web page presented or displayed on a computer screen of client computer 130. In some embodiments, a browser is any version of Internet Explorer web browser manufactured by Microsoft Corp. In other embodiments, the browser is any version of the Chrome web browser manufactured by Google Inc. In other embodiments, the browser is any version of Firefox web browser distributed by the Mozilla Foundation. In further embodiments, the browser is any version of the Opera browser by Opera Software ASA.

The page 517 may include any type and form of content processable by any embodiment of the browser 515. The page may be stored on any number of servers, such as content providers 120 and may be accessed and/or loaded by any web browser, such as browser 515. The page may be a web page. The page be a document, The page may be a file. The page may any resource accessible via a network or a world wide web by a networked device, such as a client computer 130. The page may be identified by a URL. The page may include content from a URL. The page may include any type and form of executable instructions, such as scripts, AJAX. The page may include any type and form of graphics and/or text. The page may include any type and form of media, such as video or audio media. The page may include content having text, words, keywords and links or hyperlinks to other web pages or web sites.

Page 517 may include any document which may be accessed, loaded, viewed and/or edited by a browser 620 and displayed on a computer screen. Page 517 may include any content which may be presented via hypertext markup language, extensible markup language, java, javascript or any other language or script for preparing web pages. Web page may include any type and form of components for adding animation or interactivity to a web page, such as Adobe Flash by Adobe Systems Inc. The page may include functionality for displaying advertisements, such as advertisements from enterprises, government, companies and firms. A web page may include any number of ad spaces providing space or arrangement within web page for displaying advertisement.

The client, browser or page may include an agent 520. The agent may include any type and form of executable instructions executable by the browser and/or client. In some embodiments, the agent comprises a script, such as JavaScript or JSON (JavaScript Notation). In some embodiments, the agent may comprise any type and form of plug-in, add-on or component to or of browser 515. In some embodiments, the agent may comprise any type or form of application, program, service, process or task executable by the client.

The agent 520 may be included in the page 517 when transmitted by the content provider. In some embodiments, the page includes the agent in script form as part of the content of the page. In some embodiments, the page includes a URL to the script, such as URL pointing to or identifying a resource or script of the servers 110, 110'. In some embodiments, the agent is loaded by the browser. In some embodiments, the agent is executed by the browser upon retrieval and/or loading of the page 517. In some embodiments, the page includes instructions to the browser or client to obtain and load or install the agent.

The agent 520 may include any logic, function or operations to interface to or communicate with any portion of the augmentation server 110 or ad server platform 110. The agent may include any logic, function or operations to provide any of the services or functionality of in-text 510, interest ads 512 and/or related content 514. The agent may include any logic, function or operations to identify, collect and transmit content from the page to the server 110/110'. The agent may identify, collect and transmit any and/or all text in content of the page. The agent may identify, collect and transmit any and/or all text from any pages or URLs referred to by the page. The agent may transmit any embodiments of this page content 519 to the server 110, 110'.

The agent may comprise any logic, function or operations to receive keywords, campaigns and/or augmented content from the server 110, 110'. The agent may comprise any logic, function or operations to hook keywords identified in the page content. The agent may "hook" keywords by modifying the keyword in the page content to have an indicator, such as double underlined or an icon. Hooking a keyword refers to making a keyword on the page have a predetermined visual appearance to indicate that interactivity would or may occur by the user interacting with the keyword and instrumenting the page or keyword to perform the interactivity responsive to the user interaction. The indicator may provide a visual indication that the keyword in the text is linked or hyperlinked. In some embodiment, the agent may link or hyperlink the keyword. The agent may hook the keyword to include a function, script or executable instruction to take an action responsive to a mouse over, mouse click or other user interaction. The agent may hook the keyword to display a user interface overlay or tooltip such as depicted in FIG. 5J. The agent may hook the keyword to display a related advertisement or augmented content on the page as also depicted in FIG. 5J.

The keyword matcher 522 of the server 110, 110' may comprise any type and form of executable instructions executable on a device. The keyword matcher may comprise any logic, function or operations to identify matches between one data set and another data set. In some embodiments, the keyword matcher may identify matches between keywords of campaigns with page content. In some embodiments, the keyword matcher may identify whole or complete matches. In some embodiments, the keyword matcher may identify partial or incomplete matches. In some embodiments, the keyword matcher may identify partial or incomplete matches within a predetermined threshold. In some embodiments, the keyword matcher may identify both complete and incomplete matches. The keyword matcher may perform any of the keyword operations described in connection with FIGS. 5A through 5F. The keyword matcher may be included as part of the context engine, interest engine or campaign selection engine of the ad server platform.

The keyword ranker 522 of the server 110, 110' may comprise any type and form of executable instructions executable on a device. The keyword ranker may comprise any logic, function or operations to rank a set of data responsive to one or more criteria. The keyword ranker may comprise any logic, function or operations to rank keywords matched to page content. The keyword ranker may comprise any logic, function or operations to provide a weighting to a keyword based on any metrics of the keyword, such as location, frequency, and length. The keyword ranker may comprise any logic, function or operations to provide a weighting to a keyword based on relevancy to the site. The keyword ranker may comprise any logic, function or operations to provide a weighting to a keyword based on relevancy to a publisher or content provider. The keyword ranker may comprise any logic, function or operations to provide a weighting to a keyword based on relevancy to a campaign. The keyword ranker may comprise any logic, function or operations to provide a weighting to a keyword based on relevancy to a user or behavioral profile. The keyword ranker may be included as part of the context engine, interest engine or campaign selection engine of the ad server platform.

The keyword ranker may perform any of the keyword ranking and/or weighting operations described in connection with FIGS. 5A through 5F. An output or result of the keyword ranker may be ranked keywords 528. The ranked keywords may include any type of object, data structure or data stored in memory or to storage. The ranked keywords may include contextually targeted ranked keywords as described in connection with FIGS. 5A through 5F. The ranked keywords may include behavioral targeting ranked keywords as described in connection with FIGS. 5A through 5F. The ranked keywords may include any combination of contextually targeted ranked keywords and behavioral targeting ranked keywords. The ranked keywords may be site specific. The ranked keywords may be campaign specific. The ranked keywords may be publisher specific. The ranked keywords may be based on any combination of site, campaign and/or publisher.

The campaign selection engine 506 may interface or communicate with any of the keyword matcher, the keyword ranker and/or ranked keywords. The campaign selection engine 506 may access, read or process campaigns 526. The campaigns 526 may be stored in any type and form of database or file system. The campaigns 526 may include information identifying keywords for the campaigns and augmented content to deliver for those keywords. The campaigns 526 may include any type and form of content, URLS, scripts, video, audio, advertisements, media, text, graphics, data, information etc. to provide as augmented content with the keywords. The campaigns 526 may include any type and form of URLs, advertisements, media, text, graphics, etc. to provide as augmented content with the keywords. The campaigns may identify or provide any desired user interface overlay/tooltip or content therein. The campaigns may be organized by publisher. Each publisher may have a plurality of campaigns.

The campaign selection engine selects the campaign to deliver with the page based on analysis of the page content from the keyword matcher, keyword ranker and ranked keywords. The campaign selection engine may comprise any type and form of logic, functions or operations to identify and select one or more campaigns from a list of contender or candidate campaigns based on any criteria or algorithm. The campaign selection engine may select those campaigns that best match or correspond to the top ranked keywords. The campaign selection engine may select those campaigns that match or correspond to a predetermined number of ranked keywords. The campaign selection engine may select those campaigns that match or correspond to a predetermined set of ranked keywords. The campaign selection engine may select those campaigns that match or correspond to the ranked keywords in accordance with a priority assigned to the campaigns or publisher. The campaign selection engine may exclude or include campaigns based on the logic or criteria of any rules or filters.

Responsive to the campaign selection engine, the server 110, 110' may transmit to the agent identification of one or more keywords to augment on the page and corresponding campaigns for those keywords (see 530). The server may transmit to the agent any script, data or information to provide or facilitate hooking of the keywords on the page and displaying the campaign responsive to user interaction with the keyword. The server may transmit to the agent the indicator, or identification of the indicator) to use for a hooked keyword. The server may transmit to the agent the type and form of user interface overlay to display when a user mouse over or mouse click occurs for the keyword. The server may transmit to the agent a reference to or identification of any of augmented content to display when a mouse over or mouse click occurs for the keyword. The server may transmit to the agent the augmented content, such as the advertisement, to display when a mouse over or mouse click occurs for the keyword.

The agent may receive the information 530 from the server and modify the page or content of the agent to perform the hooking of the keywords, to instrument the hooked keywords, and/or deliver the campaign responsive to the keyword. The agent may perform any of the agent's logic, functions or operations while the web page is being loaded. The agent may perform any of the agent's logic, functions or operations while the user views or browsers the web page. The agent may perform any of the agent's logic, functions or operations in the background to the user viewing or browsing the page.

Referring now to FIG. 5J, embodiments of augmented content delivered with a corresponding keyword is depicted. In brief overview, the page 517 may include an augmented keyword in the text of the content (e.g., see double underlined "Augmented Keyword" next to "in text of content"). When a user interacts with the augmented keywords, a user interface overlay 550, also referred to as tooltip, may be displayed. This user interface overlay may deliver or provide the campaign corresponding to the keyword. Responsive to user interaction with the keyword, the agent may display related advertisements 554', such as via a banner ad, or augmented content 556'. The related advertisements 554' and/or augmented content 556' may be displayed in connection with the tooltip, without the tooltip or instead of the toolip.

Any of the content on page 517 may include any embodiments of the advertisements and/or augmented contented provided and discussed above in connections with FIGS. 1 through 4E. The tooltip may be part of a multi-layered augmentation content or advertisement unit. The tooltip may provide any one or more URLs to access related websites.

The user interface overlay 550 referred to as a tooltip may include any type and form of web beacon 545. In some embodiments, the tooltip 550 may include a plurality of web beacons. The beacon may be used for tracking a user's usage and/or interactions with the tooltip. The beacon may identify or track a length of time of any user interaction with the tooltip and/or augments keyword or inline text. The beacon may identify a URL or tracking system to register or send communications regarding the user interaction. In some embodiments, a web beacon may be designed and constructed for a predetermined tracking system.

A web beacon may be an object that is embedded in the tooltip that is not visible to the user. Sometimes beacons are referred to as web beacons, web bugs, tracking bugs, pixel tags or clear gifs. Web beacons may be used to understand the behavior of users who frequent designated web pages. A web beacon permits a third party to track and/or collect various types of information. For instance, a web beacon may be used to determine who is reading a webpage, when the webpage is read, how long the page was viewed, the type of browser used to view the webpage, information from previously set cookies, and from what computer the webpage is accessed.

The tooltip may be incorporated, integrated or presented with any one or more of related advertisements 554, related video 558 and/or real time statistics 562. The tooltip 550 may include an URL 560 to any web page or resource, such as additional content, search results, or media. Although the tooltip 550 is illustrated each with a related advertisement, related video and related statistics, the tooltip 550 may be presented with one of these related content or a plurality of these related contents. Although this related content is illustrated in a location, size and position in relation to the tooltip, the related advertisements, related video, and/or real time statistics may be arranged, organized or presented in any manner.

The tooltip may also include one or URLs 560, such as a hypertexted URL or link to any other page or content. In some embodiments, the hypertexted link 560 comprises a URL of a landing page of a web site. In some embodiments, the hypertexted link 560 comprises a URL of a web page providing search results directly from the search engine. In another embodiment, the hypertexted link 560 provides a link to a recommend or most relevant search result. In other embodiments, the hypertexted link 560 provides a link to run the search query on a second search engine. The hypertexted link 560 may bring the user to a landing page of the search results of the second search engine.

The related advertisements 554 may include any type and form of advertisement related to the augmented content or inline text or otherwise related to the keyword. In some embodiments, the related advertisements are advertisements provided as described in connection with any of the embodiments of the FIGS. 1A-4E. In some embodiments, the related advertisements are advertisements provided by a search engine, such as in relation to and based on the search query. In other embodiments, the related advertisements are provided by any type and form of ad network via the server 110, 110' and/or search engine.

The related video 558 may include any type and form of video media related to the augmented content or inline text or otherwise related to the keyword. In some embodiments, the related videos are advertisements provided as augmented content as described in connection with any of the embodiments of the FIGS. 1A-4E. In some embodiments, the related videos are videos provided by a search engine, such as in relation to and based on a search query. In other embodiments, the related videos are provided by any type and form of video service, such as YouTube.com or iTunes.com. In another embodiment, the related videos are videos available to the user via a user accessible storage or video management system.

The real time statistics 562 may include any type and form of statistics related to the augmented content or inline text or otherwise related to the keyword. In some embodiments, the real time statistics 562 may be any statistics related to the person or entity of the search. For example, if the augmented keyword is a sports team, the real time statistics may include current or recent game scores and/or standings of the team. In another example, if the augmented keyword is related to the weather, the real time statistics may include a current weather forecast. In one example, if the augmented keyword is related to a musician, the real time statistics may include statistics on music downloads, album sales and top music chart location.

Referring now to FIG. 5K, embodiments of a method for augmented content of a keyword of a web page being loaded into a browser is depicted. In brief overview, at step 580, an agent of the browser sends page data to server 110, 110' upon or while loading a web page. At step 582, the server analyzes the page data and reduced the page data set. At step 584, the server performs content filtering on page and keywords to match to corresponding campaigns. At step 586, the server performs ranking of keywords. At step 588, the server matches the ranked keywords to keywords of each campaign. At step 590, the server selects top matching keywords and their campaigns. At step 592, the server sends to the agent the selected keywords and their campaigns and may provide the agent tooltips and/or augmented content. At step 594, the agent hooks the keywords identified by the server. At step 596, the agent detects user interaction such as mouse over or clock of keywords and displays augmented content, such as a tooltip.

In further details, at step 580, the agent may be executed by the browser upon or while loading the web page. The browser may retrieve the agent via a URL identified by the page. In some embodiments, the page transmitted by the server includes the agent. The agent may comprise script places or arranged at or near the top page to be executed by the browser. In some embodiments, the agent may be triggered by any load events or APIs of the browser. The agent may be executed prior to content of the web page being loaded or displayed. The agent may be executed prior to the retrieval of any URLS of the page. The agent may be executed prior to completion of loading of the web page by the browser.

The agent may identify, gather and aggregate data from the page. The agent many identify all text portions of the web page. The agent many identify those elements of the page that contain text. The agent may identify text from a predetermined set of elements of the page. The agent may identify text from HTML, XML or other page languages. The agent may identify text from the body of an HTTP portion of the page.

The agent may perform text recognition on any portion of the page or any element of the page. The agent may identify text from any URLS or other content referred to or loaded by the page. The agent may identify any other date of the page, including headers. For example, the agent may identify the browser type, the user, location, IP addresses from the content of the page or from any of the network packets used for communicating the page. In some embodiments, the agents performs analysis and identified metrics for the page date, such as text location, frequency, length and repeatability.

The agent may gather the identified page data, text or otherwise, and/or any page metrics and transmits the page data and/or page metrics to the server 110, 110'. In some embodiments, the agent transmits the page data together in one transaction with the server. In some embodiments, the agent transmits portions of page data in a series of transactions with the server. In some embodiments, the agent transmits the page data using any type and form of protocol. In some embodiments, the agent transmits the page data as a background process to the browser loading the page or the user browsing the page. In some embodiments, the agent transmits the page data while the browser is loading the page.

At step 582, the server analyzes the page data and reduces the page data to a working set of page data to continue analysis. The server may remove a predetermined set of commons words, such as a, and, the, from the page data. In some embodiments, the server may filer a predetermined set of words, phrases, terms or characters according to any filters, rules or policies. In some embodiments, the server may identify and correct any typos or other inadvertences with the page data. In some embodiments, the server may perform any type and form of metrics on the page data. In some embodiments, the server may identify location, frequency, repeatability of text on the page. In some embodiments, the server may identify location, frequency, repeatability of text on the page data relative to other text on the page.

At step 584, the server analyzes the text from the working set of page data to determine if there is any type and form of matching to any campaigns. In some embodiments, the server performs any type and form of semantic matching to match keywords on the page semantically to concepts, meanings, categories, subject matter and/or keywords of campaigns. In some embodiments, the server performs a phonetic match between keywords on the page to keywords of campaigns. In some embodiments, the server performs a spelling match between keywords on the page to keywords of campaigns. In some embodiments, the server performs content filtering on text, words, and portions of content around the keywords on the page to determine a context for the keywords and match that context to campaigns. In some embodiments, the server performs content filtering on the page data to determine a category, a sub-category, a topic, subject matter or other information indicator and matches the same to any one or more campaigns.

In some embodiments, the server may generate a set of keyword from campaigns targeted towards the site of the page or publisher of the page. The server may generate a site keyword list. The keyword matcher of the server may match keywords from a keyword list, such as the site keyword list, against text of the page data to identify keywords in the page data. In some embodiments, the keyword matcher identifies multiple word phrase matches. In some embodiments, the keyword matcher identifies partial word phrases. In some embodiments, the keyword matcher identifies a number of times or the frequency for which a keyword is found in the page data. In some embodiments, the keyword matcher identifies the location of the keyword in the page data, and in further embodiments, relative to other keywords or boundaries of the page, such as top or bottom.

At step 586, the server performs any type and form ranking of keywords of the page data identified by the keyword matcher. The keyword ranker may rank all of the matching keywords. The keyword rank may rank a predetermined number of keywords. The keyword ranker may rank the keywords according to any one or more metrics. The keyword ranker may rank the keywords according to any one or more criteria. The keyword ranker may rank each keywords by applying a weight to a value assigned to the keyword. The keyword ranker may provide any multipliers to a valued or weighted value of the keyword to increase or decrease the ranking of the keyword. The keyword ranker may rank the keywords on any type and form of scale, which may be absolute or relative.

At step 588, the server matches the ranked keywords to keywords of one or more campaigns. The keyword matcher, ranker or campaign selection engine may compare the list of ranked keywords, or any portions thereof, to a list of keywords of one or more campaigns. In some embodiments, the server identifies those campaigns that are contenders to be a selected for the campaign for this page. In some embodiments, the server identifies those campaigns associated with or assigned to be a campaign targeted to site or publisher of the page. The server may match the ranked keywords against the identified campaigns. In some embodiments, the server may match the ranked keywords against all campaigns. In some embodiments, the server may change the ranking of the keywords based on results of matching the keywords from the campaigns.

At step 590, the campaign selection engine selects a predetermined number of matching keywords and their campaigns. In some embodiments, the campaign selection engine selects a predetermined number of top matching keywords and their campaigns. In some embodiments, the campaign selection engine selects a number of top matching keywords and their campaigns corresponding to a number of matching keywords on the page. For example, if there are five unique keywords on the page and each identified by a campaign, the server may select five campaigns. In some embodiments, the campaign selection engine may select one campaign for a plurality of corresponding matching keywords on the page.

In some embodiments, the campaign selection engine may filter out campaigns based on any type and form of filter rules. The campaign selection engine may rank campaigns according to any type and form of ranking For example, the campaign selection engine may prioritize campaigns according to clients, volume, importance, spend, budget, historical campaign performance or any other desired criteria. The campaign selection engine may compare the ranked keywords to the ranked campaigns. The campaign selection engine may select any of the higher or highest ranked campaigns matching any of the higher or highest ranked keywords.

At step 592, the server sends to the agent the selected keywords and their campaigns. Responsive to the campaign selection engine, the server may send to the agent the list of keywords to augment or hook and their corresponding campaigns. In some embodiments, the server sends a predetermined number of additional keywords to augment or hook in case the agent cannot hook or augment any one or more keywords in the list of keywords. In some embodiments, the server sends an ordered list of keywords. The ordered list of keywords may identify a priority of augmentation or hooking to the agent.

The server may send any type and form of information to the agent on how to augment or hook a keyword, what type of augmentation to use and identifying the form and content of the augmentation. In some embodiments, the server sends to the agent publisher and campaign identifiers for the agent to obtain or identify the appropriate campaign for a keyword. In some embodiments, the server sends the agent an indication of the visual indicator to use for the hooked keyword (e.g., double underlined). In some embodiments, the server sends the agent the executable instructions by which the keyword is hooked or for replacing the text of the keyword with a hooked keyword.

In some embodiments, the server sends instructions for content, construction and/or display of the tooltip. In some embodiments, the server sends a set of executable instructions providing the tooltip and/or any portion thereof. In some embodiments, the server sends a set of executable instructions providing the augmented content and/or any portion thereof. In some embodiments, the server sends a set of executable instructions providing any embodiments of the augmented content, advertisements and/or tooltip of FIG. 5I. In some embodiments, the server sends content for the tooltip to provide the campaign assigned to the keyword. In some embodiments, the server sends one or more URLs referencing a campaign to be delivered via a web-site. For example, in some embodiments, the server sends one or more URLS to advertisements to be delivered for the campaign. In some embodiments, the server sends one or more scripts to agent to provide any of the above embodiments.

At step 594, the agent hooks the identified keywords on the page The agent may replace each keyword in the identified list of keywords from the server with instructions or code to hook the keyword. The agent may have hyperlink or link the keyword to a set of code or executable instructions to display the tooltip, augmented content or any embodiments of FIG. 5J. The agent may use modify the keyword to provide any type and form of visual indicator (e.g., double underlined or icon) to indicate the keyword is user interactive, hyperlinked or linked or otherwise hooked. The agent may modify the page to change the text to a liked or hooked text and to link or associated any forms of augmented content of FIG. 5J to be displayed or provided via user interaction with the hooked text. The agent may modify the page or instrument the keyword to detect when a user interacts with the keyword in a certain way. The agent may include one or more event based functions that are trigged responsive to predetermined user interactions. For example, the agent may modify the page or instrument the keyword to detect when a user mouses over the keyword, clicks on the keyword, right clicks on the keyword or left clicks on the keyword or otherwise selects any predetermined set of keystrokes or sequence of keystrokes.

At step 596, the agent detects user interaction such as mouse over or click of a keyword on the page and displays augmented content, such as a tooltip. The agent may detect when a mouse is over the keyword at any time. The agent may detect when a user has the cursor over the keyword. The agent may detect when a user has put focus on the keyword. The agent may detect when a mouse is over the keyword for a predetermined period of time. The agent may detect when a user highlights or selects a keyword. The agent may detect when the user left or right clicks on the keyword. The agent may detect when a user double clicks the keyword. The agent may detect when a user has put focus on the keyword and hit entered. The agent may detect any set of keystrokes with respect to the keyword.

Responsive to the detection, the agent may display augmented content, for example, any of the forms depicted in FIG. 5I. In some embodiments, responsive to detecting a mouse over of the keyword, the agent displays a tooltip delivering a campaign assigned to the keyword. In some embodiments, responsive to detecting a click on the keyword, the agent displays a tooltip delivering a campaign assigned to the keyword. Responsive to detection of the predetermined user interaction, the agent may display augmented content of any form, such as related videos, in predetermined areas or space on the page. Responsive to detection of the predetermined user interaction, the agent may display advertisements of any form, in predetermined areas or space on the page.

In some embodiments, the tooltip may remain displayed until the mouse is moved off of the keyword. In some embodiments, the tooltip may remain displayed until the mouse is moved off of the keyword for a predetermined time. In some embodiments, the tooltip may remain displayed until the mouse is moved off of the keyword until the user closes or exists the tooltip. In some embodiments, if the user clicks on the keyword after the mouse over, the tooltip remains displayed until the user closers or exits the tooltip. In some embodiments, any augmented content may change as the user moves the focus or mouse over to another keyword. For example, moving the mouse to a second keyword may cause a different advertisement to appear in a banner ad or may cause a new tooltip to be displayed or content of the current displayed tooltip to change.

The agent and may perform all or any of the steps of the method of FIG. 5K in real-time upon receipt and/or loading of the page. For example, the agent and the server may be designed and constructed to perform embodiments of steps 580 through 594 within a predetermined time while the page is being loaded by the browser. In some embodiments, the agent and the server may perform embodiments of steps 580 through 594 in milliseconds, for example within in 100, 200, 300, 400, 500, 600, 700, 800 or 900 milliseconds or within 10, 20, 30, 40, 50, 60, 70, 80 or 90 milliseconds, or within 1, 2, 3, 4, 5, 6, 7, 8 or 9 milliseconds or 0.1, 0.2, 0.3, 0.4, 0.5, 0.6, 0.7, 0.8 or 0.9 milliseconds. The agent and the server may be designed and constructed to perform embodiments of steps 580 through 594 while the page is loading and before the page is completely loaded. The agent and the server may be designed and constructed to perform embodiments of steps 580 through 594 in the background while the pages is being loaded and/or the user is browsing the loaded page.

D. Systems and Methods for Delivered Related Video Content for Augmented Keywords Embodiments of the systems and methods described herein provide a solution for delivering ranked related media content for the platform's related content services 514. The related content service may generate new page views or windows, such as user interface overlay windows to the users. The related content service may provide the users with navigational links and re-circulate users through a website, network or portal. The related content service may conveniently deliver relevant previews, such as clips of videos, articles and information related to one or more hyperlinked keywords on a web page. The related content service may automatically maintain or mirror the hyperlink style of a publisher's editorial links but also add an icon or indicator to indicate that related content has been returned. In some embodiments, the icon or the indicator indicates that the related content is available for selection by the user. Embodiments of the related content service or the platform services may rank, order and select a number of searched media to provide the more relevant video content of a web-site, portal or network to the user in relation to the hyperlinked keyword. In this manner, the related content service is re-circulating or providing previews of the higher ranked videos, articles and information.

Figure 6A:
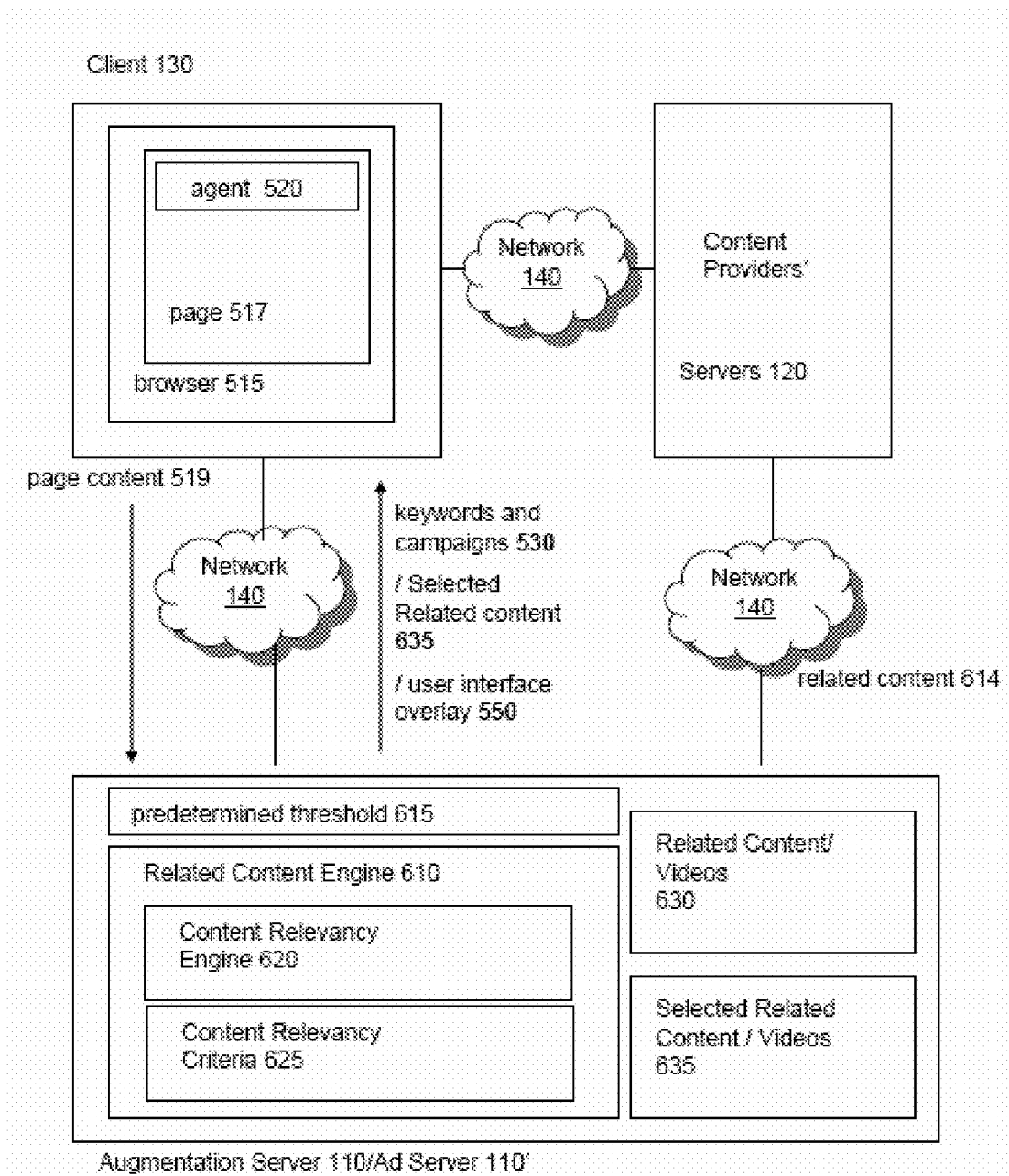
FIG. 6A is a block diagram of an embodiment of a system for providing related content.

Referring to FIG. 6A, an embodiment of a system of providing related content to a keyword from a selected set of ranked content is depicted. In brief overview, a browser 515 received a web page 517 from a content provider 120. Upon loading of the page by the browser, an agent 520 sends page data 519 to the augmentation server 110, 110' for analysis. A related content engine 610 analyzes the page data within a predetermined time threshold 615 to dynamically provide, in real-time or near real-time, selected ranked content 635 to the agent for display in space on the page 517 for or in conjunction with one or more augmented or hooked keywords on the page. The selected ranked related content 635 may also be delivered with any keywords and corresponding campaigns 530 described elsewhere herein. The selected ranked related content 635 may also be delivered in the form of a user interface overlay window 550 to be displayed over the web page 517 upon an action or a selection by the user. The related content engine 610 may include a content relevancy engine 625 for ranking and ordering related content according to any one or more content relevancy criteria, policies or rules 625. The related content engine 610 may obtain related content 630 from the content provider 120 or from any other content source accessible via network 140, such as via a search engine.

The related content engine 610 may comprise hardware or software executable on hardware. The related content engine may comprise an application, a program, a library, a script, a service, process, task, thread or any type and form of executable instructions. The related content engine may include logic, operations or functions to obtain content 630 related to one or keywords, page content 519, the publisher or publisher's web-site. The related content engine may perform a search via one or more search engines to identify and/or obtain content related to one or keywords, page content 519, the publisher or publisher's web-site. The related content engine may perform a search on or makes requests of or traverse a predetermined set of content providers to identify and/or obtain content related to one or keywords, page content 519, the publisher or publisher's web-site.

The related content engine 610 may identify the types and forms of related content 630. The related content engine 610 may determine which related content is video. The related content engine 610 may determine which related content is audio. The related content engine 610 may determine which related content is an advertisement. The related content engine 610 may determine which related content are further web pages or page data. Related content engine 610 may include any functionality to determine which related content 630 includes text, content, words or scripts from a related web page. The related web page may include a web page 517 from the same or a similar publisher, from the same or a similar advertiser, or relating a same or a similar company or a product. The related web page may also be any web page that includes the same, similar or related content to the content of the web page 517 over which the user interface overlay window 550 is to be displayed.

The related content engine 610 may index the related content 630. The related content engine may enumerate the related content 630. The related content engine may store or cache any related content. The related content engine 610 may perform any type and form of metrics on the related content 630. The related content engine 610 may determine a size, source or type of the related content 630. The related content engine 610 may track and store usage data on any of the related content 630. The related content engine 610 may track and store user behavior data on any of the related content 630.

The related content engine 610 may include a content relevancy engine 620, which may comprise hardware or software executable on hardware. Content relevancy engine 620 may comprise an application, a program, a library, a script, a service, process, task, thread or any type and form of executable instructions. Content relevancy engine 620 may include logic, operations or functions to identify, determine and rank the relevancy, semantically or otherwise of the related content 630. Content relevancy engine 620 may include any functionality for ranking and/or sorting any related content 630 based on relevance to the keyword, the user or any other information or context of a web page Predetermined threshold 615 may include any type and form of value or threshold identifying a duration of time, such as a duration of time within which selected related content 635 is delivered or returned to the client 130. Predetermined threshold 615 may include an identification of a duration of time within which ranking, ordering and selection of the related content 630 into selected related content 635 is completed. Predetermined threshold 615 may identify any duration of time upon loading a page or while the page is being loaded by the browser. Predetermined threshold 615 may identify any duration of time between 1 and 1000 milliseconds. In some embodiments, predetermined threshold 615 identifies a duration of time such as 1, 2, 5, 10, 15, 20, 25, 30, 35, 40, 50, 60, 70, 80, 90 or 100 milliseconds. In further embodiments, predetermined threshold 615 identifies 100, 200, 300, 400, 500, 600, 700, 800 or 900 milliseconds. In further embodiments, predetermined threshold 615 identifies a duration of time of less than a millisecond, such as 0.1, 0.2, 0.3, 0.4, 0.5, 0.6, 0.7, 0.8 or 0.9 milliseconds. Predetermined threshold 615 may vary from web page to web page or may be a standard value for all web pages. In some embodiments, predetermined threshold 615 is determined for each web page 517 individually. In other embodiments, predetermined threshold 617 is set for all web pages 517. Predetermined threshold 615 may be used by the related content engine 610 to perform the entire process of selecting the related content 635 and delivering back to the client 130.

Content relevancy engine 620 may rank and sort related content 630. In some embodiments, content relevancy engine 620 ranks related content 630 based on the relevance to the keyword or the user. Content relevance engine 620 may determine the relevance to the keyword or the user based on the text, context or meaning of the phrase, link or portion of content of web page 517 the user has selected or clicked on. Content relevancy engine 620 may include the functionality for determining recency of the content, such as the time when the content was created and the time when it was updated. Content relevance engine 620 may determine the most relevant group of related content 630 using portions of web page 517, such as words, keywords, tags, scripts and text. Content relevancy engine 620 may sort the relevant content 630 into groups based on related content 630 type. Content relevancy engine 620 sorts relevant content 630 based on type of content, such as audio, video, text, web page, pictures, advertisements, web page scripts and more. In some embodiments, content relevancy engine 620 determines one or more most relevant videos out of relevant content 630 out of the relevant content videos.

In other embodiments, content relevancy engine 620 determines one or more most relevant web page 517 out of the relevant content web pages. In further embodiments, content relevancy engine 620 determines one or more most relevant advertisements out of the relevant content advertisements. In still further embodiments, content relevancy engine 620 determines one or more most relevant pictures, photos or graphical displays out of the relevant content pictures, photos and graphics. Content relevancy engine 620 may sort and/or rank related content 630 based on content relevancy criteria 625. Content relevancy engine 620 may sort and/or rank information for a specified period of time and return the results back to the client 130 within the period of time identified by the predetermined threshold 615.

Content relevancy engine 620 may select the sorted and/or ranked related content 630 into the selected related content 635. Content relevancy engine 620 may include any functionality for selecting one or more most relevant related contents 635 into a group of selected related contents 635. Content relevancy engine 620 may select videos from the related content 630 into selected videos of the selected related content 635. Content relevancy engine 620 may select web pages or links of web pages from the related content 630 into selected web pages or selected links of web pages of the selected related content 635. Content relevancy engine 620 may select pictures or photos from the related content 630 into selected pictures or photos of the selected related content 635. Content relevancy engine 620 may select audio from the related content 630 into selected audio of the selected related content 635. Content relevancy engine 620 may select advertisements or publisher content from the related content 630 into selected advertisements or selected publisher content of the selected related content 635.

Content relevancy criteria 625 may include any type and form of criteria, rules or guidelines for sorting and/or ranking related content 630. Content relevancy criteria 625 may include instructions, policies and rules for sorting and/or ranking information, such as related content 630. Content relevancy criteria 625 may include information used by content relevancy engine 620 to sort and rank related content 630. In some embodiments, content relevancy criteria 625 includes instructions to search for information, such as words or keywords selected by the user via search engines. Content relevancy criteria 625 may include information about when a content was created and/or when the content was last updated. Content relevancy criteria 625 may include information such as time stamps to determine recency of any of the contents. Content relevancy criteria 625 may include instructions for searching a specific type of related content 630 within a data base, or a storage of server 110 or server 120. Content relevancy criteria 625 may include rules for sorting related content 630 into groups based on type, such as video, audio, advertisement, web page, text, pictures or graphical, products and services. Content relevancy criteria 625 may include rules or policies for ranking relevant content 630 in the order from least relevant to most relevant. Content relevancy criteria 625 may include user's preferences, user's history, user behavior or list of links, hyperlinks or references the user has selected in the past. Content relevancy engine 620 may use the content relevancy criteria 625 of any kind to rank and/or sort related content 630.

Related content 630 may include any type and form of content or data that can be transmitted and/or displayed via a web page 517. Related content 630 may include any content that may be included in a user interface overlay 550. Related content 630 may be a video file, an audio file, a web page 517 and/or web page content 519. Related content 630 may include related advertisements 554. Related content 630 may include augmented content 556. Related content 630 may include related video 558. In some embodiments, related content 630 may include URL to page 560. In some embodiments, related content 630 includes real time statistics 562. Related content 630 may include any content from a third party publisher or a third party ad exchange, such as content comprising or delivered via XML or API. Related content 630 may include any content from a third party publisher or a third party ad exchange. Such third party content may include any audio, video, advertisement, web page, news feed, information feed, or any other web page content.

Selected related content 635 may include any related content 630 selected to be sent to client 130. Selected related content 635 may include any portion of related content 630 that was sorted and/or ranked by the related content engine 610. Selected content 635 may be selected to be delivered to client 130 via a tooltip or user interface overlay 550 window. Selected related content 635 may be an audio file, a video file, a link or a hyperlink to a web page, a web page, a picture or a photo, an advertisement or any other type and form of related content 635. Selected related content 635 may include any number of related contents 630 that are ranked highest in relevance to the user. For example, selected related content 635 may include 1, 2, 3, 4 or 5 videos that are most highly ranked videos in terms of relevance to the user. In other examples, selected related content 635 includes 1, 2, 3, 4 or 5 most highly ranked web pages or links to web pages in terms of relevance to the user. In further embodiments, selected related content 635 includes 1, 2, 3, 4 or 5 most highly ranked advertisements or photos. In some embodiments, selected related content 635 includes anywhere between 6 and 30 most highly ranked videos, audio files, web pages 517, links to web pages, advertisements or any other related content 630.

Figure 6B:
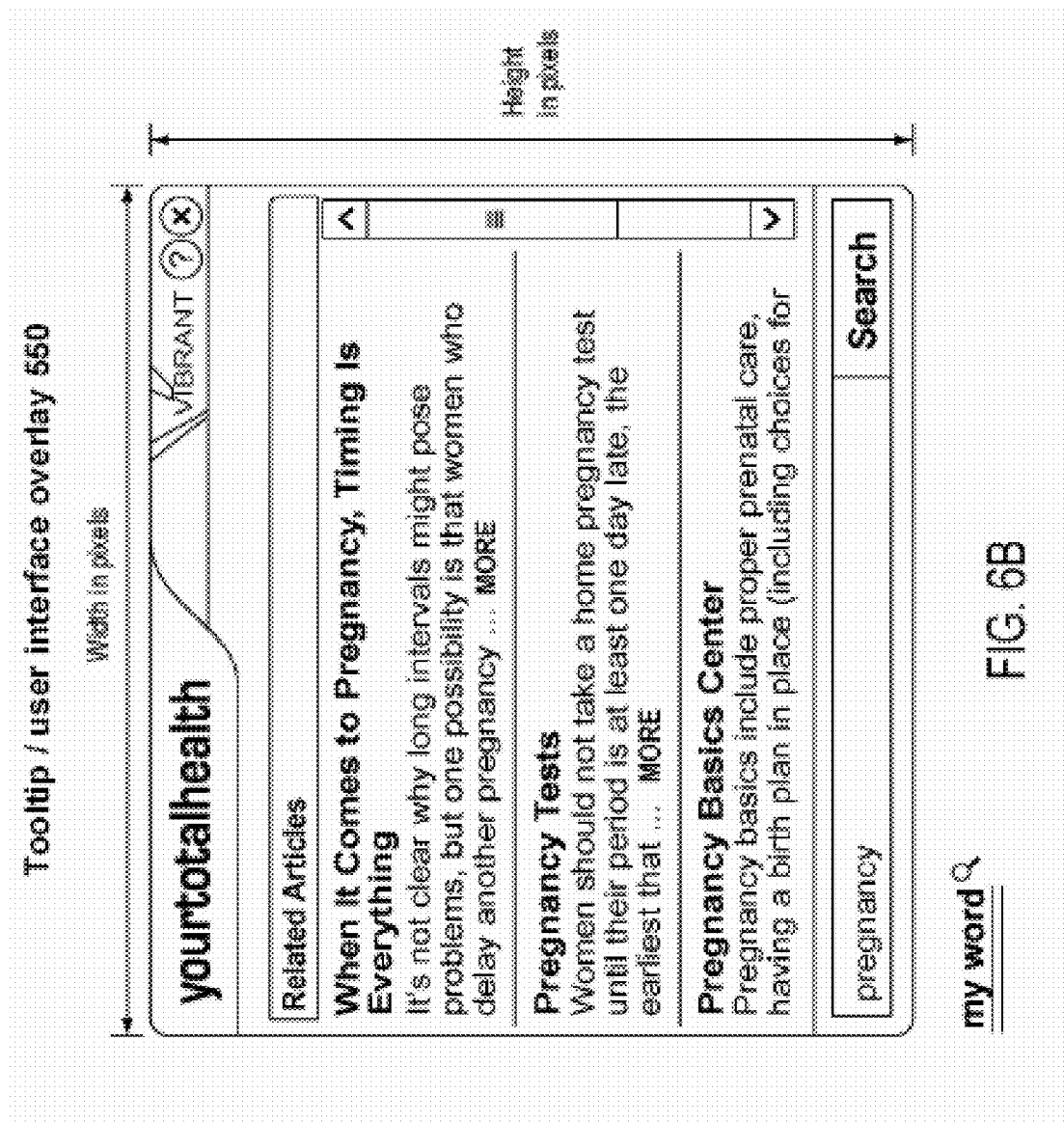
FIG. 6B is a diagram of an embodiment of a user interface for delivering related content.

Referring now to FIG. 6B, an embodiment of a user interface overlay 550 having a main module that includes selected related content 635 is illustrated. User interface overlay 550 may comprise width and height which may be defined in pixels. The main module or the main portion of the user interface overlay 550 may be positioned in the center of the user interface overlay 550, at the top or bottom section or within any portion of the tooltip. The heading of the user interface overlay window 550 or the main module may include buttons for closing the window and/or help or questions. The heading may also include an entity name or logo and/or a title referencing the selected related content 635 enclosed. User interface overlay window 550 illustrated in FIG. 6B further comprises related articles referencing web pages 517 of the related content 630. The web pages may be selected related content 635 which may include web pages 517 that are most relevant to the keyword or portion of content the user has selected in the original web page 517 loaded by the user.

The main module of the user interface overlay 550 may include or operate using a vibrant only algorithm. The vibrant only algorithm may include functionality that returns and displays to the user a module having a pre-populated selected related content 635 responsive to a mouse-over action or a selection by a user of a hyperlinked keyword within web page 517. Vibrant only algorithm may include selected related content 635 that may be selected and presented using Vibrant algorithm article contextualization. Vibrant only algorithm article contextualization may provide to the user with the related content 630 stored on the host publisher's servers 110 or 120 or the servers 110 of the host advertising network. In some embodiments, vibrant only algorithm provides to the user the selected related content 635 that is picked out from the related content 630 selected, provided, serviced or approved by the publisher host publisher, host server or host advertising network. Vibrant only algorithm article contextualization may use any information stored on a server 110 or server 120 as related content 630 from which the selected related content 635 is acquired, filtered, sorted and/or ranked to be selected and presented to the user.

The main module of the user interface overlay 550 may include any third party material or content providing functions, such as for example a third party XML/API only algorithm. The third party XML/API only algorithm may include any logic, programs and/or functionality that present to a user a module of a user interface overlay 550 window pre-populated with XML feeds and/or APIs from a third party publisher, a third party host, a third party advertiser or a third party ad exchange network. The third party XML feeds and/or APIs may include selected related content 635 ranked and selected from the related content 630 stored on the servers 110 or servers 120 of the third party publisher, advertiser, host or ad exchange company. The third party XML and/or API algorithm may present content that includes any selected related content 635 pertaining to a third party. The third party XML/API algorithm may present content that includes results from third party search engines, such as Google.com search engine, Yahoo.com search engine and/or data bases from any sources of information such as databases, websites and/or web pages from anywhere on the world wide web or from any private network. In some embodiments, a combined vibrant only algorithm and third party XML/API algorithm is used to present selected related content 635 within a main module. In such embodiments, upon a mouse-over or a selection of a link by a user, the user receives a user interface overlay 550 window comprising selected related content 635 selected from a pool of related content 630 from both the host publisher and/or advertiser network servers as well as from the related content 630 of the third party publishers and/or third party advertiser networks.

The main module of the user interface overlay 550 may include functions, states or controls, such as an On/Off state or button. The On/Off state may be determined by Partner Management System settings. The Partner Management System settings include any system or function for using feedback or end-user behavior, interests, web pages selected or information about the behavior of the user to generate, predict or estimate preferences of the user. In some embodiments, user interface overlay 550 includes a window, such as a web page window, which may expand vertically to the maximum pixel dimensions as specified in a specification. In some embodiments, the horizontal dimensions of the unit remain static, while the vertical dimensions extend or change. In other embodiments, vertical dimensions of the user interface overlay 550, while the horizontal dimensions are static. In further embodiments, both the horizontal and vertical dimensions change, expand or contract. The information returned within the user interface module 550 may conform to the specified Title, Body Copy, Call To Action (CTA) for the user, settings and/or thumbnail values.

The main module of the user interface overlay 550 window may conform to any s-settings or specifications. In some embodiments, the main module conforms to color specifications. The color specifications may include the color of the title text, user interface overlay 550 background, text, search button, search bar, calls to action (CTAs), links, hyperlinks or any other portion of the user interface overlay 550. In some embodiments, user interface overlay 550 is expandable to a defined maximum set in terms of length units, such as inches or centimeters or in pixels. User interface module 550 may include the links of the host publisher or the host advertisement exchange, such as for example links of host publisher or host advertiser's content, such as for example Vibrant Media contents. The links may be pre-populated on the servers, and displayed immediately when the unit is displayed. In some embodiments, upon expansion of the user interface overlay 550 by a specified number of pixels, one or more third party links can be displayed.

The third party links or hyperlinks displayed within the main module of the user interface overlay 550 may be pre-populated from the servers 110, and displayed immediately when the unit user interface overlay 550 is displayed to the user. In some embodiments, a search bar is attached to the bottom of the main module. In further embodiments, a logo is shown at the top left hand corner of the page. If articles have already been visited by the user previously, an indication may be provided to indicate to the user that the user has already visited such selected related content 635. Such indication may be implemented by showing a graphic to the right hand side of the article results of the selected related content 635 displayed.

Figure 6C:
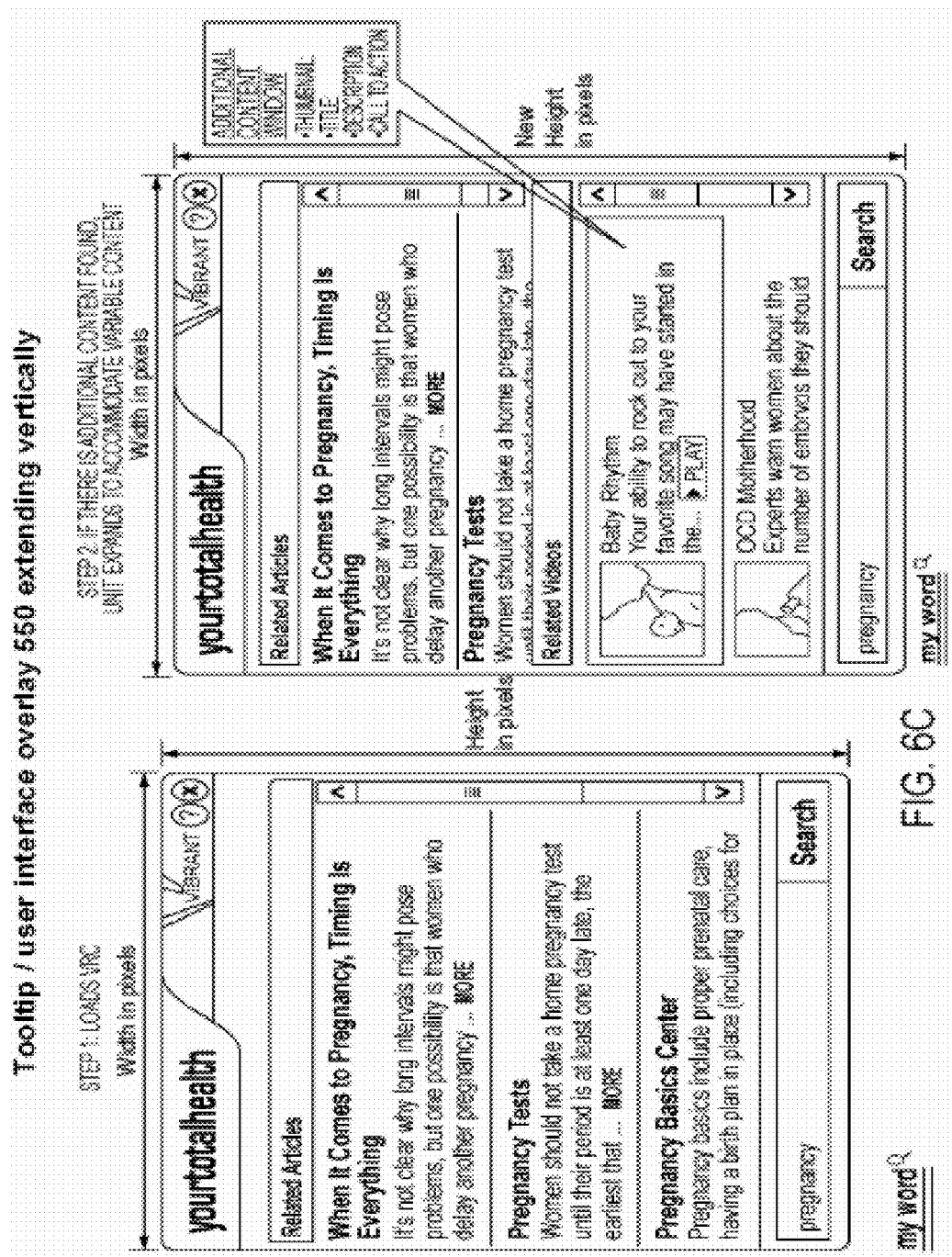
FIG. 6C is a diagram of another embodiment of a user interface for delivering related content.

Referring now to FIG. 6C, an embodiment of a user interface overlay 550 window having a bottom module comprising selected related content 635 is illustrated. In some embodiments, FIG. 6C illustrates an emergence or display of the bottom portion or bottom module of the user interface overlay 550. The bottom module of the user interface overlay 550 may include any functionality or embodiments as the main module of the user interface overlay 550 and vice versa. The bottom module may be located in the bottom portion of the user interface overlay 550 and may be pre-loaded initially when the user interface overlay 550 is first loaded or it may be loaded later upon a mouse-over or a click by a user. FIG. 6C further illustrates an embodiment in which the user interface overlay window 550 expands vertically to include a new bottom module emerging from the bottom of the user interface overlay 550 window. The user interface overlay 550 window of FIG. 6C may extend vertically from an initial height in pixels to a new and larger height in pixels.

In some embodiments, when a user selects a keyword on web page 517, a user interface overlay 550 may appear displaying only the main module. As the user interface overlay 550 extends, a new module, such as the bottom module, may appear comprising additional content, such as videos, audio files, web pages, advertisements and links of the selected related content 635. In other embodiments, the bottom module and the main module appear immediately and together when the user selects the keyword. The user interface overlay 550 may expand automatically or in response to an action of a user, such as a mouse-over or a click. The contraction or expansion of the user interface overlay 550 may extend or expand by a predetermined size in the number of pixels. In some embodiments, the size of the increase or expansion of the user interface overlay 550 may be determined for each user interface overlay 550 window individually. In such embodiments, the user interface overlay 550 window may extend by only a minimum number of pixels necessary to include the additional content to be displayed within the extended portion of the user interface overlay 550. In some embodiments, third party XML/API feed may be used to present thumbnails, title, description and call to action for third party content. The third party data may be displayed in the bottom portion of the user interface overlay 550 or the sliding or expanding portion. In some embodiments, until all of third party data or content is loaded, there may be no indication that the bottom portion of the user interface overlay 550 is present, as sometimes no third party data may be available.

The sliding or expanding of the user interface overlay 550 and emergence of the bottom module may occur when the third party XML/API data or selected related content 635 is loaded. In such embodiments, the original host publisher articles section in the main module or portion of the user interface overlay 550 may be compressed or expanded. The user interface overlay 550 may expand to the maximum pixel dimension size as defined in the specifications. The content returned within the expanded module may conform to the title, body copy, call to action and thumbnail values. In some embodiments, an option is available to embed video from the third party XML/API feeds into the user interface overlay 550.

Figure 6D:
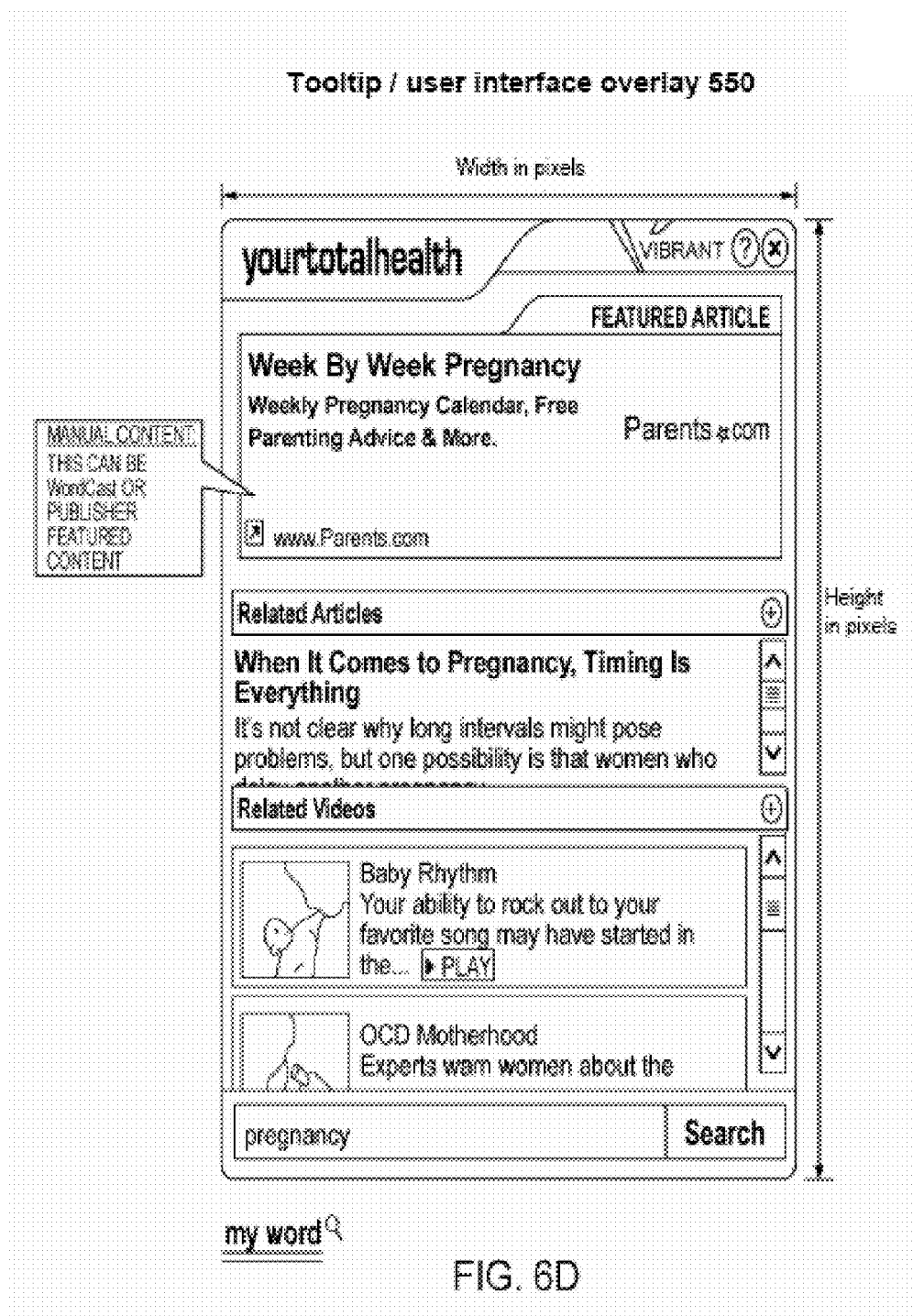
FIG. 6D is a diagram of another embodiment of a user interface for delivering related content.

Referring now to FIG. 6D, an embodiment of a user interface overlay 550 window having a top module comprising selected related content 635 is illustrated. The top module may include any functionality of a main module or the bottom module and vice versa. In some embodiments, FIG. 6C illustrates an emergence or display of a top portion or top module of the user interface overlay 550. User interface overlay 550 window may expand or extend vertically to expose a new module at the top of the user interface overlay window 550. In some embodiments, upon user mouse over on a hyperlinked keyword of web page 517 a pre-populated main module is illustrated. Additionally, when results are returned from the XML/API feed then XML/API results may slide from the bottom of the main module, and form part of the main module. In some embodiments, the top module reveals itself sliding out from the main module upon a mouse-over or a click by a user. The top module may include additional content or information, such as for example Wordcast advertising. In some embodiments, after a mouse-over or a click a live lookup or a cached data may be displayed, such as third party, XML/API data, Wordcast advertising or VIA advertising. Such advertisements may be limited within a space of a module, such as a top module and within a predetermined area defined by a specific number of pixels. In some embodiments, if a module, such as the top module is displayed before other modules, content, such as selected related content 635 may be populated into this module before populating other modules. In some embodiments, horizontal dimensions of the top module remain static while the vertical dimensions expand and contract. In other embodiments, vertical dimensions are static and horizontal dimension expand and contract. In further embodiments, if the main module is not present, the top module acts as an independent module and includes the logo on the top left corner of the module.

Figure 6E:
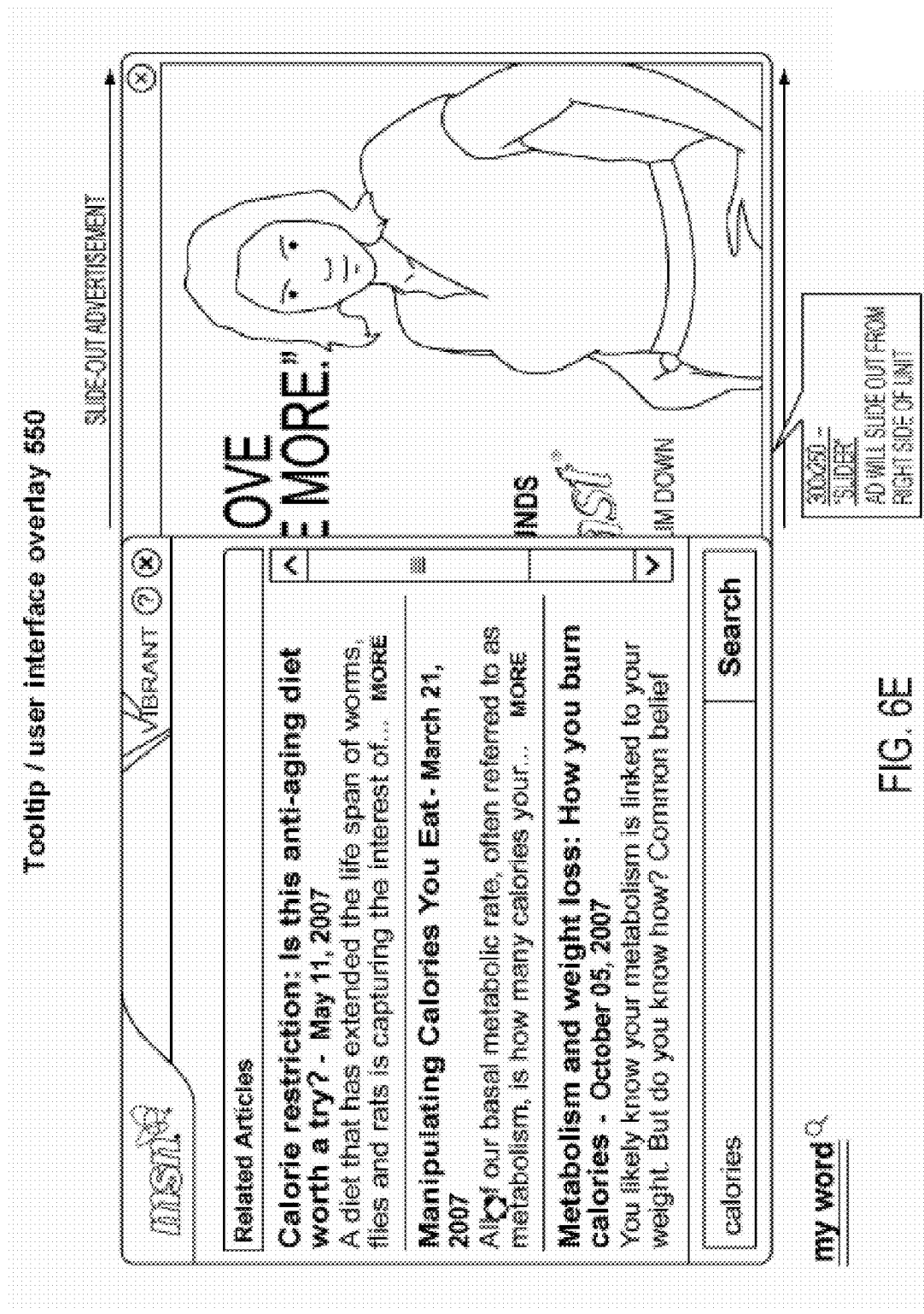
FIG. 6E is a diagram of another embodiment of a user interface for delivering related content.
Figure 6F:
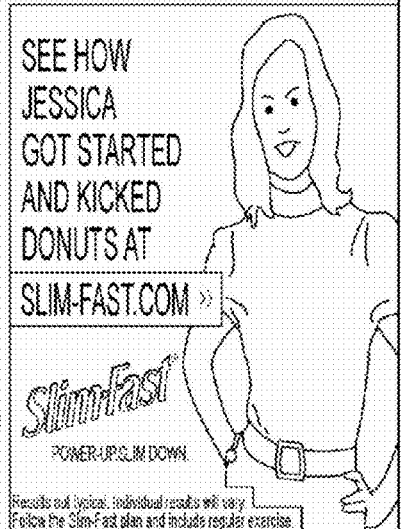
FIG. 6F is a diagram of another embodiment of a user interface for delivering related content.
Figure 6G:
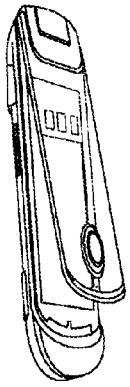
FIG. 6G is a diagram of another embodiment of a user interface for delivering related content.

Referring now to FIG. 6E, an embodiment of a user interface overlay 550 window having a sliding window on the side of the user interface overlay 550 comprising selected related content 635 is illustrated. The sliding window may have a size in pixels, such as for example 300 by 250 pixels and may include pictures, photos, links, videos, search tabs, advertisements or any other content. The sliding window may include In-Text services 510, such as Vibrant In-Text services that may include Vibrant In-text Ads (VIA). The sliding window may sometimes also be referred to as Vibrant In-Text Advertisement (VIA) unit or VIA module. Once content that is comprised within the sliding VIA module is loaded, VIA module may slide to present new content to the user. The sliding window or the VIA module may include any functionality of the main module, top and bottom modules and vice versa. The sliding window may include On/Off states and functions. The sliding function may be controlled by the publisher host servers 110 or 120 or the third party publisher's servers 110 or 120.

In some embodiments, if the user interface overlay 550 is less than 250 pixels high and/or if there is a Vibrant In-Text Advertisement (VIA) module to be displayed, then the main module or main module plus top module combined should automatically expand to 250 pixels. The VIA module may slide out for a predefined period set by server 110 or by a user. In order to accommodate the slide out function, some white space may be present within VIA module. The unit must be able to expand vertically to the maximum pixel dimensions as specified. The horizontal dimensions of the VIA module and/or of the user interface overlay 550 may remain static. In some embodiments, the horizontal dimensions change. In some embodiments, VIA module is displayed only if there is enough content to populate 300×250 pixel sized VIA module and if there is a contextual or behavioral match found in order to identify and return selected related content 635.

User interface overlay 550 modules may be ordered so that the most relevant articles, links, photos, videos or any other selected related content 635 appear at the top of any lists displayed. Rankings may be calculated based on recency and/or on relevance. In some embodiments, related content 630 is ranked based on how recent related content 630 is and/or how relevant the content is. Content may be ordered and/or ranked based on relevance and/or recency for host publisher and host advertisement content as well as the third party publisher and advertisement content. User interface overlay 550 may include In-Text advertisement content as well as the related content 630. Keywords the user selected may be added to a keyword database. The keyword database may include operations that can run a report and/or analyze and acquire any new keywords that may come up as the result of the search. Contextualization from embedded user interface overlays 550 may take into consideration multiple keywords on the page, and then rank in order of relevance.

Referring now to FIG. 6E, an embodiment of a user interface overlay 550 is illustrated. User interface overlay 550 may comprise any number of modules, such as the main module, top module, bottom module and VIA module. Parameters of the user interface overlay 550 may be set for each individual user interface overlay 550 on a per channel basis. Ability to adjust the minimum and maximum amount of pixels for the user interface overlay 550 window and/or any module may be included. In some embodiments, default dimensions of a top module and main module are 322×272 pixels. In further embodiments, default dimensions of the main module and the bottom module are 322×325 pixels. In further embodiments, default dimensions of any or all of the modules are 322×372. In still further embodiments, any of the modules may include a length of anywhere between 1 and 2000 pixels, such as 10, 20, 50, 100, 150, 200, 250, 300, 350, 400, 450, 500, 550, 600, 650, 700, 800, 900, 1000, 1200, 1400, 1500, 1600, 1800 and 2000 pixels. In yet further embodiments, any of the modules may include a width of anywhere between 1 and 2000 pixels, such as 10, 20, 50, 100, 150, 200, 250, 300, 350, 400, 450, 500, 550, 600, 650, 700, 800, 900, 1000, 1200, 1400, 1500, 1600, 1800 and 2000 pixels. The size of the modules and/or interface overlay 550 may be adjusted based on the size and/or shape of the selected related content 635 displayed within the modules.

In some embodiments, a minimum amount of articles and/or related content 630 or selected related content 635 that are included in the user interface overlay 550 may be set before the user interface overlay 550 is displayed. In some embodiments, a maximum amount of articles and/or selected related content 635 to be displayed within user interface unit 635 may be set. These settings may be changed on a server side 110 by any publisher or advertiser, or on a client side by the user. Settings for allowing or enabling and/or disallowing or disabling types of modules on a particular web page may be included. These settings may also be controlled via the server side 110 by any publisher or advertiser or by the user. Each web page 517 may have a customizable color hex color code. This option may allow the publishers and/or advertisers to define the sites color choices.

In some embodiments, the logo may be displayed on the top left corner of the main module. If the main module is not available, the logo may be displayed on the top module. In some embodiments, when a web page or a web site is signed up with the host publisher at server 110, a logo may be included with the server 110. The location of the logo image may be saved so that it can be included into the user interface overlay 550. The user may define for how long the ad, or a module of user interface overlay 550 window is slid out. In some embodiments, the default for a duration of slid out module is 30 seconds. In other embodiments, this time duration is amended at user level or at the server level.

An RC unit tag may be used or called on a predefined placement. This tag may be compatible with $3^{rd}$ party advertising servers and may be hard coded. Slide animations may be removed for some page embedded content. Some modules may be positioned in different portions of the user interface overlay 550 to match the page of the publisher, the third party publisher as well as the host publisher. In some embodiments, the VIA unit or module resides at the top of the user interface overlay 550, or on the left side or on the bottom, instead of at the right hand side.

Referring now to FIG, another embodiment of a user interface overlay 550 is illustrated. Upon user mouse over on a hyperlinked keyword of web page 517, a user interface overlay 550 may be displayed showing the top module residing on top of the main module. The top module may include embodiments of WordCast advertising. In such embodiments, the user may see advertisements from a larger selection of sites or a larger selection of publishers and/or advertisers. When a user visits a page, user interface overlay 550 may he provide the user with additional enhancements such as a preview screenshot of the link destination. The preview screenshot of the link destination may be a miniature version of the web page 517 and/or video or file at the destination link. The screenshot of the destination link page may be of any size, such as for example of any size of a module or a user interface overlay 550. Similarly, upon user mouse over on a Vibrant article or $3^{rd}$ party XML/API, the user may be presented with a screenshot of what the landing page will look like.

Figure 7:
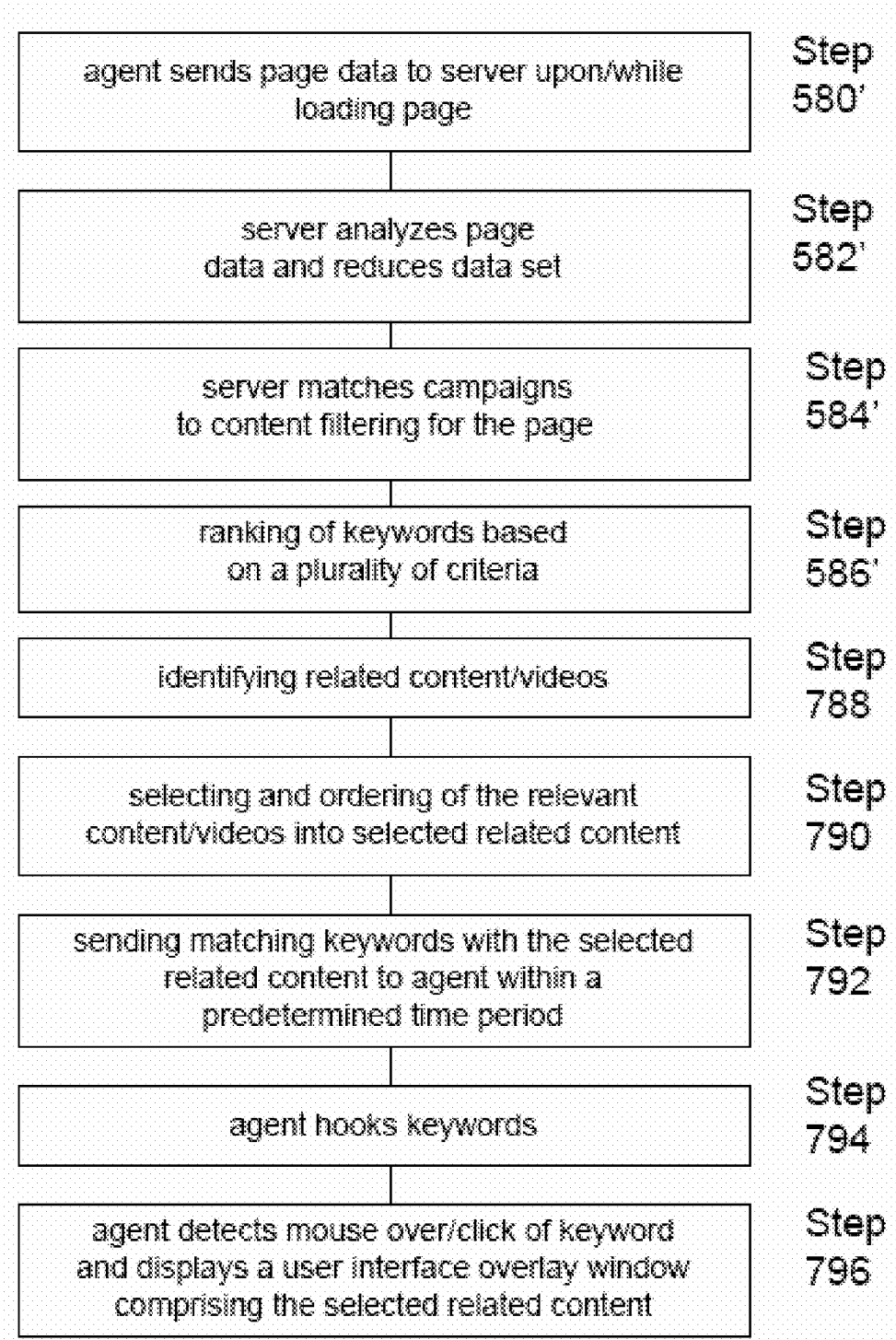
FIG. 7 is a flow diagram of an embodiment of a method for delivering related content.

Referring now to FIG. 7, an embodiment of steps of a method for delivering to a user related content based on an augmented keyword of a web page 517 is illustrated. FIG. 7 may also relate a method for delivering related video content for augmented keywords on the web page 517. At step 580', an agent 520 sends page data or content 519 to server 110 while a web page 517 is being loaded by browser 515 or upon the page is loaded by the browser. At step 582', server 110 analyzes page data or page content 519 and reduces the data set. At step 584', server 110 matches campaigns to content filtering for the web page 517. At step 586', server 110 ranks the keywords of web page 517 based on plurality of criteria. At step 788, server 110 identifies related content/videos 630. At step 790, server 110 selects and orders the relevant related content into selected related content 635. At step 792, server 110 sends the matching keywords along with the relevant selected related content 635 to the agent 520 on the client 130 within a predetermined time period. At step 794, agent 520 hooks keywords. At step 796, agent 520 detects mouse over, or a click of a keyword by a user and displays a user interface overlay 550 comprising the selected related content 635.

In further overview of FIG. 7, at step 580' the agent 520 executing on a client 130 browser 515 may send data or content 519 from web page 517 to augmentation server 110. Step 580' may include any step, operation, action or embodiment described at step 580 of FIG. 5K. The agent 520 may be initialized, loaded and/or activated by any load event or API of the browser 515 or web page 517. The agent 520 may be executed prior to content of the web page 517 being loaded or displayed or during the loading of the web page 517. The agent 520 may identify, gather and aggregate data from the page. The agent many identify and/or gather any text portions of the web page, any content such as scripts, tags or URLs, any HTML, XML, java script or other page languages functions or code and any other content of web page 517. The agent 520 may transmit to server 110 any content identified and/or retrieved, such as text and/or any page metrics and transmits such content to server 110. The agent 520 may transmit the page data 519 together in one transaction to the server or via a series of transactions. The agent 520 may transmit the page data using any type and form of protocol. In some embodiments, the agent 520 transmits the page data while the browser 515 is loading the web page 517. In other embodiments, the agent 520 transmits the page data upon the page 517 is loaded by the browser 515. In further embodiments, the agent 520 transmits page data 519 upon receiving a message from the server 110 to send the page data 519. In still further embodiments, the agent 520 sends page data 519 within a predetermined time threshold, such as predetermined threshold 615.

At step 582', the server 110 analyzes the page data 519 and reduces the page data to a working set of page data to continue analysis. Step 582' may include any actions, steps or embodiments of the step 582 in FIG. 5K. Server 110 may use any subset of web page 517 data 519 to perform analysis of the web page 517.

At step 584', the server matches campaigns to content filtering for the page. The server may match the text from the working set of page data to determine if there is any type and form of matching to any campaigns. Server 110 may perform any type of semantic matching to match keywords on the page semantically to concepts, meanings, categories, subject matter and/or keywords of campaigns. Server 110 may filter out the content to include only files of a certain type, such as video files or audio files, or web pages, or links etc. Step 584' may include any actions, steps or embodiments of the step 584 in FIG. 5K.

At step 586', the server 110 performs any type and form ranking of keywords of the page data identified by the keyword matcher. Step 586' may include any actions, steps or embodiments of the step 586 in FIG. 5K.

At step 788, server 110 identifies related content 630, such as videos. In some embodiments, related content engine 610 identifies the related content 630. Related content 630 may be identified by filtering the data or contents corresponding to any campaigns stored on the server 110. Related content 630 may be identified using data from a third party server, a third party publisher or a third party advertising network or ad exchange. Related content 630 may be identified based on XML or APIs from a third party publisher or a third party ad exchange network. Related content engine 610 may identify the related content using a search of web pages 517 from the same or similar publisher, the same or similar ad exchange network and/or a same or a similar content. Related content engine 610 may identify related content 630 by searching video files having the same or similar content, or a same or similar description as one or more keywords from web page 517. In some embodiments, related content 630 is identified by searching web pages 517 of the world wide web for information indicated in the keywords from the web page 517. In other embodiments, related content 630 is identified from the results from search engines. Related content 630 may be identified based on the user behavior information. In some embodiments, related content engine 610 identifies related content 630 using the keywords of web page 517 and information or data relating user's interests, such as data the user has previously searched or accessed. In some embodiments, identified related content 630 includes a video file, such as a related video 558. In further embodiments, identified related content 630 includes an advertisement, such as related advertisement 554. In still further embodiments, identified related content 630 includes augmented content 556. In yet further embodiments, identified related content 630 includes URL to page 560.

At step 790, server 110 selects and orders related content such as videos 630 into a group of selected related content or videos 635. Related content engine 610 and/or content relevancy engine 620 may determine which related content 630 is relevant. Relevant content may include any related content 630, such as videos, audio files, advertisements and web pages. Relevant content may be selected using any information about web pages, videos or audio files the user has accessed or searched for previously. In some embodiments, relevant content is determined based on the information about user's behavior and/or interests to determine which content out the user is likely to be interested in. Relevant content may also be determined using keywords from the web page 517 in combination with information about the user. Related content engine 610 or content relevancy engine 620 may determine most relevant content using any content relevancy criteria 625. Relevant content may be determined based on weights of keywords matched in the web page with information stored at server 110. In some embodiments, relevant content is determined based on the data freshness or recency information, such as the information about the time of creation of the content or when the content was last updated. Relevant content may be determined by filtering the content types or formats, such as video, audio, web page, stream or any other type of content. Relevant content may be ordered or ranked according to the relevance and the most relevant contents may be selected into selected related content 635. In some embodiments, any combination of weighted keywords from web page 517, user data and/or information about the user, data freshness or recency information and data types and format may be combined to determine the selected related content 635. In some embodiments, a group of most relevant videos is selected. In other embodiments, a group of most relevant web pages 517 is selected. In further embodiments, a group of most relevant advertisements is selected. In still further embodiments, any group of any type and form of related content 630 is sorted and ranked to select the selected related content 635 to present to the user.

At step 792, server 110 sends matching keywords with the selected related content 635 to agent within a predetermined time period. Related content engine 610 may send to agent 520 any number of selected related content 630 of any format. Keywords transmitted along with the selected related content 635 may correspond or be related to the selected related content 635. Related content engine 610 may send to agent 520 any combination of and any number of: related videos 558, related advertisements 556, augmented content 556, URL to pages 560 and/or real time statistics 562. Related content engine 610 may send to agent 520 information and/or instructions for creating or forming a user interface overlay 550. Selected related content 635 may be transmitted along with instructions to display the selected related content 635 within user interface overlay 550. In some embodiments, related content engine 610 sends to agent 520 information about setting or organizing the user interface overlay 550. Related content engine 610 may send instructions and/or information about organizing selected related content 635 within one or more modules of the user interface overlay 550. Selected related content 635 may be sent along with keywords from web page 517 to which the selected related content 635 corresponds. The keywords may be used for In-Text advertisement in web page 517. Selected related content 635 may include content that corresponds or is related to one or more of the keywords of the web page 517.

Still at step 792, selected related content 635 and/or keywords may be transmitted to agent 520 within a predetermined time threshold or a predetermined time period. In some embodiments, related content engine 610 returns to agent 520 selected related content 635 within a predetermined amount of time from the web page 517 being loaded by the browser 515. In other embodiments, selected related content 635 is transmitted to the agent 520 within a predetermined amount of time from the completion of loading of web page 517 by the browser. In still further embodiments, selected related content 635 is transmitted to the agent 520 within a predetermined amount of time from the moment when the agent 520 was executed by the browser 515. In yet further embodiments, selected related content 635 is transmitted to the agent 520 within a predetermined amount of time from an action by a user, such as a mouse-over, a click, a movement of a mouse or a signal from the keyboard of the user. The predetermined amount of time within which selected relevant content 635 and/or keywords are returned to agent 520 may be any predetermined threshold 615 described herein.

At step 794, agent 520 hooks keywords received from related content engine 610. Agent 520 may hook any keyword received from the server 110. Agent 520 may modify, augment or change web page 517 to make any keyword interactive. In some embodiments, the keyword is underlined by agent 520. In further embodiments, keyword is double underlined to distinguish the hooked keyword from any other content or text of web page 517. Agent 520 may change the color, size and/or font of the keyword that hooked by the agent. The hooked keyword may correspond to any of the selected related contents 635 transmitted. The agent may modify the keyword within web page 517 to be used as a trigger for displaying user interface overlay 550. Agent 520 may hook the keyword such that the user interface overlay 550 comprising selected related content 635 is displayed on the user's computer screen upon a selection or an action by the user. The selection or the action initiating the display of the user interface overlay 550 may be a mouse-over action by the user over the keyword on web page 517. The user may also initiate the display of the user interface overlay 550 by clicking on the keyword within web page 517.

At step 796, agent 520 detects a mouse over or a click of the keyword by the user and displays a user interface overlay 550 window that comprises the selected related content 635. Upon a mouse over action by a user over the keyword augmented in web page 517, user interface overlay 550 may appear or display. In some embodiments, the user interface overlay 550 appears upon a click by a user on the keyword. The keyword is the same keyword that is received by the agent 520 from the server 110. The user interface overlay 550 displaying over a portion of web page 517 may comprise one or more modules. The modules of user interface overlay 550 may each include a number of selected related content 635. In some embodiments, a module of the user interface overlay 550 includes links, such a URL to page 560. In other embodiments, a module of the user interface overlay 550 includes augmented content 556. In further embodiments, user interface overlay 550 includes related video 558. In still further embodiments, user interface overlay 550 includes related advertisements 554.

E. Systems and Methods for Design and Development of Unit Types Via a Development Tool Referring now to FIG. 8A, an embodiment of a system for designing and generating a unit type 835 comprising a tooltip 550 is illustrated. The system may comprise a development tool 800 for a user to design and generate a unit type 835 by populating unit type templates 810 with modular components to create and organize the tooltip 550 content. In brief overview of FIG. 8A, a server 110 is illustrated comprising a development tool 800 for designing and generating a unit type 835 that includes a tooltip 550 comprising graphical and/or textual content. Development tool 800 comprises a unit template selector 805 for selecting a unit type template 810 from a plurality of unit type templates 810A-N. Development tool 800 may further include one or more media blocks 815A-N. Media blocks may include generic and customized content to be used to populate the unit type template 810 and/or unit type 835.

A design layout 830 of the development tool 800 may be used to design a particular unit type 835 from scratch or using a unit type template 810. Unit type 835 may comprise a tooltip 550 which may further include components, such as header, 841, footer 842, one or more side bars 843 and sliding windows 844 and a tail 845. Tooltip 550 may further comprise content, such as media blocks 815, organized within rows and cell structures of the tooltip 550 for storing the display content. Development tool 800 also includes a unit type generator 820 for generating a unit type based on the design and content specified via the development tool. The unit type generating may generate the unit type and store the unit type in an output file 825. Once the unit type 835 has been created via the development tool 800, the unit type may be deployed to the remote client 130 to be loaded by browser 515 and displayed together with web page 517.

Development tool 800 may include functionality for a user, such as a designer of unit types 835 or tooltips 550, to design, develop and populate with content any unit type 835. Development tool 800 may provide the designer with an interface and system to design and develop the unit type 835 using modular components which may be selected, dragged and/or dropped via a user interface of the development tool 800. Development tool 800 may provide the designer with an interface and system to customize, change, create, edit or modify any feature, function or portion of the unit type 835 or the tooltip 550. Development tool 800 may provide the designer with an interface and system to customize, change, create, edit or modify any content of the unit type, such as media blocks 815 deployed within the tooltip 550 or based on the application of the unit type 835. Development tool 800 may provide the designer with an interface and system to move, arrange, organize, format, style, color or otherwise change the appearance or look and feel of the unit type.

Upon the completion of design of the unit type 835, unit type generator 820 may generate an output file 825 comprising a representation of the designed unit type 835, such as in script or executable code. The resulting output file 825 may include browser executable instructions for loading, creating and/or displaying the unit type 835 on the remote client 130 computer in response to a user selection or a mouse-over of a keyword on a web page 517 loaded by the browser 515 of the remote client 130.

Figure 8A:
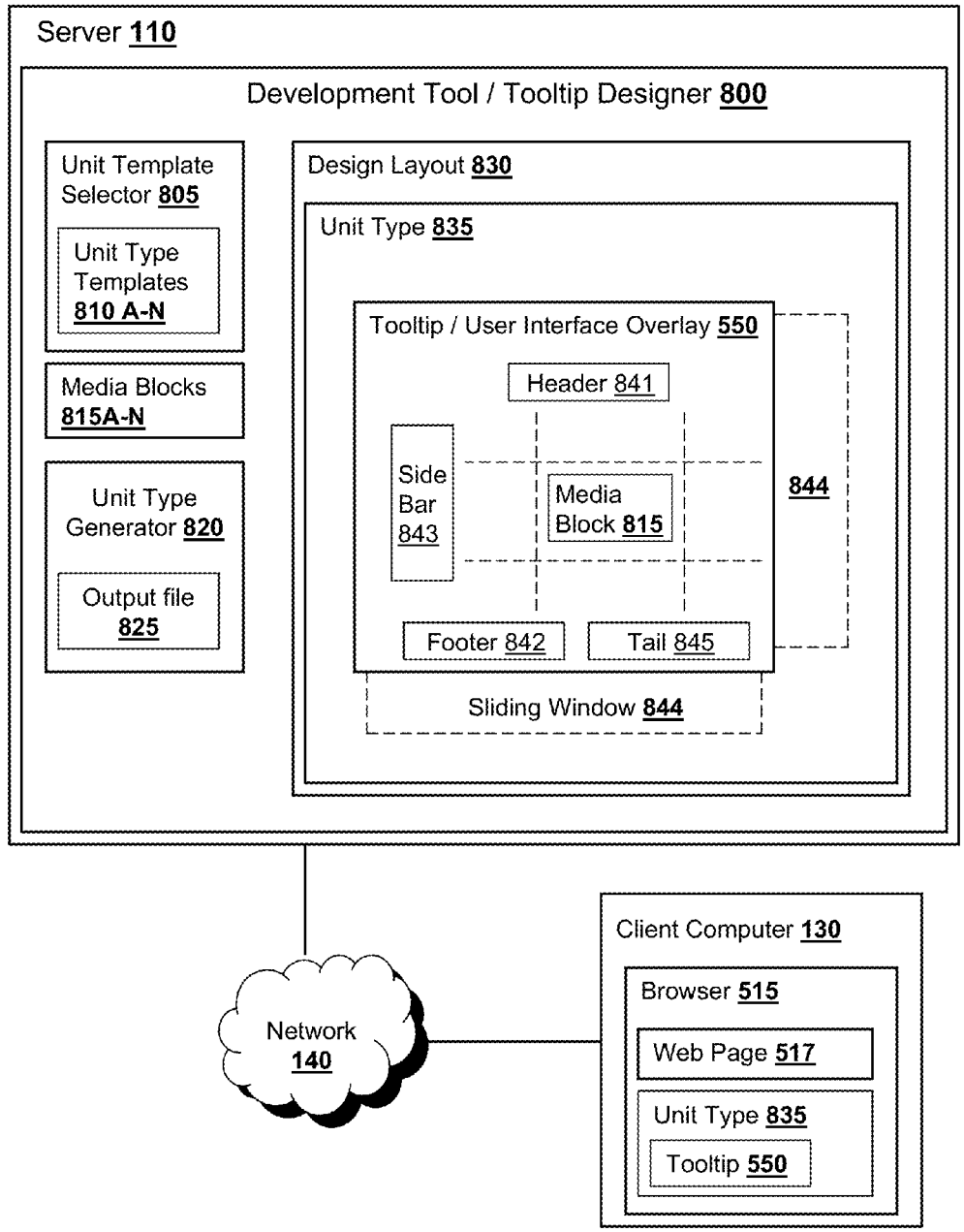
FIG. 8A is a block diagram of an embodiment of a system for designing and developing a unit type using modular components.

Referring to FIG. 8A in greater detail, a development tool 800, sometimes referred to as a tooltip designer, may include any software, hardware or a combination of software and hardware for designing, editing and generating a unit type 835. Development tool 800 may include any computer executable code, a logic unit, a script, a function, a program, an executable file, a compiler, a software application, a software development tool, a library or any other component for designing, editing, creating and/or generating a unit type 835 and/or a tooltip 550. Development tool 800 may include any functionality for assembling modular components or content within a template 810 of a unit type 835. Development tool 800 may include functionality for including, excluding, arranging and reordering any content within a tooltip 550 of the unit type 835. Development tool 800 may include a graphical user interface to enable a user of the development tool, such as a designer, to interact with the development tool and the unit type 835 features and contents. In some embodiments, development tool 800 includes functionality enabling a user to select, drag and drop components, such as media blocks 815 into sections or portions of the design layout 830. In further embodiments, development tool 800 includes functions for arranging or organizing content within a unit type 835 and/or tooltip 550. In still further embodiments, development tool 800 includes functionality to allow the designer to edit or revise the programming code or browser executable code of the unit type 835 manually. Development tool 800 may further include any functionality for generating a browser executable code into an output file 825 in order to enable a remote browser 515 to load, recreate and display the unit type 835 as designed on development tool 800 on a remote client 130.

Development tool 800 may include any functionality for selecting and editing any unit type template 810 to create, populate and assemble a unit type 835. In some embodiments, a development tool 800 includes functions for enabling a user to select a particular template in order to create a unit type 835. Development tool 800 may include modular components that may be assembled, rearranged, edited and added to a template 810 in order to create a unit type 835. In some embodiments, development tool 800 includes functionality to remove or revise the contents and/or components of the unite type template 810. Development tool 800 may include a plurality of panels or panes for designing, arranging or rearranging any portion or section of unit type 835 or a tooltip 550. Development tool 800 may include functions, algorithms and/or programs for enabling a user to arrange a layout of a tooltip 550 and/or unit type 835. Development tool 800 may further include one or more design layouts 830 within which the user may drag and drop, activate or deactivate components of a unit type 835 and/or tooltip 550. The user operated or controlled components may include media blocks 835, headers 841, footers 842, side bars 843, slide windows 844 or any other component. Development tool 800 may enable the user to edit or revise positions of any of these components or contents, thus rearranging the look and order of the unit type 835 or tooltip 550.

Development tool 800 may include any functionality for generating an output file 825. In some embodiments, development tool 800 comprises the functionality for creating, generating and outputting a computer executable code, functions or algorithms based on a design of a unit type template 810 or unit type 835 as designed and displayed in the development tool 800. Development tool 800 may include the functionality for calculating and creating the sizes and shapes of the unit type 835 based on the sizes, shapes and arrangement of contents, such as media blocks 815, links, headers 841, footers 842, side bars 843, sliding windows 844, tails 845 or any other component of the tooltip 550. Development tool 800 may use a unit type generator 820 to include into the resulting unit type 835 script of the output file 825 any customized features, actions, events, instructions or modifications made to the unit type 835. The unit type generator 820 may generate any set of programming code, instructions or customized features of the unit type 835 which may be used by a remote browser 515 to recreate the replica of the unit type 835 along with any customized features of the unit type 835.

Design layout 830 of the development tool may be a graphical interface and layout for designing, arranging and/or creating a layout of a unit type 835 and/or a layout of tooltip 550. Design layout 830 may comprise a user interface window or a space within which a unit type 835 and/or tooltip 550 may be drawn, designed, organized, edited and populated with content, such as media blocks 815. Design layout 830 may include a function or an application for drawing, editing or modifying a unit type template 810 into a desired customized unit type 835. Design layout 830 may include a gritted background which may include columns and/or rows for drawing, creating, designing and organizing the unit type 835 or components or contents to be displayed within a unit type 835. Design layout 830 may include functions and algorithms facilitating activating, deactivating and including or excluding of functions, contents, or portions of a tooltip 550, such as headers 841, footers 842, side bars 843, slide windows 844, tails 845. Design layout 830 may enable resizing, reshaping, creating or deleting of cells, rows or columns of a tooltip 550 within which content may be displayed. Design layout 830 may include functions for dragging and dropping and arranging content, such as media blocks 815 within the cells, rows and/or columns of the tooltip 550 content container. Design layout 830 may include functions for rearranging, editing and redrawing any portion of the unit type 835 and/or tooltip 550. Design layout 830 may include applications for including unit type templates 810 within unit types 835.

Unit type 835 may comprise any combination of elements to form a predetermined arrangement and selection of content for a user interface, such as a tooltip 550. The unit type may include tooltip 550 along with any set of features, graphics or functions relating or surrounding a tooltip 550. Unit type 835 may comprise any selection of content that may be presented via tooltip 550 or within a tooltip 550. Unit type 835 may comprise a tooltip 550 and/or any functionality of a tooltip/user interface overlay 550. Unit type 835 may include a border, a shadow and/or a container for containing or comprising a tooltip 550. Unit type 835 may include functions or features external to a tooltip 550 which may be deployed with a tooltip 550 and used to control the tooltip 550 or any portion or content of the tooltip 550. Unit type 835 may comprise content that may be loaded, executed and displayed by a remote browser 515. In some embodiments, unit type 835 includes any functionality or component of tooltip 550, such as a module, a sliding window 844, a header 841, a footer 842, a side bar 843 or a tail 845. In further embodiments, unit type 835 comprises one or more cells defined by rows or columns, such as the cells, rows or columns of the tooltip 550 used for storing content, such as media blocks 815.

Unit type 835 may include any generic content or customized content. Unit type 835 may include customized appearance for a tooltip 550. The customized appearance of the unit type 835 may include a modified size, shape, color or a design of any portion of the tooltip 550, which may further be customized for functionality based on the preferences of any particular advertisement campaign or application. Customized unit type 835 may include a functionality of tooltip 550 which may provide a different look or appearance to each tooltip 550. Unit type 835 may include a feature that are customized for a particular content of a web page 517, as well as customized for a particular advertisement content or media block content 815. A unit type 835 may include any design, feature, shape or a functionality which may be in accordance with a unit type template 810. In some embodiments, a unit type 835 include designs and features that are based off of a unit type template 810 and further modified, reshaped and resized in order to accommodate any needs of the content displayed within tooltip 550.

Unit type 835 may be designed, shaped and/or personalized to include any portion of tooltip 550 or any content displayable by a browser 515. In some embodiments, unit type 835 includes a main module of tooltip 550. In further embodiments, unit type 835 includes a bottom module of tooltip 550. In still further embodiments, unit type 835 includes a sliding window, such as a sliding window 844. In yet further embodiments, unit type 835 includes a header 841. In yet further embodiments, unit type 835 includes a footer 842. In still further embodiments, unit type 835 includes a side bar 843. Unit type 835 may include a related content 630 or selected related content 635. Unit type 835 may further include any number of media blocks 815, augmented contents 556, related videos 558, related ads 558, related contents 630 and/or URLs to pages 560. Unit type 835 may include an agent 520. Unit type 835 may include any type of content that may be run, loaded and/or displayed by a browser 515. Unit type 835 may include any functionality of any unit type template 810. Unit type 835 may include any customized, modified, set or configured functions or features of any unit type template 810.

Unit template selector 805 may comprise any functionality for selecting one or more unit type templates 810 from a plurality of unit type templates 810A-N. Unit template selector 810 may comprise any software, hardware or a combination of software and hardware. Unit type selector 805 may include a function, a script, a software code, a program and/or an executable. Unit type selector 805 may include any functionality for selecting a particular template for any unit type 835. Unit type selector 805 may include a menu, such as a drop down menu, or a selection menu for selecting a template for a unit type 835. Unit type selector 805 may include functionality for creating a new template or a new layout for designing a new unit type 835. Unit template selector 805 may include functionality to allow a user of development tool 800 to select a design of a unit type 835 or a design of a particular tooltip 550. Unit template selector 805 may include functionality for sending any selected unit type templates 810 to the design layout 830.

Unit type templates 810A-N may include any number of templates or examples of unit types 835. The unit type templates may be loaded into design layout 830 and that may be further edited in order to create a unit type 835. A unit type template 810 may include any pre-drawn or pre-designed layout. A unit type template may include a partial layout of an example of a unit type 835 or a model of a unit type 835. Unit type template 810 may further include a computer executable code or scripts for creating or displaying the unit type template 835 in a browser 515. Unit type templates 810 may be written or designed using any browser executable code or script, including HTML, XML, java, javascript or any other programming code. Unit type template 810 may include any individual, function, portion or a section of a tooltip 550. In some embodiments, unit type template 810 includes a compilation of functions of tooltip 550.

A unit type template 810 may be loaded into design layout 830 to become a unit type 835. Unit type template 810 may be editable and/or configurable in accordance with user's preferences to be formed, shaped and/or modified within design layout 830 into a unit type 835. A unit type templates 810A-N may include a templates each of which may include same or different shapes, colors, functions and layouts. In one embodiments, a unit type template 810 includes a main module of a tooltip 550. In other embodiments, a unit type template 810 includes a top module of a tooltip 550 and/or bottom module of the tooltip 550. In some embodiments, a unit type template 810 includes a sliding window 844, a header 841, a side bar 843 and/or a footer 842. Unit type template 810 may include any content, such as any media block 815, any related content 630, selected related content 635 or any content described herein which may be displayed using a tooltip 550.

Unit type templates 810A-N may vary from template to template and may be selectable by the user based on the application, functionality and/or desired appearance. Each of the unit types 810 may be converted into a single format. The unit types 810 may include features, configurations and parameters which are designated for this format and described using comments. The users may utilize the comments to implement any functionality available to the particular unit type 810. A unit type template 810 may include intelliTXT features and functionality along with any name-value pairs. Unit type templates 810 may include any functionality of a tooltip 550 including in-text and related content functionalities. Unit type template 810 may include HTML content which may be further modified with additional modular functions which may be implemented using XML, javascript or java code or functions. Unit type templates 810 may be sorted based on their complexity. In some embodiments, unit type templates 810 include rich media templates which include complex media blocks 815, such as video, flash and graphical content. In other embodiments, unit type templates include standard and/or resource templates which may be used for supporting medium complexity media blocks 815 or text, scripts and/or simple content. Unit type templates 810A-N may include customizable or editable features, such as background colors, call to action functions and font sizes and/or colors. In some embodiments, unit type templates 810 comprise unit types 835 that were previously created and/or customized from other unit type templates 810.

Media blocks 815A-N may include any number, type and format of content, such as content that may be displayed within a unit type 835 or a tooltip 550. A media block 815 may include any media content, flash content, text content, video or audio content. Media content 815 may comprise any type and format a video, an audio, a graphical content or a picture or an animation. Media content 815 may include any script or programming code comprising commands, settings, parameters or instructions in any format or language, such as an HTML, XML, javascript or java content or any other browser executable code. Media blocks 815 may comprise any content described herein, such as an advertisement content, an advertisement video or audio, a related video 630, a selected related videos 635. Media block 815 may include a web page 517 or a portion of a web page 517, a search box for a search engine or link, such as a URL to page 560. In some embodiments, media block 815 includes an augmented content 556. In further embodiments, media block 815 includes a related video 558. In still further embodiments, media block 815 includes related ads 558. In yet further embodiments, media block 815 includes agent 520. Media block 815 may comprise any content, component or a feature that may be displayed within a main module, top module, bottom module or a sliding window of a tooltip 550. In some embodiments, media block 815 includes a core component, such as for example content comprising text, image, flash file or iframe. In further embodiments, media block 815 comprises custom components, such as for example custom designed advertisements, videos or images. Media block 815 may include any content which may be displayed by a browser 515.

Unit type generator 820 may include any hardware, software, or a combination of hardware and software for creating and/or generating output representing the unit type, The output may be stored to an output file 825. The output file may includes executable code or instructions for displaying a unit type 835 by a browser 515. A unit type generator 820 may include any functionality for compiling, creating and/or generating any computer executable program or code that may be used by a browser 515 to recreate and display a unit type 835 or a tooltip 550. Unit type generator 820 may include any function, program, script, application, executable, compiler or an algorithm for generating a computer executable code. Unit type generator 820 may include functionality to generate any set of instructions, commands, functions and algorithms to be used by a web browser 515 to display a unit type 835 and/or a tooltip 550.

Unit type generator 820 may include functionality for creating or generating any type and form of code for rendering a unit type 835. The unit type generator may generate script code that provides rendering directives or instructions to the agent for rendering the unit type via a browser. For example, the unit type generate may generate any type and form of JSON script code to be executed or provide instructions to the script of the agent for rendering the unit type. The unit type generator may generate a set of execution directives understood by the agent to render or otherwise provide and display the unit type via the browser. The unit type generator may generate a set of execution directives with corresponding text or information for providing, forming or rendering the unit type via the agent and/or the browser. The unit type generator may generate directives, commands or instructions for rendering any of the media components of the unit type. The unit type generator may translate the design of the unit type in the layout to instructions or code for providing elements of the unit type within a predetermined set and size of rows and columns. The unit type generator may generate instructions or code for rendering the unit type to have a predetermined width and length or size and to have the elements of the unit type fit or be arranged within rows and columns of the predetermined size.

Unit type generator 820 may include functionality for loading any unit type 835 designed within a design layout 830 and generate a set of directives, instructions, command or code for creating and/or rendering unit type 835 by the agent. In some embodiments, unit type generator 820 loads a unit type 835 from design layout 830 including all of the content of the unit type 835 and generates script code for this particular unit type 835. The generated output may be stored within a file, such as an output file 825. Unit type generator 820 may locally store the output file 825, or send the output file 825 to a remote storage or memory.

Output file 825 may include any type and format for a file. The output file may include executable code for generating and displaying a unit type 835 or a tooltip 550. Output file 825 may include any type and format of content, such as XML, HTML, java, javascript and/or any other type of browser 515 executable, readable or processable content. Output file 825 may include a script or code for a script to generate and/or display a unit type 835 and/or tooltip within a browser 515 of a remote client 130. In some embodiments, output file 825 includes instructions, content and components of a unit type 835. Output file 825 may include any functionality, code or instructions for regenerating or creating a unit type 835 as designed within design layout 830 by the user.

Output file 825 may include any instructions, computer executable code and/or components or content to render a tooltip 550 by the agent. Output file 825 may include source code for a tooltip 550. Output file 825 may comprise a tooltip's properties and/or settings. Output 825 may further include a tooltip's content structure. In some embodiments, output file 825 includes media blocks 815 and/or content to be displayed within unit type 825. Output file 825 may include URL(s) for obtaining and/or display content of the unit type. Output file 825 may include instructions to direct the rendering of the unit type. Output file 825 may include information about components that surround tooltip 550, such as the shadow or tooltip container.

Output file 825 for each template 810 may include a comment markup syntax which may include information about the unit type 835 or the template 810. The information presented by the syntax may be parsed and understood by the development tool 800. The syntax may be implemented using Javascript Object Notation (JSON). To allow the development tool 800 to read information from unit type template 810 or unit types 835, additional information may be included in the templates. This information may be expressed using meta comments. Meta comments may be formatted in a certain way so that they can be identified by development tool 800 from the output file 825.

In one embodiment, a meta comment may include a syntax, such as:

///@METATITLE <JSON: 'OBJECT'}.

In this embodiment, three back slashes identify a comment syntax. The comment syntax may ensure that a browser 515 does not interpret the information that follows this syntax as part of the javascript template. "@METATITLE" identifies a title of the meta comment and "{JSON: 'OBJECT'}" identifies comment details. Comment details may include instructions, information, or describe additional properties of the meta comment. In some embodiments, meta comments are included in the output file 825. In other embodiments, meta comments are not included in the output file 825.

Header 841 may comprise any header of a unit type 835 or tooltip 550. Header 841 may include any header or a top portion of a window or a page, such as a web page 517 or a pop-up window. Header 841 may include a background section which may include features, such as buttons or links. In some embodiments, a header 841 may include an off or a close button for exiting a tooltip unit type 835 or tooltip 550. Header 841 may include a minimize or maximize button for minimizing or maximizing a unit type or tooltip 550. Header 841 may include one or more logos, such as a logo of a publisher company or an advertisement network. Header 841 may also include logo of a sponsor or a company or enterprise being advertised. Header 841 may include optional features or buttons, such as control buttons. In some embodiments, header 841 includes an edit button which may comprise links to features or functions for editing the tooltip 550 or using a functionality of the tooltip 550. Header 841 may include help button for requesting more information about tooltip 550.

Footer 842 may comprise a portion of the bottom side of the tooltip 550 which may comprise any functions or information. Footer 842 may include a search box or a link to a search engine. Footer 842 may include a brand logo, an enterprise logo or an advertisement content. Footer 842 may include a module, such as a bottom module of tooltip 550. Footer 842 may include links to web pages or media content. Footer may also include media blocks 815.

Side bar 843 may comprise any portion of the tooltip on the left or on the right side of the tooltip 550. Side bar 843 may include a sliding window 844 which may extend out from the side module upon a mouse-over or click by a user. Side bar 843 may include any content, such as links, advertisements or media blocks 815. Side bar 843 may comprise modules of the tooltip, such as the top module, bottom module or the side module. Side bar 843 may comprise any tooltip module, such as a main module, top module or bottom module. Side bar 843 may include a logo or an advertisement of a publisher or the advertiser. In some embodiments, side bar 843 includes information about the tooltip 550.

Sliding window 844 may comprise any window comprising content which may slide out from or extend from a tooltip 550. Sliding window 844 may include any content such as media blocks 815, links to web pages, information about a product or advertisements. Sliding window 844 may include any embodiment of a tooltip 550, including any layout of a module, such as a top module, bottom module or a main module. Sliding window 844 may be sized to fit the content being comprised within the window. Sliding window 844 may slide out of the tooltip 550 in response to a user selection or automatically. Sliding window 844 may be used for displaying related content 630 in a separate slide out of the tooltip. In some embodiments, sliding window 844 may include any advertisements that may be presented to the user.

Unit type 835 may include a tail 845 for identifying or pointing to a keyword on web page 517. The keyword pointed to by the tail 845 may be the keyword in response to which unit type 835 or the tooltip 550 is initiated. Tail 845 may highlight the hooked keyword and indicate to the user that the content of tooltip 550 relates to this keyword. This tail may be connected to the tooltip 550 and may be positioned on any portion of the outer edge of the tooltip 550. Tail may be positioned in top left corner, top right corner, bottom left corner or a bottom right corner. Tail may be positioned or offset any distance to the left or to the right from any of the corners of the tooltip 550. Tail 845 may be positioned or moved on any location around the outer edge of the unit type 835 or tooltip 550 based on the content of the web page 517 or based on the layout of the tooltip 550 or unit type 835.

Figure 8B:
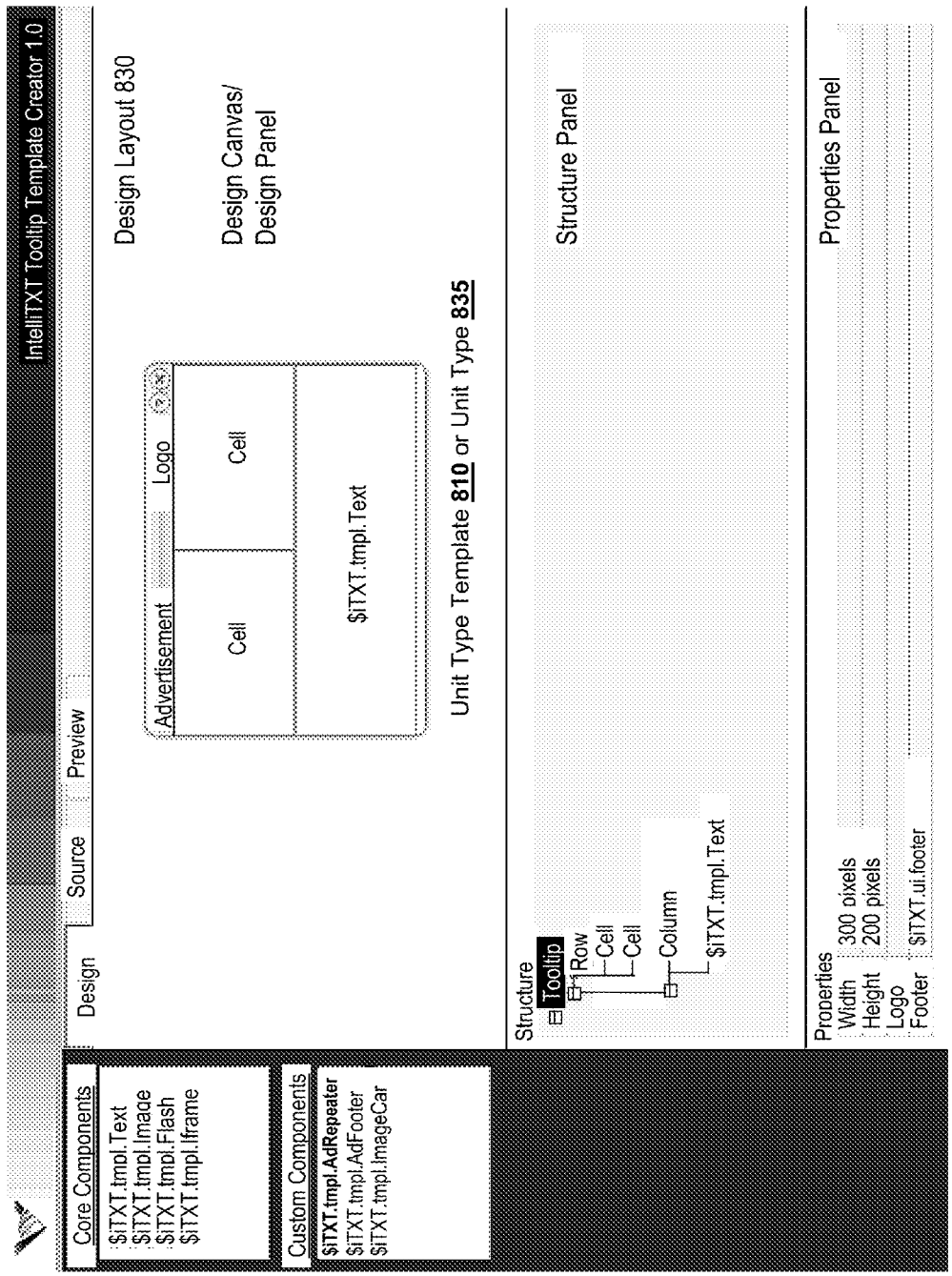
FIG. 8B is a block diagram of an embodiment of a user interface of a development tool for creating a unit type.

Referring now to FIG. 8B, an embodiment of a development tool 800 user interface is illustrated. In brief overview, an embodiment of a development tool 800 may include user interface components which may include contents for populating a unit type template 810. The development tool 800 may also include a design layout 830. Design layout 830 may include design canvas or a design panel within the user interface window in which a unit type template 810 and/or unit types 835 may be designed, edited and displayed. Design canvas of the design layout 830 display an embodiment of a unit type template 810 or unit type 835. The unit type template 810 or unit type 835 displayed within the design canvas is divided into cells, rows and columns. Design layout 830 further includes a structure panel for displaying a tree structure format of the unit type and a properties panel for displaying the properties of each of the unit type 835 components selected in the design canvas. Contents for populating the unit type template 810 or the unit type 835 are located to the right of the design layout 830. The contents may comprise media blocks 815 and may be sorted into core components and custom components. Core components may include media blocks 815, such as $iTXT.tmpl.Text, $iTXT.tmpl.Image, $iTXT.tmpl.Flash and $iTXT.tmpl.Iframe. Custom components may include media blocks 815, such as $iTXT.tmpl.AdFooter and $iTXT.tmpl.ImageCar. The contents or the media blocks 815 may be selected individually by the user or the designer and inserted into the cells, rows or columns of the unit type 835 or unit type template 810 displayed in the design canvas. Depending on the embodiments, the layouts of the unit type template 810 may or may not be editable. In some embodiments, unit type template 810 may be edited to include additional cells, rows and columns. In other embodiments, the template layout cells, rows and/or columns are not editable.

Still referring to FIG. 8B, a design layout 830 may display a number of panels. A design canvas or a design panel may include a visual drawing or a visual representation of the unit type template 810 or unit type 835 along with its components. A structure panel of the design layout 830 may include an internal template structure using a tree control. Each of the rows, cells and components that make up the template may be presented in the structure panel in accordance with their hierarchical state. When an item is selected in a structure panel, a properties panel of the design layout 830 may display any properties that can be modified. Upon selection of an item in the structure panel the design canvas may highlight the actual component visually. The user may create new rows, columns and/or cells using the structure panel. User interface components, such as core components or custom components may be dragged and inserted into the cells of the unit type template 810 in the design canvas of the design layout 830. Media blocks 815 which may be selected and inserted into the cells, rows and/or columns of the unit type template 810 or unit type 835. As the user populates the template 810, structure panel may reflect each new component or media block 815. Structure panel may identify the location of such components in terms of the rows, columns and/or cells they occupy. Properties panel may identify the properties of each component or portion of the unit type template 810 or unit type 835 selected in the design canvas.

Development tool 800 may also include a view tab bar to allow the user to see different views of the unit type 835. The view tab bar may be located towards the top section of the design layout 830 and may enable the user to view or open any number of screens or panels within design layout 830. In one embodiment, the view tab bar comprises a Design view. The design view may present to the user with a view comprising design canvas panel, structure panel and properties panel. In another embodiment, a view called Source, may present to the user a construction of the template source code. The user may use the Source view to view, monitor and/or edit the code of the template. Another view, which may be called Preview, may allow the user to view and monitor the current version of the unit type 835 in practice along with dummy advertisement data. In one example, a user may use the Design view to populate various cells with content, such as media blocks 815. The user may then use the Source view to edit some of the source code and fine tune the unit type 835 or the tooltip 550. The user may then turn to Preview pane to view, monitor and test the designed unit type 835 or tooltip 550. The user may use the Preview pane to determine if the unit type 835 functions correctly in the test environment presented by the Preview pane.

Unit type template 810 and/or unit type 835 being designed within the development tool 800 may include properties implemented using javascript object notation (JSON) object format. Tooltip properties may be included at the beginning of template class initialization function. A StartWidth property or feature of the tooltip properties may be used to identify the start width of the tooltip content. The actual tooltip width may be changed depending on the requirements of the template structure. A StartHeight property may indicate the start height of the tooltip content. The actual tooltip height may also be changed depending on the requirements of the template structure. A Header, LeftSideBar and RightSideBar properties may also each include a user interface component class name to use for the Header, LeftSideBar and RightSideBar of the tooltip instead of the default properties.

The structure of the tooltip may be defined in an array created within the initialization function or method of the templates class. The structure array may define the layout of the rows and cells as described in the previous section. Each row and cell may include width and height properties, and their own structure property which may include a child array object describing the child components.

In one example, the structure of the tooltip 550 components, such as the array of cells, rows and columns may include an instructional or a functional code, such as:

```
[ type: 'row',
    height: 30,
    structure:
        [ { type: 'cell'
            structure:
                [ { type: 'comp',
                    comp: '$iTXT.ui.Text',
                    props:
                    {
                        text: '${AD.TITLE}'
                    } }
                ] },
        { type: 'cell'
            structure:
                [ {
                    type: 'comp',
                    comp: '$iTXT.ui.Text',
                    props:
                    {
                        text: '${AD.DESC}'
                    } }
                ] }
        ]
]
```

In such and similar embodiments, a row of the structure may comprise multiple cells. In further embodiments, a cell may further include multiple rows or a component, such as a media block 815. In some embodiments, a component included within the cells comprises a property that defines the class of the component. In some embodiments, a token substitution object is included, such as for example an object to alter a style of the unit type 835:

```
{
    backgroundImage:
        'http...com/ast/ftr/ftr_$(CC)_${AD.COLOR}.gif'
}
```

Development tool 800 also includes an event section for adding and editing events. Customized events may be added based on the applications. Functions used for including and/or using events may include code, such as:

```
{
    mouseClick: function( ) { alert("UI Component Clicked"); },
    imageChange: function( ) { alert("Image Changed"); }
}
```

Each unit type template 810 may include any type and form of core and custom components which may be included in the cells of the tooltip 550. The core components may be include components, such as $iTXT.tmpl.Text which may include a text field that displays a portion of styled text. Core components may also include $iTXT.tmpl.Image comprising an image, $iTXT.tmpl.IFrame comprising an iframe element and/or $iTXT.tmpl.Flash comprising a flash movie.

Custom components may be included as a part of unit type template 810. Custom components may also be available via a library or an external file. Custom components may comprise $iTXT.tmpl.ProductList which may include a list of products from different vendors that may appear underneath the main product in a tooltip. Custom components may also include $iTXT.tmpl.AdFooter which may comprise a custom Footer component that displays the details of an advert and two call to action buttons.

User interface components of the development tool 800 may include $iTXT.tmpl.ElementBase class which may provide certain required functionality for any individual component. The ElementBase class may include functions which can be extended by the subclass. The ElementBase class may include $iTXT.tmpl.Row and $iTXT.tmpl.Cell classes, which may extend from ElementBase and provide extra functionality to handle the layout of rows, cells and components within the tooltip content. Functions, such as init or initialization function may be used to setup a unit type 835 or any portion or component within unit type 835. A resize function may set width and height properties of the unit types 835 or any component within the unit type 835. A render function may be used to return the root document object platform (DOM) information. A destroy function may be used to destroy or erase components that need to be removed. A destroy function may be called to remove any event subscriptions and remove any nodes from the DOM.

When defining the value of a property within the tooltip creation application, or within the actual template manually, token notation may be used such as ${AD.TITLE}, which may be processed when the component is created and substituted with the title of the block media, such as the advertisement content. In some embodiments, tokens may be mixed with text or introduced into a URL, such as for example:

http://image.intellitxt.com/ast/footer/FTRCTA_${CC}_${AD.COLOR}.gif

In this example, an image URL may use a channel and advertisement values within the actual URL. A new class may be created to be used to perform token substitution. The new class may allow usage of nested objects so that tokens, such as for example "AD.TITLE" may resolve to a property within the tokens object called AD and a property of that object called TITLE.

Development tool 800 may include options or effects which may be used for generating or creating unit types 835. A resize effect may be included into or applied to a unit type 835 or a component within the unit type 835. In some embodiments, resize effect is used to resize a media block 815 within unit type 835 in response to an action, such as a selection of a user or a mouse-over. The resize may be done from a current size or an initial size of the component to another size in pixels, or simply to a percentage of the current size. The resize effect may modify only the width and height values of an element or component. Resize effect may be used in combination with other effects. A combination effect may be used or applied to perform multiple effects at the same time. The combination effect may include a command or an instruction, such as: $iTXT.fx.Combination.

Development tool 800 may further include models, such as an event model. The event model may enable the components, functions or sections of the unit type 835 created by the development tool 800 to operate in absence of direct communication between the components using global variables or structures. In some embodiments, unit types 835 may be subscribed to document object model (DOM) events. In other embodiments, third party javascript libraries, such as JS or jQuery may be used to provide events. Events may be subscribed to and unsubscribed from by any of the components.

A notification list of events may include events which may trigger actions used by the components, sections or media blocks 815 of the unit type 835 or any portion of the unit type 835 and/or hooked keywords on web page 517. Events may be included with unit types 835 or anywhere on the client 130 or server 110.

A tooltip container, unit type 835 or tooltip 550 may include or be associated with any number of events, such as: $iTXT:tt:before:position, $iTXT:tt:before:open, $iTXT:tt:after:open, $iTXT:tt:before:close, $iTXT:tt:after:close and $iTXT:tt:queue:hide. Event $iTXT:tt:before:position may be fired or executed when the tooltip is about to be shown, and before the positioning algorithm is called. Event $iTXT:tt:before:open may be fired or executed when the tooltip is about to be shown, and after the positioning algorithm is called, just before the tooltip is actually opened. Event $iTXT:tt:after:open may be executed or fired when the tooltip is displayed on the screen, and any opening animations or media blocks are loaded. Event $iTXT:tt:before:close may be executed or fired just before the tooltip is closed and the close animation starts. Event $iTXT:tt:after:close may be fired when the tooltip is hidden from view and after the close animation has completed. Event $iTXT:tt:queue:hide may be called or executed when a tooltip queue hide event is called, such as for example when the mouse has first left the tooltip. The tooltip may then be hidden after a certain time.

A hooked keyword may include or be associated with any number of events, such as $iTXT:hook:over, $iTXT:hook:out, and $iTXT:hook:click. Event $iTXT:hook:over may be fired or executed when a user mouse is over the hooked keyword. Event $iTXT:hook:out may be fired or executed when the mouse leaves the keyword. Event $iTXT:hook:click may be executed when the user clicks on the keyword.

Tooltip 550 may further include events, such as $iTXT:tts:before:fade:in and $iTXT:tts:after:fade:in. Event $iTXT:tts:before:fade:in may be called just before the shadow of the tooltip fades in, or when the tooltip is visible, but before the whole animation is completed. Event $iTXT:tts:after:fade:in may be called just after the shadow has faded in and the tooltip is fully visible.

Tooltip 550 and/or unit type 835 may also include or enable action events. An action event $iTXT:tt:set:size may be called by a component to set the required content size of the tooltip. Parameters used in this action event may include a parameter w for width, a parameter h for height and a parameter anim for indicating if change or function should be animated. An action $iTXT:tt:close may be called to close the current tooltip. A parameter animated may be used to indicate if the closing should be animated.

Unit type 835 and/or tooltip 550 may be sided based on the content included within the tooltip. In some embodiments, any sizes specified for media blocks 815 may be used to determine the size of the content within tooltip 550. In some embodiments, tooltip 550 may be dynamically resized based on the content being resized or displayed at the moment. In some embodiments, a default size for the content portion of tooltip 550 is 300 pixels by 200 pixels. The final tooltip size may be calculated by adding the space required by all the components around the tooltip content itself. While sizing the tooltip 550, left and right side bars 843, header 841 and footer 842 may be taken in consideration.

Unit type 835 may be dynamically resized. In some embodiments, tooltip 550 may comprise media blocks 815, such as flash contents and advertisements which may expand based on viewing or actions of the user. Unit type 835 may include instruction or event, such as $iTXT:tt:set:size event which may be used to resize the media block 815, such as a flash movie or an advertisement. Media block 815 may also include internal functions which to resize its own internal user interface in order to resize.

Development tool 800 may include hooked keyword wrapping. In one embodiment, unit media 835 includes functions to identify a location in which the user placed a mouse over the hooked keyword. The functions may determine if the tooltip needs to be placed close to this location or elsewhere. In some embodiments, a method is used for working out which part of a hooked keyword the tooltip needs to be displayed near and whether or not the keyword is wrapped. In one embodiment, if a keyword includes a plurality of words, each word may be redefined as a keyword. By having a plurality of individual keywords that are displayed as a single keyword, it may be easier to determine the location of the keyword of the plurality over which the user has placed the mouse. The mouse over event for the hooked keyword may report the target as one of the child elements which it contains. The position of the target element may be used to determine where the tooltip needs to be displayed especially when the hook is wrapped over two lines. The position of each of the child elements or the each individual word elements of the larger keyword, may also be used to determine the bounds of the hook on each line.

Still referring to FIG. 8B, unit type template 810 and/or unit type 835 designed within the development tool 800 may include code such as:

```
/**
 * This source code is Copyright (c) Vibrant Media 2001-2009 and
 forms part of
 * the patented Vibrant Media product "IntelliTXT" (sm).
 * @author arussell
 */
//////////////////////////////////////////////////////////
//FILE LOAD INDICATOR! DO NOT REMOVE
//////////////////////////////////////////////////////////
$iTXT.js.loader["$iTXT.tmpl.TestTemplate"] = true;
//////////////////////////////////////////////////////////
//Loader Function
$iTXT.tmpl.TestTemplate__Load = function( ){
    //Speed up access to undefined
    var undefined;
    //CUSTOM COMPONENT INCLUDES
    //END CUSTOM COMPONENT INCLUDES
```

In further embodiments, unit type template 810 and/or unit type 835 designed within the development tool 800 may include a code such as:

```
/**
 * This source code is Copyright (c) Vibrant Media 2001-2009 and forms
 part of
 * the patented Vibrant Media product "IntelliTXT" (sm).
 * @author arussell
 */
//////////////////////////////////////////////////////////
//FILE LOAD INDICATOR! DO NOT REMOVE
//////////////////////////////////////////////////////////
$iTXT.js.loader["$iTXT.tmpl.TestTemplate"] = true;
//////////////////////////////////////////////////////////
//Loader Function
$iTXT.tmpl.TestTemplate__Load = function( ){
    //Speed up access to undefined
    var undefined;
```

-continued

```
    //CUSTOM COMPONENT INCLUDES
    //END CUSTOM COMPONENT INCLUDES
    //START TEMPLATE CLASS
    $iTXT.tmpl.TestTemplate =
$iTXT.core.Class.create($iTXT.tmpl.TemplateBase,
    /** @lends $iTXT.tmpl.TestTemplate.prototype */
    {
        /**
         * The TestTemplate
         * @constructs
         * @param {Object} _options The new object options
         */
        init: function(_options, $super)
        {
            //START TEMPLATE OPTIONS
            var defOpts = $iTXT.core.Util.extend(
                {     }
                , _options);
            //END TEMPLATE OPTIONS
            //START TEMPLATE STRUCTURE
            this.structure =
            [{
                type: 'row',
                structure:
                [
                    { type: 'cell',
                      structure:
                      [
                          { type: 'row',
                            height: 30,
                            structure:
                                [{ type: 'cell' },
                                  { type: 'cell' }] },
                          { type: 'row',
                            structure:
                                [{ type: 'cell'},
                                  { type: 'cell'}]
                      }]},
                    {
                        type: 'cell'
```

Figure 8C:
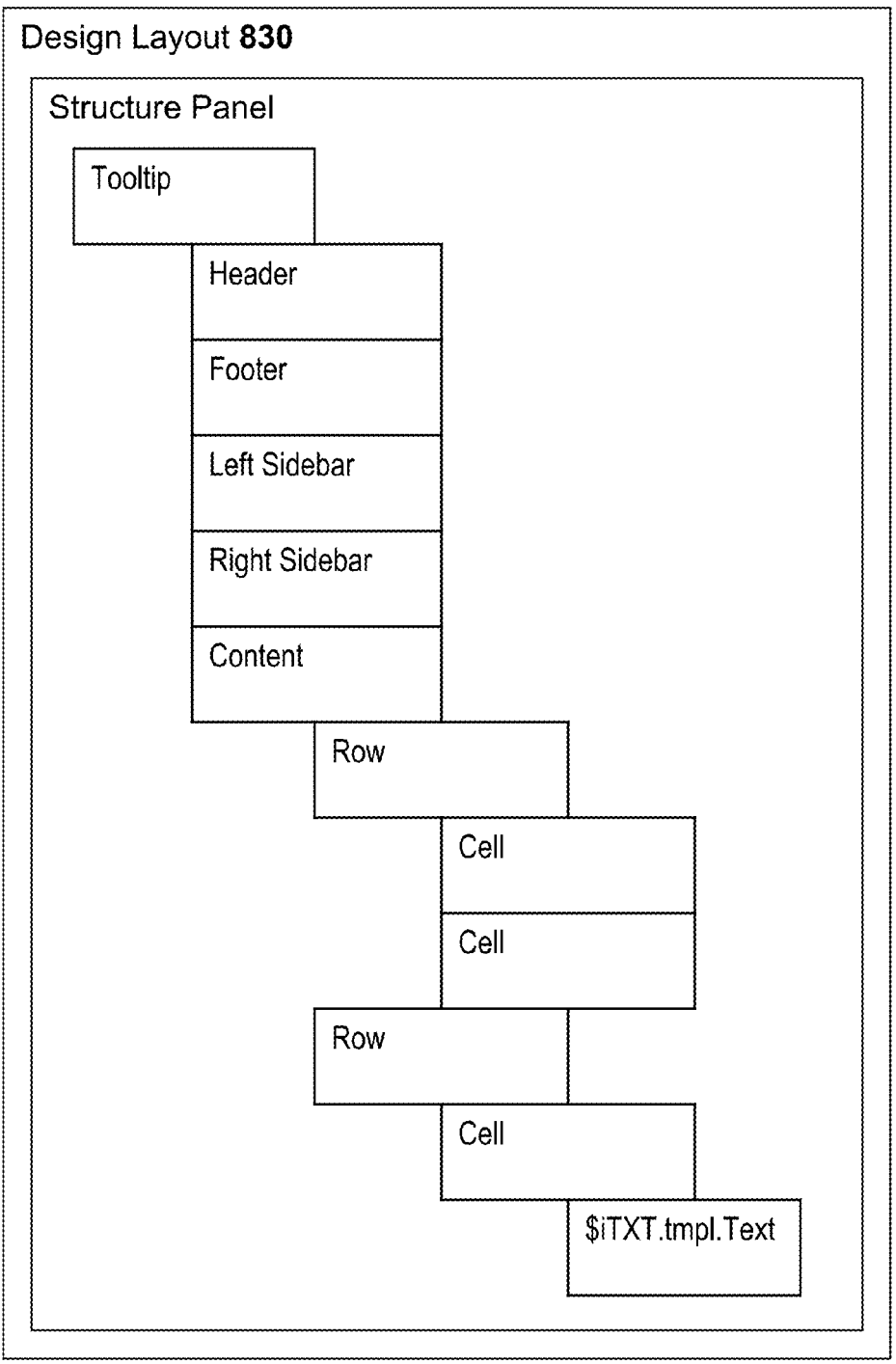
FIG. 8C is a block diagram of an embodiment of a structure panel of the development tool.

Referring now to FIG. 8C, an embodiment of a structure panel for a fully populated unit type 835 designed in a development tool 800 is illustrated. Structure panel may include a hierarchical tree structure identifying contents and media blocks 815 of a unit type 835 created within a design layout 830. The structure panel may also allow the user to change properties for the header 841, footer 842, left and right side bars 844 as well as the content portion which may be further split into any number of cells. For the header, footer and sidebars, the user interface components may be replaced with a custom class of component libraries. For example, some agencies or campaigns may include their own customized contents, which may be used as media blocks 815. Components displayed in the structure panel may be highlighted or selected to reveal the properties of these components in the properties panel. The properties panel may display all editable properties of any currently selected structure node in the structure panel.

Figure 8D:
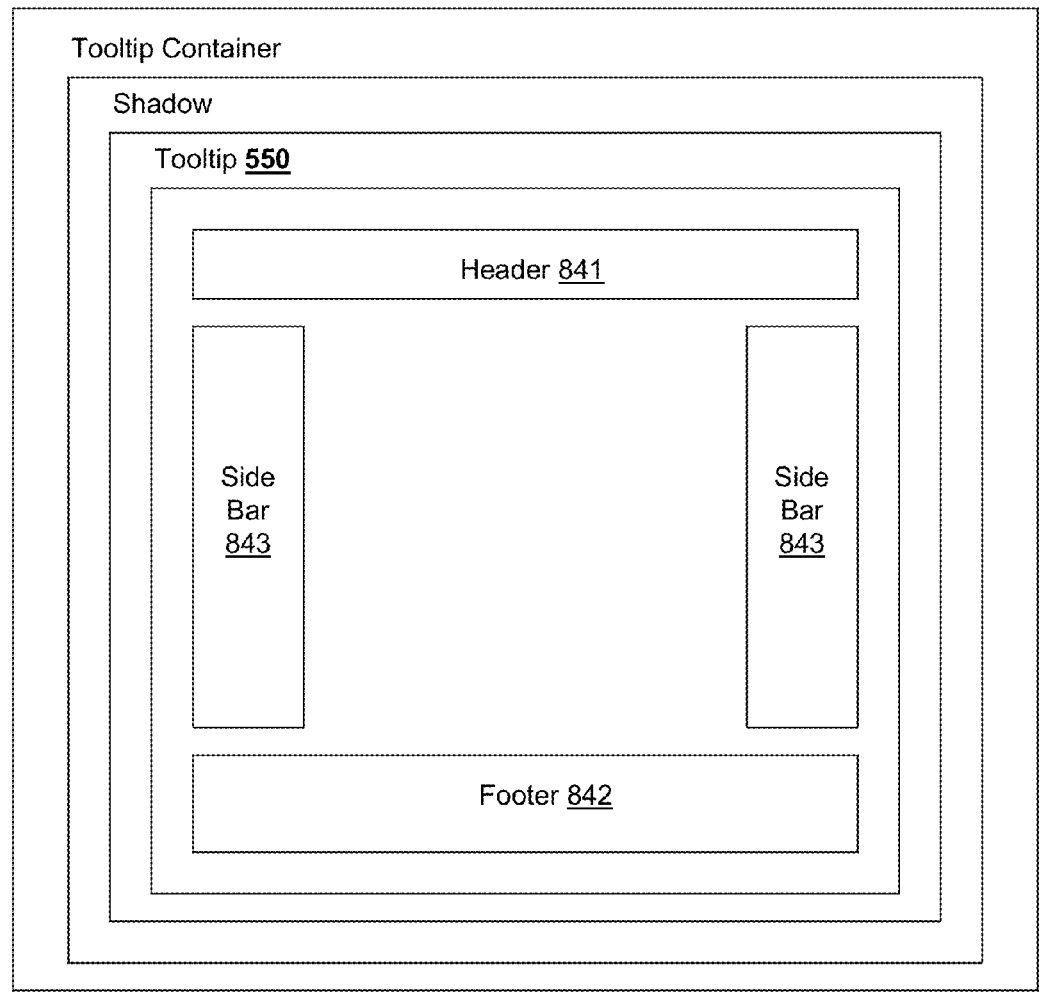
FIG. 8D is another block diagram of an embodiment of a unit type created using the development tool.

Referring now to FIG. 8D, an embodiment of a unit type 835 created using a development tool 800 is illustrated. Unit type 835 includes a tooltip container. The tooltip container may provide a space within which the tooltip 550 is displayed or deployed. The tooltip container may also include functions, such as borders, shading or graphics that enhance the look or appearance of the tooltip 550. Unit type 835 further includes shadow. The shadow may surround the outer edge of the tooltip 550 for appearance and emphasis of the tooltip 550. Tooltip 550 may include a header 841, a footer 842, a left side bar 843 and a right side bar 843. Each of the components of the unit type 835 may be modular, including the tooltip container and the shadow.

Figure 8E:
FIG. 8E is an embodiment of a unit type created using the development tool.

Referring now to FIG. 8E, another embodiment of a unit type 835 created using a development tool 800 is illustrated. A particular embodiment of unit type 835 may include a tooltip 550 that may be referred to as chrome tooltip. Chrome tooltip may include a design of unit type 835 from a particular unit type template 810 for creating chrome tooltips. Other tooltips may be designed differently using different unit type templates 810. The chrome tooltip may be created, controlled and operated using JavaScript and HTML. Any interactive media within this particular embodiment of tooltip 550 may be implemented within a contained flash movie. Expandable video functionality may be provided to increase a size of a movie or a video being played within a contained flash movie portion of the tooltip 550. Such expansion of the movie may be triggered by a mouse-over or click by a user viewing the tooltip 550. The expansion of the movie may resize the movie being played to enable a more satisfying viewing for a user viewing the tooltip 550. In one embodiment, resizing of the unit type 835 or any component, such as the video being played within the unit type 835, such as the chrome tooltip, may be handled by a JavaScript function.

Still referring to FIG. 8E, this embodiment of the unit type also includes a tail 845 that points to a keyword of web page 517. In this embodiment, the tail 845 is located on the lower end of the unit type 835 and towards the left corner, though offset from the corner itself. In some embodiments, placement of the tail 845 is dependent on the location of the augmented keyword, also referred to as the hooked keyword. For example, tail 845 may be placed on a top right corner in order to ensure that the tooltip 550 points to the keyword and is still displayed within the user's screen. Placement of the tooltip 550 may be determined based on the placement of the keyword within the web page or the screen of the user. Similarly, tail 845 may be placed anywhere on the outer edge of the tooltip 550 such that the tooltip may be positioned clearly on the user's screen. Placement of the tail 845 and unit type 835 may be based on the location of the keyword. Therefore, unit type 835 and tail 845 positioning may be calculated in real time and adjusted should the keyword location within the screen change.

Upon a user mouse-over on a keyword of web page 517 a tooltip 550 may appear. The tooltip 550 may include a design and functionality elements such as a word in the top right hand corner next to the close button informing them what the unit is about, such as for example an advertisement. Also a "learn more" or a "what is this?" button may be included which may be used to explain to the user what tooltip 550 is and what the privacy policy of the publisher or the advertisement network is. In some embodiments, a 'Close' button is included for closing the tooltip. The media block 815, such as an animation or movie, may automatically load and display. The tail 845 may point to the keyword, so that the user is able to see the relevance between the keyword and the tooltip 550. Additionally, the keyword may be highlighted for a duration of time so that the tooltip 550 is visible, further increasing the relevancy connection between the keyword and tooltip.

Upon a mouse off, the tooltip 550 may shrink back towards the keyword, thus also emphasizing the keyword/tooltip association. Upon the mouse over, the keyword may revert back to its original state, so that it is no longer highlighted and indicated as the keyword. If a tooltip 550 is present, the keyword may be modified to be displayed in a particular color. The tooltip tail 845 may also include a same or a similar color. In some embodiments, the tail 845 may be colored in any color based on the configuration.

Figure 8F:
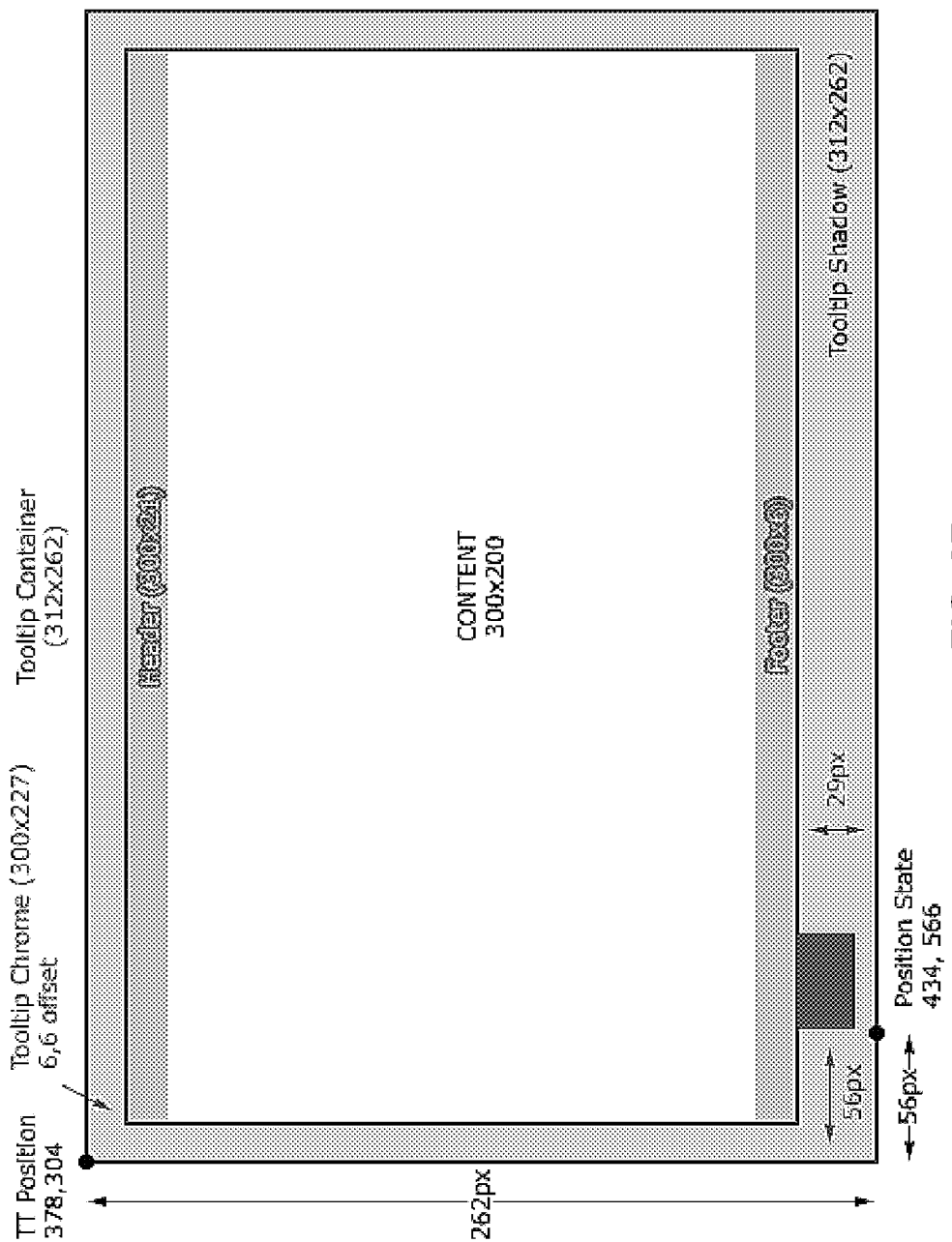
FIG. 8F is a diagram of another embodiment of a tooltip comprised within the unit type created by the development tool.

Referring now to FIG. 8F, another embodiment of unit type 835 is illustrated. FIG. 8F also presents a tooltip 550 positioning based on tooltip container. In some embodiments, position of the unit type 835 or the tooltip 550 on the display screen depends on the container offset settings. The offset settings may be based on where the tooltip tail 845 is in relation to a corner of the tooltip 550. This offset may be based on the corner that is nearest to the tooltip tail 845. FIG. 8F illustrates position state of the tail 845 as well as the number of the pixels from the nearest corner, which is the lower left corner of the tooltip 550. Tooltip 550 further is surrounded by tooltip shadow and is positioned within a tooltip container. This particular embodiment includes sizes in pixel for each of the unit type 835 components. The height of the tooltip 550 may be 262 pixels. The offset distance of the tail 845 from the lower left corner may be 56 pixels. The width of the tooltip shadow may be 29 pixels. Header 841 may have a size of 300 pixels by 21 pixels. Footer 842 may have a size of 300 pixels by 6 pixels. Content of tooltip 550 may be positioned within an area of 300 pixels by 200 pixels.

Figure 8G:
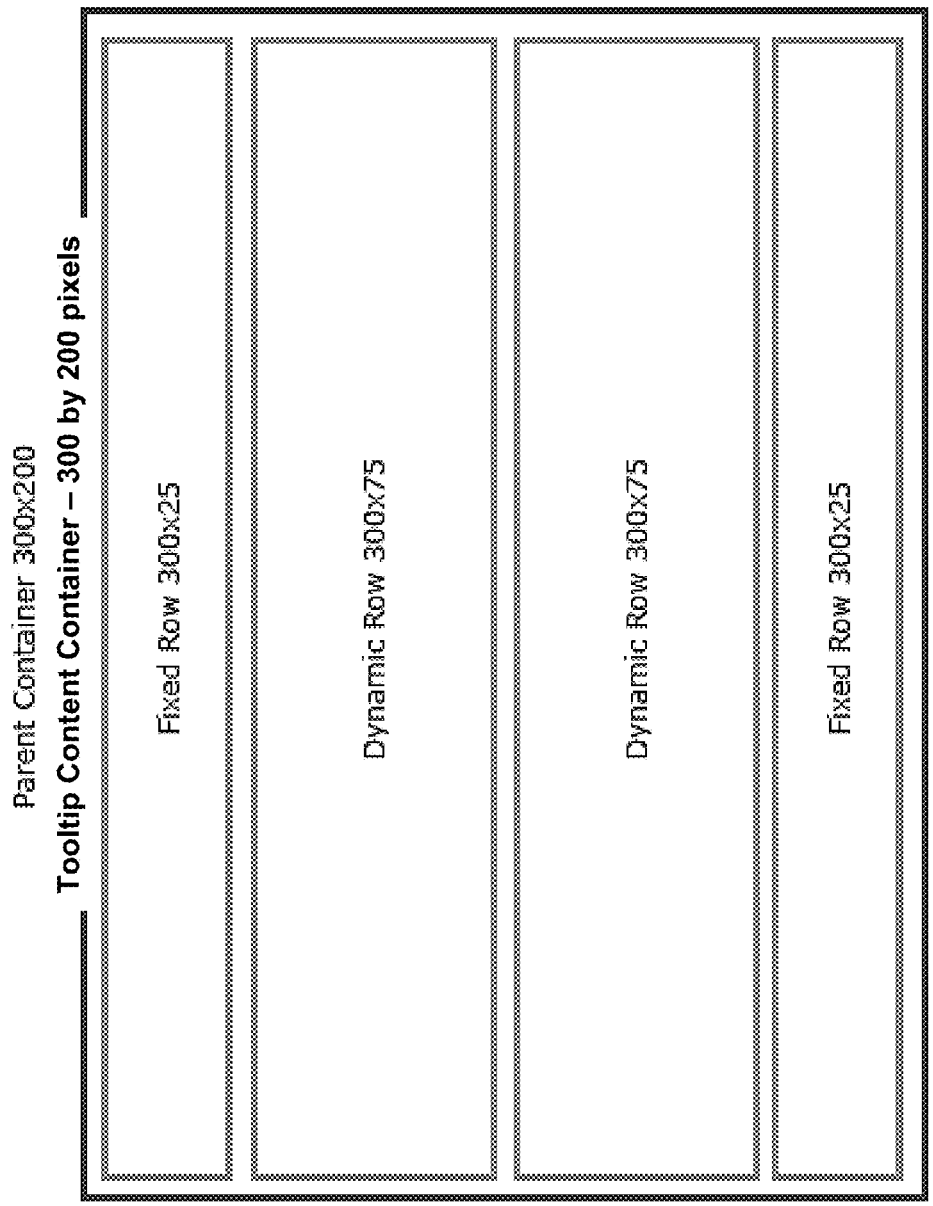
FIGS. 8G and 8H are embodiments of the tooltip content container of the unit type.
Figure 8H:
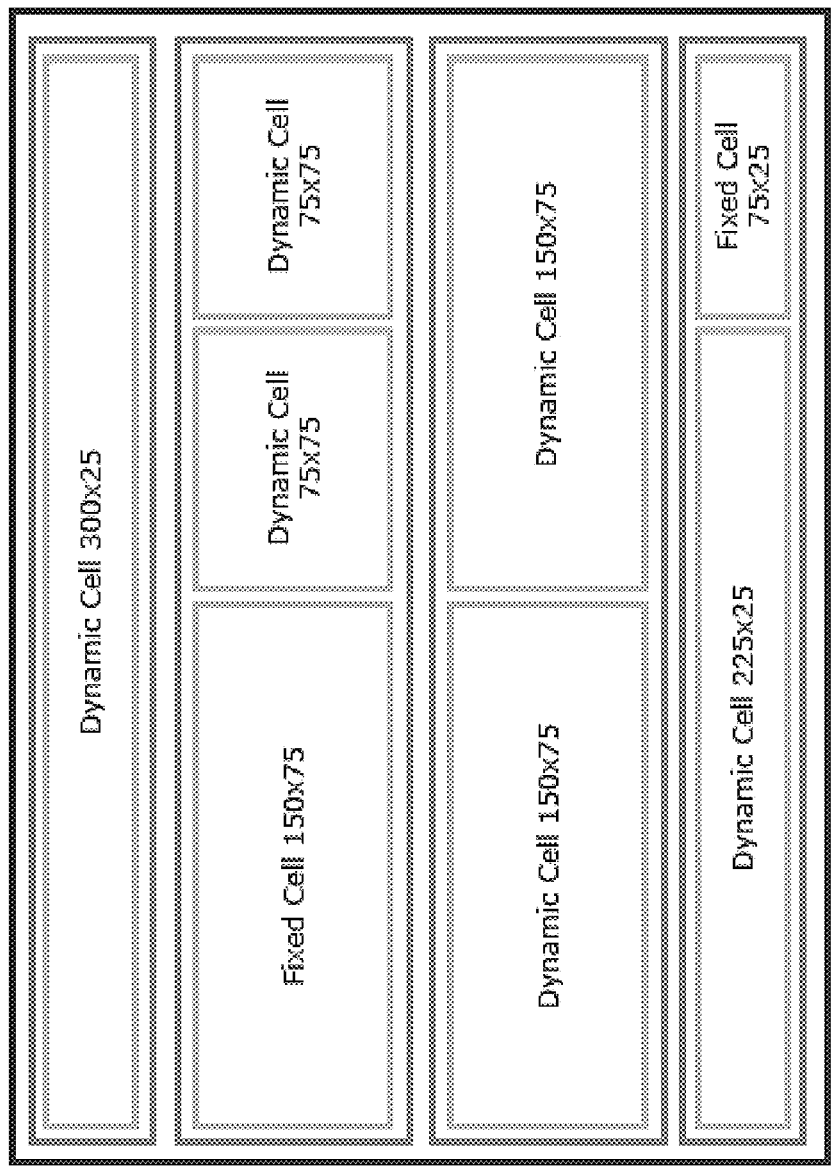

Referring now to FIGS. 8G and 8H, embodiments of tooltip 550 containers for storing content are illustrated. FIG. 8H illustrates container of a tooltip content having rows and cells. The container of the content comprises a width of 300 pixels and height of 200 pixels. The container includes fixed rows having fixed height and width and dynamic rows having dynamic height and fixed width. Layouts of unit type templates 810 may be implemented using object based approach. In some embodiments, block elements may be used to populate the template instead of the tables. A layout algorithm may be implemented using JSON code and DOM elements to mimic the behavior of HTML tables. Row and cell objects may be used to store media blocks 815.

Rows may be a container for storing other contents. Rows may include cell objects. The width of a row may be up to a 100% of the parent container width. In some embodiments, the width of the row is the total width of its child cells included within the row. In further embodiments, the width of the row is whichever is bigger of the 100% parent container width of the child cell's width. The height of the row may either be a fixed height or it may be set to whatever height is left available in the parent container. The layout algorithm may work out the total height of all the fixed height rows, and then divide the remaining space up equally between any dynamic height rows as illustrated in FIG. 8G.

FIG. 8H illustrates an embodiment of a tooltip content container comprising same rows as in FIG. 8G, but further comprising cells located within rows. Cell objects may include a number of objects or media block 815. A cell's height may be determined based on the height of the child objects or media blocks 815 stored within the cells. Cells may have a height determined based on the height of its parent container. The width of a cell like the height of a row, may either by dynamic or fixed. When the width of a cell is dynamic, the width of the cell may be calculated by sharing the remaining space of its parent with other dynamic cells of the same row.

Figure 8I:
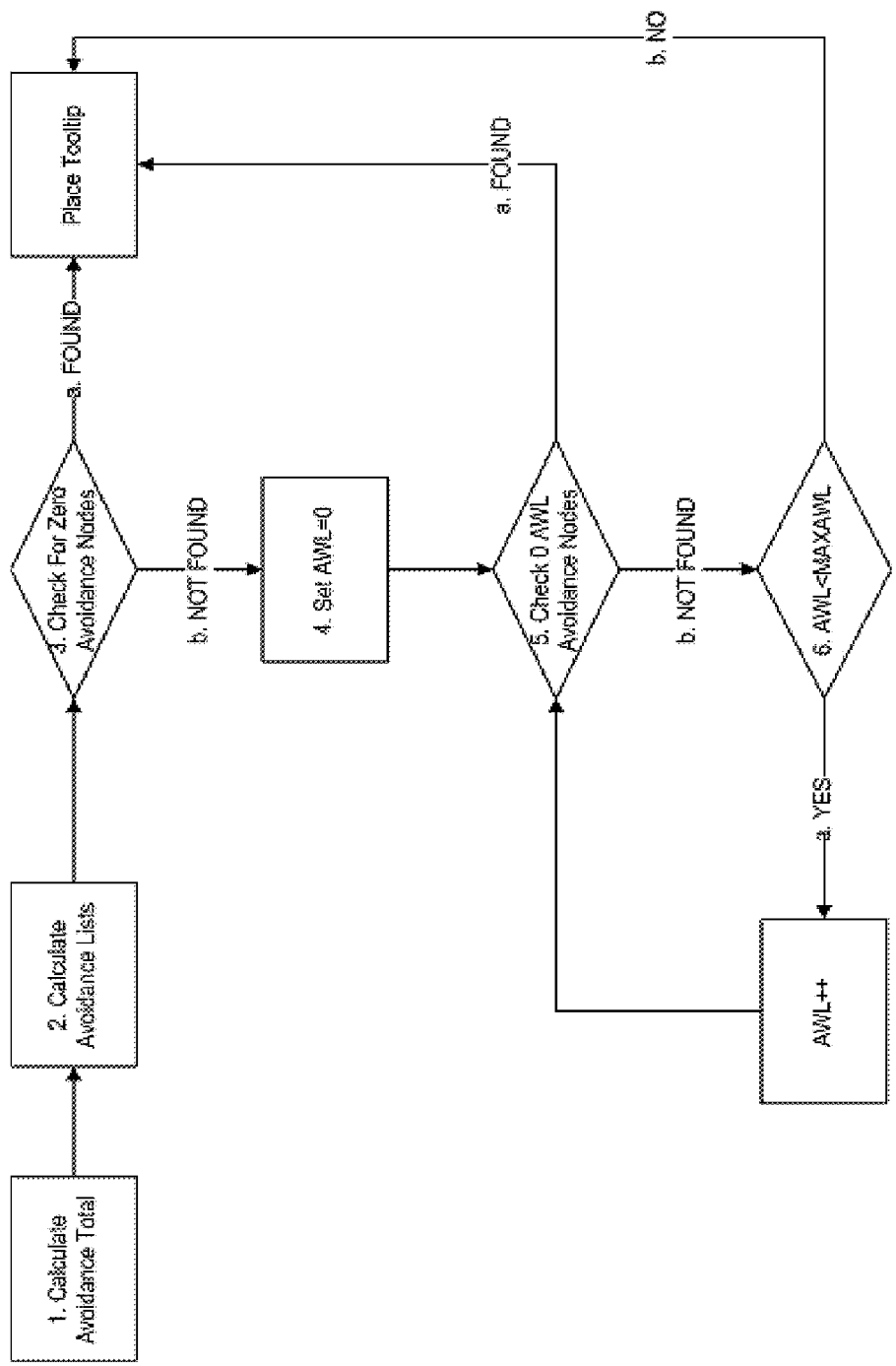
FIG. 8I is a flow diagram of an embodiment of a method for determining placement of the unit type.
Figure 8J:
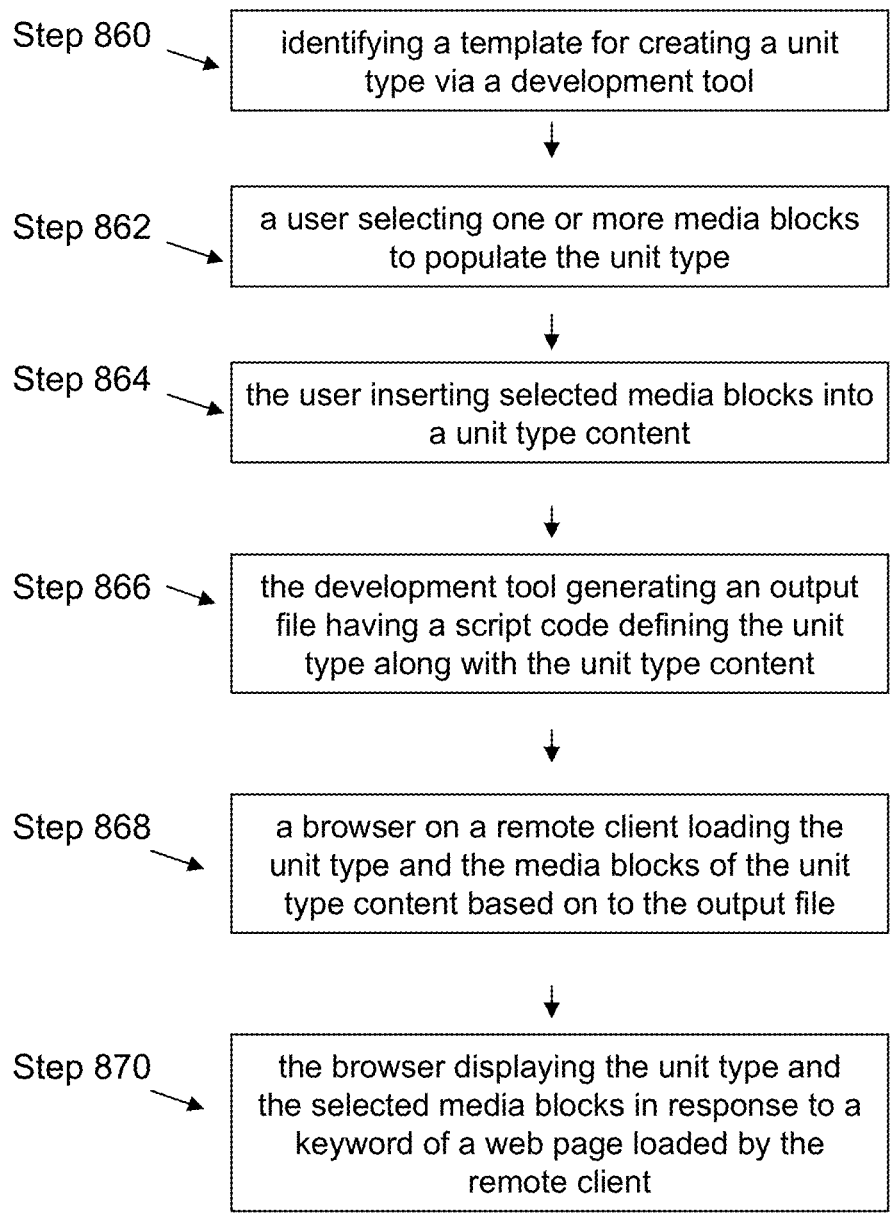
FIG. 8J is a flow diagram of an embodiment of a method for creating a unit type using the development tool.

Referring now to FIG. 8I, an embodiment of an algorithm for positioning a unit type 835 and a tail 845 within a client computer 130 screen is illustrated. Unit type 835 and/or tooltip 550 may be positioned within the client's screen in relation to a hooked word in web page 517. In one example, the hooked keyword may be located in the top right corner of the screen. The tooltip 550 of the unit type 835 may, in such instances, be placed below and to the left of the hooked keyword. Tail 845 of the tooltip 550 may be placed on the towards the top right side of the unit type 835 and pointed to the hooked keyword. Similarly, arrangement and placement of both, the unit type 835 and tail 845 of the tooltip 550 may vary based on the location of the hooked keyword.

In some embodiments, there are multiple set locations with respect to the hooked keyword in which unit type 835 may be located. In one embodiment, unit type 835 is positioned above and to the right of the hooked keyword. In one embodiment, unit type 835 is positioned above and to the left of the hooked keyword. In one embodiment, unit type 835 is positioned below and to the right of the hooked keyword. In one embodiment, unit type 835 is positioned below and to the left of the hooked keyword. Priority of different positions may be determined based on the content of the page 517. In some embodiments, position of the unit type 835 is determined based on the content that falls beneath each of the tooltip 550 positions. For example, when choosing the location in which to display the unit type 835, unit type 835 may be positioned to the right and above of the hooked keyword in response to a determination that a movie content, a flash content or a graphical content would be blocked if the unit type 835 was positioned differently.

Tooltip positioning algorithm illustrated by FIG. 8I may take in consideration four different locations of the tooltip 550 of the unit type 835, such as the top left, top right, bottom left and bottom right positions with respect to the keyword. The tooltip positioning algorithm may decide if the content which the tooltip would block is an area of the web page 517 to avoid displaying the tooltip on. If the area of the web page 517 is determined to be avoided, then the next position for placing the tooltip 550 is sought. The areas determined to be avoided may be referred to as the avoidance nodes. Tooltip positioning algorithm may be comprised within the development tool 800. Tooltip positioning algorithm may determine, created and included into the output file 825 by the unit type generator 820. Tooltip positioning algorithm may be deployed together with the unit type 835 to the client 130 and be loaded and used while displaying unit type 835 on the client computer 130.

Because this embodiment of the tooltip positioning algorithm picks only from four positions within which the unit type 835 may be displayed, there is a possibility that all four choices may be undesirable. In order to resolve any conflicts, a weight may be assigned to each of the avoidance nodes. The weight of the avoidance nodes may indicate which areas are more important to avoid than others. For example, areas with iframes, flash movies, videos or graphical content may be more important to avoid than text. In other embodiments, text is more important to avoid than a picture. An avoidance list may be used to indicate the criteria for assigning the weight and avoiding areas. The avoidance list may include a description of a node to avoid, such as an area or a particular content and the importance weight to be assigned to any such node.

Tooltip positioning algorithm may operate in accordance with a set of steps. In one step, a tooltip positioning algorithm may calculate the avoidance total for each position state. In another step, a tooltip positioning algorithm may also calculate a list of avoidance nodes for each position state. In yet another step, tooltip positioning algorithm checks each position state for zero avoidance nodes or nodes on which the tooltip 550 may be displayed freely without any avoidance weight. If a position state with zero avoidance node is found, tooltip 550 is placed within such area. If no position state with zero nodes is found, tooltip positioning algorithm may set avoidance weight level (AWL) to 0. Tooltip positioning algorithm may check each position state for zero avoidance nodes that have avoidance weight equal to the AWL. If a position state is found to satisfy such request, tooltip 550 may be placed. If a position is not found, tooltip positioning algorithm may check for other possibilities. Other possibilities may include locations which should be avoided or have an assigned weight of avoidance, but which are weighted less than other locations which should also be avoided. In such instances, an area that is weighted least may be picked as the area in which the tooltip 550 will be placed.

In instances in which there are no available areas within which the tooltip may be placed, a determination may be made of whether or not the AWL is equal to max avoidance weight. In some embodiments, the tooltip 550 may be simply placed above and to the right of the hooked keyword. In other embodiments, a determination is made whether or not an AWL for a particular position is smaller than the maximum avoidance weight of all possible locations within which the tooltip 550 may be placed. If such AWL for a position is found to be smaller than the maximum avoidance weight, a determination may be made to see if any other position state has a weight of avoidance that is smaller than the AWL. If such a position is found, then the location with least important content to cover with tooltip 550 is identified and the tooltip 550 may be placed in this location. If no preferred location is found, tooltip 550 may be placed above and to the right of the keyword.

Avoidance list identify nodes to be avoided while positioning the tooltip 550 or unit type 835. Avoidance list may identify which contents to avoid and what weight to assign to each content in order to determine which content should be avoided more than other. In one embodiment, iframe may be identified as an area to avoid. In another embodiment, an object or an embed tag comprising media or flash movies may be avoided. In further embodiments, avoidance list identifies script parameters or contents to avoid. Object to avoid may also include or be associated with rules, instructions, tags or names that may be used by the tooltip positioning algorithm.

Referring now to FIG. 8K, an embodiment of steps for creating, via a development tool, a unit type for display on a web page responsive to a keyword on the web page is illustrated. At step 860, a unit type template 810 for creating a unit type 835 is identified via a development tool 800. At step 862, a user of the development tool 800 may select one or more media blocks 815 to populate the unit type 835. At step 864, the user may insert selected media blocks 815 into unit type 835 content. At step 866, the development tool 800 may generate an output file 825 comprising a script code that defines the unit type 835 along with the unit type content. At step 868, a browser 515 on a remote client 130 may load the unit type 835 along with the selected media blocks 815 of the unit type content based on the output file 825. At step 870, the browser 515 may display the unit type 835 along with the selected media blocks 815 in response to a keyword of a web page 517 loaded by the remote client 130.

At step 860, a user or a designer of a unit type 835 may identify, via a development tool 800, any unit type template 810 to create a new, predetermined or customized unit type 835. In some embodiments, a user identifies a unit type template that includes a tooltip 550 for augmenting a keyword on a web page 517. In further embodiments, the user identifies the unit type template 810 comprising tooltip 550 having a predetermined set of design and functional elements. The predetermined set of design and functional elements may comprise a particular number of cells, rows or columns, a particular number size or shape of tooltip 550 or a particular functionality or feature of the tooltip 550. The predetermined set of design and functional elements may include a function of the tooltip 550 such as a dynamic size of a cell, row or a column or a dynamic or changeable shape of a cell row or column. In some embodiments, the predetermined set of design and functional elements includes a predetermined settings, order or layout of tooltip 550 components, such as the header 841, footer 842, side bars 843, sliding windows 844 and/or tail 845. In other embodiments, the predetermined set of design and functional elements includes a particular number of cells, rows and/or columns defined within a content comprising portion of the unit type template 810. In some embodiments, the user creates, via the development tool, the unit type 835 based on a unit type template 810 selected from a plurality of unit type templates 810.

At step 862, the user may select any type and form of content to insert into the unit type template 810 or the unit type 835. In some embodiments, the user select, via the development tool, a media block 815 to add to the unit type. The user may select a generic media block 815 or a media block 815 customized for a particular feature, such as an advertisement, video or a flash movie. In some embodiments, the user selects a media block 815 comprising a text, a portion of a web page or a link to a web page. The user may select, via the development tool, an advertisement footer component to add to the unit type. The advertisement footer component may comprise a media block 815 designed to fit within footer 815 of the tooltip 550. In further embodiments, the user selects, via the development tool, the media block 815 that includes a video media, an audio media or a hyperlink to a web page. The user may select any number of media blocks 815 to populate into any number of cells of the unit type template 810 or unit type 835.

At step 864, the user may insert selected media blocks 815 into any portion of unit type template 810, such as to create a new unit type 835. As the unit type template 810 is populated and/or modified by the user, the unit type template 810 may become a customized unit type 835. In some embodiments, the user drags and drops the selected media block 815 into a cell, row or a column of the unit type template 810 via a user interface of the development tool 800. In further embodiments, the user drags and drops a plurality of media blocks 815 into a plurality of rows, columns and/or cells of the unit type template 810 or unit type 835. In further embodiments, the user drags and drops a plurality of selected media blocks 815 into a single cell, a single row or a single column of the unit type template 810 or unit type 835. The user may place, via the development tool, the media block component into a cell in a design layout of the unit type 835. In some embodiments, the user arranges, via the development tool, a location of the media block component and one or more text block components in a design layout of the unit type. In further embodiments, the user modifies the computer executable code corresponding to the unit type template 810 or the unit type 835. In still further embodiments, the user edits, reshapes, enables or disables any of the unit type 835 components, such as a header 841, a footer 842, a side bar 843, a tail 845 or a sliding window 844. In yet further embodiments, the user includes, excludes or modifies events for performing particular actions of the unit type 835. In yet further embodiments, the user includes a functionality of another unit type template 810 into the unit type 835.

At step 866, the development tool 800 generates an output file defining the unit type 835 along with the contents included into the unit type 835. In some embodiments, a unit type generator 820 generates the output file. In further embodiments, the output file is generated to include the script code defining the layout of the unit type. The layout of the unit type may include a set of cells and rows within a predetermined sized container. In some embodiments, the layout includes one or more cells. In other embodiments, the layout includes one or more rows. In further embodiments, the layout includes one or more columns. In still further embodiments, the layout includes a combination of cells, rows and/or columns. Media blocks 815 may be comprised within each of the cells of the set of rows and cells. In some embodiments, a plurality of media blocks 815 is comprised within a single cell. In further embodiments, a plurality of media blocks 815 is comprised within a row of the set of cells and rows. The script code of the output file may provide execution direction for rendering media of the media block component while displaying the unit type. In some embodiments, the development tool creates a file for the unit type 835. The file may comprise the generated script code corresponding to the unit type 835. In further embodiments, the output file comprising the script code to define properties of the tooltip 550 is generated. In yet further embodiments, the script code to include functions for the media blocks 815 is generated.

At step 868, a browser 515 on a client 130 may load the unit type 835 along with media blocks 815 of the unit type content based on the output file. In some embodiments, the agent of the browser receives the output file 825 and based on the script corresponding to the unit type 835 loads, creates or recreates the unit type 835. In further embodiments, the agent and/or browser creates the layout of the unit type defined by the set of cells and rows within a predetermined sized container. In further embodiments, the agent and/or browser creates or acquires the selected media blocks 815 that are placed in the cell, row or column of the unit type 835. The agent and/or browser may receive the media blocks 815 from the server 110 and repopulate the unit type 815 using the selected media blocks 815. The agent and/or browser may load and prepare the unit type for display in response to the script code providing execution direction for rendering media of the media block component while displaying the unit type. The agent and/or browser may also load the media blocks 815 and prepare for displaying the media blocks within the designated portions of the unit type 835.

At step 870, the browser 515, such as via agent, may display the unit type 835 and the selected media blocks 815 in response to a keyword of a web page 517 loaded by the client 130. In some embodiments, the client 130 loads a web page 517 comprising a keyword. The keyword may be augmented and in response to a mouse-over the augmented keyword by the viewer, the browser may display the unit type 835. The unit type 835 displayed on the client 130 screen may include the selected media blocks 815 inserted into the content of the unit type 835 or the unit type template 810 used to create the unit type 835. In some embodiments, the browser displays the unit type 835 comprising the media blocks 815 located within cells, rows and/or columns as inserted by the user at step 864. In further embodiments, the browser displays unit type 835 comprising each feature, media block 815, content or functionality as prepared, described or defined by the user at step 864. The browser 515 may display the unit type 835, such that a tail 845 of the unit type 835 points at the augmented keyword in response to which the unit type 835 is displayed. In some embodiments, the tail 845 is moved to a different portion of the unit type 835 in response to identification of the avoidance node on the web page 517. In further embodiments, unit type 835 is displayed over a portion of the web page 517 that does not include an avoidance zone in order to avoid displaying the unit type 835 over the avoidance zone. Unit type 835 may be displayed over a portion of the web page 517 having a lower avoidance zone weight in order to avoid displaying of the unit type 835 over the portion of the web page 517 having a higher avoidance zone weight.

F. Systems and Methods for Pixel Rules Based Campaign Retargeting

Retargeting may be used as a way of targeting campaigns to users based on the behavioral information already available about the users being targeted. One way to retarget the campaigns to the users may be via pixels a user was marked with, which may also be combined with the keywords the user has previously been exposed to.

Marking a user with a pixel, or pixelling a user, also known as beaconing, may involve inserting one or more cookies on a user's browser following a particular event such as visiting a page, viewing or clicking on a particular advertisement. The pixel, making a pixel call, may be implemented as a 1×1 image or a script block. Such an image or a script of the pixel may cause the user's browser to make requests to a web server at which point the user may be recognized as a pixelled user by a retargeting system. When a user is pixelled, the user's browser may be inclusive of multiple pixels, which may come from any number of different networks, campaigns or exchange networks, whether the host enterprise's exchange network or the third party network. This way of pixelling may allow for retargeting of the user on the campaign provider's own network ("on-network"), such as via the systems described herein, as well as on other third party networks ("off-network").

One aspect of pixel rules based campaign retargeting may comprise relying on a third party's retargeting capabilities or features to implement retargeting. In one example, a campaign, such as an Epson campaign for example, may provide retargeting capability via a third party enterprise. In such an example, the campaign may be hosted or served via a third party exchange network, such as the Right Media Exchange network. In this embodiment, a host network or enterprise may ask the third party enterprise to provide the host enterprise with a number of tracking pixels which then can be forwarded to a customer such as Epson or the campaign of this customer company, in order to put on their website. The host enterprise may book some of the Epson campaign's inventory with third party enterprise in order to target at users with those pixels. This may be referred to as off-network retargeting as it utilizes a third party retargeting exchange network and capability to provide the retargeting services.

In one embodiment, a campaign manager may utilize the ability to include a pixel retargeting feature into the targeting mix for a set, such as a set of rules for determining the most appropriate campaign for a specific user. A development tool, such as a campaign management system tool or a development tool 800 may be modified to include a retargeting interface, which may be also referred to as the Pixel Retargeting Manager interface. In order for a campaign to be retargeted to pixels, there may be a way of creating, editing and managing the pixel features and details. In such embodiments, a development tool, such as development tool 800, may include a pixel management interface, which may be referred to as the Pixel Manager interface. In order for pixels to be dropped or delivered to users' machines, a component or a web tier that will service those pixel requests may be implemented. Such component may be referred to as the Pixel Servlet. When advertisements to serve to a user are chosen based on the pixel rules, the Ad Server platform may include pixel retargeting into its decision tree. These changes may occur or be implemented in a Campaign Level Relevancy algorithm (CLR), such as executed by a campaign selection engine, and these changes may be referred to as the CLR Changes.

Figure 9A:
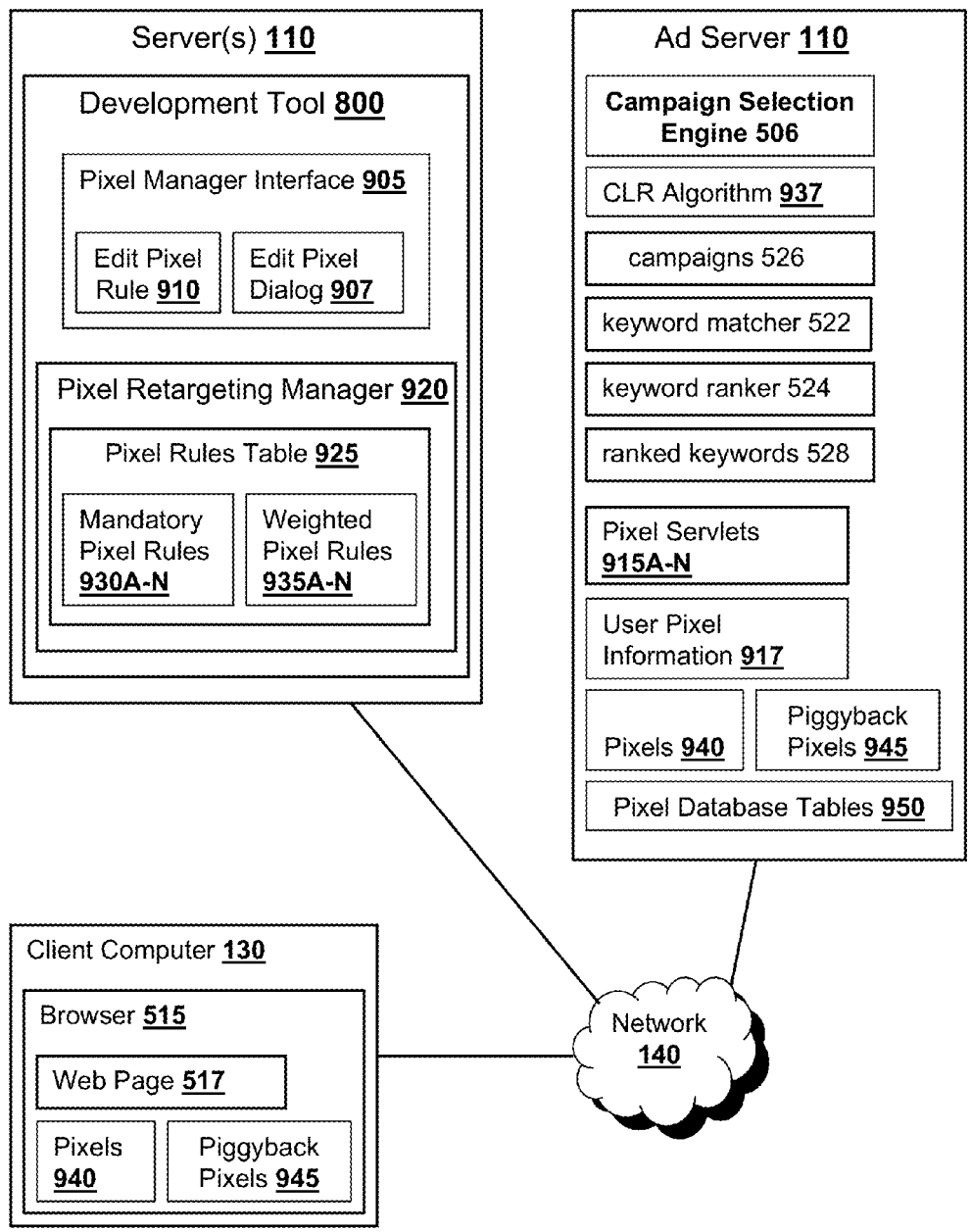

Referring now to FIG. 9A, an embodiment of a system for pixel rule based campaign retargeting is illustrated. In brief overview, a server 110, an ad server 110 and a client computer 130 are in communication via network 140. Server 110 includes a development tool 800 which further includes a pixel manager interface 905. The pixel manager interface may include an edit pixel rule 910 and an edit pixel dialog 907. Development tool 800 also includes pixel retargeting manger 920 comprising a pixel rules table 925. Pixel rules table 925 may include mandatory pixel rules 930A-N and weighted pixel rules 935A-N. Ad server 110, communicating with server 110 via network 140, may include a CLR algorithm 937, campaign selection engine 506, campaigns 526, keyword matcher 522, keyword ranker 524 and ranked keywords 528. Ad server 110 may also comprise pixel servlets 915A-N, user pixel information 917, pixels 940, piggyback pixels 945 and a pixel database tables 950. Campaign selection engine 506 may use any of the pixels 940 and 945, pixel database tables 950, pixel servlets 915 and CLR algorithm 935 to select campaigns 526 for a user based on keywords and user pixel information. Across the network 140, the client computer 130 may comprise a browser 515 having a web page 517 and one or more pixels 940 and one or more piggyback pixels 945. The user operating the browser 515 on the client computer 130 may be considered pixelled as pixels 940 and piggyback pixels 945 are tracked for the user.

In one aspect, the system illustrated by FIG. 9A corresponds to an embodiment of the present disclosure in which calls transferred between the pixels on the client machine and the servers are used to identify the pixels on the client machine. As the client computer 130, server 110 and the ad server 110 may exchange any communication between each other, the ad server 110 may use the information identifying pixels 940 or 945 on the client machine 130 to apply the rules of these specific client residing pixels 940 to identify campaigns to be presented to the user, such as via the browser 515. As a result, advertisements, web pages or any other content determined to be of potential interest to the user may be identified and served to the client based on the rules corresponding to the pixels 940 on the client machine which may be used to identify the particular campaigns having content of interest to the client.

In further overview, development tool 800 in addition to the aforementioned features, may further comprise any hardware or a combination of hardware and software for configuring pixels and pixel rules to be used in selection of campaigns to be provided to a client based on pixels 940. Development tool may include any features, functions, algorithms, executables, libraries or logic for implementing functions and/or making determinations based on one or more pixels 940. Development tool 800 may comprise any features, functions or algorithms for pixel based campaign retargeting to clients, such as pixel manager interface 905 and a pixel retargeting manager 920. Development tool 800 may include dialogs, windows, user interfaces and databases to enable a user of the development tool to create and manage any pixel rules based campaign targeting features. Development tool 800 may comprise any functionality to access, utilize, edit, run and/or manage any component operating on the remote ad server 110, such as the CLR algorithm 937, pixel servlets 915, user pixel information 917, pixels 940 and 945, pixel database tables 950 and the campaign selection engine 506. Development tool 800 may thus enable a user of the development tool to implement pixel design and management, pixel rules design and management, pixelled users database information editing, tracking or writing, CLR algorithm 937 editing and management, as well as access and full control of any information corresponding to pixels, pixel rules and the users being labeled with particular pixels.

Pixel manager interface 905 may include any software, hardware or a combination of software and hardware to provide an interface for a user to access, view, edit and/or manage any feature or component of a pixel 940 of piggyback pixel 945. Pixel manager interface 905 may include a dialog, a window, an input or output feature, an editing tool or any function enabling a user to edit, manage or control a pixel, such as pixel 940 or piggyback pixel 945. Pixel manager interface 905 may provide any functionality for a user to edit a pixel or edit a pixel rule. Pixel manager interface 905 may include an edit pixel rule dialog or function, such as edit pixel rule 910 and/or edit pixel dialog 907. Pixel manager interface 905 may include a pixel's relation to different rules as well as different associated campaigns. Pixel manager interface 905 may display information regarding a particular pixel and a campaign that is the owner of the pixel, as well as any piggyback pixels 945 associated with the pixel.

Edit pixel rule 910 may include any software, hardware or a combination of software and hardware to enable a user to edit a pixel rule, such as mandatory pixel rule 930 or weighted pixel rule 935. Edit pixel rule 910, also referred to as edit pixel rule dialog, may include a dialog window for editing a rule for a pixel 940 or piggyback pixel 945. Edit pixel rule 910 may include any feature for accessing, editing and/or managing one or more rules corresponding to a pixel, or one or more pixels corresponding to a rule. Edit pixel rule 910 may include a functionality for a user to choose or select a weight for a pixel rule and a cap for a pixel rule. Edit pixel rule 910 may enable the user of the tool to set the features of a rule, such as whether the rule must enforce a restriction or a condition, whether a rule is mandatory or weighted, the weight of the rule, and manage the association or tie of a particular rule to a specific pixel.

Edit pixel dialog 907 may include any software, hardware or a combination of software and hardware for editing a pixel 940 or a pixel 945. Edit pixel dialog 907 may include any functionality for accessing, editing and/or managing any pixel 940 or piggyback pixel 945 via a user interface. Edit pixel dialog may comprise a setting for visibility in which the user of the dialog may set a visibility for a particular pixel or pixel rule as specific to a campaign, an advertiser, an agency or as a global rule. In some embodiments, edit pixel dialog 907 includes a description, a category and an expiration time after which the pixel is considered expired. Edit pixel dialog 907 may specify one or more piggyback pixels 945 associated with a particular pixel.

Pixel retargeting manager 920 may comprise any software, hardware or a combination of software and hardware to provide a user interface to development tool 800. Pixel retargeting manager may include an interface for the user to edit, manage or modify pixels, pixel rules, relations between the pixels and other pixels, relations between the pixels and the pixel rules, as well as relations between particular pixels, pixel rules and campaigns. Pixel retargeting manager 920 may comprise any dialog, window, input and output feature, editing tool or any function enabling a user to edit, manage or use any feature of the development tool 800. Pixel retargeting manager 920 may enable a user of the tool to configure and manage pixel rules, such as the mandatory pixel rules 930A-N and/or weighted pixel rules 935A-N, with respect to a particular campaign or agency. Pixel retargeting manager 920 may enable the user to access any pixel and pixel rule related features via dialogs and links and specify terms and/or settings for any specific set of pixel rule or pixels as needed for the use of a particular campaign. Pixel retargeting manager 920 may include links and references to other features and functions of the development tool 800, such as the features and functions for accessing and managing pixels 940, piggyback pixels 945, pixel database tables 950, CLR algorithm 937, pixel rules table 925 or any other features of pixel retargeting manager 920. Pixel retargeting manager interface 900 may also enable a user to edit or manage any functions of user pixel information 917, pixel servlets 915A-N or pixel manager interface 905. Pixel retargeting manager 920 may include the functionality for the user to access user pixel information 917, pixel servlets 915 or any other component of development tool 800.

Pixel rules table 925 may include any type of table, file or a formatted unit within which data may be stored. Pixel rules table 925 may include columns and rows for storing information regarding pixels 940, piggyback pixels 945 as well as pixel rules 930A-N and 935A-N. Pixel rules table 925 may comprise functionality for storing pixel and pixel rules related information. Pixel rules table 925 may include any functionality for editing the pixels and the pixel rules 930 and 935. Pixel rules table may include any number of pixel rules 930 and 935 along with any related information, such as the type of the rule, description of the rule, parameters regarding the rules or any other information used by the pixel retargeting manager 920 to identify campaigns for a user.

Mandatory pixel rules 930A-N may include any type of rule, policy or a logic for evaluating or determining a validity of a particular campaign for a user having a pixel 940 or 945. Mandatory pixel rules 930 may include any software, hardware or a combination of software and hardware. In some embodiments, mandatory pixel rules include policies, logic or rules for determining if a particular pixel associated campaign is suitable for a user. Mandatory pixel rule 930 may include a rule which produces a binary response, such as a yes or a no. In some embodiments, mandatory pixel rule 930 comprises a rule, a policy or a logic which may produces a 1 or a 0 output, a true or false output or any binary level output. Mandatory rules 930 may include logic, policies or rules which produce any number of responses, such as more than two responses. Mandatory rules 930 may include rules and logic which must be satisfied for a particular pixel, in order for the campaign associated with this pixel to be further considered. In some embodiments, mandatory rules include rules and logic which must not be satisfied in order for a particular campaign associated with this pixel to be further considered.

Weighted pixel rules 935A-N may include any type of rule, policy or a logic for evaluating or determining a validity of a particular campaign for a user having a pixel based on weights assigned to particular pixels. Weighted pixel rules 935 may include any software, hardware or a combination of software and hardware. Weighted pixel rules 935 may include a weight with which the pixel 940 or 945 is weighted when considered or evaluated by the pixel retargeting manager or CLR algorithm 937. In some embodiments, weighted pixel rules include policies, logic or rules for determining if a particular pixel associated campaign is suitable for a user on a client computer 130 based on a weight assigned to this pixel rule. Weighted pixel rules 935 may include positive or negative weights and may have positive or negative impact when considering a campaign for a particular user based on the pixel on the user's client machine. Weighted pixel rule 935 may include a rule which produces a weighted response. For example a response or evaluation of weighted pixel rule 935A may be more or less valued than a response of a weighted pixel response 935B.

Located at any server or ad server 110, the campaign selection engine, in addition to aforementioned features and embodiments may also include any functionality for identifying a campaign for a user based on one or more pixels 940/945 and/or pixel rules 930/935. Campaign selection engine 506 may include logic, functions, algorithms, processors and tools for determining or selecting a most suitable campaign for a user based on a pixel rule 930/935 or a set of pixel rules 930A-N/935A-N. Campaign selection engine 506 may include functionality to eliminate from consideration any one or more campaigns for a particular user based on evaluation of pixel rules 930-935 associated with pixels 940/945 with which the particular user was pixelled or labeled. Campaign selection engine 506 may be in communication with or have access to any of the pixel manager interface 905, pixel retargeting manager 920, CLR algorithm 937, pixel servlets 915A-N, user pixel information 917 pixels 940/945 and/or pixel database tables. Campaign selection engine 506 may determine, based on an information from a call of a particular pixel 940 or piggyback pixel 945 from a particular user, which set of pixel rules 930/935 to use in order to determine the most suitable campaign for the user. Campaign selection engine 506 may determine the most suitable campaign for the user in consideration of other determinations, such as the determinations based on keywords on the web pages accessed by the user.

Campaign Level Relevancy algorithm, also referred to as CLR algorithm 937 may include any software, hardware or a combination of software and hardware for determining or identifying the most appropriate campaign for a user based on rules of one or more pixels. Any embodiment of the campaign selection engine may implement any CLR embodiment to select campaign(s) from a plurality of campaigns in any embodiments described herein. CLR algorithm 937 may include any logic, processor, algorithm, function, executable or any other form of logical computer executable code for evaluating a campaign corresponding to a set of pixel rules. CLR algorithm 937 may include a series of logical steps via which campaigns associated with specific set of pixel rules 930 or 935 are graded and/or compared against other campaigns based on their set of pixel rules. CLR algorithm 937 may include any functionality for evaluating campaigns based on any number or combination of mandatory pixel rules 930 and weighted pixel rules 935. CLR algorithm 937 may use the pixel rules 930 and 935 to determine if one campaign is more appropriate for a user than another campaign based on the rules associated with the pixels 940 or 945 the particular user had on his/her web browser 515. CLR algorithm 937 may be activated based on an information from a call of a pixel 940 or 945 and may use this information to identify a campaign most suitable for a user based on the rules of this pixel 940. In some embodiments, CLR algorithm 937 is activated based on information from one or more calls of a plurality of pixels 940 and/or 945 and may use this information to identify a campaign most suitable for a user based on the rules corresponding to these pixels 940 and 945.

Pixel 940 and/or piggyback pixel 945 may include any software, hardware or a combination of hardware and software for storing, tracking or providing information about user behavior or preference. Pixels 940 and 945 may include any image, URL, script, script block, function, API, beacon, instructions or an executable t instruction to information, such as to server 110, about user activity, interactions, preference and/or user behavior on the client, server, network or otherwise. Pixels 940 and 945 may be loadable by a user's web browser 515 and may be loaded together with a web page 517 a user loads online. Pixels 940 and 945 may be incorporated in or otherwise referred by a web page. Pixels 940 and 945 may include any functionality for making a call to ad server 110. Pixels 940 and 945 may trigger evaluation by ad server 110 based on a set of rules corresponding to a given pixel 940 or 945. Pixels 940 and 945 may include a single pixel image and may be loaded along with a web page 517 a user loads and may send the calls to ad server 110 later when the ad server 110 serves a different content corresponding to the user. Pixel 940 and piggyback pixel 945 may be stored on client machines 130 and/or ad server 110 and may correspond to any number of pixel rules 930 and 935. Each pixel 940 or 945 may have any number or configuration of pixel rules 930A-N and 935A-N stored on the ad server 110. Pixels 940 and 945 may be owned by a campaign and the campaigns may be evaluated for the user based on the pixel rules 930A-N and 935A-N of the specific pixels.

Pixel database tables 950 may include any type and form of table, file, database or formatted storage for storing pixel 940 and pixel 945 related information. Pixel database tables 950 may include any number of rows and columns which may be used for storing or organizing any number of parameters, pixel rules 930 and 935, pixel rule descriptions, pixel descriptions, user descriptions or any other information that may be used by pixel retargeting manager 920 for identifying a campaign based on the set of pixel rules 930 and 935. Pixel database tables 950 may include information that relates a particular set of pixel rules 930/935 with a particular pixel 940 or 945 or a particular group or set of pixels 940/945. Pixel database table 950 may include information about users corresponding to one or more pixels, as well as the information relating a pixel to a pixel identifier, a rule to a pixel, or a rule to rule identifier. Pixel database table 950 may include be accessed by the campaign selection engine 506, pixel servlets 915 and/or pixel retargeting manager 920 as necessary, during the run-time, as the campaigns are selected for the users based on the pixel 940/945 calls received by either server 110 or ad server 110.

Pixel servlets 915A-N may comprise any software, hardware or a combination of software and hardware for marking or keeping track of a user whose browser 515 comprises a particular pixel 940 or 945. Pixel servlet 915 may include any functions, algorithms, databases or scripts that receive a call from a pixel 940 or 945 and store information regarding the call, the pixel 940 or 945 making the call or any other pixel related information. Pixel servlets 915 may be deployed on any number of network devices and may forward the pixelled user updated information to any central storage location. Pixel servlets 915 may store the updated information about a user based on the pixel calls into user pixel information 917 to be used by pixel retargeting manager 920.

User pixel information 917 may comprise any database, a table or a storage for storing information about users with respect to the pixels 940 or 945, pixel history of being pixeled. Pixel user information 917 may be a part of a greater overall user profile in which other user history or behavior may be stored or indicated. User pixel information 917 may include pixel and pixel rules specific user information, but may also include other user behavioral information, such as the keywords associated with the user or other information that may be used by the campaign selection engine 506 to identify the most appropriate campaign for the user. User pixel information 917 may include information about any pixel 940 or 945 call made to ad server 110 or any other network device. User pixel information 917 may include the history of the user's behavior based on the pixels 940 or 945. User pixel information 917 may include references to other information files for the particular user. User pixel information 917 may exist for each user individually, or may be organized to comprise all information for all the users. In addition to the pixels 940/945 corresponding to the user or pixel rules 930/935 corresponding to the user, user pixel information 917 may include any number of user related information such as for example the keywords, content or any other behavioral information corresponding to the user. User pixel information 917 may be regularly updated, either periodically or in response to any new call from a pixel of the user being made.

Pixel Retargeting Manager 900

The development tool may be modified to include a "Pixel Retargeting" button in the set targeting options. Clicking this button may bring up the Pixel Retargeting Manager interface wherein the retargeting for the current set can be configured. The pixel retargeting configuration for a set may comprise a set of pixel rules wherein each set may have zero or more rules and wherein each rule may be associated with one set. These pixel-based rules may be stored in a table, such as a PixelRules table, where they can be organized in a configuration of one per rule. In one example, if any rules exist then there may be one row in the PixelRuleSets table for each particular rule.

Figure 9B:
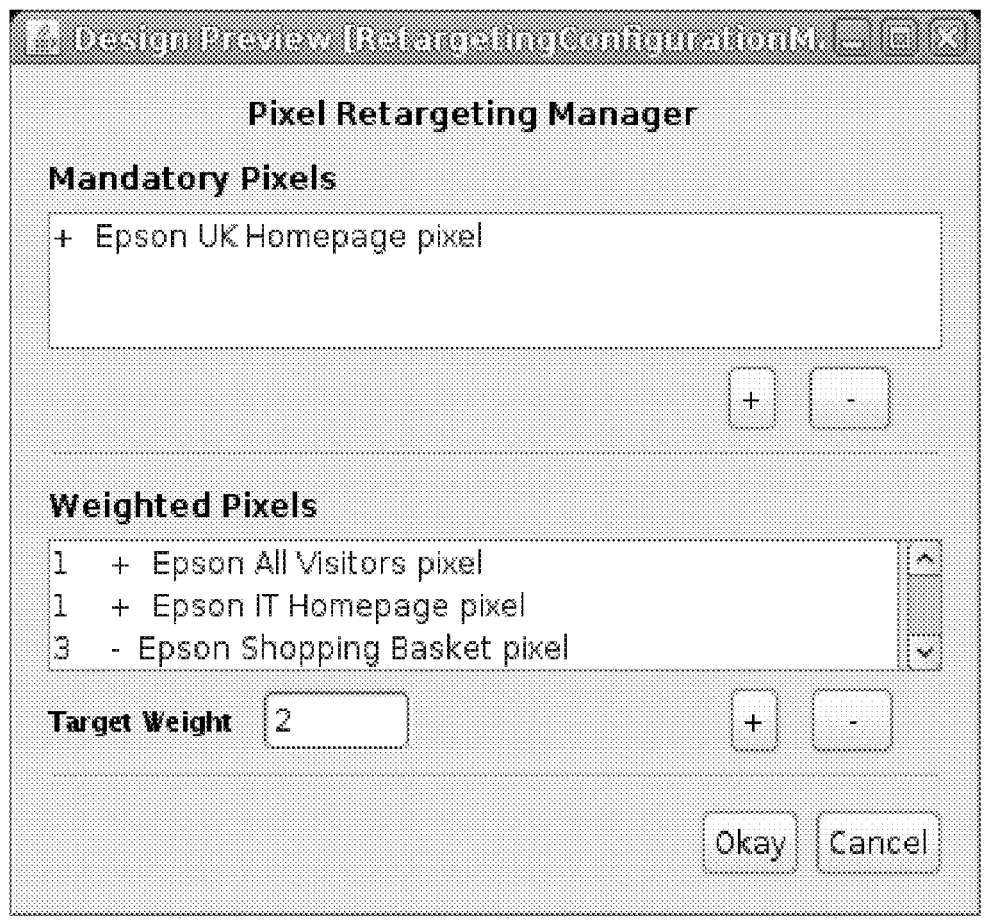
FIG. 9B is a block diagram of an embodiment of a user interface for a pixel retargeting manager.

FIG. 9B illustrates an embodiment for an interface, such as a Pixel Retargeting Manager Interface. As illustrated in FIG. 9B, the pixel rules may be sorted into two categories: the mandatory pixels and the weighted pixels. Mandatory pixels may comprise pixel rules which must be satisfied. For example, if one rule fails then no further rule processing for that set is needed. Weighted pixels may include rules which include weight values. The weighted pixels may be treated such that the sum of rules that are satisfied must meet or exceed a particular target weight threshold. Once the weighted rule passes then no further weighted rules may need be processed for that set. Negative rule weights may also be permitted.

The target weight fields may be stored in a table, such as the IntelliTXTTargetingByPixel table. This table may include any configuration value that applies to the rules for this particular set, such as a rule set.

In FIG. 9B, the pixel rules are illustrated as listed by their name prefixed with a "+" for embodiments in which the pixel is required to exist or a "−" for embodiments in which the pixel is not required. This setting, along with the two types of rules and the ability to have negative rule weights means that the enterprise can implement complex rule sets. For example, a rule set may be formulated to implement a feature that a user must have pixels a and b but not pixel c, and that at least one of d, e and f but not of g or h are included. In such embodiments, if the mandatory pixels and weighted pixels are satisfied then the set may remain in the selection process, or from a CLR perspective, the set remains a contender while considering other sets of rules. In some embodiments, the mandatory pixels are processed first, and then weighted pixels are considered. Pixels may be processed (and displayed) in order of a pixel id, or identifier, in order to maintain determinism (in deference to adding an "order" field).

In order to enable the campaign manager to add or remove rules each list may include add and remove buttons for the respective list. Clicking either of the add buttons (or "+" in the image) may bring up an empty Edit Pixel Rule dialog. Double-clicking a rule from either list may bring up the Edit Pixel Rule dialog for the selected rule.

Edit Pixel Rule Dialog 910

Figure 9C:
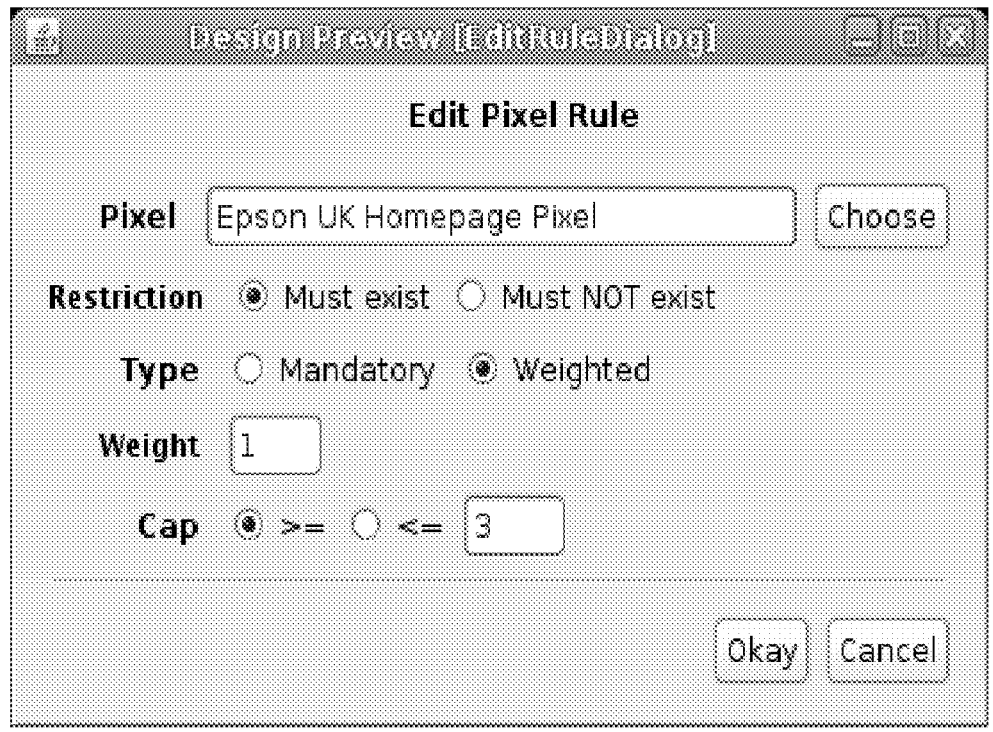
FIG. 9C is a block diagram of an embodiment of a user interface for a pixel rule dialog.

FIG. 9C illustrates an embodiment of a dialog in which both the mandatory rules and weighted rules may be edited. Such dialog may, in some embodiments, be referred to as the Edit Pixel Rule Dialog. A rule may be based on a pixel with the Restriction field specifying whether the pixel must, or must not exist. This feature may provide the ability to implement complex rule sets, such as for example a rule set requiring pixels x and y but requiring absence of pixel z, or a rule set requiring pixels x and y but not requiring the presence of pixel z". The Type field may be included and used for determining whether the rule is a mandatory rule in which case a weight is not needed, or a weighted rule, in which case the weight value may be used. A default weight for all weighted rules may be 1. It may be permitted to include negative weights which would introduce a penalizing effect and need additional positively weighted rules in order to reach the target weight threshold.

As illustrated in FIG. 9C, the Cap field may let the user of the dialog specify whether the pixelled user must have been marked with the pixel a number of times. If the Cap field is 0 then no cap may be applied.

Pixels may be shared amongst campaigns and therefore a pixel rule may bind to a pixel but can have its own mandatory or weighted specification. As such, in some embodiments, a rule binds to only one pixel but a pixel is bound to one or more rules. In further embodiments, a rule set does not include two rules binding to the same pixel. Pixel rules are stored in the IntelliTXTPixelsRules table. The "choose" button may enable the dialog user to bring up the Pixel Manager which may allow the campaign manager to select the pixel upon which this particular rule is based.

Pixel Manager 905

Figure 9D:
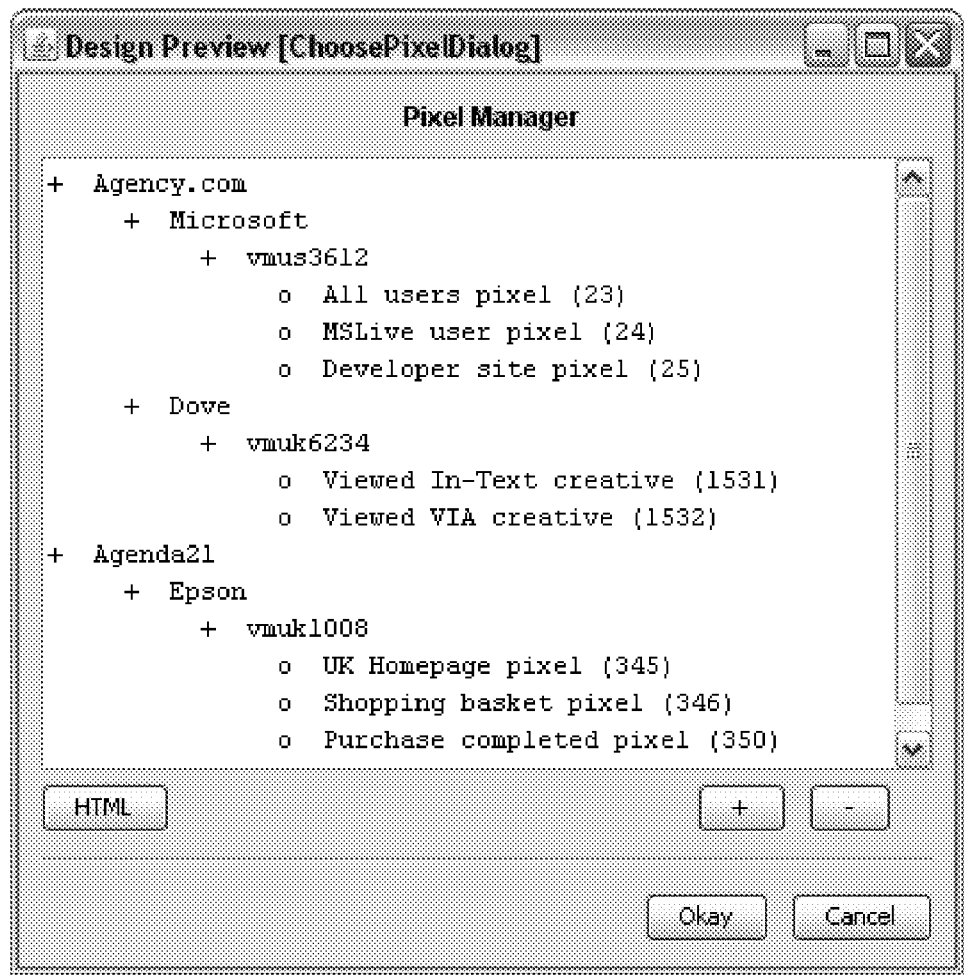
FIG. 9D is a block diagram of an embodiment of a user interface for a pixel manager.

FIG. 9D illustrates an embodiment of a Pixel Manager, which may include an option or a dialog in which campaign managers may manage the pixels in the system. In Pixel Manager, a pixel may be created in relation to a campaign such that the campaign becomes the owner of the pixel. This campaign may still have active sets or may have sets that are expired. Other active sets or expired sets may have no impact on the validity of the pixel. Every pixel may be owned by a campaign and this ownership may not be transferred.

The Pixel Manager may be initiated in "choose pixel" mode. This may be in response to a user clicking the "choose" button in the Edit Pixel Rule dialog or selecting the link button in the Edit Pixel Dialog. When in this mode the interface may return the identifier, or an ID, of the created or the selected pixel, or zero if none selected. In this mode the interface may show a hierarchical tree of pixels which may be visible to the currently selected campaign.

In some embodiments, the interface may be initiated via a "Pixel Manager" button within the development tool or the campaign management system tool, which may allow the users to view the full list of pixels and optionally retrieve the relevant HTML for a pixel. If the user is working with a campaign then the users may be permitted to add pixels at this time. If no campaign is being worked on then pixel creation may not be allowed because the campaign to which to assign the pixel is still not known. In some embodiments, identifying the owner of the pixel is necessary in order complete the creation of the pixel. In such a mode, the tree may show a hierarchical list of all pixels in the system.

When a pixel is created, the pixel may define its level of visibility (or privacy) in relation to its owner campaign. To determine the list of visible pixels, assuming that a campaign, such as a "myCampaign", is the campaign currently being edited, the campaign manager may, in some embodiments, implement one or more of the following steps:

Pixel.visibility="campaign" and pixel.campaign.id=my Campaign.id

OR pixel.visibility= "advertiser" and pixel.campaign.advertiser.id=myCampaign. advertiser.id OR pixel.visibility="agency" and pixel.campaign.advertiser.agency.id= myCampaign. advertiser.agency.id OR pixel.visibility="global"

The list of pixels displayed in the dialog may change with each invocation, although once a set has a rule bound to a pixel the visibility of the pixel may not be changed later to exclude it, unless the dependent rules are first removed. If the interface is being displayed as a result of clicking the "choose" button in the Edit Pixel Rule dialog then the currently selected pixel in that dialog (if any) should be highlighted.

FIG. 9C illustrates a tree in which the pixels currently visible to the set are being edited. The tree is broken out by agency, advertiser, campaign and then by available pixels. The pixels are listed by name with their pixel id in parentheses. The list also includes "+" and "−" buttons so pixels can be created or deleted. Clicking the "+" button may bring up the Edit Pixel dialog. Double-clicking a pixel in the list may also bring up the Edit Pixel dialog but only allow the pixel to be edited if it is not being used by another set (editing a "live" pixel can cause problems). The current campaign may be configured to be the pixel's owner campaign and thus prevent other campaign managers from editing other campaign's pixels. The HTML button may enable the access to the Get Pixel HTML dialog. The pixels may be stored in the Pixels table.

Edit Pixel Dialog 907

Figure 9E:
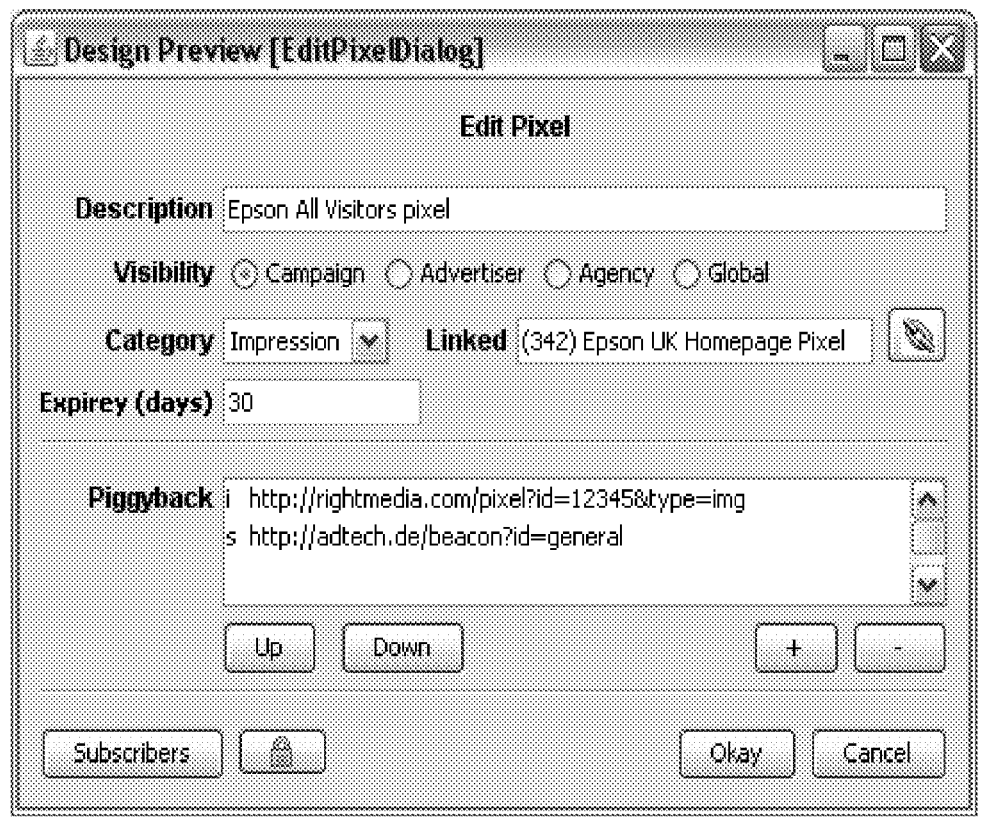
FIG. 9E is a block diagram of an embodiment of a user interface for an edit pixel dialog.

FIG. 9E illustrates an embodiment of an Edit Pixel Dialog. From one aspect, a pixel may include an identifier or an ID used to store in a user's cookie. The pixel may also be a marker to say that the user performed some particular action, such as viewed a page or an advertisement. Multiple campaign sets may want to retarget to users who have a particular pixel and this means that these pixels are shared. Therefore, a set may only bind to each pixel once, but a pixel can be bound to by many sets.

When a pixel is created a campaign manager may have selected a campaign to associate the pixel with. This campaign then may become the owner of the pixel. The campaign may be active or stopped, and it may make no difference to the existence of the pixel. A pixel may have a concept of visibility and this is performed in relation to its owner campaign. The visibility of a pixel may be concerned with which sets are able to retarget against the pixel, and there may be are 4 levels of visibility:

Campaign—any sets belonging to the owner campaign are allowed to retarget against this pixel.

Advertiser—any sets within campaigns from the same advertiser or the advertising enterprise as the owner campaign are allowed to retarget against this pixel. This is may be the default setting for the visibility.

Agency—any sets within campaigns from any advertiser from the same agency as the owner campaign are allowed to retarget against this pixel.

Global—any set without restriction can target against this pixel. Care should be taken with this option when targeting against competitor's pixels to avoid any contractual issues.

A pixel may have an assigned category so that the type of pixel is known. This feature enables us to know the conversion pixel from a page impression pixel. The list of values for these categories may be database stored. These values may or may not be edited by the users. The edits may be done by the agency or the enterprise administrators. The default value for new pixels should be "Impression".

A pixel may also include an optional linked value which may apply if this is a conversion pixel (as specified by the category). This linked value may be used as an ID of another pixel which may be tested via the Pixel Servlet. Clicking the link button next to the Linked field may bring up the Pixel Manager whereupon the dialog user may select a pixel to link against. This method may be used to perform the Post-Impression Tracking as detailed below. The linked field may be used when the category of the pixel is "conversion". The category may be stored in the database as an integer, and is only known to represent a "conversion" when a configured categoryId value is used.

Once a user has been pixelled, that pixel may have a lifetime after which it is removed from that user's machine (the user is de-pixelled). The expiration field, such as the expirey, may specify the amount of time after which the pixel is removed.

When a user is pixelled, multiple pixels may be delivered within that same call and this concept may be referred to as the "piggybacking". A pixel may be delivered as an image or as a script. In the embodiments in which it is delivered as an image then the piggybacking may be performed as a sequence of redirects, which may be similar to the way the click tracking is performed. In the embodiments in which the pixel is delivered as a script, then a script in Javascript or in any other programming language, may be sent to the client browser which, when executed, may cause the browser to request our multiple piggybacked pixels in parallel.

In one embodiment, when using the image approach, if any link in the redirect chain breaks then all subsequent links may not happen. This may result in only some of the piggybacked pixels being dropped. In the case of the script block there may be a level of protection/isolation between the pixels, but this may require the user's browser to support Javascript. The description field may be a human-readable version used through the various retargeting interfaces. Internally the various software systems may use an ID value which is automatically assigned when the pixel is created. In some embodiments, the ID value is assigned by the pixel creator.

The piggyback list in FIG. 9E shows the list of piggyback pixels prefixed with "i" if it's an image pixel or "s" if it's a script pixel. The order in which the pixels are delivered may not matter, but the up and down buttons may be provided so that an order can be selected. If our pixel is being delivered as an image and there are multiple piggyback pixels, any which we think may potentially break we would want to move to the bottom of the delivery chain. If any of piggyback pixels are set to deliver as a script, then our pixel may be delivered as a script. Consequently, if our pixel is being delivered as an image, then all our piggybacked pixels may be delivered as images.

As illustrated in the embodiment of FIG. 9E, piggyback pixels may be added/removed via the "+" and "−" buttons underneath the list. Double-clicking an existing piggybacked pixel allows for editing of that pixel. Editing piggybacked pixels may be done using the Edit Piggyback dialog. Clicking the "Subscribers" button may bring up the Show Pixel Subscribers dialog which may show the list of sets currently bound to this pixel. The pixels may be organized into a pixels' table.

The lock button may indicate whether a particular pixel has been locked or not. When a pixel is first added to the system it may be unlocked by default. However, as soon as one or more rules are created corresponding to this pixel, then this pixel becomes locked. A pixel may also become locked when a user brings up the Get Pixel HTML Dialog. If a rule is based on a pixel and the pixel is then changed, this may affect the rule which is dependent on it. Also, if a pixel is added and the HTML retrieved and given to a publisher/advertiser to put on their site, even if there are no rules using this pixel, there may be a dependency. If a pixel is locked then clicking the lock button may unlock the pixel and this may trigger a confirmation warning. If a pixel is unlocked and the lock button is clicked then the pixel may become locked, again with a confirmation warning. The lock may be determined by the Locked field in the Pixels table.

Get Pixel HTML Dialog

Figure 9F:
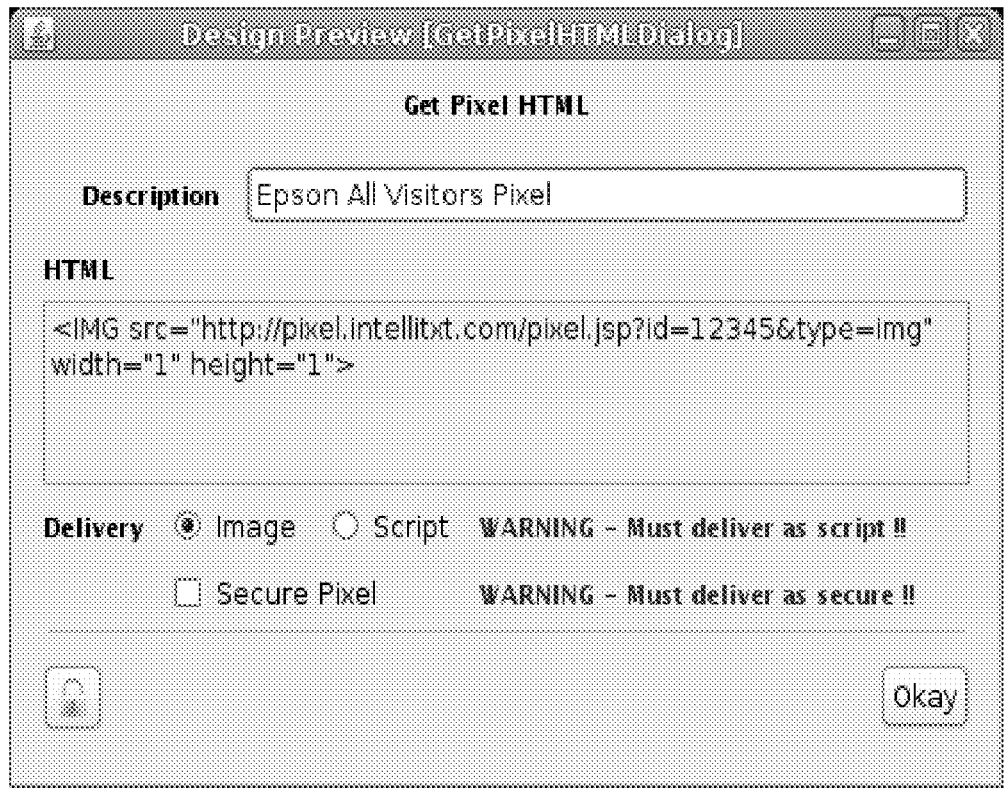
FIG. 9F is a block diagram of an embodiment of a user interface for a get pixel HTML dialog.

Referring now to FIG. 9F, an embodiment of a Get Pixel HTML dialog is illustrated. This dialog is an option or a location within the development tool in which the campaign managers may generate the relevant HTML for a given pixel.

When displaying Get Pixel HTML dialog, if the underlying pixel is not locked then displaying this dialog may lock this pixel. In such instances, the pixel may be live and any subsequent changes to the pixel may have effects which may or may not be undesired. Each pixel may also have dependencies on it. This behavior may be a reflection of the same locking implemented in the Edit Pixel Dialog mentioned above. If the pixel becomes locked then a warning may be displayed and the underlying Pixel.Locked flag may be set. The description shows the name (which may be non-editable) of the selected pixel for which the HTML is generated. This identifies the selected pixel for the user using the dialog.

The HTML box may be non-editable. The HTML box may allow the user to select the text for copying. This text may be automatically generated and updated when the delivery options are modified. The format for the URL may come from a development tool template defined in a table, such as the EnvironmentVariables table.

As the delivery method for delivering the pixels may be an image or a script, if image is selected and the pixel has any piggybacked pixels with a script delivery type then a warning may be displayed. Also, if a piggybacked pixel is expecting to be delivered as script, meaning some server should receive a call and return Javascript, but we delivered within an image-delivered pixel then an error may occur during the delivery.

As illustrated in FIG. 9F, the generated HTML includes a "type=img" parameter. While this may seem redundant, this parameter may act as a safeguard in case someone takes the URL in the resultant IMG tag and uses it in a script call. This parameter may also be used in case someone edits this pixel at a later stage and adds piggyback pixel that is incompatible with the original delivery method. For example, a pixel with no piggybacked pixels is created and the HTML is used to deliver this as an image. Later on, a script-based piggyback pixel is added, but this pixel is still being called as an image. The type parameter may specify for the Pixel Servlet, which is the target for our pixel call, what type of response should be sent back. If no type parameter is passed, then the servlet may derive this information from the Pixels table. If the parameter is passed, then the servlet may override the value in the Pixels table.

The Secure Pixel option may select whether the pixel should be delivered over a secure channel (https:// instead of http://). Selecting this option may change the URL in the HTML section from "http://pixel . . . " to "https://pixel . . . ." If the secure option is not selected but the pixel has one or more piggybacked pixels which may be delivered via a secure channel (parse the piggybacked pixel urls looking for any starting https://) then a warning may be displayed. If a non-secure pixel is delivered on a secure page, then at the time the pixel call is made, a warning dialog may be displayed to the user viewing the page, asking if they want to reject the unsecured call, such as to deny our pixel call. This option may be undesirable. If the pixel is locked, then clicking the lock button may unlock the pixel. If the pixel is unlocked then clicking the lock button may lock the pixel. A confirmation warning may be displayed upon clicking of the lock button. Clicking the "Okay" button may hide or destroy the dialog.

Edit Piggyback Pixel Dialog

Figure 9G:
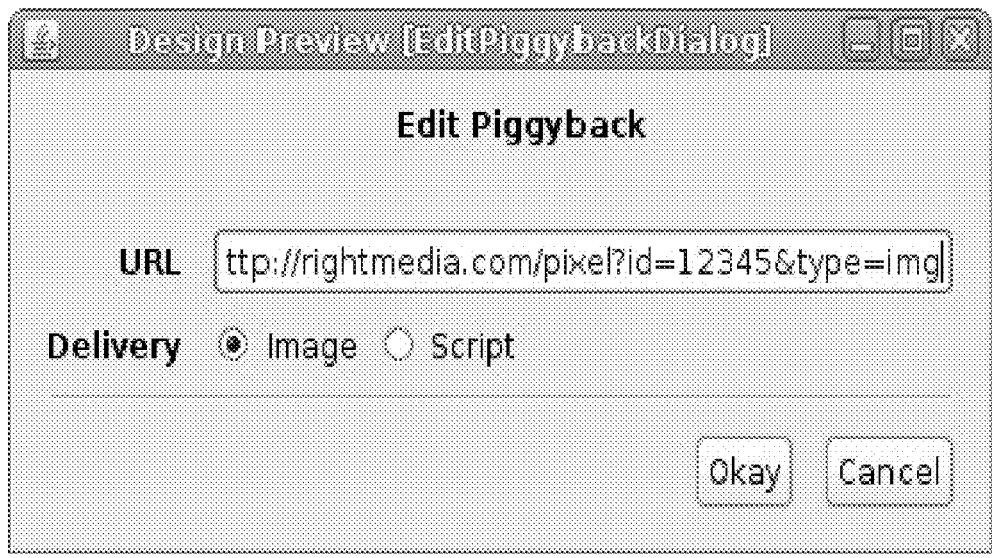
FIG. 9G is a block diagram of an embodiment of a user interface for an edit piggyback dialog.

Referring now to FIG. 9G, an embodiment of an Edit Piggyback Dialog is illustrated. A piggyback pixel may be a URL with an indication of how that pixel is expecting to be requested. If the pixel is to be delivered as an image, an instruction to the client browser would be sent to request an image using the relevant URL. Similarly, if the pixel is to be delivered as an image, a script block to request a pixel using the URL may be sent. Although piggybacked pixels may be from third parties, an enterprise providing the pixels may actually piggyback its own pixels off of each other. Piggybacked pixels may stored in the IntelliTXTPixelsPiggybacked table.

If the piggybacked pixel is to be delivered as an image then there may be other piggybacked pixels needing to be delivered after it (e.g., it is in a chain and it is not the last link). In this case a way to specify a redirect URL in the piggyback pixel's URL may be implemented. This may be accomplished by placing the marker ${PIXEL} in the URL. Thus, when the Pixel Servlet comes to deliver the piggybacked pixel, if the Pixel Servlet detects this marker in the URL, the Pixel Servlet may replace it with an escaped version of the next pixel in the chain.

For example, if a URL said: http://here.com/pixel?id=12345&redir=${PIXEL}, and if the next pixel in the chain was http://there.com/beacon?x=98765, then the pixel servlet may turn the original URL into a new URL, such as for example:

--- http://here.com/pixel?id=12345&redir=http%3A%2F%2Fthere.com%2Fbeacon%3Fx%3D98765

---

If the piggybacked pixel doesn't support image-based delivery (e.g., it doesn't support the idea of a "redirect" parameter) then such piggybacked pixel may be placed last in the chain.

Show Pixel Subscribers Dialog

Figure 9H:
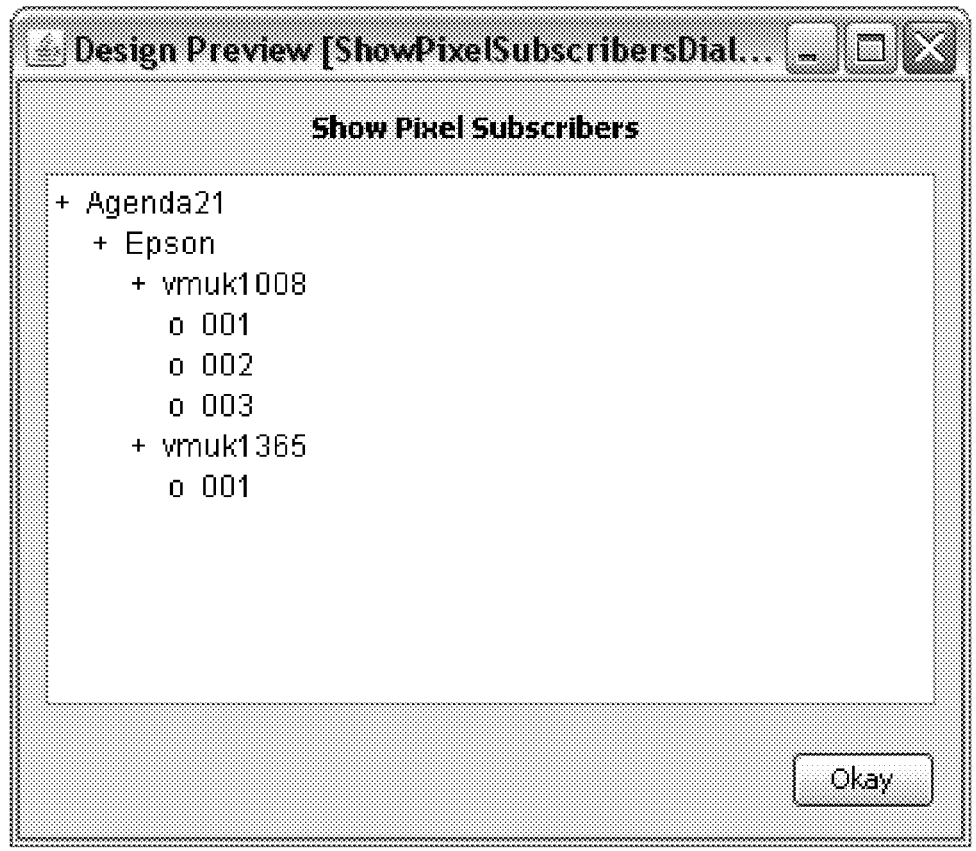
FIG. 9H is a block diagram of an embodiment of a user interface for a show pixel subscriber dialog.

Referring now to FIG. 9H, an embodiment of a Show Pixel Subscribers dialog is illustrated. This dialog may be displayed in response to a user clicking the "Subscribers" button in the Edit Pixel dialog. It may display a list of the sets which are currently using this pixel in their pixel rules.

FIG. 9H shows that the pixel is being used by four sets of rules in two campaigns. In some embodiments, when a pixel is created, the campaign that was selected (or being edited) at that time may be defined as the owner of the pixel, but this may not necessarily mean that this campaign has any sets using that pixel. A pixel's owner campaign, may have, but does not have to have any sets which are subscribers to that pixel.

Pixel Servlet 915

Pixel Servlet, also referred to as a servlet, may be a component, script or function that receives the call and is responsible for the actual pixelling of the user. Pixel Servlet may receive any number of calls. In some embodiments, if the pixel servlet is placed on a multitude of high-volume advertiser pages the number of calls the servlet may receive across the network could be high. Therefore, the servlet may be designed to implement its functions and work quickly and efficiently so as to reduce the chance of any potential delay. In some embodiments, this may become important if the pixel call is placed high up on a web page because the user's browser may wait for the pixel call to complete before continuing rendering the page.

The format of the pixel URL itself may be as follows:

```
http://pixel.intellitxt.com/pixel.jsp?id=aaa[&tag=bbb][&type=ccc][&redir=ddd][&p1=eee][&p2=fff][&p3=ggg]
```

In some embodiments, the components of the URL, such as aaa, bbb, ccc, ddd, eee, fff, ggg may be as follows:
aaa=pixel id
bbb=optional tag (up to 8 characters)
ccc=optional delivery type ("image" or "script")
ddd=optional escaped URL of another piggybacked pixel (which may also piggyback)
eee=optional parameter reserved for future use (value currently ignored)
fff=optional parameter reserved for future use (value currently ignored)
ggg=optional parameter reserved for future use (value currently ignored)

The URL may start https://in which case any or all pixels should be delivered securely.

SSL Certificates and Cost Implications

In order to respond to requests made via secure channel (https) the web nodes used may each have an SSL certificate installed. In some embodiments, the SSL certificate may be tied to the pixel.intellitxt.com domain. Since a single system may include hundreds of servers, it may become prohibitively expensive for each web node to have one. As such, the pixel servlets may be hosted off different servers to the normal web nodes.

Within each data centre (NOC), a separate tier of servers dealing with these pixel calls may be deployed. Initially, "images" servers may be used, of which there may be two per NOC making a total of six servers globally. A new web application, such as webapp, may be hosted by these servers to service the calls. The servers may respond to the DNS entry "pixel.intellitxt.com" and the URL for the servlet may be "/pixel.jsp". These servers may generate log files, which may be periodically cycled and sent to the stats servers for importing and processing. These servers may also be periodically retrieving a subset of the database tables involved in retargeting, specifically the Pixels and PiggybackedPixels tables.

ID Parameter

In some embodiments, the servlet may be passed the id of the pixel with which the user is pixelled. Without this information, the servlet may exit with no response. If the id of the pixel passed is invalid (less than 1 or has no corresponding entry in the Pixels table) then the servlet may also exit.

Tag Parameter

The optional tag field may help with logging and reporting. When a call is received the tag value (if specified) may be written alongside the other logging data. From a reporting perspective the user may be able to group against the tag. This may provide a way for a single site to use one pixel ID and their own tag values to differentiate between where they were placed. This field may support up to 8 characters.

Type Parameter

The servlet may also be passed the optional "type" parameter which may indicate to the servlet the type of delivery method being used (and thus the type of response expected). The value may be either "img" or "script". If the parameter is missing then the type may be determined by checking the pixel details in the database.

Redir Parameter

The servlet may also be passed an optional "redir" parameter which may specify a URL-encoded redirect URL. If the delivery type is "script", whether its passed as a parameter or retrieved from the database, then the unescaped redir value may be passed as a piggybacked pixel (i.e. added to the list of piggybacked pixels we'll respond with). If the delivery type is image, then it may be appended to the end of our piggybacked pixels chain. If the last item in our chain doesn't support redirects (no ${PIXEL} marker) and the redir value doesn't have this marker, then this redir value may be used and our own piggybacked pixels may be skipped. If the redir value does have the redirect marker (${PIXEL}) then it may be delivered after the last pixel in our piggyback chain that does support redirects and the value replaced with the escaped next (non-redirecting) piggybacked pixel in our chain.

The Pixel Servlet may support a "redir" param without "${PIXEL}" or a third party piggybacked pixel without "${PIXEL}". Whichever of those are supplied, may be positioned at the end of the image redirect chain. Other than this consideration, the image redirect chain may be ordered as configured via the database "OrderID" column.

P1-P3 Parameters

As some advertisers may book the pixels via an ad server, ad servers may be notified of the parameters are that a pixel call has. To change the permitted parameters, a provision in the pixel URL for some extra parameters may be added.

Dropping the "VM_PIX" Cookie

In some embodiments, the pixel servlet is configured to respond as fast as possible. In such configurations, the servlet should do as little of processing as is necessary in order to keep the time cost of pixelling to a minimum. The pixel information may be stored in a "VM_PIX" cookie, irrespective of whether the user has a profile in the behavioral system or not, which may be determined by examining the VM_USR cookie.

In order to count the number of times each pixel is seen and when it was last seen, each pixel may be assigned a date field (in UTC) and a count field. If the pixel already exists in the user's cookies, then the date field may be updated and the count may be incremented. If the pixel does not exist in the cookie, then it may be added to the cookie. In some embodiments, multiple pixels may be stored in the user's cookies. In some embodiments, one cookie may be used for the data. Finally, checksums may be run on the cookie data so that users who edited their cookies may be identified.

In some embodiments, both the pixel mentioned in the "ID" parameter and any piggybacked pixels may be added to the cookie as a single operation. When a user visits a page with any of the advertised products or the web pages of the advertiser or the enterprise, such as the web pages that include VIA or In-Text features, pixels may be moved from their cookies over to their behavioral profile if they have one. Pixels may exist in the user's VM_PIX cookie and/or their behavioral profile. In some embodiments, it is the combined set of pixels from both the cookie and the profile that is used during re-targeting of the user.

Cookie Size Constraints

There may be a limit to the number of pixels which can be encoded in a user cookie. Particularly if the user is not often visiting an enterprise, advertiser or partner site, such as the exchange site, or if web nodes are configured not to consume pixels into a user's behavioral profile, the number of pixels in the cookie may grow above than what is allowed.

To address this issue, the cookies may be truncated in two ways. The first way may include limiting of the number of pixels. This limit may be configured via:

JMX→GlobalSettings→PixellingMaxPixelsInCookie, and via INTELLITXTPARAMETERS entry "pixelling.max-PixelsInCookie".

If exceeded, the cookie with the lowest categoryId may be repeatedly removed until the number of pixels in the cookie is within limits again. When several cookies with the lowest categoryId exist the oldest ones based on the time stamp may be destroyed.

Another way to address this issue may involve limiting the number of impressions per pixel. This limit may be configured via JMX→GlobalSettings→PixellingMaxImpressionsPerPixelInCookie. In some embodiments, this limit is configured via INTELLITXTPARAMETERS entry "pixelling..maxImpressionsPerPixelInCookie". If exceeded, the oldest pixel impression timestamps may be repeatedly removed until the number of impressions is within limits again.

Image Response (Redirect Chain)

The servlet's response may depend on the type of response expected (the "type" parameter). In embodiments in which the response is delivered as an image, a redirect chain based on the list of the third party piggybacked pixels may be constructed.

For example, if we have the following piggybacked pixels (in order):

---
http://one?redir=${PIXEL}
http://two?next=${PIXEL}
http://three
---

Then the resultant URL may be

"http://one?redir="+encode("http://two?next="+Encode("http://three"))

In this example the first two pixels may support redirects, and are thus ahead of the last pixel which doesn't support them. If a "redir" parameter is passed, then if it contains the string "${PIXEL}" the resulting redirect chain may be ---
"http://one?redir= " + encode("http://two?next=" + encode(redir + Encode("http://three")))
---

If the redir parameter does not include "${PIXEL}" marker then, if the redirect-supporting pixels are not included in our piggyback chain, our redirect would be "http://one?redir="+encode("http://two?next="+Encode(redir))

If no redirect-supporting pixels are in the chain, then redirection may be to the redir URL passed in. When the servlet exits, the response may be to send a redirect, such as an HTTP response 302, passing back the constructed redirect chain URL.

Script Response

The script response may entail a URL from the optional redir parameter and any third party piggybacked pixel URLs to be requested in parallel. This may be done by outputting a Javascript block which may call each pixel without appending any other redirects. The type of call for each pixel may depends on the type specified in the piggybacked pixel's configuration. For any redir value passed in it should be called in the same way as the servlet is being called. Also, the response should be wrapped in a self-calling Javascript function so that any variables that are declare do not clash with any variables defined in the page in which the script is executed.

An example of the script output generated might look like:

---
(function( ) {  try{
         var d = document;
         d.write('<img src="http://here.com/pixel?id=1" width="1" height="1">');
         d.write('<img src="http://there.com/beacon?id=234" width="1" height="1">');
         d.write('<scr'+'ipt src="http://everywhere.com/pixel?id=987"></scr'+'ipt>');
    }catch(x){ }
})( );
---

Recursion Detection

Pixel recursion may occur in two ways:

Advertiser's or the hosting enterprise's pixel has another pixel of the enterprise piggybacked upon it. That pixel in-turn has the original enterprise's pixel piggybacked upon it. This may be prevented by dropping all piggybacked enterprise's pixels (any number of levels deep) as part of the original pixel impression, and ignore repeated references to these pixels.

The host enterprise's pixel may include a third-party or an external pixel piggybacked upon it. That pixel may be redirected back to the original enterprise's pixel. This may be prevented by ignoring repeated impressions for the same pixel, from the same user, within a configurable period. Configuration may be implemented, such as JMX→GlobalSettings→MinPixelRepeatImpressionTime and in INTELLITXTPARAMETERS as "pixelling.minPixelRepeatTimeMs" and defaults to 2000 ms (2 seconds).

Logging

Calls to the pixel servlet may be logged so that the number of times each pixel was requested can be traced. In some embodiments, the servlet do not reliably know whether the user already has the pixel each time and therefore this log may act as a request count.

This logfile may be named <servername>.PixelImpressions.<YYYYMMDD>.<HHMMSS>.log and it may be collated centrally for processing. The logfile may be text-based with one entry per line, and each field delimited by a TAB character. The following fields may be logged:

Entrydate—a timestamp as a string in the format "yyyyMMdd-hhmmss" (UTC)
PixelID—integer id of the pixel we dropped
Conversion—1 or 0 as determined in Post-Impression Tracking below
UserID—the unique user id from their cookies (if exists)
Tag—the tag value passed in (any TAB character should be replaced by a space)
Referer—URL of the referrer page (may not always be available), may be truncated to a configurable length.

Post-Impression Tracking

Post-impression tracking may include the process whereby the dropping of a pixel is attributed to a previous pixel-dropping event. Upon logging of a pixel, a check may be made to see whether the user also has another designated pixel. The log may be updated to state if the pixel is dropped or if the optional other pixel existed.

In order to implement post-impression tracking, at the time we drop a pixel, a determination may be made as to whether this pixel has a linked pixel and if so, another determination as to whether the user has that pixel. Therefore, when dropping a pixel the Pixel Servlet may look at the LinkedPixelID field of the pixel in question and if the value is non-zero, and this user has a non-expired matching pixel then a conversion may be logged. Otherwise, a log may be edited to state that the pixel is dropped.

In order to determine whether the user has the linked pixel or not, any pixels in the user's cookies as well as in the user's profile, may be examined. A user's profile may be retrieved and merging of the pixels may be performed. Since a pixel may be dropped over a secure channel and we are only putting SSL certificates on the pixel servlet servers, only those servers can perform this task. In some embodiments, this may be implemented as efficiently as possible because the pixel servers are expected to receive a high number of calls.

In order to implement this and similar determinations, the following actions may be taken:

1. converted=0
2. If pixel.CategoryID=conversion and pixel.LinkedPixelID>0 then
   a. For each pixel in their cookies
      i. If pixel.LinkedPixelID==cookie.pixel.id
         1. if cookie.pixel has not expired then
            a. converted=1
            b. exit processing (do not proceed to step b)
   b. If user has behavioural profile then
      i. Retrieve profile
      ii. For each pixel in their profile
         1. If pixel.LinkedPixelID==profile.pixel.id
            a. profile.pixel has not expired then
               i. converted=1
               ii. exit processing In these embodiments, converted may be determined to be the number 1 if this is a linked conversion pixel and the user has a valid instance of the linked pixel. In this embodiment, no merging of pixels in cookies and profiles may have been performed and no changes to the profile may be made. In some embodiments, the user profiles are retrieved if no linked pixel is found in the user's cookies. This converted value may then be included into the log.

CLR Algorithm 937*a*

The campaign selection engine and/or campaign selection algorithm such as CRL 937 may implement any of the follows steps in any combination:

1. If user has a user or behavioural profile then
   a. For each pixel in the user's profile
      i. Check if pixel has expired (e.g.,check against Pixels table)
         1. If expired, then may Delete the pixel
   b. For each pixel in the user's cookies
      i. If pixel has expired
         1. then may delete pixel
      ii. otherwise
         1. If pixel exists in user or behavioral profile
            a. profile.pixel.datestamp=cookie.pixel.datestamp
            b. profile.pixel.count+=cookie.pixel.count
            c. delete cookie.pixel
         2. otherwise (if not in profile)
            a. add pixel to profile using datestamp and count from cookie 2. Otherwise (if there is no profile)
   a. For each pixel in their cookies
      i. If pixel has expired (e.g., check against Pixels table)
         1. may Delete the pixel In some embodiments, a two-phase approach to copying pixels from the user's cookie to the behavioral profile may be used. This may be implemented to ensure that the profile got successfully stored and that the pixels are not lost. Pixels may exist temporarily both in the cookie and the profile. However, the overall set of pixels may be correct (impressions and timestamp), as demonstrated in the "showmypixels.jsp" utility page.

To ensure that this two-phase approach works, pixels in the cookie may be "expanded" (every timestamp is stored), whereas those in the behavioural profile may be stored as an impression count and latest timestamp only. The "consumption" of pixels from the cookie into the behavioural profile may occur if the JMX→GlobalSettings→ BehaviouralConsumesPixels setting is set to true. If set to false, which may be a default setting, the pixels may remain in the user's cookie only. At this point any pixels may be moved from the user's cookies to the user's profile, if the user has one and if the system is configured to do so. Any expired pixels, whether in the user's profile or cookies, may be removed.

When the campaigns are being selected, a load adverts call may be made. In some embodiments, the load adverts call may be made following the determinations described above. In further embodiments, the following actions are implemented:

1. Declare an empty "bucket of pixels" structure
2. If the user has a behavioral profile then
   a. Copy each pixel from the profile into the bucket
3. Otherwise if the user has pixel cookies then
   a. Copy each pixel from the cookies into the bucket At this point the bucket may include the pixels the user has, irrespective of whether these pixels came from the user's profile or the cookies. This abstraction of the pixels, or more correctly where they came from, may make for easier processing.

Referring now to FIG. 9I, an embodiment of a CLR algorithm along with the steps for identifying the campaign based on the pixel rules is illustrated. In some embodiments, FIG. 9I presents a method of steps of CLR algorithm for filtering the contenders and thus narrowing down the pool of acceptable campaigns or choices based on the pixels and pixel rules. Focusing on the In-Text perspective, as well as VIA, the Campaigns.loadAdvertsUsingKeyfileData( ) may be edited to also include the pixel-targeting options, such as the ones illustrated in FIG. 9*i*. CLR may be modified so that having found the unfiltered list of contenders, determinations, calculations and evaluations may be implemented in order to identify contender rule and campaign sets to be chosen for a particular user.

Referring to FIG. 9I in more detail, at step (A) for each entry of the considered contenders, pixel rules for each particular set may be retrieved. At step (B), a determination may be made if the pixel is a mandatory pixel. At step (B)(i) if the pixel restriction states that the pixel must exist either in possession of the user or the user associates files, cookies or database, then at step (B)(i)(1), if bucket includes a particular pixel or a pixel ID, no action may be taken because the rule is satisfied. Otherwise, at step (B)(i)(2) a contender may be removed from consideration because the rule is not satisfied.

At step (B)(ii), if the pixel restriction is that it must not exist, then at step (B)(ii)(1) if bucket includes the pixel or the pixel ID then at step (B)(ii)(1)(a) the present contender may removed because the rule is not satisfied. Otherwise, at step (B)(ii)(2) no action is taken.

At step (B)(iii) if a variable cap (which may indicate if a user has been marked with a pixel a number of times) is greater than or equal to zero, then at step (B)(iii)(1) a determination may be made if the CapType variable is zero. If the CapType variable is equal to zero, then at step (B)(iii)(1)(a) if the bucket pixel impression count is greater than the pixel cap, no action may be taken because the rule is satisfied. If otherwise, at step (B)(iii)(1)(b) the contender may be removed because the rule is not satisfied. At step (B)(iii)(2), if cap is 1 or not zero, then at step (B)(iii)(2)(a) if the bucket pixel impression count is less than the pixel cap, no action may be taken because the rule is satisfied. If otherwise, at step (B)(iii)(2)(b) the contender may be removed because the rule is not satisfied.

At step (C) a determination is made whether a weighted pixel exist. At step (C)(i), a weight is set to zero. In some embodiments, a determination is made whether the weight is zero. At step (C)(ii), for each weighted pixel, at step (C)(ii)(1) if cap is greater than or equal to zero, then at step (C)(ii)(1)(a) a determination is made if CapType is equal to zero. At step (C)(ii)(1)(a)(i) if the bucket pixel impression count is greater than or equal to the pixel cap, a move may be made to the next step because the rule is satisfied. If otherwise, at step (C)(ii)(1)(a)(ii), then a move may be made onto the next weighted pixel because the rule is not satisfied. At step (C)(ii)(1)(b) if cap is equal to one, then at step (C)(ii)(1)(b)(i) if bucket pixel compression count is less than or equal to the pixel cap, a move may be made to the next step because the rule is satisfied. If otherwise, at step (C)(ii)(1)(b)(ii), then a move to the next weighted pixel may be made because the rule is not satisfied. At step (C)(ii)(2) if pixel restriction is that it must exist then, at step (C)(ii)(2)(a) if bucket contains pixel or the pixel ID, then weight is added to the existing value of the pixel weight. Otherwise, at step (C)(ii)(3) the pixel restriction may be that it must not exist and so if at step (C)(ii)(3)(a) the not-bucket contains the pixel or the pixel ID, the weight is added to the existing value of the pixel weight. At step (C)(iii) if weight is less than the pixel rule sets target weight then the contender is removed from consideration because the rules are not satisfied.

Using the method illustrated in FIG. 9I, a process of elimination may be established to filter out any campaigns whose rule sets are not appropriate for a particular user, based on the pixels with which the user was pixelled. In such an example, the contenders list may have the pixel retargeting filtering applied and the result may be the list of contenders that is now potentially shorter, thus helping the process of selecting the correct campaign for the user.

Debug

In some embodiments, one or more levels of debug may be used. In some embodiments, two levels of debug processing are used: the summary level and the detailed level. The summary level processing may use "n" rules of each type (mandatory and weighted) and determine whether the set was discarded or not. The "detailed" debug level may list the rules assigned to the set, indicating which rules were (and weren't) processed and any effect they had (including incremental weights).

At the start of the normal CLR output, one or more summary lines per contender set may be seen. The summary lines may describe whether or not the set has satisfied any assigned pixel rules. Sets that do not satisfy their pixel rules (if any) may be removed from the contender list completely.

An example of the code may look as follows:
vmuk34880.001 (campaign 34880, set 72947) has 1 pixel rules (1 mandatory, 0 weighted): NOT satisfied (0 satisfied, 1 unsatisfied)
vmuk34950.001 (campaign 34950, set 73199) has 1 pixel rules (1 mandatory, 0 weighted): SATISFIED (1 satisfied, 0 unsatisfied)
vmuk34894.001 (campaign 34894, set 73390) has 2 pixel rules (0 mandatory, 2 weighted): SATISFIED (2 satisfied, 0 unsatisfied)
vmuk34988.004 (campaign 34988, set 73999) has 0 pixel rules (0 mandatory, 0 weighted): SATISFIED (0 satisfied, 0 unsatisfied)
mentasys_uk_tech (campaign 31219, set 48852) has 0 pixel rules (0 mandatory, 0 weighted): SATISFIED (0 satisfied, 0 unsatisfied)
kelkoo_uk_tech (campaign 21458, set 23186) has 0 pixel rules (0 mandatory, 0 weighted): SATISFIED (0 satisfied, 0 unsatisfied)

In further embodiments, a debug flag, such as itxtdba4-xx debug flag may be added. This flag may add a narrative following each of the summary lines, describing how each successive rule (if any) affects the outcome for the set. The code using such debug flag may be as follows:
vmuk34880.001 (campaign 34880, set 72947) has 1 pixel rules (1 mandatory, 0 weighted): NOT satisfied (0 satisfied, 1 unsatisfied)
Mandatory rule PIXEL PRESENCE NOT SATISFIED: Set 72947, MANDATORY rule: Pixel 999001 MUST occur>=0 times
vmuk34950.001 (campaign 34950, set 73199) has 1 pixel rules (1 mandatory, 0 weighted): SATISFIED (1 satisfied, 0 unsatisfied)
Mandatory rule SATISFIED: Set 73199, MANDATORY rule: Pixel 999002 MUST occur>=0 times
Overall rules SATISFIED.
vmuk34894.001 (campaign 34894, set 73390) has 2 pixel rules (0 mandatory, 2 weighted): SATISFIED (2 satisfied, 0 unsatisfied)
Weighted rule SATISFIED, adds 5 to weight (5 so-far): Set 73390, WEIGHTED rule: Pixel 999006 MUST occur>=1 times, to contribute 5 towards target weight
Weighted rule SATISFIED, adds 2 to weight (7 so-far): Set 73390, WEIGHTED rule: Pixel 999007 MUST occur>=1 times, to contribute 2 towards target weight
Overall rules SATISFIED. Weight of 7 satisfies target of 6
vmuk34988.004 (campaign 34988, set 73999) has 0 pixel rules (0 mandatory, 0 weighted): SATISFIED (0 satisfied, 0 unsatisfied)
mentasys_uk_tech (campaign 31219, set 48852) has 0 pixel rules (0 mandatory, 0 weighted): SATISFIED (0 satisfied, 0 unsatisfied)
kelkoo_uk_tech (campaign 21458, set 23186) has 0 pixel rules (0 mandatory, 0 weighted): SATISFIED (0 satisfied, 0 unsatisfied)

Logging

When a campaign set is delivered, as an In-Text hook or a VIA impression, then if the set had a retargeting component IDs of the pixel rules that were satisfied may be logged. Using the log, the system may keep track of which rules are being most effective. If a campaign is rejected because it didn't satisfy a rule then we should log the pixels id of that rule.

In some embodiments, to avoid increasing log volumes unacceptably, the logging of rules regarding the satisfied/unsatisfied for each hook may occurs only if the campaign has the new campaign-level "lcro" (log campaign retargeting outcomes) boolean script param set to 1/true. This may apply to both In-Text and VIA. Such logging may occur for hooks, and may not be repeated for ad-views and clicks. To determine the retargeting rules that were satisfied/unsatisfied for ad-views and clicks, a function, such as pageViewUuid may be used as a backwards reference to the details logged against the hook.

The new log entries may be entered in a log, such as LoggingStorage log, with a "metric=rt" parameter to distinguish them from other entries. Query parameters logged may be:

type=1 for InText, 2 for VIA;
metric="rt";
cn=cluster name, as per other log entries;
pid=product id(s) as CSV;
pvu=page view uuid (will be specified for InText only);
set=Set ID for which pixel rules were considered;
pass=1 if pixel rules were satisfied overall, 0 otherwise;
sat=CSV of pixel rule ids that were satisfied;
unsat=CSV of pixel rule ids that were unsatisfied.

In some embodiments, the countryId and clientIp columns are blank.

Example for In-Text is as follows:
17 Jun. 2009

```
16:18:36|,|1|,|<<NULL>>|,|type=1&metric=rt&cn=dummycluster&pid=2&pvu=FCE836DB
5FA545FA81A647217067E781&set=70636&pass=0&sat=999002,999003&unsat=999001|,
|1|,|<<NULL>>|,|<<NULL>>|,|<<NULL>>|,|loncackett
```

Example for VIA is as follows:
17 Jun. 2009

```
16:18:31|,|1|,|<<NULL>>|,|type=2&metric=rt&cn=dummycluster&pid=1&pvu=&set=70224
&pass=1&sat=999024&unsat=|,|1|,|<<NULL>>|,|<<NULL>>|,|<<NULL>>|,|loncackett
```

Reporting

There may be a number of reports aggregated on a daily basis. Since the configurations for pixels may be changed there may be the potential for anomalies. For example at the time an impression is logged a set may have retargeting options defined but when the logs are imported the options may have been removed.

Pixel Impressions

Pixel impressions may be stored in a report indicating for each pixel and tag, the number of impressions served that day and how many were conversions. In some embodiments, this report may not indicate which of those impressions was from a user who already had the pixel in their cookies. In other embodiments, this report may indicate which of those impressions was from a user who already had the pixel in their cookies Pixel Referer Pixel referer may be stored in a report used for troubleshooting showing date, pixel, referrer and count aggregated on a daily basis where the data is only retained for 7 days.

Satisfied Pixel Rules

For each set the number of impressions, ad-views and clicks for each satisfied pixel rule may be split by product (e.g. VIA and In-Text).

Unsatisfied Pixel Rules

For each set the number of times each pixel rule was not satisfied thus causing the campaign to be rejected, unsatisfied pixel rules may be split by product (e.g. VIA and In-Text).

Database Tables

In order to support retargeting, one or more new database tables may be created. Any tables related to pixels may be replicated to the Ad Server web nodes, along with pixel descriptions to aid debug or processing information. On the other hand, pixel rules may be replicated if the set of rules is active.

One of the tables created may be a pixels table, such as the IntelliTXTPixels table. Each pixel may be owned by a campaign, irrespective of whether the campaign is actually active or not. The PixelID field may be automatically assigned by the system or may be assigned by a user of the development tool. The numeric CategoryID may be assigned to "Conversion" and may be configurable, but default of this value may be 30.

An embodiment of a pixels table, such as the IntelliTXTPixels table, may be organized as follows:

| IntelliTXTPixels | | |
|---|---|---|
| Field | Type | Description |
| PixelID | Int | ID of pixel from Pixels table (PK, Identity) |
| CampaignID | Int | ID of the campaign that owns this pixel (IDX) |
| Description | Varchar(100) | Human-readable description of this pixel |
| Visibility | Int | 1 = campaign, 2 = advertiser, 3 = agency, 4 = global |
| ExpireyDays | Int | How many days after a user is pixelled does this pixel become invalid |
| CategoryID | Int | 10 = Impression, 20 = Click, 30 = Conversion |
| Locked | Bit | 0 = unlocked, 1 = locked |
| LinkedPixelID | Int | ID of pixel required to mark this as a conversion (or 0 for none) |

Another table may include a piggybacked table, such as the IntelliTXTPixelsPiggybacked table which may store information about pixels which may be piggybacked when delivering pixels from the IntelliTXTPixels table.

| IntelliTXTPixelsPiggybacked | | |
|---|---|---|
| Field | Type | Description |
| PiggybackID | Int | ID of piggyback (PK, Identity) |
| PixelID | Int | ID of pixel being piggybacked (IDX) |

IntelliTXTPixelsPiggybacked

| Field | Type | Description |
| --- | --- | --- |
| OrderID | Int | Order in which pixels should be deployed |
| URL | Varchar(1024) | URL of the piggybacked pixel |
| DeliverAsScript | Bit | 0 = deliver as image, 1 = script |

Another table may be a pixel rules table, such as the IntelliTXTPixelsRules table. This table may specify the rules for a set and the pixel to which each rule is applied or bound. One set may have multiple rules but each SetID and PixelID combination may be unique.

IntelliTXTPixelsRules

| Field | Type | Description |
| --- | --- | --- |
| PixelID | Int | ID of the pixel this entry is "bound" to (IDX) |
| SetID | Int | ID of the set this entry belongs to (IDX) |
| RuleType | Bit | Must this rule always be satisfied (1) or not (0) |
| Weight | Int | Weight of rule when satisfied (or 0 if RuleType is 0) |
| MustExist | Bit | Must the pixel exist (1) or not (0) |
| CapType | Bit | Cap comparison type is 0 for >=, or 1 for <= |
| CapValue | Int | Number of pixel impressions cap (0 for none) |

Another table may be a targeting by pixel table, such as the IntelliTXTTargetingByPixel table, which may act as an initial point for a set of rules for a set. This table may include configuration details that apply to the set of rules, so if a set has rules then there must be exactly 1 row in IntelliTXTTargetingByPixel with the relevant SetID.

IntelliTXTTargetingByPixel

| Field | Type | Description |
| --- | --- | --- |
| SetID | Int | ID of the set this entry belongs to (PK) |
| TargetWeight | Int | Combined weight value that weighted rules (PixelRules.RuleType = 0) must meet/exceed |

In some embodiments, the tables may be sent to the web servers, ad servers or any other network device so that these devices may use the data as necessary. The tables may be updated or sent to the servers periodically, such as for example every microsecond, second, minute, 30 minutes, 60 minutes, every 2, 4, 6 or 12 hours, or on daily, weekly or monthly basis. In some embodiments, the data is filtered from some tables to only get live SetID's. This may happen in the tables, such as the following tables:
IntelliTXTTargetingByPixel
IntelliTXTPixelsRules
Behavioral This phase of re-targeting may have an impact on existing behavioral functionality. The behavioral functionality may be changed as follows:

Behavioral function may be enabled to be modified for collection of user data (i.e. creating/updating a profile) as well as enabled for the use of user data (i.e. retrieving an existing profile but not updating it). As such, the existing behavioral switch may configure use of existing behavioral data. A separate switch may enable collection of behavioral data. Both switches may operate via JMX (with default taken from INTELLITXTPARAMETERS). Both switches may be disabled for a set of partner country codes, and both may be overridden per channel.

If collection of Behavioral data is enabled, but the user currently does not have a profile, a profile may be created when the user first performs an ad view.

A utility page, such as "behaviouralprofile.jsp" page, may be added, allowing inspection of any user's profile from within the host enterprise's exchange network.

The "showmypixels.jsp" page may be useful for seeing which pixels are in the user's VM_PIX cookie and which are in their behavioural profile, as well as for viewing or gathering information about the overall set of pixels. The pixels may be duplicated between the cookie and the profile, as they may be copied over using a two-phased approach, but the overall set of pixels (and impression count) may be updated and accurate.

Deployment

In some embodiments, the PixelServlet is deployed using the similar or same steps or methods that are used to deploy intelliTXT features, such as the scripts or agents to the client's machine. In further embodiments, pixelservlet is given a LiveDataLocal database access.

Feature Details

The following may be a list of features details which may be borne in mind when implementing and using an embodiment of the system:

A pixel may be owned by one campaign, even if the campaign has no active sets. In some embodiments, the ownership of the pixel cannot be transferred. In other embodiments, the ownership can be transferred. A campaign may own a plurality of pixels.

A pixel delivered as an image may not deliver script-based piggybacked pixels. In some embodiments, a script-based pixel can deliver any type of piggybacked pixel.

In some embodiments, editing a "live" pixel may not be recommended as this pixel may be used by multiple sets. Therefore once a pixel becomes live, or has rules dependent on it, the pixel may automatically be locked to prevent from any changes. This may be reflected by the lock icon in the Edit Pixel Dialog.

All mandatory pixel rules may be satisfied, whereas for weighted pixel rules only the sum of the weights of satisfied rules may meet or exceed the target weight value.

An image-delivered pixel may be used to deliver piggybacked pixels by constructing a potentially long, redirect chain.

A pixel being delivered securely (https) may be used to deliver any piggybacked pixels securely to avoid the user being presented with security warning dialogs.

A pixel's visibility to other campaigns may be determined by the pixel's visibility in relation to the campaign that owns it.

A script-delivered pixel may protect itself and its environment when it executes.

Pixel rules may be processed by type (mandatory then weighted) then by pixel id to remain deterministic.

The pixel servlet may run on a separate web node tier running a different web application to the rest of the Ad Server web nodes. This may be implemented to reduce the SSL licensing costs, but also to reduce potential latency.

Pixel servlet may retrieve a user's profile if the dropped pixel's category id is "conversion" and the LinkedPixelID is non-zero.

An embodiment of types and features of parameters used may be as follows.

| INTELLITXT PARAMETERS | JMX | Type | Default | Description |
| --- | --- | --- | --- | --- |
| behavioural.consumesPixels | GlobalSettings.BehaviouralConsumesPixels | Boolean | false | Do pixels get moved from users' cookies to their behavioural profile when they visit partner sites? |
| pixelling.maxPixelsInCookie | GlobalSettings.MaxPixelsPerCookie | Integer | 60 | Maximum number of pixels we allow per cookie. Above this number, we remove those with the lowest categoryId, starting with the oldest within each category. |
| pixelling.minPixelRepeatTimeMs | GlobalSettings.MinPixelRepeatImpressionTime | Long | 2000 (2 secs) | Minimum time between repeat impressions of the same Vibrant pixel. Impressions within this period will be counted as potential recursion and ignored. |
| pixelling.maxImpressionsPerPixelInCookie | GlobalSettings.MaxImpressionsPerPixelInCookie | Integer | 60 | Maximum number of impressions per pixel we allow in the cookie. Above this number, we remove the oldest impressions for that pixel. |
| pixelling.conversionPixelCategoryId | GlobalSettings.ConversionPixelCategoryId | Integer | 30 | Pixel categoryId which we count as a "conversion" |
| pixelling.maxRefererURLLength | GlobalSettings->MaxPixelImpressionRefererLength | Integer | 800 | The referring URL for pixel impressions will be truncated to this length before being logged to the PixelImpressions logfile. |

40

An embodiment of types and features of parameters used may be as follows.

| INTELLITXT PARAMETERS | JMX | Type | Default | Description |
| --- | --- | --- | --- | --- |
| behavioural | GlobalSettings.BehaviouralEngineEnabled | Boolean | true | Is the Behavioural engine enabled for use of behavioural data? |
| behavioural.disabledForCountries | n/a | String | DE | For which countries is use of behavioural data disabled (CSV of country codes)? Overrides the above switch. |
| behavioural.dataCollection | GlobalSettings.BehaviouralDataCollection | Boolean | true | Is the Behavioural engine enabled for collection of behavioural data? |
| behavioural.dataCollection.disabledForCountries | n/a | String | DE | For which countries is collection of behavioural data disabled (CSV of country codes)? Overrides the above switch. |

| INTELLITXT PARAMETERS | JMX | Type | Default | Description |
|---|---|---|---|---|
| behavioural.createProfileOnAdView | | Globals.BehaviouralCreateProfileOnAdView | Boolean | true | Should we create a Behavioural profile for a user when they first perform an ad view? | pixelling-info.jsp

A page, such as the "info.jsp" page for IntelliTXT, may provide information on the Pixel Server instance. Page "info.jsp" may redirect the user to another page, such as "pixelling-infojsp".

pixelling-status.jsp

A page, such as the "status.jsp" page for IntelliTXT, may provide text-only information on the Pixel Server instance. Page "status.jsp" may redirect the user to "pixelling-statusjsp".

showmypixels.jsp

A page, such as "showmypixels.jsp" may be presented as http://<webnode>/showmypixels.jsp, within the host enterprise network, shows the current user's pixels at a glance, including whether they are stored in the user's profile, their cookie, and the overall position (from combining the two). This page may be accessed via the ".intellitxt.com" domain, in order to see the user's pixels.

behaviouralprofile.jsp

A page, such as behaviouralprofile.jsp, may be presented as http://<webnode>/behaviouralprofile.jsp and may allow a user's behavioural profile to be inspected from within the host enterprise network by entering their 32-character identifier, such as a UUID.

droppixels.jsp

A page, such as "droppixels.jsp" may be presented as http://<webnode>/testpages/droppixels.jsp, and may allow a pixel to be dropped without constructing a test page.

Figure 10:
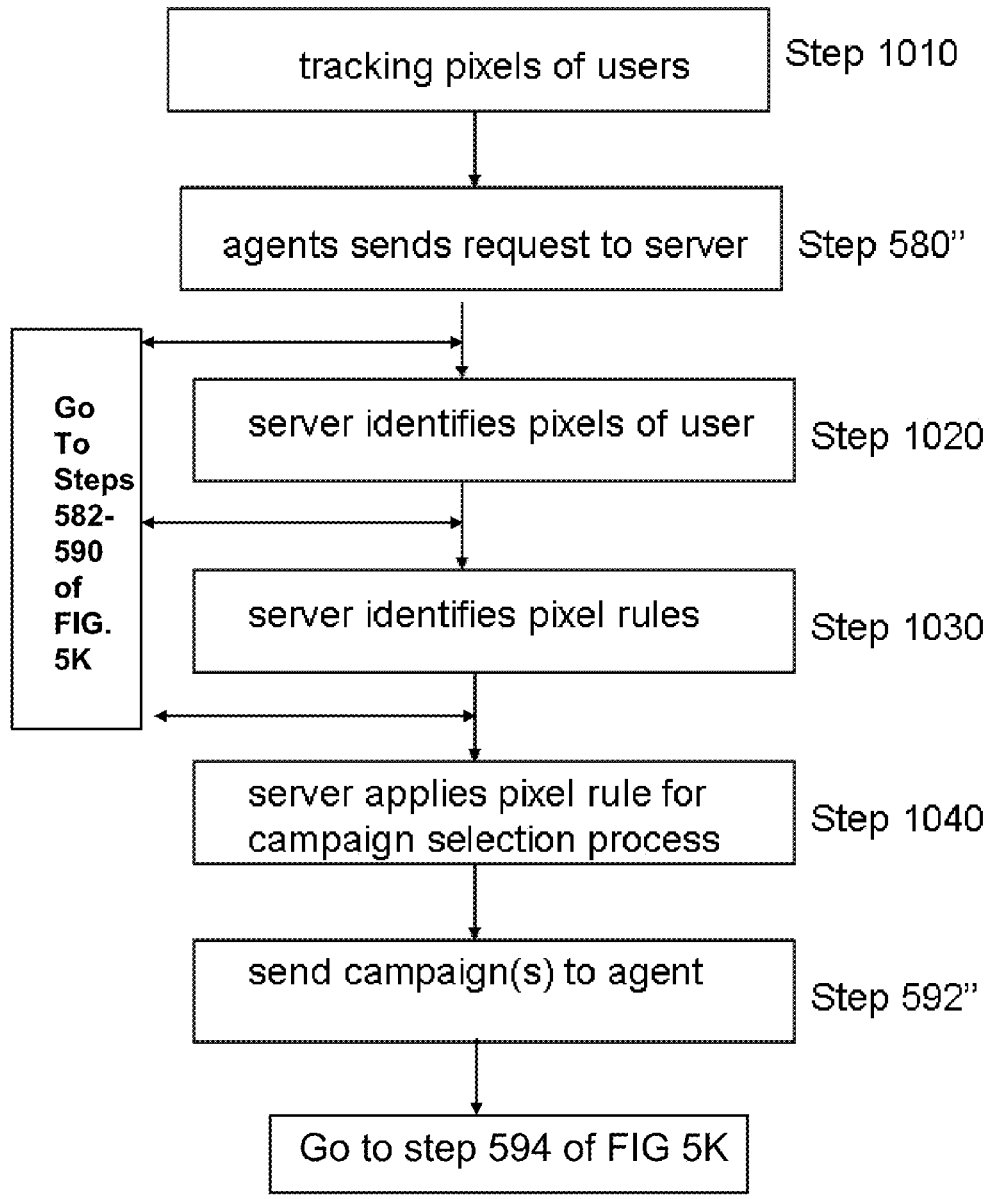
FIG. 10 is a flow diagram of an embodiment of a method for providing pixel based targeting of campaigns.

Referring now to FIG. 10, embodiments of a method for retargeting campaigns based on applying pixel rules to user's pixel history is depicted. The pixel retargeting may occur in connection any of the embodiments of systems and methods for delivering augmented content depicted FIGS. 5I, 5J and 5K. For example, the pixel tracking and rules may bused in embodiments of a system for analyzing content of a page to determine keywords to augment for one or more campaigns of FIG. 5I or in embodiments of augmented content delivered to a web page of a client of FIG. 5J. During the steps of FIG. 5k depicts embodiments of a method for analyzing and hooking keywords on a web page of a client In brief overview, at step 1010, pixels of users are tracked. Ate step 580", an agent of a browser sends a request to the server, for example, to augment a keyword on a page being loaded on the browser. At step 1020, the server identifies pixels of user. at step 1030, the server identifies one or more pixel rules that may be applied to the user or campaign selection for the user. At step 1040, the server applies the one or more pixels rules during the campaign selection process. As a result of the campaign selection process and pixel rules, at step 592"" the server sends one or more campaigns to the agent for augments the keyword based on user pixels and applying the pixel rules.

In further details, at step 1010, the systems herein track the pixelling of users and store the pixel data to a database such as a user profile, for example user pixel information 917. A server, such as ad server, may receive cookies from or associated with a user. Each of the cookie may identify the pixels of the user, the pixelling of the user or any other pixel related information. The server may also receive pixels of the user or pixelling of user or any other pixel related information from the agent. In some embodiments, the pixel comprises a URL, request or API call the informs or provides the server information of the user being pixelled At step 580" the agent 520 executing on a client 130 browser 515 may send a request to augment and/or data or content 519 from web page 517 to augmentation server 110. Step 580' may include any step, operation, action or embodiment described at step 580 of FIG. 5K. The agent 520 may be initialized, loaded and/or activated by any load event or API of the browser 515 or web page 517. The agent 520 may be executed prior to content of the web page 517 being loaded or displayed or during the loading of the web page 517. The agent 520 may identify, gather and aggregate data from the page. The agent may identify and/or gather any text portions of the web page, any content such as scripts, tags or URLs, any HTML, XML, java script or other page languages functions or code and any other content of web page 517. The agent 520 may transmit to server 110 any content identified and/or retrieved, such as text and/or any page metrics and transmits such content to server 110. The agent 520 may transmit the page data 519 together in one transaction to the server or via a series of transactions. The agent 520 may transmit the page data using any type and form of protocol. In some embodiments, the agent 520 transmits the page data while the browser 515 is loading the web page 517. In other embodiments, the agent 520 transmits the page data upon the page 517 is loaded by the browser 515. In further embodiments, the agent 520 transmits page data 519 upon receiving a message from the server 110 to send the page data 519. In still further embodiments, the agent 520 sends page data 519 within a predetermined time threshold, such as predetermined threshold 615.

Any of the steps 582 through 588 described in FIG. 5K may be performed responsive to the receipt of the request or data of step 580".

At step 1020, the server may identify the pixels tracked for the user. The server may identify the pixels of the user responsive to step 580". The server may identify the pixels of the user as part of or responsive to any embodiments of steps 582 through 588 of FIG. 5K. The server may identify pixel information tracked of the user from one or cookies received from the agent, client or browser. The one or more cookies may contain or identify a plurality of pixels. The one or more cookies may contain or identify piggybacked cookies. The server may identify pixel information of the user from a user profile or database having the pixelled history of the user.

At step 1030, the server identifies one or more pixel rules to apply for the user during the campaign selection process. The server may identify the one or more pixel rules to responsive to step 580". The server may identify the one or more pixel rules as part of or responsive to any embodiments of steps 582 through 588 of FIG. 5K. The server may identify or obtain the one or more pixels rules from a database. The server may identify or obtain the one or more pixels rules from a database, such as the pixel rules table 925. The server may identify or obtain the one or more pixels rules from the pixel retargeting manager, such as via an API call.

The one or more pixel rules and/or the pixels they specify may be assigned or owned to any type of entity or object in the system. The one or more pixel rules and/or the pixels they specify may be on a campaign basis, advertiser basis and/or agency basis. The one or more pixel rules and/or the pixels they specify may be on a global basis to all campaigns. The one or more pixel rules and/or the pixels they specify may identify or specify any type of category. The one or more pixel rules and/or the pixels they specify may identify or specify a number of times the use is exposed to the pixel or is otherwise pixelled via that pixel.

The one or more pixel rules may be mandatory pixel rules. The one or more pixel rules may be weighted pixel rules. The one or more pixel rules may be any combination of mandatory pixel rules and weighted pixel rules. Any pixel rule(s) may identify a number of times the user must be marked with a specified pixel. Any pixel rule(s) may identify that a user should not have a specified pixel.

At step 1050, the server applies the one or more pixels rules identified at step 1030 to the pixel information of the user identified at step 1020. The server may apply the one or more pixels rules the pixel information of the user identified for a plurality of campaign contenders. The server may apply the one or more pixels rules the pixel information of the user identified to each of the campaign contender. The campaign selection engine may apply the one or more pixels rules the pixel information of the user during the campaign selection process. The campaign selection engine may execute any embodiments of the method of FIG. 9I. The campaign selection engine may execute any embodiments of the CRL algorithm 937.

In some embodiments, the server or campaign selection engine determine whether each of the one or more pixels tracked for the user correspond to a pixel specified by each of the one or more pixel rules. In some embodiments, the server or campaign selection engine matches the one or more pixels tracked for the user to each pixel required by the one or more pixel rules. In some embodiments, the server or campaign selection engine matches the one or more pixels tracked for the user to each pixel to be excluded by the one or more pixel rules. In some embodiments, the server or campaign selection engine determines that the one or more pixels tracked for the user do not match a pixel required by the one or more pixel rules. The server or campaign selection engine determines whether the pixel is present or not in accordance with the specification of the pixel rule. The server or campaign selection engine determines whether how many times the user has been pixelled with this pixel accordance with the specification of the pixel rule. In some embodiments, the server or campaign selection engine sums weights, negative or positive, for any one or more pixels tracked for the user that match each pixel as specified by the one or more pixel rules. In some embodiments, the server or campaign selection engine sums weights, negative or positive, for any one or more pixels tracked for the user that do not match each pixel as specified by the one or more pixel rules.

Responsive to applying the one or more pixel rules to the one or more pixels tracked for the user, the server or campaign selection engine determines whether or not to include a campaign for the user for or during the campaign selection process. In some embodiments, the server or campaign selection engine drops or excludes the campaign from the campaign selection process. In some embodiments, the server or campaign selection engine adds or maintains the campaign in the campaign selection process. In some embodiments, the server or campaign selection engine determines that summation of weights exceeds a threshold. In some embodiments, the server or campaign selection engine determines that summation of weights is below a threshold. Responsive to the summation of weights being above, at or below the threshold, the server or campaign selection engine may exclude or include the campaign in the campaign selection process.

The server or campaign selection engine may use a combination of pixel rules and keyword matching and ranking during the campaign selection process. For example, any embodiments of FIG. 9I or CLR algorithm 937 may used in combination with the method of FIG. 5K. The server or campaign selection engine may use a combination of pixel rules, keyword matching and ranking and contextual targeting and/or behavior targeting of FIGS. 5A-5J.

At step 592", the server sends to the agent the selected keywords and their campaigns and may provide the agent tooltips and/or augmented content. Step 592" may include any step, operation, action or embodiment described at step 592 of FIG. 5K. The method may continue with any of the remaining steps 594 and 596 of FIG. 5K.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention described in this disclosure.

What is claimed:

1. A method for applying one or more pixel rules to selecting for a user a campaign from a plurality of campaigns, the method comprising:
   (a) identifying, by a server, one or more pixels tracked for a user;
   (b) identifying, by the server, one or more pixel rules for a first campaign of a plurality of campaigns, each of the one or more pixel rules identifying whether or not a pixel is required for the first campaign; and
   (c) determining, by the server responsive to applying the one or more pixel rules to the one or more pixels tracked for the user, whether or not to include the first campaign in selecting, for the user, a campaign from the plurality of campaigns.

2. The method of claim 1, wherein step (a) further comprises receiving, by the server from a client, one or more cookies of the user, the one or more cookies identifying the one or more pixels tracked for the user.

3. The method of claim 2, further comprises receiving, by the server, the one or more cookies comprising a set of piggbacked pixels as the one or more pixels.

4. The method of claim 2, further comprises storing, by the server, the one or more pixels to a profile of the user.

5. The method of claim 1, wherein step (a) further comprises identifying, by the server, the one or more pixels tracked for the user from a profile of the user.

6. The method of claim 1, wherein a pixel rule of the one or more pixel rules identify a number of times the user must be marked with a specified pixel.

7. The method of claim 1, wherein a pixel rule of the one or more pixel rules identify that a user should not have a specified pixel.

8. The method of claim 1, wherein step (c) further comprises determining, by the server, whether each of the one or more pixels tracked for the user correspond to a pixel specified by each of the one or more pixel rules.

9. The method of claim 1, wherein step (c) further comprises determining, by the server, the one or more pixels tracked for the user match each pixel required by the one or more pixel rules and including the first campaign in the campaign selection.

10. The method of claim 1, wherein step (c) further comprises determining, by the server, the one or more pixels tracked for the user do not match each pixel required by the one or more pixel rules and excluding the first campaign in the campaign selection.

11. A method for applying a pixel rule to selecting for a user a campaign from a plurality of campaigns, the method comprising:
   (a) identifying, by a server, one or more pixels tracked for a user;
   (b) identifying, by the server, a pixel rule for a first campaign of a plurality of campaigns, the pixel rules identifying one or more pixels, a weight corresponding to each of the one or more pixels and a weight threshold; and
   (c) determining, by the server responsive to applying the pixel rule to the one or more pixels tracked for the user, whether or not to include the first campaign in selecting, for the user, a campaign from the plurality of campaigns.

12. The method of claim 11, wherein step (a) further comprises receiving, by the server from a client, one or more cookies of the user, the one or more cookies identifying the one or more pixels tracked for the user.

13. The method of claim 12, further comprises receiving, by the server, the one or more cookies comprising a set of piggbacked pixels as the one or more pixels.

14. The method of claim 12, further comprises storing, by the server, the one or more pixels to a profile of the user.

15. The method of claim 11, wherein step (a) further comprises identifying, by the server, the one or more pixels tracked for the user from a profile of the user.

16. The method of claim 11, wherein the pixel rule identifies one or more mandatory pixels.

17. The method of claim 11, wherein the pixel rule identifies a negative weight corresponding to a pixel of the one or more pixels.

18. The method of claim 11, wherein step (c) further comprises summing, by the server, the corresponding weights of each of the one or more pixels tracked for the user that correspond to a pixel specified by the pixel rule.

19. The method of claim 18, further comprises determining, by the server, to include the first campaign in the campaign selection if the summation is greater than the weight threshold.

20. The method of claim 18, further comprises determining, by the server, to not include the first campaign in the campaign selection if the summation is less than the weight threshold.

* * * * *